(12) United States Patent
Keith

(10) Patent No.: US 7,383,220 B1
(45) Date of Patent: Jun. 3, 2008

(54) AUTOMATED SHORT TERM OPTION ORDER PROCESSING

(75) Inventor: Christopher Keith, New York, NY (US)

(73) Assignee: Stikine Technology, LLC, Las Vegas, NV (US)

( * ) Notice: Subject to any disclaimer, the term of this patent is extended or adjusted under 35 U.S.C. 154(b) by 1144 days.

(21) Appl. No.: 09/802,088

(22) Filed: Mar. 8, 2001

Related U.S. Application Data

(63) Continuation-in-part of application No. 09/546,031, filed on Apr. 10, 2000.

(51) Int. Cl.
G06Q 40/00 (2006.01)

(52) U.S. Cl. ......................................... 705/37
(58) Field of Classification Search .............. 705/35–39
See application file for complete search history.

(56) References Cited

U.S. PATENT DOCUMENTS

| | | | |
|---|---|---|---|
| 3,702,007 A | 10/1972 | Davis, II | |
| 4,346,442 A | 8/1982 | Musmanno | |
| 4,376,978 A | 3/1983 | Musmanno | |
| 4,456,957 A | 6/1984 | Schieltz | |
| 4,823,265 A | 4/1989 | Nelson | |
| 5,077,665 A | 12/1991 | Silverman et al. | |
| 5,101,353 A | 3/1992 | Lupien et al. | |
| 5,148,365 A | 9/1992 | Dembo | |
| 5,148,368 A | 9/1992 | Okubo | |
| 5,253,165 A | 10/1993 | Leiseca et al. | |
| 5,297,032 A | 3/1994 | Trojan et al. | |
| 5,315,634 A | 5/1994 | Tanaka et al. | |
| 5,412,804 A | 5/1995 | Krishna | |
| 5,453,601 A | * 9/1995 | Rosen | ......................... 705/65 |
| 5,615,269 A | 3/1997 | Micali | |

(Continued)

FOREIGN PATENT DOCUMENTS

WO    WO 00/63814 A1    10/2000

(Continued)

OTHER PUBLICATIONS

Hull, John C. Introduction to Futures & Options Markets. 2nd Edition. Prentice-Hall. Englewood Cliffs, New Jersey. 1995. pp. 4-6, 11, 26, 33-34 and 188-190.*

(Continued)

Primary Examiner—James A. Kramer
Assistant Examiner—Jason Borlinghaus
(74) Attorney, Agent, or Firm—Christensen O'Connor Johnson Kindness PLLC

(57) ABSTRACT

A trading process automatically requests a short term option having a term of less than a minute, and sometimes less than a second, from a market process. The trading process and the market process both operate on a platform. The market process requests a platform service to set a timer to measure the expiration time of the short term option, and to notify the market process and the trading process at the expiration of the short term option. The short term option is particularly useful for a list of orders that must be executed, if at all, at a guaranteed price; in which case, the platform may adjust the expiration time of the short term options associated with the orders in the list to ensure that the orders in the list can be executed at particular respective prices.

50 Claims, 91 Drawing Sheets

U.S. PATENT DOCUMENTS

| | | | |
|---|---|---|---|
| 5,689,652 | A | 11/1997 | Lupien et al. |
| 5,806,048 | A | 9/1998 | Kiron |
| 5,826,244 | A | 10/1998 | Huberman |
| 5,845,266 | A | 12/1998 | Lupien et al. |
| 5,847,845 | A | 12/1998 | Takahashi et al. |
| 5,864,827 | A | 1/1999 | Wilson |
| 5,915,245 | A | 6/1999 | Patterson, Jr. et al. |
| 5,924,082 | A | 7/1999 | Silverman |
| 5,924,083 | A | 7/1999 | Silverman et al. |
| 5,941,996 | A | 8/1999 | Smith |
| 5,946,666 | A | 8/1999 | Nevo et al. |
| 5,946,667 | A | 8/1999 | Tull, Jr. |
| 5,950,176 | A | 9/1999 | Keiser |
| 5,950,177 | A | 9/1999 | Lupien et al. |
| 5,953,707 | A | 9/1999 | Huang et al. |
| 5,963,923 | A | 10/1999 | Garber |
| 5,978,779 | A | 11/1999 | Stein et al. |
| 5,983,200 | A | 11/1999 | Slotznick |
| 5,987,435 | A | 11/1999 | Weiss |
| 6,012,043 | A | 1/2000 | Albright |
| 6,012,046 | A | 1/2000 | Lupien |
| 6,014,643 | A | 1/2000 | Minton |
| 6,016,483 | A | 1/2000 | Rickard |
| 6,018,722 | A | 1/2000 | Ray et al. |
| 6,021,397 | A | 2/2000 | Jones |
| 6,021,398 | A | 2/2000 | Ausubel |
| 6,026,383 | A | 2/2000 | Ausubel |
| 6,029,146 | A | 2/2000 | Hawkins et al. |
| 6,035,287 | A | 3/2000 | Stallaert et al. |
| 6,035,289 | A | 3/2000 | Chou et al. |
| 6,068,117 | A | 5/2000 | Koehn |
| 6,092,056 | A | 7/2000 | Tull, Jr. et al. |
| 6,101,484 | A | 8/2000 | Halbert et al. |
| 6,105,005 | A | 8/2000 | Fuhrer |
| 6,131,087 | A | 10/2000 | Luke et al. |
| 6,134,535 | A | 10/2000 | Belzberg |
| 6,160,204 | A | 12/2000 | Steffens |
| 6,236,980 | B1 | 5/2001 | Reese |
| 6,278,982 | B1 | 8/2001 | Korhammer et al. |
| 6,285,989 | B1 | 9/2001 | Shoham |
| 6,317,727 | B1 | 11/2001 | May |
| 6,317,728 | B1 | 11/2001 | Kane |
| 6,321,212 | B1 | 11/2001 | Lange |
| 6,343,278 | B1 | 1/2002 | Jain et al. |
| 6,377,940 | B2 | 4/2002 | Tilfors |
| 6,408,282 | B1 | 6/2002 | Buist |
| 6,418,419 | B1 | 7/2002 | Nieboer et al. |
| 6,421,653 | B1 | 7/2002 | May |
| 6,493,681 | B1 | 12/2002 | Tertitski |
| 6,493,682 | B1 | 12/2002 | Horrigan et al. |
| 6,505,174 | B1 | 1/2003 | Keiser et al. |
| 6,553,346 | B1 | 4/2003 | Walker |
| 6,594,643 | B1 | 7/2003 | Freeny, Jr. |
| 6,601,044 | B1 | 7/2003 | Wallman |
| 6,625,583 | B1 | 9/2003 | Silverman et al. |
| 6,629,082 | B1 | 9/2003 | Hambrecht et al. |
| 6,792,399 | B1 | 9/2004 | Phillips et al. |
| 6,850,907 | B2 | 2/2005 | Lutnick |
| 7,058,601 | B1 | 6/2006 | Paiz |
| 7,242,669 | B2 | 7/2007 | Bundy |
| 2001/0042785 | A1 | 11/2001 | Walker |
| 2002/0004774 | A1 | 1/2002 | Defario |
| 2002/0107781 | A1 | 8/2002 | Neyman |
| 2003/0014354 | A1 | 1/2003 | Madoff et al. |
| 2003/0014379 | A1 | 1/2003 | Saias et al. |
| 2004/0117302 | A1 | 6/2004 | Weichert |
| 2006/0195386 | A1 | 8/2006 | Glodjo |

FOREIGN PATENT DOCUMENTS

WO      WO 01/02930 A2      1/2001

OTHER PUBLICATIONS

The Options Institute. Options: Essential Concepts & Trading Strategies. 3rd Edition. McGraw-Hill. 1999. p. 420.*

"AuctionBot", 9 pages from http://auction.eecs.umich.edu, printed Mar. 30, 2000.

Maes et al., "Agents that Buy and Sell: Transforming Commerce as we Know It", Comm. ACM. Mar. 1999, vol. 42, No. 3.

Wellman et al., "Real Time Issues for Internet Auctions", First IEEE Workshop on Dependable and Real-Time E-Commerce Systems (DARE-98), Denver, CO, Jun. 1998.

Wurman et al., "Flexible Double Auctions for Electronic Commerce: Theory and Implementation", Jul. 13, 1998, to appear in "Decision Support Systems".

Mertz et al., "The Handbook of Investment Technology," Chapters 7, 8,and 15.

Keyes, Handbook of Technology Financial Services, Chapters 5, 36, 37, 40.

Teweles et al, "The Stock Market," Chapters 8 and 23.

Dalton, "How the Stock Market Works," Chapters 5 and 7.

"PeCo-Mediator: finding partners via personal connections," IEEE Int. Conf. on Systems, Man and Cybernetics 1996, vol. 1:802-7 Abstract.

Propson, "The Secret Matchmaker," Business2.Com, Mar. 6, 2001, pp. 90-93.

Arvedlund, "An Arranged Exchang," Business2.Com, Feb. 6, 2001, pp. 90-91.

Chang, "New Age Bidding: Against Computers, Humans Usually Lose," New York Times, Jan. 2, 2001, pp. 1-3.

Rijnen, "Trading Places," Alleycat News, pp. 61-73, Nov. 2000.

e-mail from lab_rat@listerv.redherring.com, dated Feb. 8, 2001, Subject: Lab Rat: Smart technology trounces traders, p. 1-5.

Lowenstein, R., "Why Stock Options Can Be Dynamite for a Portfolio," Wall Street Journal (Europe), Nov. 7, 1997, p. 13.

McGuire, C., "FIXML Set for Launch," Wall Street & Technology 17(3):50, Mar. 1999.

TSU, M.E., "Tutorial on Using Options in Active Strategies," Derivatives Quarterly 6(1):39-48, Fall 1999.

Twitchell, E.E., "Barron's Online: Extreme Markets," Barron's 80(15):36, Apr. 10, 2000.

* cited by examiner

|  | Open/<br>Closed/<br>Suspended | Open/fast<br>symbol/In-<br>Process | List of<br>ELFs<br>Registered |  | (other status<br>information) |
|---|---|---|---|---|---|
| U1 |  |  |  |  |  |
| U2 |  |  |  |  |  |
| U3 |  |  |  |  |  |
| U4 |  |  |  |  |  |
| U5 |  |  |  |  |  |
| ELF 1 |  |  |  |  |  |
| ELF 2 |  |  |  |  |  |
| ELF 3 |  |  |  |  |  |

Status spans the status columns. Umpires bracket U1–U5. Reference 74.

FIG. 11

| name of symbol | type | attributes | default value | value |
|---|---|---|---|---|
| | | | | |
| | | | | |
| | | | | |
| | | | | |

| umpire 342 |
|---|
| umpire 30 |
| . |
| . |
| . |
| umpire 154 |

AUTOMATED SHORT TERM OPTION ORDER PROCESSING

The present application is a continuation-in-part of U.S. application Ser. No. 09/546,031, filed Apr. 10, 2000, which is hereby incorporated by reference.

BACKGROUND OF THE INVENTION

The present invention relates to trading systems such as for financial instruments and other goods and services, and more particularly, is directed to a system that forms a platform for processes that can be flexibly configured to interact with each other.

Conventional financial instrument trading systems assume a particular set of rules and protocols must be used during trading. However, the financial industry is a hotbed of rapidly changing ideas and trends; because the development time and expense associated with a conventional trading system cannot change accordingly, financial innovation is stifled.

Due to the rapid proliferation of methodologies and competitors, practitioners are experiencing increasing difficulty in finding best markets, as required by their fiduciary obligations.

Meanwhile, the stress of person-to-person trading is increasing as the volume of information that must be assimilated by an individual trader increases. Despite the ever faster pace of financial markets, there is a desire to give each party's order the sort of personalized service that becomes increasingly difficult with the increasing market pace.

On the other hand, the rate at which the structure of financial markets changes is slow, in part due to the huge technology costs. The costs include building new systems and connecting practitioners to the new systems.

Finally, personal relationships remain key in large trades, that is, computer-based trading technology has not been adopted by large block traders, who still rely on the telephone. This fact has not been accommodated in conventional trading systems, which generally require practitioners to change their practices to what can be readily automated from a system implementer's viewpoint; private interpersonal agreements and arrangements have been considered unsuitable for automation in conventional trading systems.

Accordingly, there is a need for a fresh methodology for developing financial instrument trading systems.

SUMMARY OF THE INVENTION

In accordance with an aspect of this invention, there is provided a method of facilitating trading. A timer request for a short term option expiration is automatically received from a market process. A timer is automatically set to indicate the short term option expiration time.

In a further aspect, the timer is reset to ensure that the short term option remains valid.

In accordance with an aspect of this invention, there is provided a method of facilitating trading. A short term option request is automatically received from a user, the term of the option being less than one minute. The short term option is then automatically requested from a market process.

In accordance with an aspect of this invention, there is provided a method of facilitating trading. A request for a short term option having a term less than one minute is automatically received, and the short term option is automatically granted.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 11 and 13 are charts referred to when describing platform services 60;

FIGS. 17-20 are diagrams of data structures used by an order ELF;

DETAILED DESCRIPTION

The present trading system provides a platform for trading various items using an architecture that combines the flexibility of a telephone with the speed and multiprocessing character of a computer. This description of the trading system includes the following sections:
Overview of trading system
Examples of services provided using the trading system
Platform services
Order ELF setup
Order ELF operation
Order umpire setup
Order umpire operation
Use Cases It will be appreciated that many aspects of the system are not described for brevity. For example, the system is assumed to execute using a fault-tolerant operating system that guarantees transactional integrity such as Compaq (Tandem) Transaction Protection Facility or BEA Tuxedo. Transaction protection not only provides transactional integrity in the traditional sense, it also provides for back-out following the detection of race conditions.

Overview of Trading System

Overview

Platform

Figure 1:
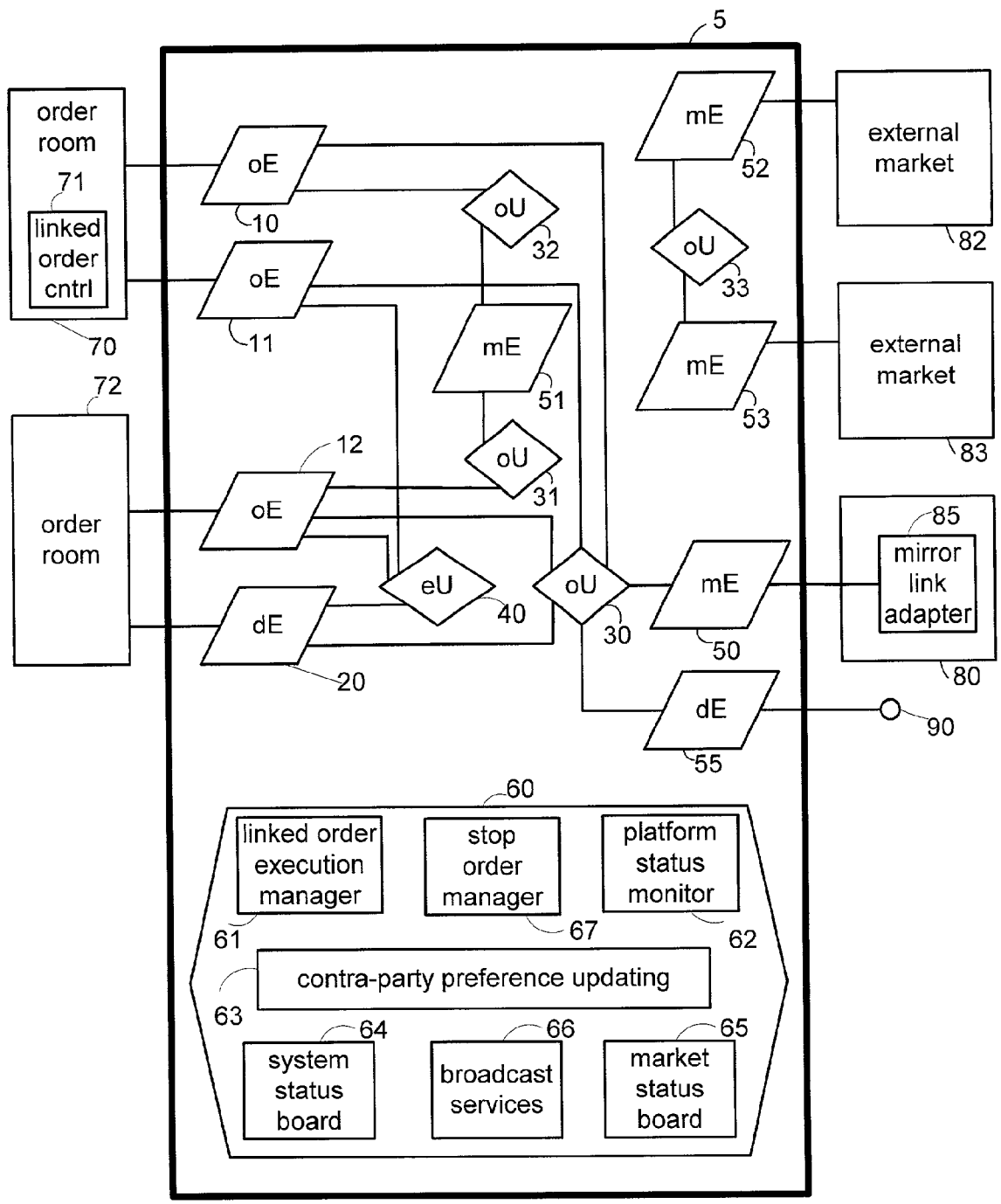
FIG. 1 is a block diagram of a trading system platform used with the present methodology.

Referring now to the drawings, and in particular to FIG. 1, there is illustrated a block diagram showing the components used with the present methodology. System 5 is a general purpose computer or network of computers programmed in accordance with the present invention and functions as a platform for allowing electronic liquidity finder (ELF) programs and umpire programs to interact. The platform of system 5 embodies a protocol for standardizing market trading methodologies, order representation and processing, and data formats. System 5 provides platform services 60 to the ELFs and umpires active within system 5. Platform services 60 includes, among other things, linked order execution manager 61, platform status monitor 62, contra-party preference updating 63, system status board 64C, market status board 65, broadcast services 66 and stop order manager 67.

In conventional securities trading systems, the term "platform" usually indicates a system for mapping data from disparate data sources onto one or more display screens to aid in comprehension of the data by a securities trader. An objective of a conventional platform is to make it easier for the securities trader to communicate with disparate data sources. In contrast, as used herein and in the claims, the term "platform" indicates a computer system for supporting software processes that can exist independently of each other and that communicate with each other in a standardized manner. That is, the platform makes it easier for processes to communicate with each other.

System status board process 64C operates in association with system status board data structure 74, shown in FIG. 11. Market status board process 65 operates in association with market status board data structure 75, shown in FIG. 13.

The platform of system 5 also includes order ELFs (oEs) 10, 11, 12; data ELFs (dEs) 20, 55; order umpires (oUs) 30, 31, 32, 33; evaluation umpire (eU) 40; and mirror ELFs (mEs) 50, 51, 52 and 53. oUs 31 and 32 are coupled via mE 51. Order room 70 is coupled to oEs 10 and 11, and includes linked order controller 71. Order room 72 is coupled to oE 12 and dE 20. External markets 80, 82 and 83 are coupled to mEs 50, 52 and 53, respectively.

An ELF may be thought of as a virtual floor broker that operates at electronic speeds. Forming an ELF is the culmination of a procedure involving configuring an order-handling program with specifications from a trader, and executing the configured program on the platform of system 5 to create an order handling engine, also referred to herein as a trading process. An order ELF may be coupled to as many order umpires as desired.

An order umpire may be thought of as a formal or informal market that defines and implements the rules of engagement by which information or merchandise is exchanged between ELFs. An umpire is formed by configuring a market program with configurations from a market provider, and executing the configured program on the platform of system 5 to create a market process. Generally, if activity in multiple markets is desirable, an order ELF elects to couple to multiple umpires associated with such markets, rather than expecting the umpires to link with each other.

An umpire publishes its rules and ELFs either agree to those rules by registering with that umpire, or they do not register. Registration with an umpire is required before an ELF can avail itself of the services of the umpire.

An ELF may elect to join the "crowd" for an umpire. An ELF crowd functions in a manner similar to crowds on trading floors. Crowd members take priority behind orders in an order book but otherwise have the time/place immediacy advantage of a floor such as ability to bid on "imbalances" at a price, and ability to interact with one another. Time is not necessarily a key priority in all trading methodologies. For example, in match programs the time that an order arrived is typically ignored. As another example, the first look methodology, described below, does not follow strict time priority.

System 5 is connected to external users 70 and 72, shown as order rooms 70 and 72, and external exchanges 80, 82 and 83 through appropriate communication channels, such as dedicated or dial-up lines, or via the Internet. A user may be represented via one or more order ELFs (oEs) and/or provide information via one or more data ELFs (dEs). In FIG. 1, user 70 is coupled to oE programs 10 and 11, while user 72 is coupled to oE program 12 and dE program 20. It will be understood that system 5 actually supports many oEs and dEs. A user or customer of an oE is a broker, institutional investor or other appropriate trading party. A user of a dE is a broker-dealer providing price quotes, a quote or trade feed from a provider, or other suitable source of data.

System 5 is depicted with order umpire (oU) programs 30, 31, 32, 33 and evaluation umpire (eU) program 40. It will be understood that system 5 actually supports many oUs and eUs and has administrative functions (not shown).

External site 80, also referred to as external exchange 80, is coupled to system 5 through mirror ELF 50 which ensures that two files or appropriately designated subsets thereof remain synchronized, one file being at external site 80 and the other being at system 5. In FIG. 1, exchange 80 is shown as including mirror link adapter program 85, which serves to translate between formats and protocols used at exchange 80 and in mirror ELF 50. As discussed below, only a limited set of messages are used to communicate with exchange 80, and mirror link adapter program 85 need only translate the limited set of messages to the internal protocol of exchange 80. It is assumed that all relevant orders arriving at external 80 are passed through mirror link adapter 85 so that these orders can also be represented in system 5. Order umpire program 30 is coupled to exchange 80 through mirror ELF program 50 that serves to pass messages between exchange 80 and umpire 30. Order umpire program 30 is also connected to external point 90, for reporting trades as appropriate, to an external point not coupled via a mirror ELF, through dE 55.

oU 33 is coupled to mEs 52 and 53, which are respectively coupled to external markets 82 and 83. A practical use for this configuration is as follows. Assume that markets 82 and 83 trade different symbols. Via mEs 52 and 53 and oU 33, markets 82 and 83 can send orders for the other market's symbol. Here, oU 33 mainly serves as a router.

One of the platform services 60 is market status board process 65, which maintains, for access by ELFs, a combined copy of all books of all order umpires as market status board data structure 75. ELFs can access market status board 75, but are limited to those portions of the combined book that were posted by umpires at which they are registered and for which portions they are authorized. Additionally, access may be further restricted for specific ELFs by the umpires at which those ELFs registered. For example, an umpire may limit a particular ELF's access to a certain depth of book, such as best market.

FIG. 1 shows mirror ELF 50 as being coupled to external system 80 and also shows oUs 31 and 32, both on the platform of system 5, being coupled via mE 51.

System 5 is described in the context of trading equity securities. However, system 5 can also be used for trading other financial and non-financial instruments such as futures, derivatives, options, bonds, currencies, power, barges, chemicals, and so on. System 5 can also be used to trade other items such as tangible items or intangible items that are represented by an ownership document, such as royalty rights or settlement amounts for a dispute. Accordingly, the terms "buying," "selling," "bidding" and "offering" should be understood from context.

System 5 facilitates competition among trading methodologies, rather than enforcing any particular methodology. Accordingly, the overhead of setting up a separate trading system each time a new item is to be traded can be avoided, so trading innovations are promoted.

Overview

Order ELF and Order Types

Typically, order ELF (oE) programs are agents representing orders from customers. An ELF program interacts with umpire programs and platform services 60; an ELF program does not directly communicate with any other ELF program. Each ELF program also communicates with its owner external to system 5.

An oE may support various types of order handling features including inquiries and cancellations of all or part of orders. A particular umpire may or may not support methodologies associated with the order handling features. Some orders utilize the full price discovery and decision mechanisms described herein before being acted upon, while other orders use market status board 75 for discovery, or are simply acted upon without any price discovery and/or decision mechanisms. In some cases, the order room overrides the ELF's processing logic and interactively provides guidance to the ELF. When an order owner, such as order room 70, sends an order to an order ELF, the order owner provides information in various fields in the order that permit the ELF's logic to make decisions about the routing and other processing of the order.

Examples of orders include:

Market order—A market order is of the form BUY 100 XYZ, meaning buy 100 shares of XYZ security at the best price available immediately; these orders may involve determining the best market available from a variety of umpires, or may result in routing the order to be filled at a single umpire.

Limit order—A limit order is of the form BUY 100 XYZ (@ 30), meaning buy 100 shares of XYZ when the price is $30 or less per share. An order book is a file of stored limit orders.

Stop request order—A stop request order, also referred to as a stop order, is a short-term option to buy or sell at a particular price. The duration of the stop may be determined by an order umpire or be one of the parameters of the stop set by the order ELF. In some cases, the order umpire specifies a time range of stops it will grant, and the order ELF's requested stop duration must be within this range. The order umpire may specify a default duration for its stops. The order umpire may charge a fee for any of its services, including each stop.

Stop exercise order—After a stop request order has been granted by an order umpire, the stop is exercised by sending a "stop exercise" order to the umpire that granted the stop request order. The umpire then provides the price indicated in the stop grant notice, for the amount in the stop exercise order, up to the amount in the stop grant notice. A stop exercise order can be sent by an order ELF to an order umpire. A stop exercise order can be sent by platform services during guaranteed linked order execution to an order umpire.

Linked order—A linked order is a set of orders executed as a single order. The constituent orders are sometimes referred to as "legs." A linked order may have an objective function associated therewith. An objective function is a parametric expression, possibly involving one or more legs, that evaluates to TRUE or FALSE. When the objective function is satisfied, that is, evaluates to TRUE, then the linked order is executable. Two variants of linked orders are described:
1. Guaranteed execution—the orders in a linked order are executed only if all can be executed in accordance with their conditions, if any. Guaranteed executions are implemented by obtaining stops for all orders, then when all stops are obtained, freezing the stops and executing the linked order. 2. Best efforts execution—the orders in a linked order are executed after it is determined that the criteria for the orders have been met. In the time between determining that the criteria have been met, and when the execution occurs, conditions may change and logic (not shown) is provided to handle such situations.

Trial order—A trial order is a type of limit order submitted to an umpire to be treated as an ordinary order with the exception that the execution is for informational purposes, only. A trial order provides information as to the price and depth of the market, and its priority at a particular price. The execution of a trial order can also be used to trigger some other action, such as a linked order.

Each oE, such as oE 10, includes decision engine program 100 that is able to access data structures including decision table 110, order table 115, price-response table 120, order control table 130, umpires table 140, ELF data structure 145 and symbol table 150. These elements are discussed in detail below.

Figure 2:
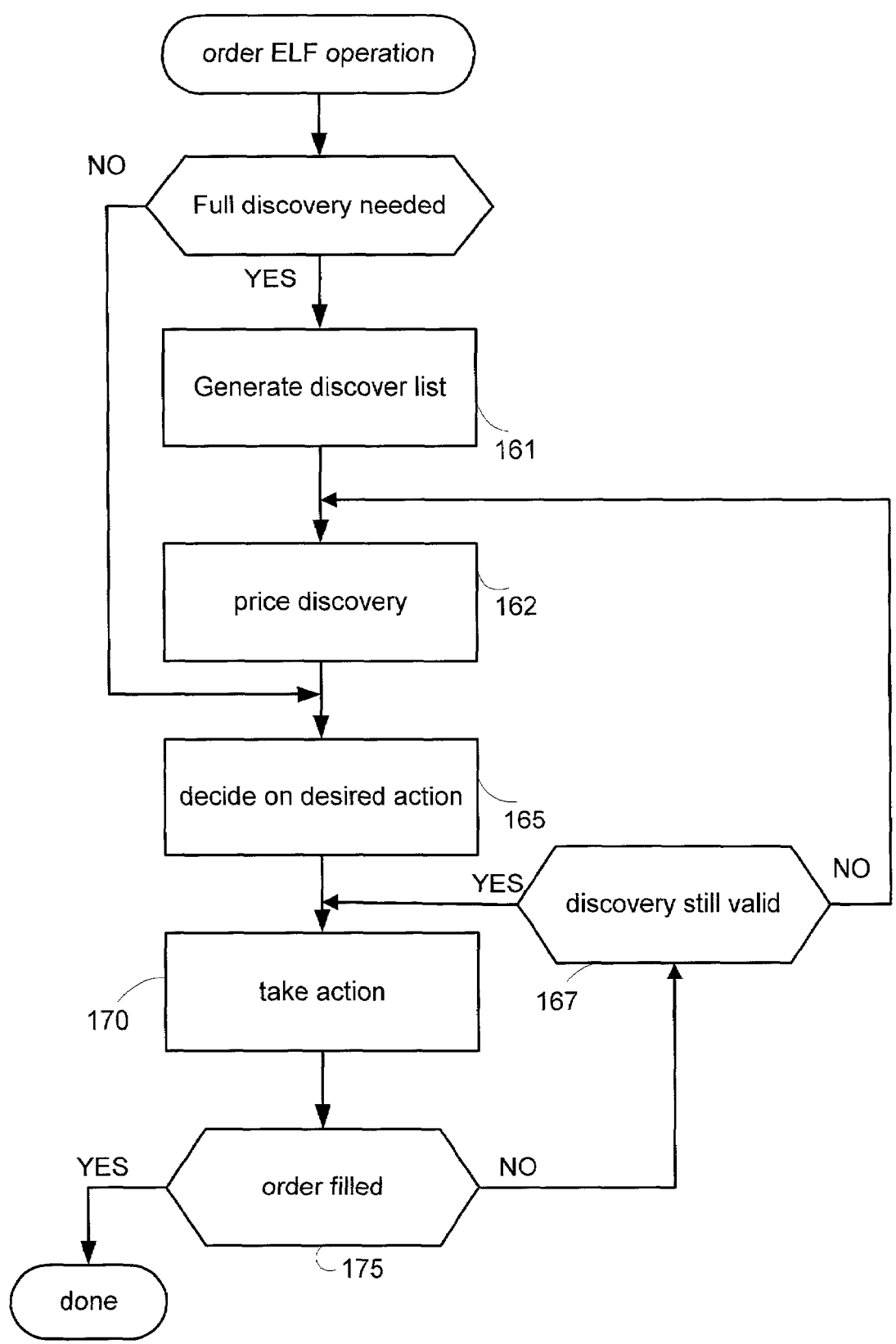
FIG. 2 is an overall flowchart of operation of an order ELF.

FIG. 2 is an overall flowchart of operation of an oE, such as oE 10. Set-up for oE 10 is discussed below. Generally, oE 10 processes orders in three phases: price discovery, decision as to what to do, then taking action; for orders for which discovery is not needed, oE 10 simply takes action.

At step 160, oE 10 determines the required level of discovery. If the order requires no discovery or if prices available at market status board 75 provide sufficient discovery for this order, processing continues at step 165. If full discovery is required, at step 161, a discover list is generated either by analysis of the order, or by consultation with the order room. A discover list is a list of umpires that oE 10 should get a price from during oE 10's discovery phase. A discover list may include discovery parameters. At step 162, oE 10 either obtains at least one price from market status board 75, or obtains a price from at least one of the oUs in its discover list and may obtain information from at least one of the eUs with which it is registered.

At step 165, oE 10 executes its decision logic for how to respond to the just-discovered prices. The decision logic may specify consulting with order room 70 or invoking additional decision logic at oE 10. At the conclusion of step 165, oE 10 has generated an action list. At step 170, oE 10 takes the actions specified in the just-generated action list. As explained below, oE 10 can act in any of the following ways depending on its own logic and the procedures of the oU it is interacting with, such as:

Accept the price for all or part of its order;
Counter-offer by proposing a different price;
Request that the oU conduct an auction for its order;
Request a stop;
Choose to join the crowd for the oU;
Take shares up to x1, price not worse than x2, not less than x3 shares;
Route a market order to the oU; or
Post its order or a portion thereof with the oU.

While in the crowd for an oU, the oE is eligible for some or all of the following:

Participating in the price improvement mechanism, if any, for the oU; and
Receiving private trade opportunities from another oE (see discussion of order umpire setup).

oE 10 may execute some of its order in one way, and the rest of its order in other ways. oE 10 repeats its cycle of price discovery, decision and action until it has paired its order or has returned the order to the order room for other action.

After an action has been taken, at step 175, oE 10 tests whether the entire order has been paired. If so, oE 10 reports the results to order room 70 and processing is complete. If the order has not been completely filled and there are actions remaining on the action list, oE 10 proceeds to step 167 and determines whether sufficient time has elapsed since the action list has been generated that the remaining actions may no longer be valid. If the action list is still valid, oE 10 continues at step 170 with the next action on the action list. If the action list is stale, for example, older than a predetermined time limit or market conditions have changed, which may be determined by the decision table, oE 10 proceeds to step 162 for fresh discovery.

Brokers presently compete by persuading customers that they can obtain better prices. In the environment of system 5, the ability for each broker to program its own ELF enables the broker to implement the features of its strategy, and continue to obtain better prices for their customers and provide personalized service to each order.

In some embodiments, the owners of the ELFs are limited to tailoring their ELFs by changing parametric settings and providing decision table logic. Custom programming is prohibited for the protection of other platform users.

Overview

Data ELF

Data ELF (dE) programs provide information to various umpires, such as market information, general business data and so on, from sources including individual market participants such as broker-dealers.

Figure 3:
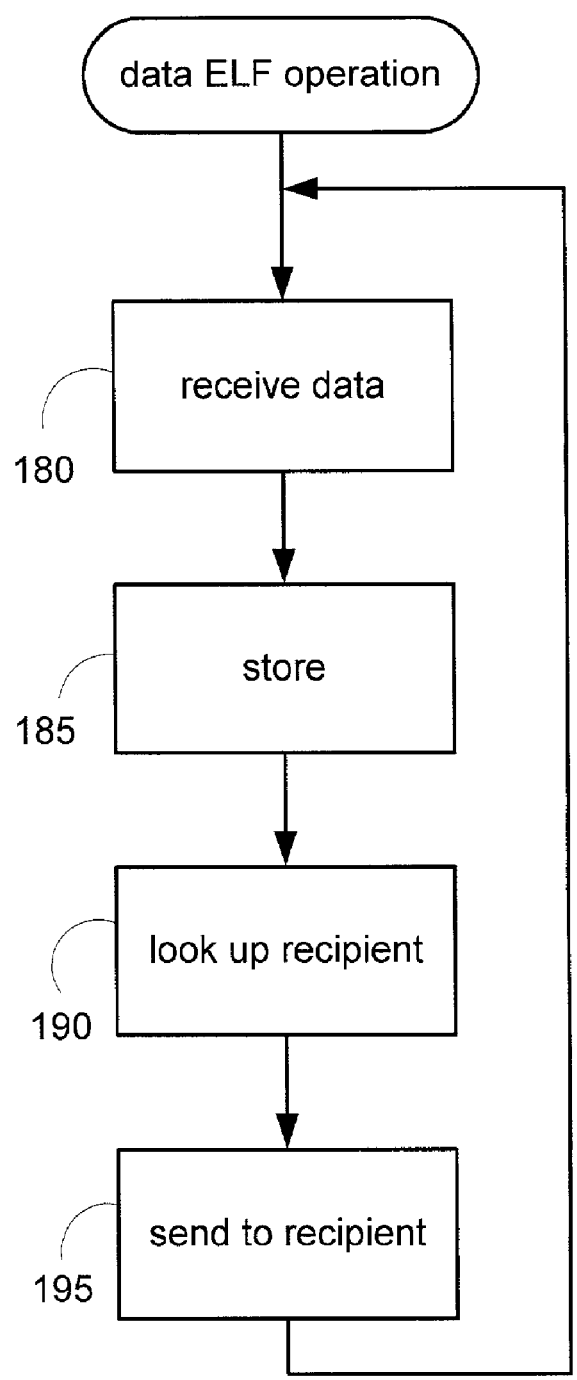
FIG. 3 is a flowchart of the operational phase of a data ELF.

FIG. 3 is a flowchart for operation of dE 20. At step 180, dE 20 receives data from user 72. At step 185, dE 20 may or may not store the received data. At step 190, dE 20 looks up the recipients for the newly stored data. Recipients get created and updated using, for example, a recipient-initiated subscription process for specified types of information to which the recipient has access authority. At step 195, dE 20 sends the newly stored data to the indicated recipients. While the description of the data ELF, above, refers to transmission of data from off the platform to umpires on the platform, it may be used in the other direction. For example, dE 55 transmits pairings to external facility 90 for execution.

Overview

Mirror ELF

Mirror ELF (mE) programs couple an order umpire with an external point, such as external site 80, or with another order umpire on system 5. A mE is also referred to as a representation process. In a generally symmetric manner, when an order is represented at oU 30 and at exchange 80, before acting upon the order, oU 30 first checks with exchange 80, and after exchange 80 confirms, oU 30 takes its action. As explained in detail below, oU 30 must ensure that exchange 80 will not act upon the order while oU 30 does so; accordingly, a mirror ELF is a conduit for cancel and post actions, but not execution actions. The mirror ELF also transmits commands between oU 30 and external 80 with respect to entering fast symbol mode (defined below), re-synchronizing the books when fast symbol mode is finished, and ending fast symbol mode. A symmetrical situation exists with respect to exchange 80 acting upon the order, and entering and leaving fast symbol mode.

Fast symbol mode is sometimes referred to herein as fast mode. Fast symbol mode is entered when a market such as oU 30 or external 80 will no longer support a two-phase commit process prior to pairing of orders and will assume all posted orders are available for immediate execution. The only actions supported in fast symbol mode are post, cancel, and execute. If external 80, for example, entered fast symbol mode, oU 30 acts as an input station, forwarding any order it receives from any ELF directly to the mirror ELF for transmission to external 80. For any symbol, at most one of the markets coupled to mE 50 can be in fast symbol mode. During fast symbol mode, an umpire may provide reduced discovery or no discovery.

Figure 4:
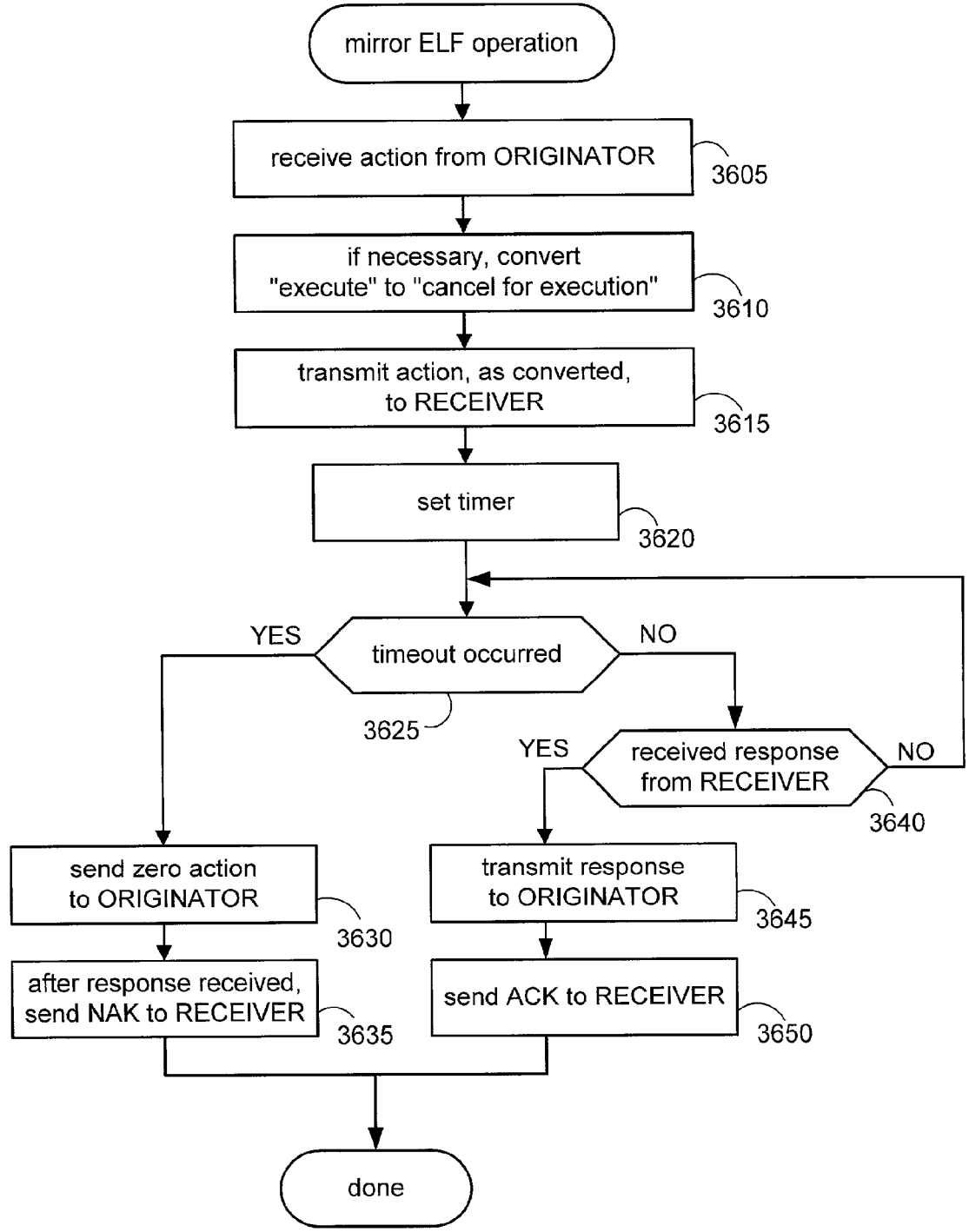
FIG. 4 is a flowchart of the operational phase of a mirror ELF.

FIG. 4 is a flowchart for operation of mE 50. At step 3605, mE 50 receives an action from an order umpire, such as oU 30, or an external point, such as external 80, referred to as an "originator" for purposes of FIG. 5. The action may be one of post, execute, cancel, enter fast mode, end fast mode, sync books, update book, request affirmation, provide affirmation and so on. "Sync books" is used when the originator is about to exit fast symbol mode and indicates that the originator will send the entire book for that symbol. "Update book" is used immediately after "sync books" to send updates received while the entire book was being sent pursuant to the sync books message.

At step 3610, mE 50 checks whether the action is an "execute" and if so, converts the action to a "cancel for execution." That is, there are two types of cancels, a "regular cancel" and a "cancel for execution," both generally referred to as "cancels." This procedure is used because an originator cannot locally execute until it has eliminated the chance of an execution in another market, that is, has cancelled from the other market.

Figure 5:
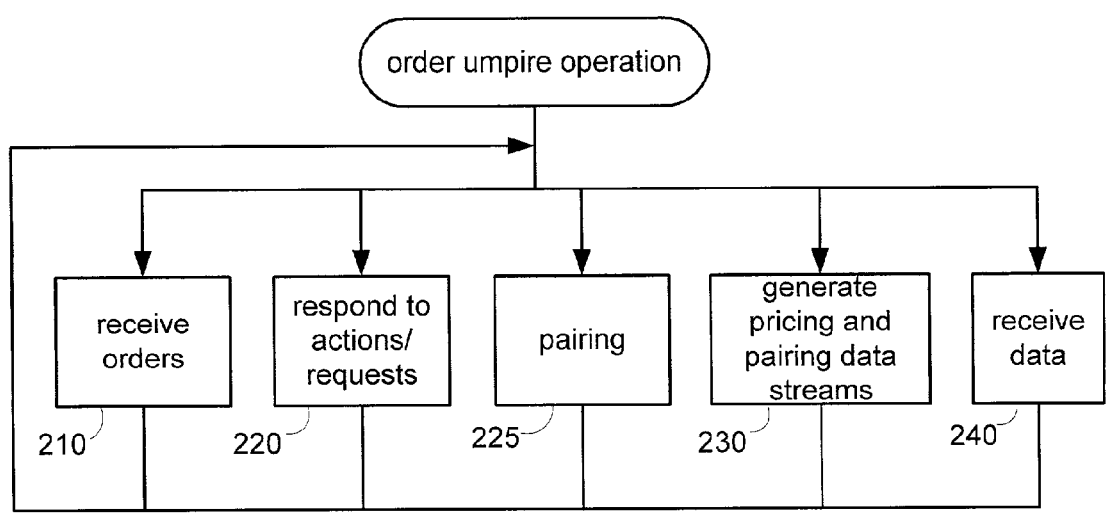
FIG. 5 is an overall flowchart of an order umpire.

At step 3615, mE 50 transmits the action, as converted, to the other of the order umpire or external point (which may be a local order umpire), referred to as a "receiver" for purposes of FIG. 5. At step 3620, mE 50 sets a timer to a value indicating by when a response is expected from the receiver. At step 3625, mE 50 checks whether a timeout has occurred, that is, the timer value and the system actual time are the same. If not, then at step 3640, mE 50 checks whether a response has been received from the receiver. If not, processing returns to step 3625.

If at step 3625, it is determined that a timeout has occurred, then at step 3630, mE 50 sends a zero action response to the originator. At step 3635, mE 50 configures itself to send a negative acknowledgement (NAK), indicating that the response was too late, after a response is received from the receiver. Processing is now complete.

If at step 3640, it is determined that a response has been received from the receiver, then processing proceeds to step 3645, where mE 50 transmits the response from the receiver to the originator. At step 3650, mE 50 sends an acknowledgement (ACK) to the receiver. Processing is now complete. Generally, the response indicates a number of shares that was acted upon. In some cases, such as a cancel, the response may also include a number of shares in-process. In one embodiment, when the originator sends a request for affirmation as the action, and the receiver is an existing trading system or exchange that does not do affirmations, then mE 50 generates an affirmation on behalf of the receiver.

Overview

Order Umpire and Pricing

An order umpire (oU) program serves as a facility that implements the rules of engagement between two or more ELFs for exchanging information or merchandise. Any user of system 5 can create an oU that acts as a meeting place for oEs that choose to follow the rules thereof. A user of system 5 sets predetermined parameters to define an oU; the parameters for each oU can be set independently of the parameters for all other oUs. Accordingly, oUs may follow the same market methodology, similar market methodologies, or entirely different market methodologies.

As explained, by registering with an umpire, the ELF agrees to the rules of that umpire. An umpire program provides services to ELF programs and may represent orders sent to it by ELF programs. An umpire program interacts with ELF programs and platform services 60; the umpire program does not directly communicate with any other umpire program. Umpire programs do not communicate directly with users external to system 5.

FIG. 5 is an overall flowchart of an oU, such as oU 30, showing that the oU has functions that are executed at various times: receiving orders, responding to action/discover requests, pairing, generating pricing and pairing data streams, and receiving data. As discussed below, there is a set-up period during which logic and parameters for the oU are defined, including price discovery parameters, and during which the oU grants access to one or more oEs.

At step 210, oU 30 receives orders and stores them in an order book.

At step 220, oU 30 responds to certain oE actions and requests, such as registering and deregistering from its crowd. Another type of request that oU 30 responds to is discovery, by performing a pricing function, including the following:

Collecting prices from various sources including its own order book and dEs, and oEs registered in its crowd during a price improvement procedure;

Computing a current price; and

Responding to requests by providing its current prices.

Parameters relevant to discovery include the following characteristics, specified on an umpire-by-umpire basis:

T1 Maximum time an umpire takes to return a price

METHOD Pricing methodology (to determine price)

L In-process timer defining the maximum interval that a periodic umpire will be in-process DP Depth of prices returned (amount of price data)

T2 Amount of time for which the returned price is good (executable), that is, the returned price can be soft or instant or held for some period FS This field may contain one of several values to represent, for example: that this umpire is always in fast symbol mode; or that this umpire may go into fast symbol mode from time to time.

MM Method modifier

The parameter T1, when set appropriately, provides time for an umpire to solicit price improvement from its crowd or otherwise obtain data in responding to a discover request.

The parameter METHOD identifies how the umpire will provide prices. Pricing methodologies may be characterized as "on demand," "periodic" or "continuous" and include:

"Stored" (book), meaning that the price is determined based on an order book,

"Superbook" meaning that the price is determined based on an order book and with a price improvement mechanism: an auction for the crowd of oEs registered with the umpire. The price improvement mechanism is operative during discovery and during execution. During discovery, an inquiring order ELF can indicate that it "accepts auction mode" meaning that if an order ELF in the crowd provides a better price than the superbook umpire's book, then the inquiring order ELF will accept the crowd ELF's price. During execution, just before a superbook umpire moves to booked orders at a new (worse) price to fill an active contra side order, the superbook umpire notifies order ELFs in its crowd of the opportunity to improve the price.

"Auction" meaning that the price is determined by an auction according to predetermined auction rules, "Match" meaning a process with three aspects: 1) pairing, 2) price assignment, and 3) reporting to participants and possibly other places such as an exchange. A match methodology may only do aspect 1, or aspects 1 and 2, or aspects 1, 2, and 3. Pairing is determined by selecting orders according to a predetermined procedure. Price assignment is made according to established rules such as a Market Mid-Spread Match that obtains the spread for the market from an external source and uses the midpoint of the spread to set the match price of orders. Reporting of pairings is done depending on a parameter of the umpire.

"Negotiation" meaning that the parties negotiate to arrive at a mutually agreeable price. System 5 supports three forms of negotiation:

1. Inquiry—market information is provided to a filtered set of users on a discretionary basis. For example, the umpire sends a "negotiation possibility" notice to each party, including information such as the telephone number of the other party so that the parties can negotiate outside system 5;
2. Third party—the umpire, at the time it is created, names a third party to conduct the negotiation or defines a method such as BidPlus, discussed below, to conduct the negotiation. At the time of the negotiation, the third party negotiation umpire provides both orders to the third party. According to the well-known procedure of the third party, it may simply provide a price to both parties, or it may contact each party to mediate the negotiation. It will be appreciated that the third party may be a human or a computer process, such as another umpire; and
3. Direct—the umpire acts as an automated broker and/or message switch.

"BidPlus" referring to a periodic matching method that allows users to select a liquidity curve specifying price aggressiveness per quantity traded. For instance a curve might indicate a trader would want the market price if selling 10,000 shares but would drop 10 cents a share to sell 20,000 shares, and 30 cents a share to sell 40,000 shares. The 10 cents and 30 cents are the premiums at the different share amounts. BidPlus has a simple specification (one parameter), and a fair method. This method asserts to the user, "anyone less aggressive will trade at a price no better than yours." Thus, if a user indicates a willingness to Buy at 80, the user will Buy for at best no more and perhaps less than anyone indicating a lower maximum price.

The owner of an order may specify the negotiation form, thereby selecting appropriate order umpires. In some cases, an order umpire supports multiple forms of negotiation, with certain forms of negotiation possibly being available only to certain order ELFs.

The parameter L defines the behavior of an umpire regarding an in-process interval, that is, the maximum time that a periodic umpire will remain in-process. An example is how long it takes to run a match. During the time when the umpire is in-process, the order cannot be cancelled. The in-process Umpire may execute all or part of the quantity of the order. If it is executed, the ELF will not be given a chance to confirm if the quantity of the order is still available.

The parameter DP indicates how much pricing information will be provided. A depth equal to zero means no prices are returned, also referred to as a "blind book." A depth of one means the best price is returned. A depth equal to "best plus max" means the best price plus sufficient depth to fill the order up to a maximum depth is returned. A depth equal to "all" or "infinite" means the entire book is returned, or changes to the book since the last time a price was requested.

The parameter T2, sometimes referred to as the price characteristic, indicates how long the price can be relied upon for an execution. For example, T2 may be set to one of the following:

s The price is a soft price, that is, an indication, that cannot be used for an execution, and may change at any time
n A positive integer signifying the number of time units that the price is good for. A value of zero indicates the price is only good immediately. Time units are measured in "Processing Time Units," an abstraction that can expand or shrink with respect to clock-time to take into account heavy versus light processing loads. The purpose of using processing time units is to prevent fluctuations in processing loads from significantly changing the way umpires process orders.

The parameter FS—fast symbol mode—contains one of several values to represent, for example: that this umpire is always is in fast symbol mode; or that this umpire may go into fast symbol mode from time to time. When an umpire is in fast symbol mode, the umpire may alter the amount of discovery available to an ELF, and may assume posted orders are available for execution without affirmation. For example, when an umpire's internal queue length of waiting orders exceeds a predetermined amount, or some other measure is exceeded, the umpire may go into fast symbol mode. Fast symbol mode is of indeterminate length, and terminates only when the umpire explicitly decides to terminate it. When an umpire enters or leaves fast symbol mode, it advertises that fact by broadcasting it and by updating system status board 74. Before an umpire goes into fast symbol mode, it waits for acknowledgement of fast symbol mode from each ELF having one or more orders in its book. An ELF may cancel all or part of its orders from the umpire at this time. If the umpire does not receive an acknowledgement for an order in its book after a timeout period, the umpire treats the lack of acknowledgement as a cancel from the owning ELF and cancels the order. When an order ELF receives notification that the umpire will go into fast symbol mode, the oE decides whether to leave its order in the umpire's market based on a number of factors, including the oE's parametric settings.

The parameter MM means different things depending on the METHOD parameter. For some methods, MM is unspecified. For example, when the METHOD is set to "market best" then MM is the amount per share that the umpire will pay. As another example, when the METHOD is set to "price improvement" then MM specifies the percentage amount of price improvement.

The price discovery parameters can be varied in numerous ways. Table 1 indicates settings that yield conventional pricing methods. Other settings may enable new pricing methods.

TABLE 1

| T1 | Method | T2 | Methodology |
|---|---|---|---|
| 0 | book | 0 | standard book |
| Infinity | book | 0 | blind book |
| value | auction | Not applicable | Dutch auction |
| value | external value | Not applicable | match |
| value | negotiation (inquiry type) | 0 | inquiry |
| value | superbook | 1 | representation |

The methods in which T2 is not applicable are "periodic" methods in that once the process begins on the affirmed orders, the prices are returned without further interaction of any kind by the controlling ELFs. At other times, orders may be booked or canceled at will.

In addition to the parameters above, an umpire may enforce the privacy policy of its ELFs by guaranteeing that only the information specified in the ELF's "disclosure signature" will be given to any other ELF. The disclosure signature is selected from one of seven levels 0-6 shown in Table 2.

TABLE 2

| Level | Fields disclosed if potential match | Fields disclosed if inquiry, no match |
|---|---|---|
| 0 | no | none |
| 1 | ID | none |
| 2 | ID, topic | none |
| 3 | ID, topic, side | none |
| 4 | ID, topic, side, approx min lot size | ID, topic, side, approx min lot size |
| 5 | ID, topic, side, min lot size, soft price | ID, topic, side, min lot size, soft price |
| 6 | ID, topic, side, min lot size, hard price | ID, topic, side, min lot size, hard price |

The term ID means the ID of the owner of the ELF, that is, the trader or designated broker if there is one. The term "topic" indicates a symbol. The term "side" indicates whether this is a buy or a sell. The term "min lot size" indicates the minimum number of units that will be considered. The term "approx min lot size" indicates that the min lot size will be characterized as either a large or small order. The term "soft price" means that the price is an indication and the term "hard price" means that the price is firm.

A call list associated with an order is a list of contra-parties to whom the order may, or may not, be shown and what the disclosure signature will be for each listed party. Each party in the call list may be identified by name or by characteristics, and wild card characters may be used if a party's name is not fully known. Assuming an affirmative call list, ELF-1 must match an entry in ELF-2's call list to be eligible to interact with ELF-2. Assuming a negative call list, if ELF-1 is on ELF-2's call list, then ELF-2 will not interact with ELF-1. Each ELF can have an affirmative call list and a negative call list. An interaction must be permitted by both parties in order to occur.

At step 225, oU 30 interacts with oEs by performing various functions that may include:
  Reporting order pairings;
  Maintaining an order book for orders entrusted by an oE;
  Providing execution to an oE;
  Responding to a request for a stop from an oE;
  Responding to a counter-offer from an oE; and
  Conducting an on-demand auction to promote pairings between orders in the ELF crowd and booked orders.

To illustrate the terms "take," "pair," "report" and "execution," let it be assumed that oE 10 posts an order with oU 30. oE 12 now might come to oU 30 for discovery for its order. Following discovery, oE 12 may decide not to "take" any of the discovered orders, or it may attempt to "take" one or more of the discovered orders, including the order posted by oE 10. If oE 12 decides to take oE 10's posted order, oU 30 will ask oE 10 to affirm how much, if any, of the posted order remains. Let a specific quantity of shares of the order from oE 10 be affirmed. oU 30 "pairs" the shares from oE 10 and oE 12 to create a "pairing." If, for example, it is necessary for this umpire to report pairings to an external exchange and the pairing is successfully reported, then an "execution" has occurred. Reporting to an Exchange is an example of a pairing turned into an execution but not the only one. As another example, if the umpire has been set up on the basis that a "pairing" is a contract, then a pairing is an execution. That is, when an umpire does not have to report pairings to an external exchange, a pairing is an execution if the umpire's rules so specify. Alternatively, a pairing can be reported to the order ELFs and at least one of the order ELFs is responsible for doing what is necessary to convert the pairing into an execution, such as reporting to an exchange, sending an invoice to a contra-party, and so on.

Parameters relevant to ELF-umpire interaction include:

| | |
|---|---|
| DT | decision table |
| PRICE | umpire supports posting and counter-offers |
| PROCMOD | process modifier |
| DISCLOSURE | representation disclosure for oEs registered in crowd |

The parameter DT is set to one of a set of values:

| | |
|---|---|
| DT = NONE | umpire parameters are presented to an oE as indicated in the remainder of the umpire parameters |
| DT = STANDARD | use predefined table, includes which oEs are eligible for parameters of the table |
| DT = SPECIAL | enables creator of umpire to specify, by individual oE or a set of oEs, the special behavior of that umpire for those oEs |

The parameters PRICE, PROCMOD and DISCLOSURE may be enabled or disabled for any particular umpire. When they are enabled, an oE may use them. When they are disabled, they are unavailable.

The parameter PRICE indicates to an oE that this umpire supports posting and counter-offers.

The parameter PROCMOD, process modifier, specifies which of a set of additional capabilities this umpire provides, for example, enabling posting an order resulting in a crossed market.

The parameter DISCLOSURE indicates to what extent an oE is visible to others, and has one of the following three values: anonymous, ordinary or "serious," when an umpire permits representation and an oE registers in the crowd. The "serious" value is used by an oE to indicate to contra-oEs that the oE has a large block to trade.

At step 230, oU 30 generates data streams containing pricing and pairing information. For example, oU 30 can put the following into the data stream, among others: the price whenever a price changes or is about to change, or the price whenever a pairing occurs. The data stream may be broadcast via the broadcast services 65.

At step 240, oU 30 receives data, such as a price or business-related data from a data ELF, and stores the received data.

Overview

Evaluation Umpire

Evaluation umpire (eU) programs provide information or services in response to requests from order ELF programs; an eU provides an analysis service to oEs. For example, an eU may calculate a "theoretical price" for a particular instrument, the price being used by the oE in its decision logic.

Figure 6:
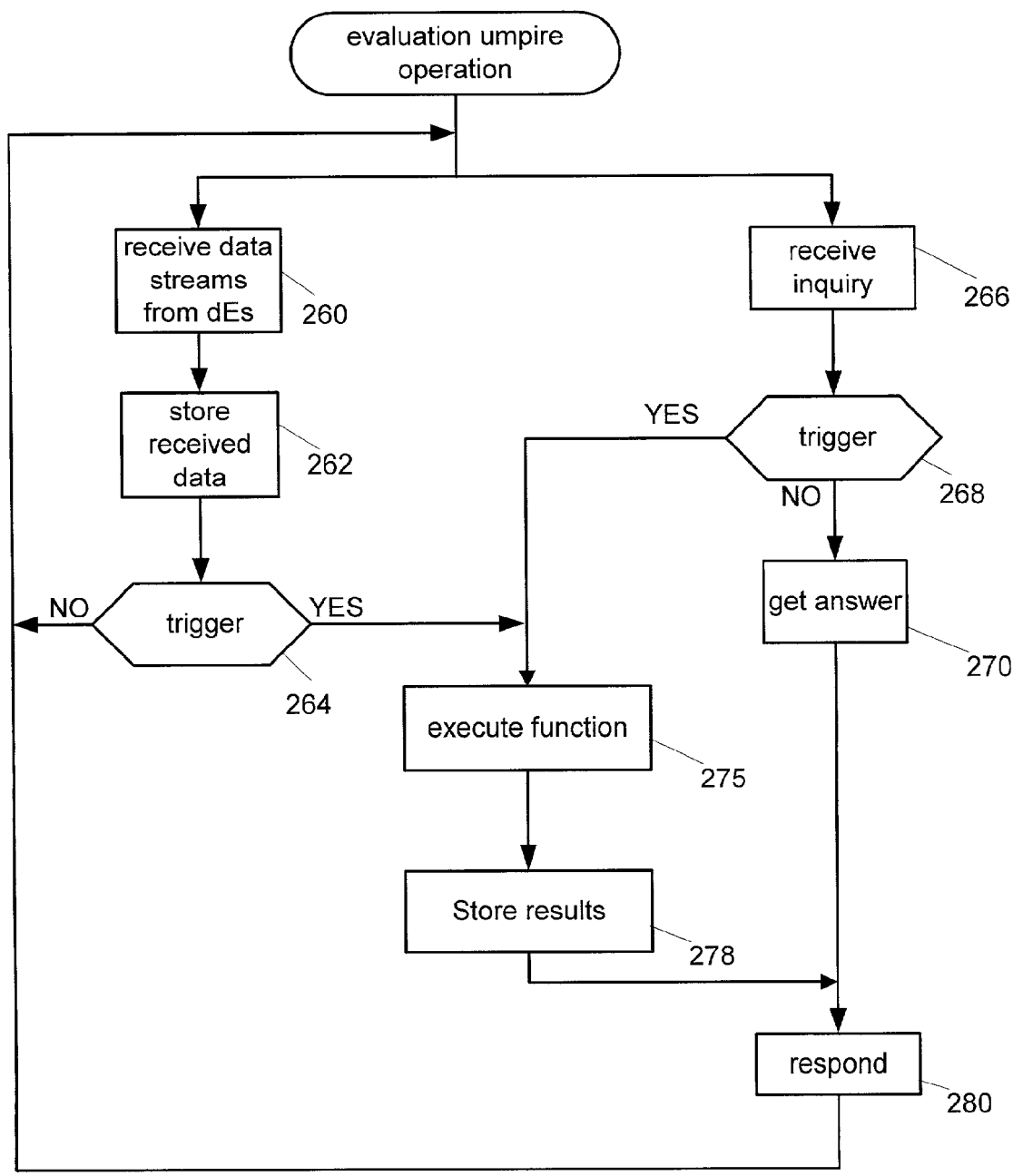
FIG. 6 is a flowchart of the operational phase for an evaluation umpire.

FIG. 6 is a flowchart for operation of eU 40. As shown, eU 40 performs two functions: receiving data from at least one dE (steps 260-264) and responding to inquiries from oEs (steps 266-280). At step 260, eU 40 receives data from a dE, such as dE 20. At step 262, eU 40 stores the received data. In the course of receiving data in step 260, at step 264, a trigger event may be detected. If a trigger event is detected, eU 40 proceeds to step 275 to execute eU 40's analysis function. Following execution of its analysis function, at step 278, eU 40 stores the result for later use. At step 266, eU 40 receives an inquiry from an oE, such as oE 11. At step 264C, eU 40 determines whether the inquiry or some data pattern causes a trigger. If a trigger is detected, then at step 275, eU 40 executes its analysis function, and at step 278 stores the result. If a trigger is not detected, then at step 270, eU 40 prepares an answer to the inquiry. At step 280, eU 40 responds to the inquiry.

Examples of evaluation umpires include:
Umpires that aggregate and analyze data from a variety of sources and continuously produce the results of that analysis. These results may be obtained by the oEs connected to the umpire. Results may include market indices and averages; and
Umpires that execute a proprietary analytical model for a fee to provide results to an inquiring oE.

An evaluation umpire is one instance of a broader category of umpires called service umpires. Service umpires are of two categories: umpires that make evaluations and umpires that perform an action. Evaluations do not change files. Services such as credit, allocation, and soft dollar tracking do change files. Service umpires may perform credit checking, certification and/or clearing.

Examples of Services Provided Using the Trading System

Using the platform of system 5, with order umpires representing markets having respectively different trading methodologies and order ELFs representing different traders, a wide variety of services are readily provided. Several such services are discussed below to illustrate the flexibility of system 5.

System 5 enables humans to trade via order ELFs in a manner which preserves the relationship nature of trading. In contrast, conventional trading systems typically assume traders are willing to interact with an electronic database in a uniform way no matter who is on the contra side, and so, even after years of electronic trading system availability, traders eschew conventional electronic trading system for large block trading.

System 5 provides an environment that facilitates rapid launching and cost-effective operation of new trading methodologies. In contrast, conventional trading systems are based on a single trading methodology, and are very expensive and time-consuming to change.

System 5 provides an environment in which the increasing fragmentation of markets can be readily implemented, while providing the ability to find a best market according to respective criteria for a best market supplied by each user.

Advantages of system 5 include improved market information, flexible order routing, representation of an order in multiple markets, ability to find size liquidity, reducing market and disclosure risk, ability to simultaneously execute a linked order with multiple legs, improved order management, improved market service versatility due to a range of trading, informational and advisory services, improved market connectivity with immediate connections once on the platform of system 5, empowering users to define their own ELFs and umpires, facilitating innovation as a custom umpire can be provided inexpensively and quickly, facilitating a common liquidity pool for exchanges while maintaining independent systems, and providing a platform that facilitates competition between methodologies as opposed to promoting one or more specific methodologies.

Service

Representation of Order in Multiple Markets

An order can be represented in multiple markets without risk of multiple executions. Multiple executions are prevented via several mechanisms.

In one mechanism, control over an order is associated with a particular process, usually an order ELF but sometimes an order umpire in fast symbol mode, and another process trying to execute the order must first obtain permission from the controlling process before actually executing; this mechanism is referred to as a two-phase commit.

When an umpire declares itself to be in fast symbol mode, another umpire process can execute an order represented at the fast symbol umpire, only after the order is first cancelled from the fast symbol umpire.

In another mechanism, an order umpire can declare itself to be in-process, and then another order umpire that subsequently becomes in-process skips its own orders that it finds, via the respective order tails of the orders, to be in-process at umpires having an in-process start time preceding the in-process start time of the instant order umpire.

It is also possible for an individual order to be in-process at an umpire, although the umpire itself is not in-process.

When an umpire is in-process, an order represented at the in-process umpire cannot be cancelled.

When an order is in-process at an umpire, the in-process order cannot be cancelled.

Accordingly, an order ELF must manage its order so that the order is in-process at no more than one umpire.

The two-phase commit and in-process mechanisms are integrated in system 5.

Figure 93A:
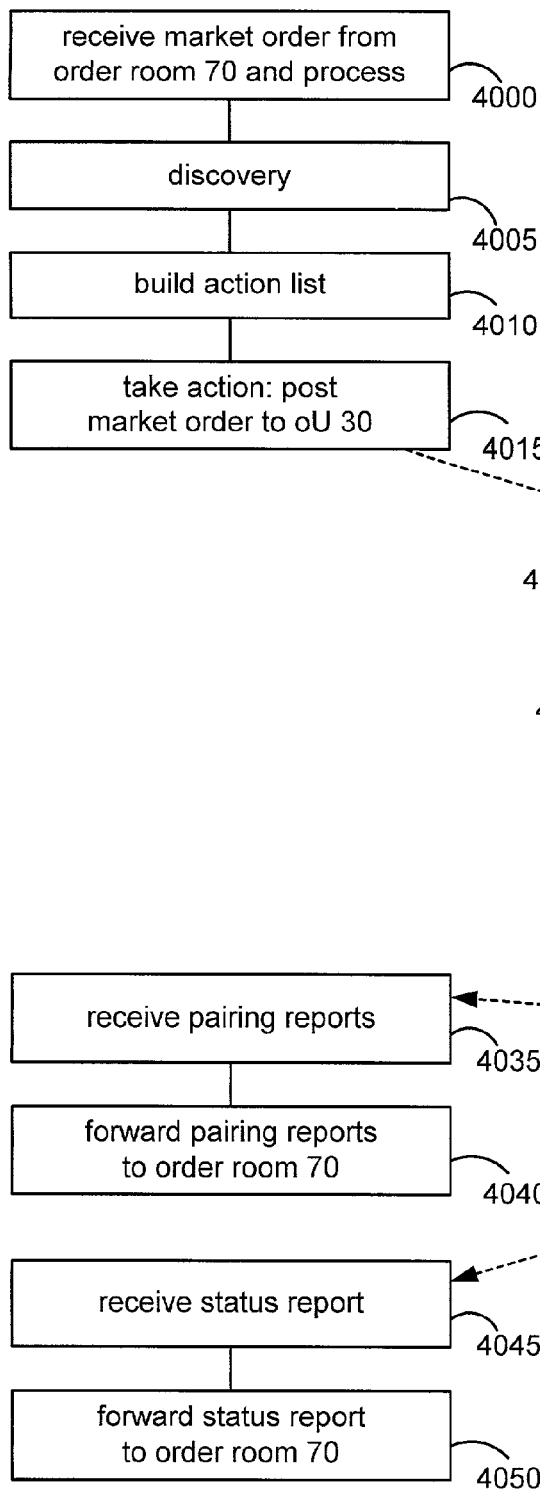
FIG. 93A is a chart showing processing of a market data order in system 5.
Figure 93A:
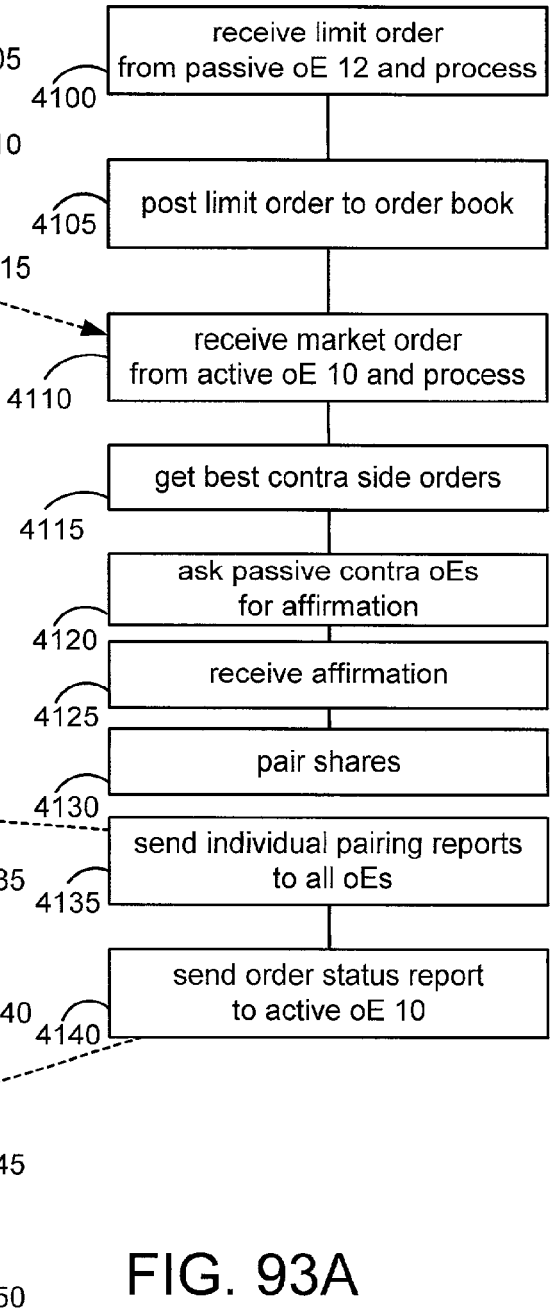
Figure 93B:
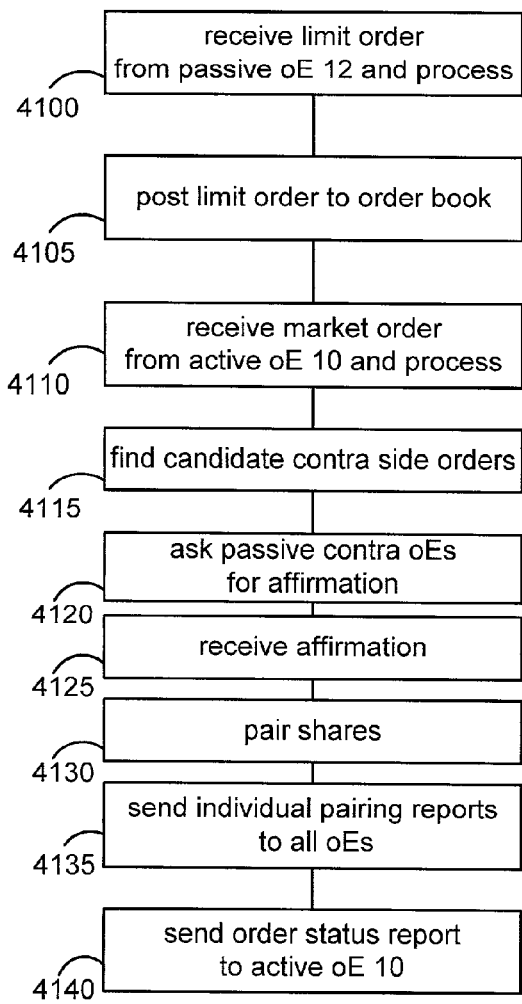
FIG. 93B is a chart showing processing of a limit order in system 5.
Figure 93B:
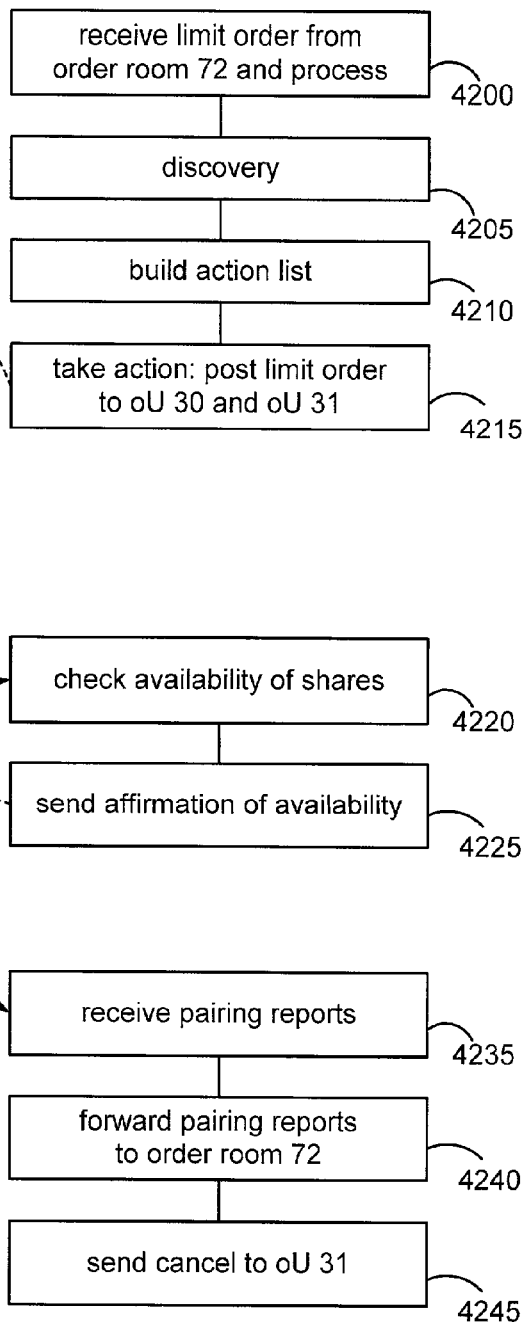
Figure 93C:
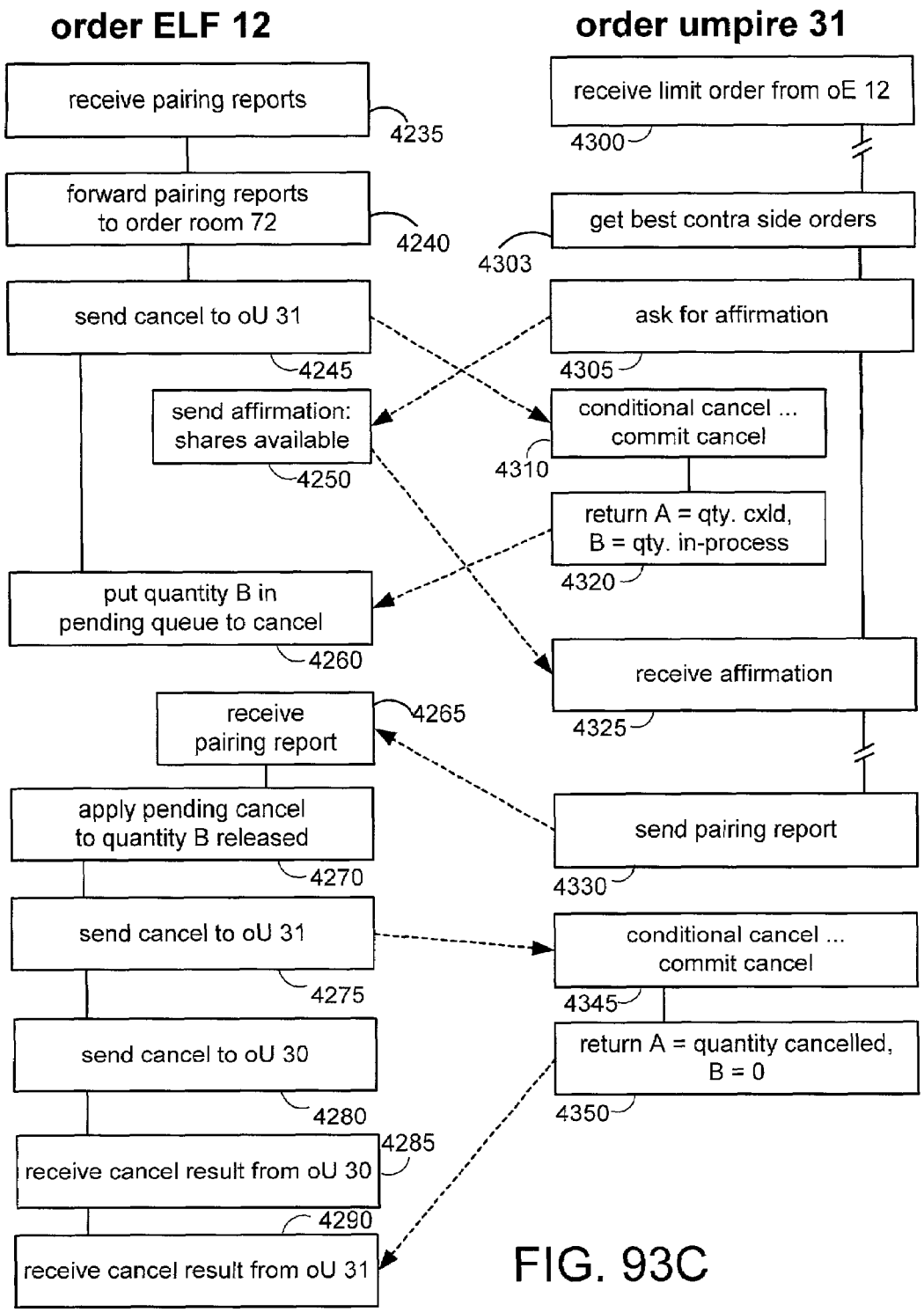
FIG. 93C is a chart showing processing that prevents duplicate order execution.

FIGS. 93A-93C show an example of representing an order in multiple markets, specifically, an umpire asking an order ELF for affirmation before pairing the ELF's order with a contra-side order, and an order ELF canceling its order from a second market after the order is paired in a first market. See also Tables 14-16.

Conventional trading systems assume that an order represented in their marketplace is immediately available for execution, that is, conventional trading systems permanently operate in fast symbol mode. Accordingly, with conventional systems, when a trader wishes to represent an order in multiple markets, the trader runs the risk of multiple executions. Some trading systems are aware of other markets and will route orders in their market to another market when the price is better; however, conventional markets adhere to the concept of control over the order being embedded in the order. In contrast, system 5 separates control over the order from where the order is represented.

Service

Routing Control for Orders

System 5 enables sophisticated and flexible management of order flow by providing various features that a trader uses as desired.

When an order room sends an order to system 5, the order room can choose from among multiple order ELFs. Each order ELF implements a desired order processing strategy, ranging from a very simple strategy such as, "no discovery just forward to market with best price," to a complicated strategy such as, "check market conditions, get analysis from service umpire, ask order room for decision if (condition set 436) is true, take quantity if (condition set 221) is true else join crowd for umpires meeting (condition set 57) until (condition set 10) is true then execute (action 43)." Accordingly, orders with a simple handling strategy need not be delayed while processing orders with a more complicated handling strategy. Since an order room can instantiate as many order ELFs as desired, system 5 is readily scalable.

Because each order ELF can implement a different strategy, traders can provide as much personalization as desired to each type of order, based on the characteristics of the order as well as market characteristics.

The amount and type of discovery performed for each order can also differ depending on the characteristics of the order and market characteristics. Thus, routing can be based on an internal decision process alone, sometimes with previously obtained data and/or advice, or can be based on external data and/or advice obtained especially to make a routing decision.

An umpire responds to a discovery request from an ELF by providing at least one of a price, a symbolic code, and an alphanumeric message. A price is a currency number. A symbolic code has a meaning understood by a particular umpire-ELF pair; depending on the umpire's rules, the same symbolic code may be used for all ELFs, or each ELF can have its own special symbolic codes at the umpire. An example of a symbolic code is "U332" which may mean, "umpire will improve best published price from any other umpire by 0.02 per share." An alphanumeric message is to be displayed to a trader. An example of an alphanumeric message is, "call Beth at (123) 456-7890 mentioning Jones order."

An order umpire routes when it applies discretion rules to the orders in its stored order file, also referred to as its book, resulting in booked orders being shown to an active oE or matched with an order from an active oE.

Since umpires can also implement different strategies, and special codes can be defined for a particular pair of umpire and ELF, the discovery responses provided to an ELF can be very personalized, reflecting the relationships between the umpire and ELF as well as other ELFs.

System 5 enables an order to obtain discovery from as many formal and informal markets as desired. A formal market is an organized trading market complying with SEC rules. An informal market is any liquidity provider other than a formal market, such as an individual willing to provide liquidity, possibly only to selected parties.

In system 5, after an order ELF obtains discovery, the order ELF uses a private decision table to build an action list of actions to take for an order. The "build action list" procedure enables an order ELF to make sophisticated decisions based on characteristics of the order, market characteristics and the discovery responses. Orders are routed in accordance with the action list built via this highly flexible decision procedure.

Conventional trading systems lack the panoply of features available in system 5, and fail to provide some of the routing features available in system 5. In conventional systems, orders are all processed with generally the same methodology, even orders with few or no parameters requiring specialized handling; accordingly, simple orders are held up by complex orders and suffer processing delay due to the complexity needed to handle other order types. Conventional systems often have bottlenecks that inhibit their scalability. Conventional trading systems do not provide for personalized, relationship-dependent order handling by market. Conventional trading systems support only formal markets. Informal markets are not facilitated or supported in conventional trading systems. Accordingly, the order routing ability of conventional trading systems is primitive.

Service

Synchronization of Orders in Multiple Markets

Orders can be represented in multiple markets in a synchronized manner. Let it be assumed that one market is an order umpire on the platform of system 5, and another market is an external exchange, that the order umpire and the external exchange have respective order books, and that the order umpire and external exchange transmit messages to each other via a mirror ELF. The mirror ELF enables the order umpire and the exchange to maintain synchronization over a variety of operations, such as cancel, post, affirm and execute, via a protocol wherein the operation is conditionally performed at one market and the operation is committed after being reflected at the other market. The reflection may include canceling to allow one market to be in sole control of the order and therefore able to safely execute without chance of a duplicate execution.

Additionally, a mechanism is provide to hook and unhook, or link and unlink, two markets, namely fast symbol mode which effectively makes one market the active market and the other market be a passive or slaved traffic router for the active market.

Figure 94:
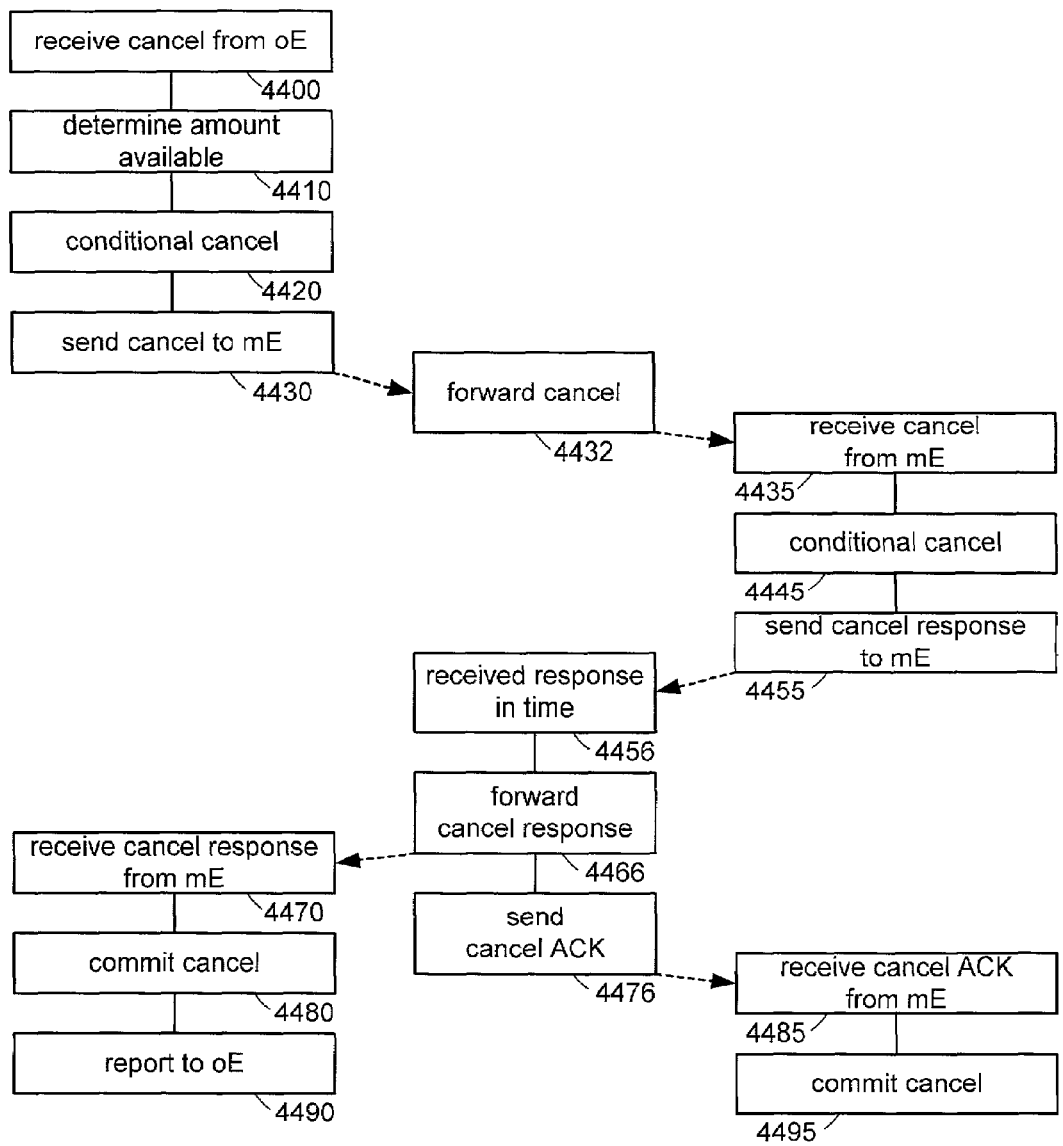
FIG. 94 is a chart showing processing of a cancel order when a mirror ELF is involved.

FIG. 94 provides an example of cancel order processing when a mirror ELF is involved.

Conventional systems sometimes have a hot standby, in which a physically separate system shadows a primary system, and if the primary has a problem, the standby immediately becomes the primary so that service is provided without interruption. In such standby systems, there is a need to keep the order books synchronized, and a transaction is not considered complete until it is properly reflected in both the primary and standby system. In contrast, system 5 ensures that a transaction is cancelled from one market before it can be executed in another mirror market; or, when one market is in fast symbol mode, the other market disengages. Additionally, when one market is in fast symbol mode, the market at the other end of the mirror ELF does not necessarily maintain a synchronized order book; rather, when the first market ends fast symbol mode, the first market transmits the order book to the other market to ensure that the order books are synchronized from that point forward.

Service

Linked Order Processing

A list of orders can be linked together, with execution of the list performed in a guaranteed mode or a best efforts mode. It will be appreciated that a linked order is akin to a synthetic security. In a guaranteed mode, each order is submitted to system 5 with a price, and either all orders are executed at their respective prices, or none of the orders are executed. In one embodiment, guaranteed execution is provided by obtaining stops for the contra-sides of each of the orders in the list, and only executing the list when stops have been obtained for all orders. A useful platform service is the ability to freeze stops in this situation, that is, ensure that they will not expire.

The market discovery protocol of system 5, when used with a linked order, enables a trader to readily "see" liquidity for the synthetic security corresponding to the linked order.

Orders in a linked order can be trial orders. Accordingly, substantial discovery can be easily performed about market depth for synthetic securities.

Figure 97:
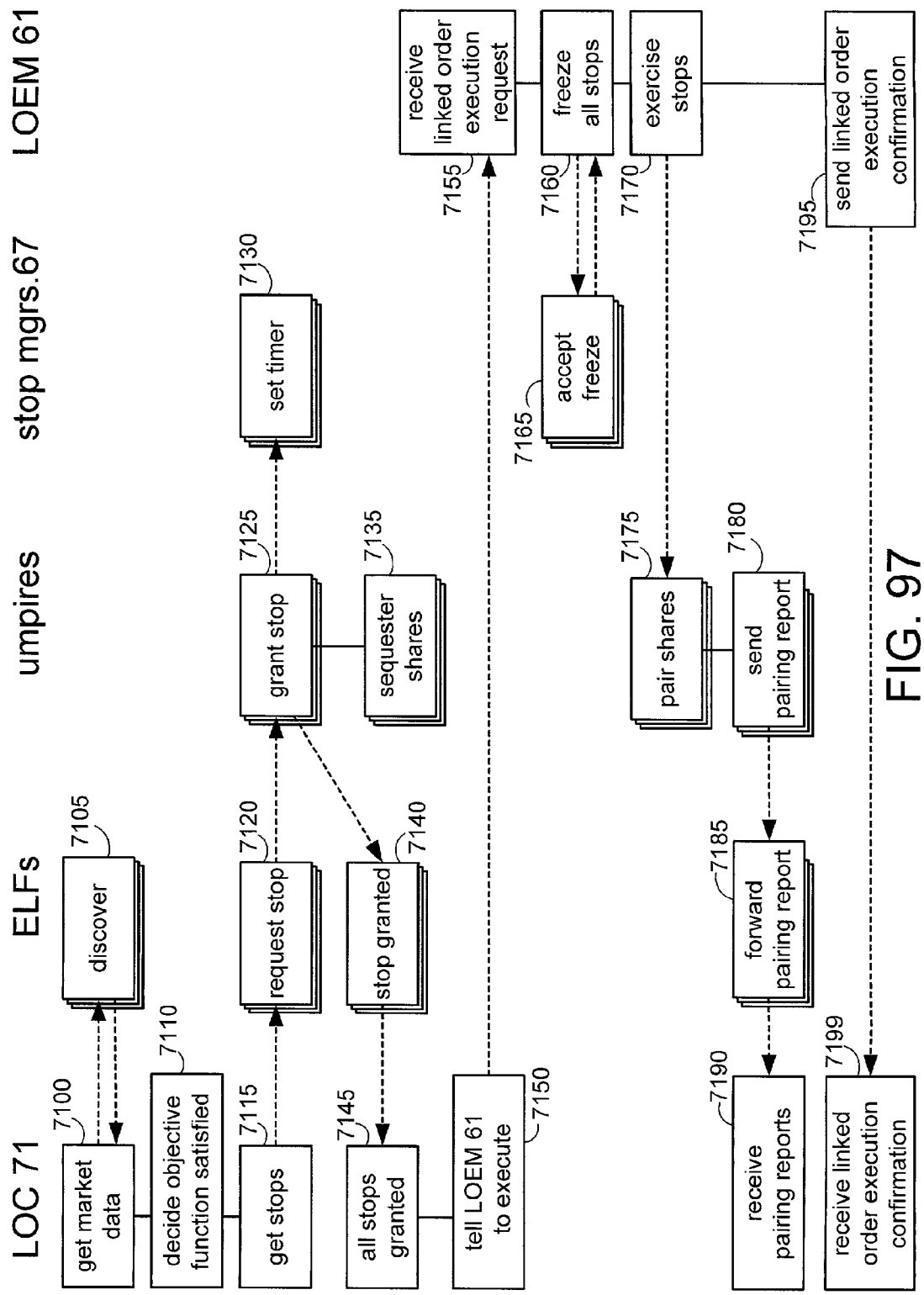
FIG. 97 is a chart showing processing of a linked order in system 5.

FIG. 97 illustrates an example of linked order processing.

Conventional program trading refers to a trader designating a list of symbols and then submitting all symbols on the list for execution to the appropriate markets. When executions occur, they are each independent, and the trader must accumulate the results and group them together into the program. Importantly, there is no way for the trader to assure all of the prices in a program trade before deciding to execute the program. In contrast, system 5 uses the affirmation mechanism to ensure that, in a guaranteed mode, prices for all legs of a linked order are assured before the entire linked order is executed.

Service

Stop Order

Stops, short term option orders, can be provided as an optional feature of an order umpire. The expiration time of a stop may be controlled through platform services to ensure guaranteed execution for a linked order. The expiration time is typically sufficient for a process on system 5 to accomplish an operation on the platform, with present computer processing technology, this time is several hundred milliseconds or less.

Figure 103:
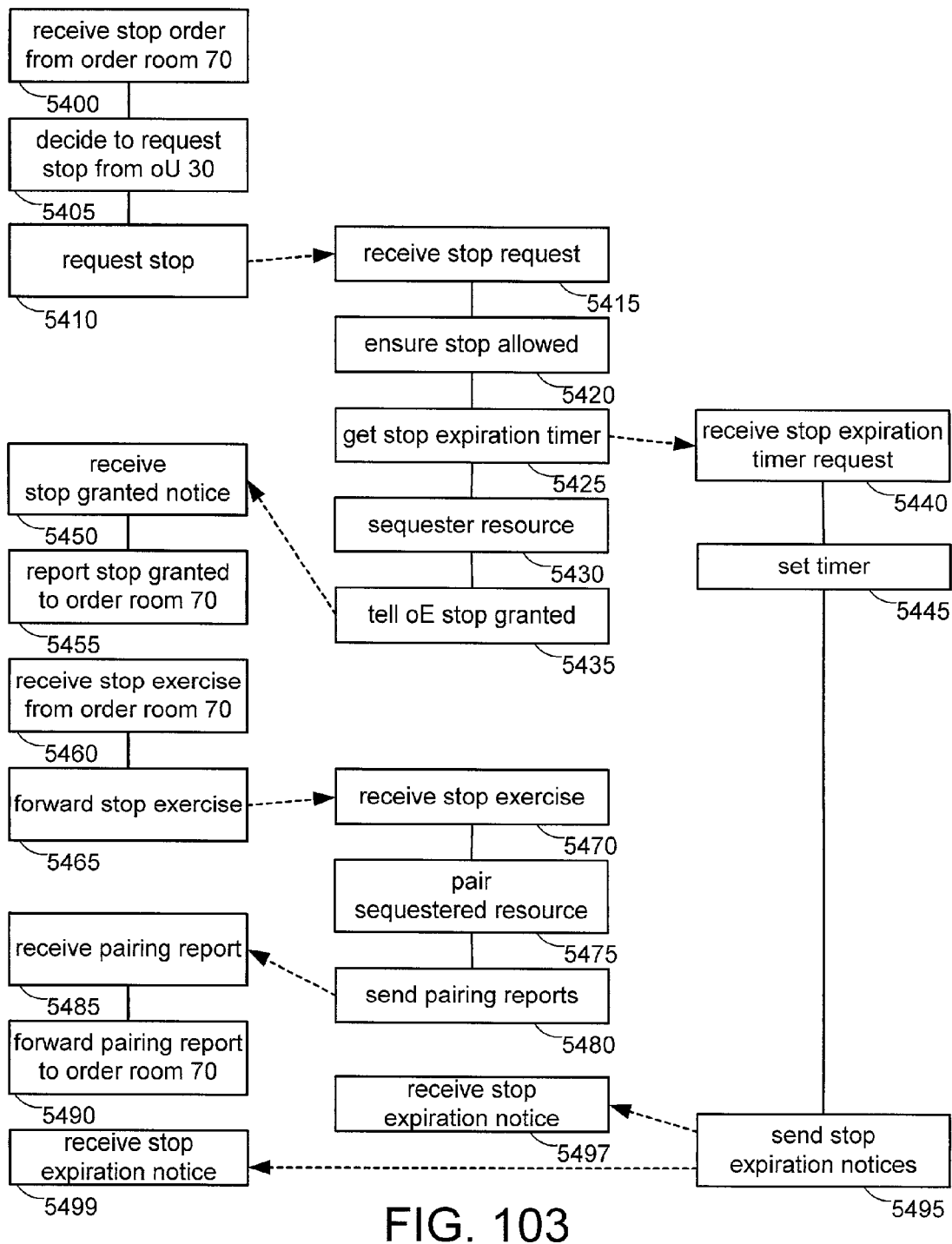
FIG. 103 is a chart showing stop order processing in system 5.

FIG. 103 illustrates an example of stop order processing.

Conventional options expire at one of a set of predetermined times in the future, rather than in a short time measured from when they are granted. Recently, the International Securities Exchange has provided an automated facility for trading these conventional options. So-called "forwards" enable a trader to negotiate the expiration time.

In conventional human-directed markets, a market maker will often grant a short-term option to a trader, sometimes for a fee and sometimes as a favor. The market maker is exposing himself or herself to arbitrage by the trader, so is reluctant to grant such stops for more than intervals of time measured in tens of seconds. Due to human reaction times, a stop for a duration of one second or less is useless, since a human cannot physically take another trading action in such a short time.

In contrast, system 5 has many mechanisms to ensure appropriate management of small intervals of time despite computer queues and the like. System 5 is also concerned with allowing human behaviors to occur electronically, rather than forcing all trades into the conventional electronic bulletin board paradigm. The fundamental nature of system 5 makes a short-term stop meaningful, whereas in conventional systems it is useless.

Service

Trial Order

Trial orders are provided for enhanced market discovery, enabling a party to learn "shares ahead" at a market price. A trial order is stored by an order umpire in a similar manner as a regular order, but is ignored for market inquiry purposes. When executed, a trial order results in an execution report for zero shares at a specified price to the owner of the trial order, and is otherwise transparent to the priority of the order(s) involved in a pairing.

Conventional market watch systems notify a trader when a price has been hit. However, these conventional systems provide no clue as to market depth.

Conventional book trading systems do not support conditional orders, rather, they assume that each order is fully executable.

Figure 98:
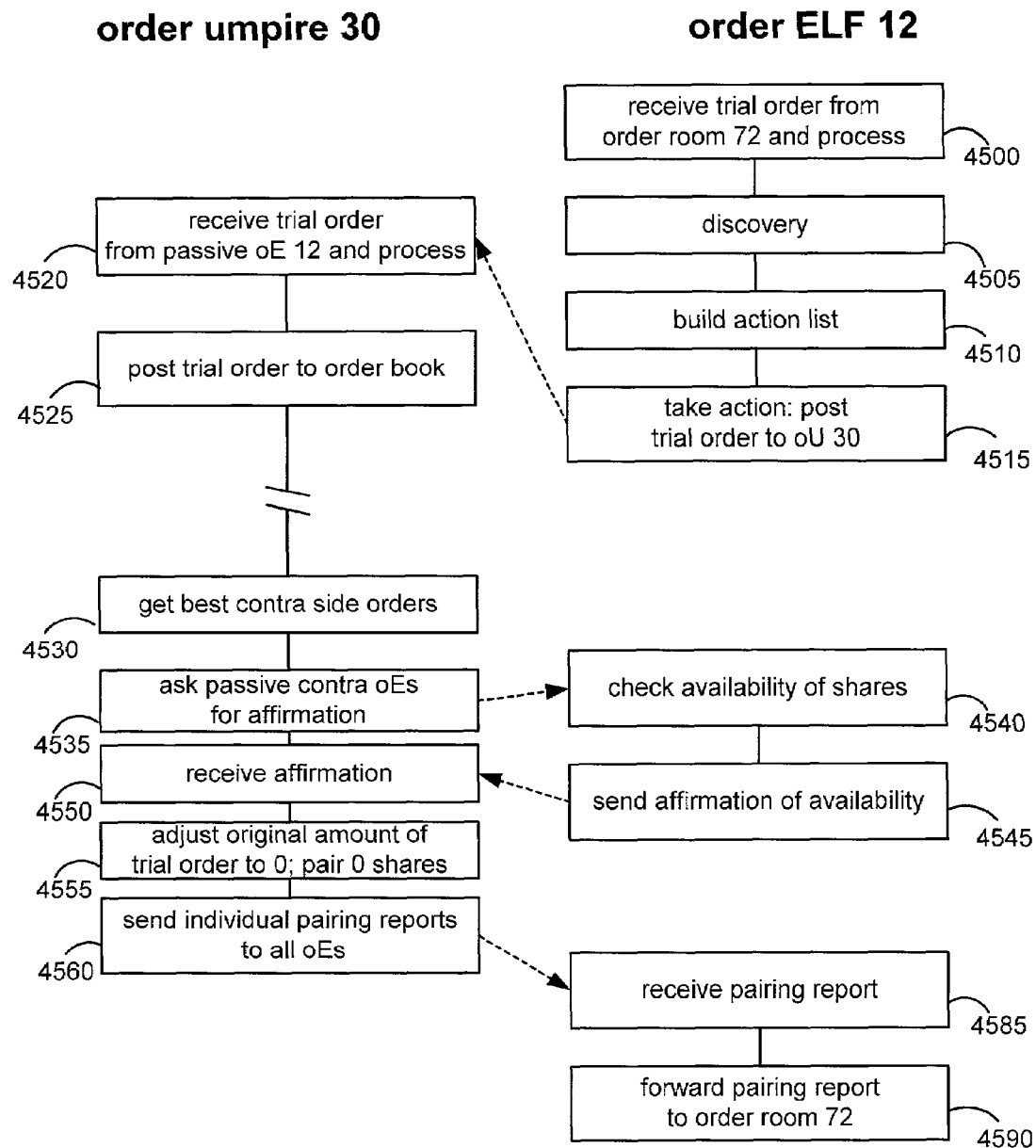
FIG. 98 is a chart showing processing of a trial order in system 5.

FIG. 98 provides an example of trial order processing. See also the example of trial order processing during an execution attempt, presented after the discussion of FIG. 71.

Human market makers sometimes let a broker leave an order with them to be executed at the discretion of the human market maker. These types of orders are referred to as "not held" orders and may violate the trading rules of the marketplace. The purpose of these not held orders is to get an execution, not to ascertain market depth.

In contrast, system 5 has much more flexibility in managing event simultaneity than conventional systems, and provides the mechanisms needed to implement a trial order, including the ability to ignore a trial order when responding to market inquiries, and to "execute" the trial order without affecting the priority of other orders involved in a pairing.

Service

Decision Table for Order Handling

Both order ELFs and order umpires support user-defined decision tables for controlling their behavior. A decision table provides a facility for defining conditions that must occur before action is taken, and a facility for defining the actions to be taken and their sequence. Decision tables can have effect when an order is received, upon completion of price discovery for the order, on receipt of a contra-side bid or offer for the order, and upon reporting execution of the order, including share allocation. Decision tables can include order-related events and/or market-related events among their conditions. Decision tables can include nested decision tables. Decision tables can have associated holding tanks, to store orders while waiting for market-related events. Decision tables can specify that if a particular situation occurs, the order room should be notified and/or will provide a decision.

The decision tables of system 5 provide tremendous flexibility to route an order based on the order's parameters as well as market conditions. Accordingly, each order ELF can define what a "best market" means for each order. Each umpire can tailor its service offerings on the basis of the identity of the order ELF it is serving.

Tables 5-7 provide examples of decision tables.

Conventional order routing systems may route to a best market, but they do so based on a third party's definition of what is a best market. In contrast, system 5 allows each trader in an order room to define best market as they wish.

Conventional trading systems provide, at best, a few parameters that affect how an order is executed, such as a limit price, a designation of "all or none" to prevent partial executions, and so on. In contrast, the decision tables of system 5 can accommodate an enormous variety of conditions combined with as little or as much complexity as desired.

Service

Negotiation Protocols

An order umpire may employ a negotiation method for price discovery and is referred to as a negotiation umpire. "Negotiation," as used herein, refers to the parties interacting to arrive at mutually agreeable terms, such as price and/or quantity.

A negotiation umpire has three important characteristics defined during a setup period: (i) its behavior relating to discretion signature matching, that is, how it decides to show information to oEs, (ii) its behavior relating to order matching, and (iii) its negotiation form.

System 5 supports three forms of negotiation:

Inquiry—market information is provided to a filtered set of users on a discretionary basis. For example, the umpire sends a "negotiation possibility" notice to each party, including information such as the telephone number of the other party so that the parties can negotiate outside system 5.

Third party—the umpire, at the time it is created, names a third party to conduct the negotiation or defines a method such as BidPlus, discussed below, to conduct the negotiation. At the time of the negotiation, the third party negotiation umpire provides both orders to the third party. According to the well-known procedure of the third party, it may simply provide a price to both parties, or it may contact each party to mediate the negotiation. It will be appreciated that the third party may be a human or a computer process, such as another umpire; and Direct—the umpire acts as an automated broker and/or message switch allowing parties to negotiate directly between themselves.

Figure 101:
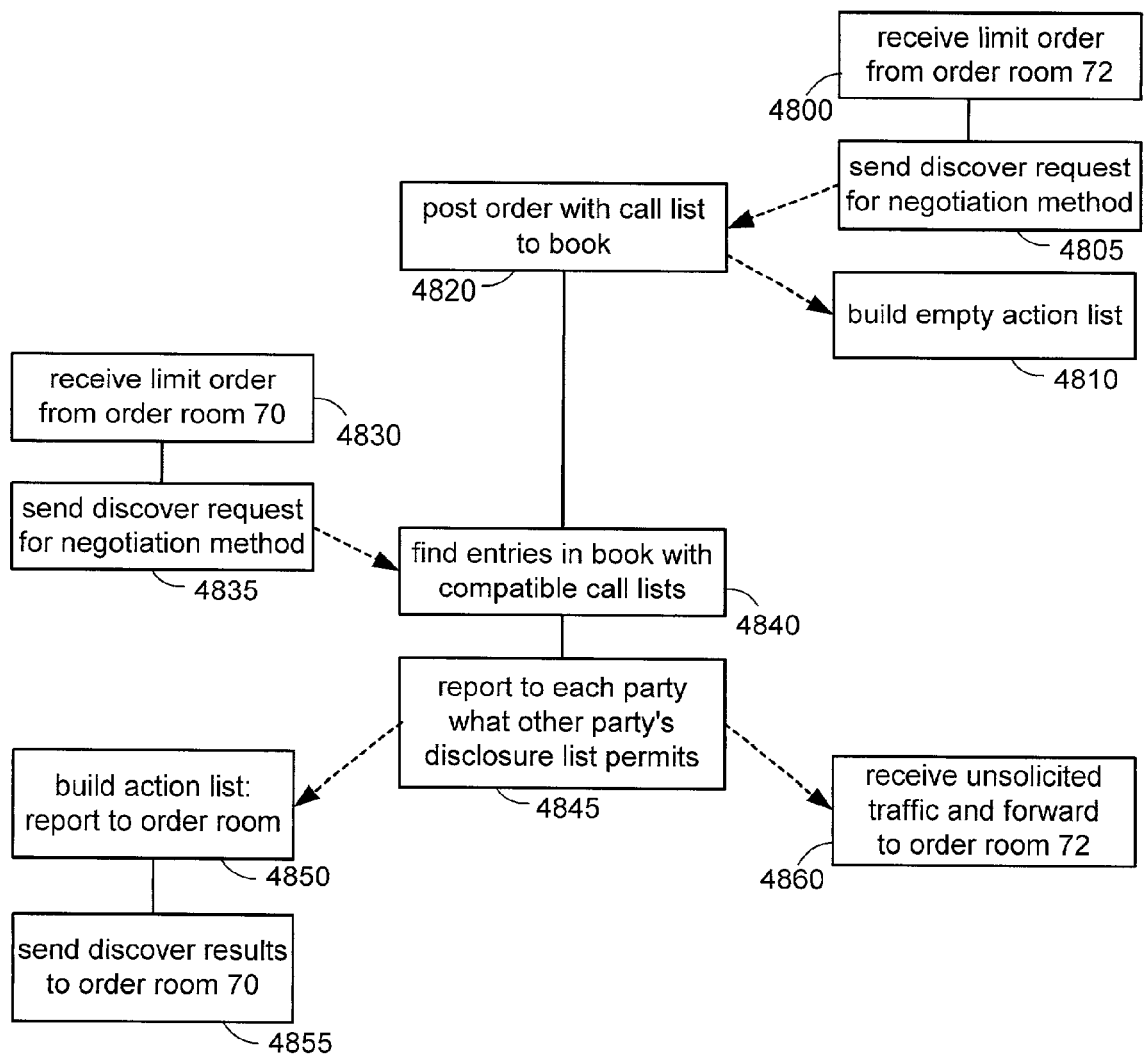
FIG. 101 is a chart showing obtaining discovery from market participants in system 5.
Figure 102:
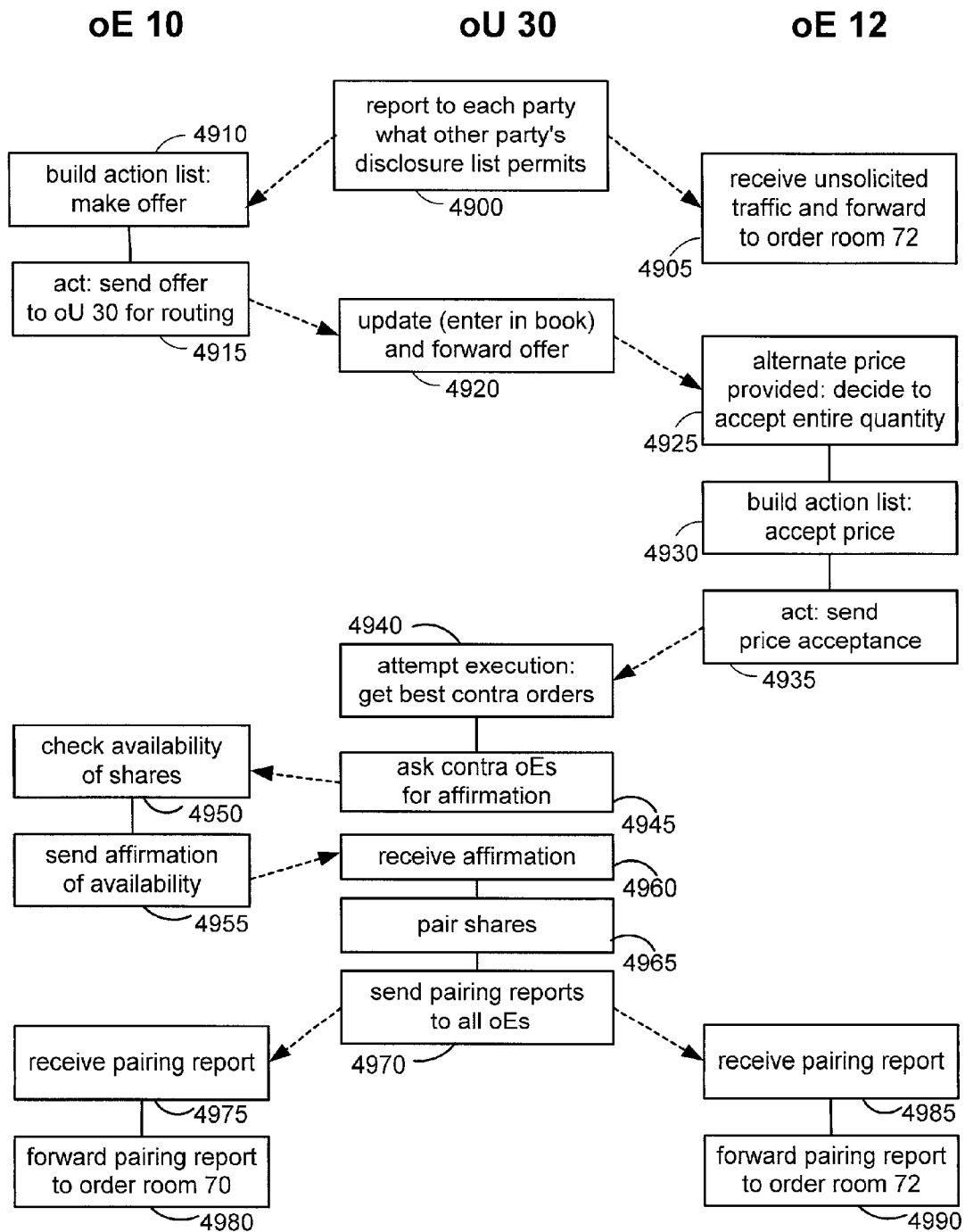
FIG. 102 is a chart showing automated negotiation in system 5.

FIG. 101 provides an example of an inquiry negotiation. FIG. 102 provides an example of a direct negotiation.

Some conventional trading systems support the direct form of negotiation described above. However, these system do not offer inquiry negotiation, direct negotiation, or a choice of negotiation methods as does system 5.

In the early-mid 1990's, the Chicago Match system provided a "near match" feature in which a party submitted its order to the system book and designated it would accept a near match. If a contra-side order had a price "near" a booked order that would accept a near match, the system would notify the owner of the booked order, and brokers would negotiate the price. However, the Chicago Match system did not support the inquiry negotiation or direct negotiation 28 described above, and did not offer a choice of negotiation methods as does system 5.

Service

Crowd Auction During Discovery

All umpires are assumed to have a book of orders. Any umpire that has a crowd may 31 choose to support auction mode price discovery, either as a default or by request from an ELF. It will be appreciated that some order processing methods are suitable for auction price discovery, such as book and superbook methods, while other order processing methods are not suitable for auction price discovery, such as periodic match methods.

When an order umpire is providing discovery with auction mode, the order umpire responds to price inquiries after an interval of up to a published delay time. During this delay time, the order umpire gives order ELFs registered in its crowd the opportunity to provide a better price than the book's price. If an order ELF in the crowd, referred to as a passive-side order ELF, provides a price better than the book's price, then the order ELF seeking discovery, referred to as an active-side order ELF, is obliged to take the price and is immediately paired with the passive-side order. Effectively, the crowd response is an order that was provoked by the active-side order ELF's auction mode discovery request.

The active-side order ELF is not obliged to take the book's prices, unless the umpire has specified that if the umpire provides a price, the ELF must take the price.

Figure 99:
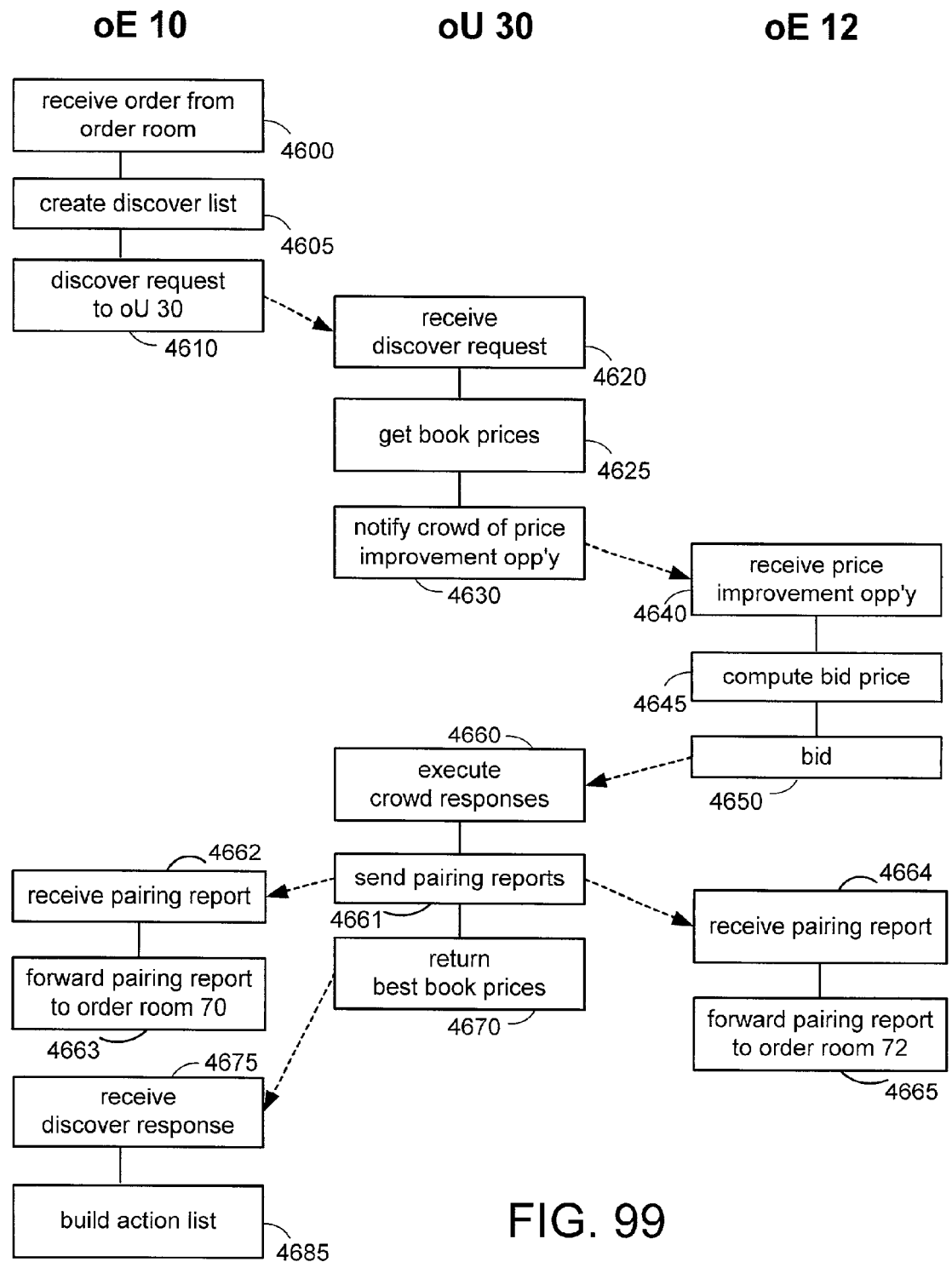
FIG. 99 is a chart showing processing during auction discovery in system 5.

FIG. 99 provides an example of superbook processing during discovery.

Service

Crowd Auction During Execution

An umpire operating according to the superbook method will, when the order umpire is about to change to orders in its book to a new (worse) price, automatically notify its crowd of order ELFs, and each order ELF then decides whether it wants to provide a quantity of shares at an improved price for matching with the active contra side order. The superbook method is actually a combination of a book trading method and an auction trading method, with crowd auctions occurring to improve the price relative to the book's price. A superbook umpire may also support auction mode price discovery.

Figure 100:
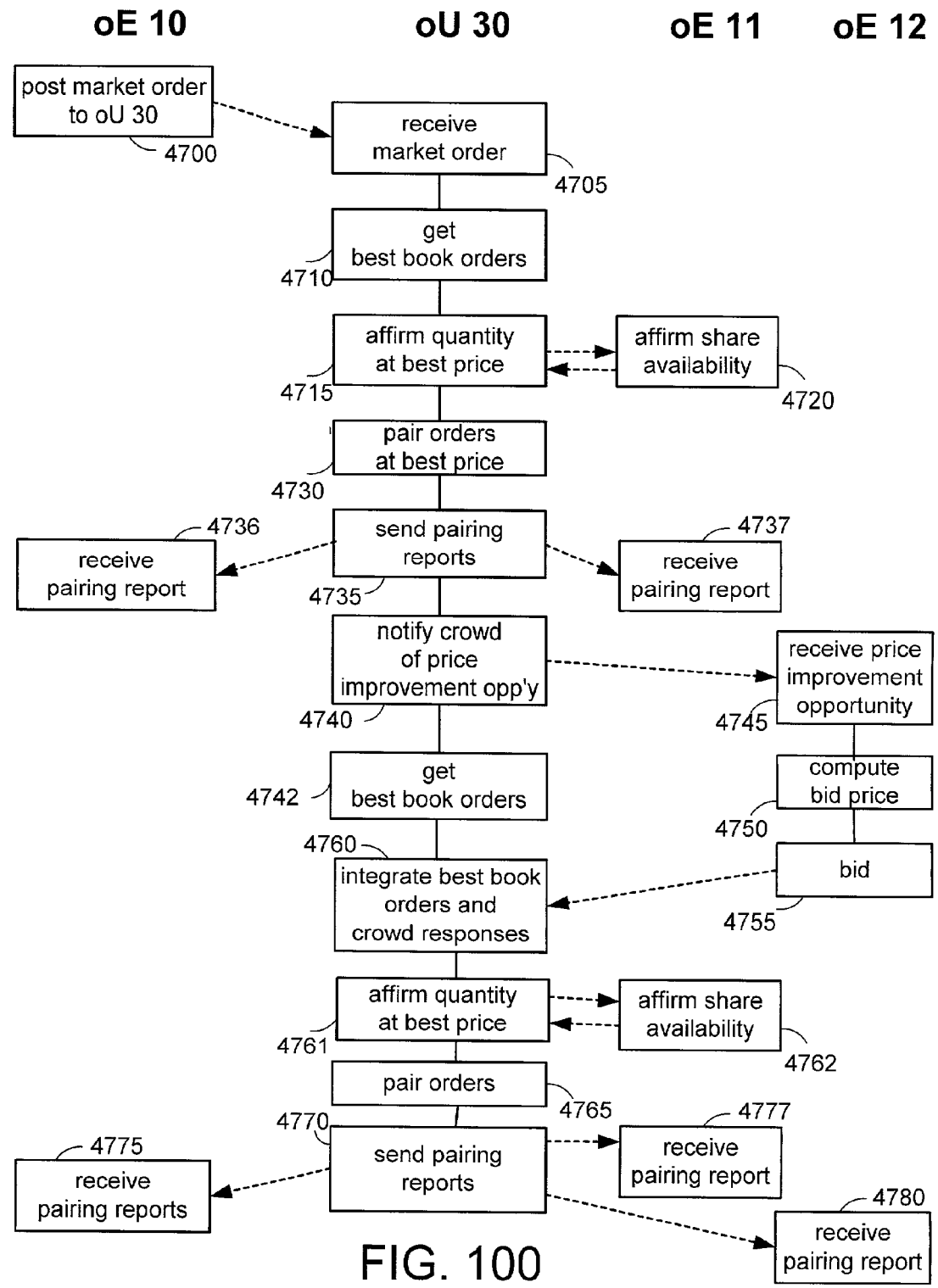
FIG. 100 is a chart showing superbook processing during execution in system 5.

FIG. 100 provides an example of superbook processing during execution. See also the example of superbook processing during attempt execution, presented after the discussion of FIG. 71.

Some conventional trading systems support a so-called reserve book feature. A trader submits an appropriately designated order, and only a predetermined amount of the order is revealed on the public book. For example, a reserve order for 10,000 shares with 1,000 shown would place an order for 9,000 shares on the reserve book, and an order for 1,000 shares on the public book. After the 1,000 shares is executed, the reserve book would shift another 1,000 shares to the public book, and so on until the entire order was executed. These conventional systems use the same methodology for executing all portions of the order. In contrast, system 5 may execute portions of an active order in different ways: the first contra-side portions being obtained from the book and the second contra-side portions being obtained through the auction form of crowd price improvement.

System 5 also provides much more sophisticated mechanisms for disclosing only desired amounts of information about an order than the conventional reserve book mechanism.

Service

Response Protocol for Price Inquiries

An order umpire may support disclosure levels from an order ELF. A first order ELF specifies a disclosure level for each entry in the call list associated with an order it posts at an order umpire. Then, another order ELF inquiring at the order umpire also provides its call list including a disclosure level for the first ELF. If the call lists intersect and the disclosure levels are compatible, the order umpire notifies the parties of the other party's permitted disclosure. In one embodiment, the discretion level is selected from (i) none, (ii) owner, (iii) owner and symbol, (iv) owner, symbol and side, (v) owner, symbol, side and approximate minimum lot size, (vi) owner, symbol, side, minimum lot size and soft price, and (vii) owner, symbol, side, minimum lot size and hard price. A soft price requires affirmation to execute. A hard price is immediately executable.

Conventional order processing systems arose from an effort to reduce clerical effort and errors. In conventional systems, orders are exact, i.e., they do not contain any judgmental component and they are fungible, that is, an order for a certain number of shares means the same thing independent of who sent it. System 5 can operate in this mode, but it can also operate in a mode in which the handling of an order is based on a relationship between the parties. Also, system 5 enables each order to be treated based on a relationship between trading parties, that is, part of the nature of an order depends on who it belongs to. Fundamentally, system 5 is reflecting the human dynamics of trading and telephone calls, rather than acting as an anonymous bulletin board as do conventional systems.

Service

Contra-Party Preference Updating

An order umpire may support contra-party preference information updating and may track interaction between market participants and allow or disallow interactions based on the contra-party preference information. Generally, a trader can designate a contra-party as "friendly" or "rogue," and can designate itself as "anonymous." An order umpire can receive and assign evaluations of traders about contras even though the contras are anonymous. Furthermore, contra-party preference updating 63 can compare a trade made at a given time with a market price at some other past or future time, and compute a measure of merit for trading with the contra-party, even if the contra-party is anonymous.

System 5 provides a mechanism for negative selection. During a periodic match, it is often the case that there is an imbalance between buy and sell sides of the market. Frequently, the parties on the less popular side are there due to ignorance of the market, and would actually prefer to be on the popular side of the market. The contra-party preference updating mechanism can be used to ensure that a party will not get matched against a contra-party who has demonstrated superior trading ability, often based on superior market knowledge, thus enabling negative selection.

Figure 10:
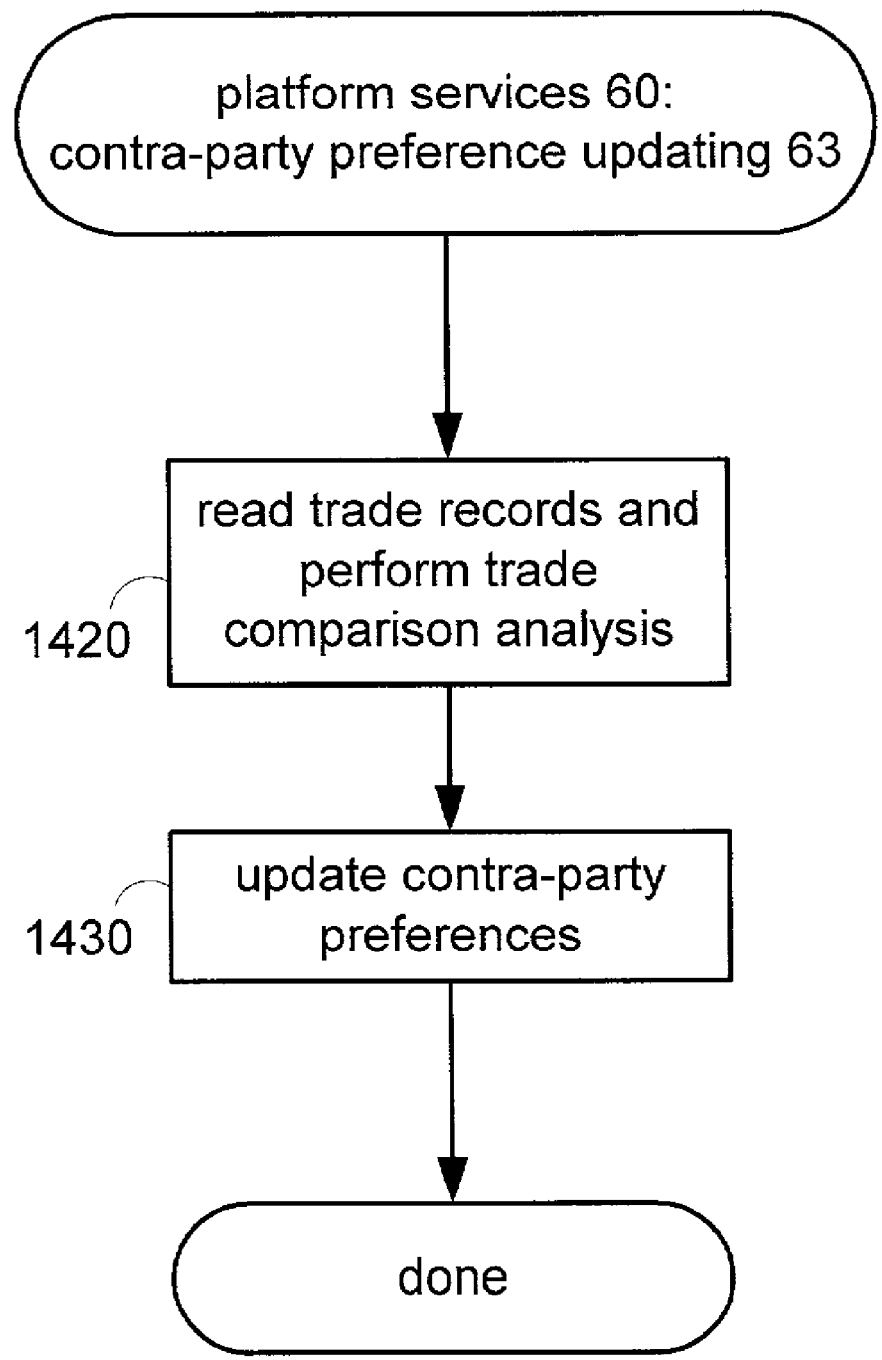

An example of contra-party preference updating is presented after the discussion of FIG. 10.

Certain conventional trading systems enable designation of desired or undesired contra-parties, and then check the designations before pairing orders, but traders must manually update their lists of desired or undesired contras. In contrast, system 5 has a mechanism for automatically updating a list of desired or undesired contras based on their trading performance, even if the contras are anonymous and therefore could not be specified on a conventional manually updated list. Furthermore, system 5 enables combination of trader-supplied ratings with system statistical ratings in a single index.

Selected conventional trading systems enable parties on a desired or undesired list to be specified by their organizational affiliation, for example, "I will not trade with any institutions, just with other brokers." These lists must be manually updated. In contrast, system 5 has a mechanism for automatically updating a list of desired or undesired contras based on their trading performance, even if all characteristics of the contras are anonymous and therefore could not be specified on a conventional manually updated list.

Service

First Look at Market Improvement

An order umpire may support a first look feature, enabling the provider of the best market price to see a contra-side price improvement before all other participants in the market. The provider and/or other participants may be order ELFs.

Figure 76:
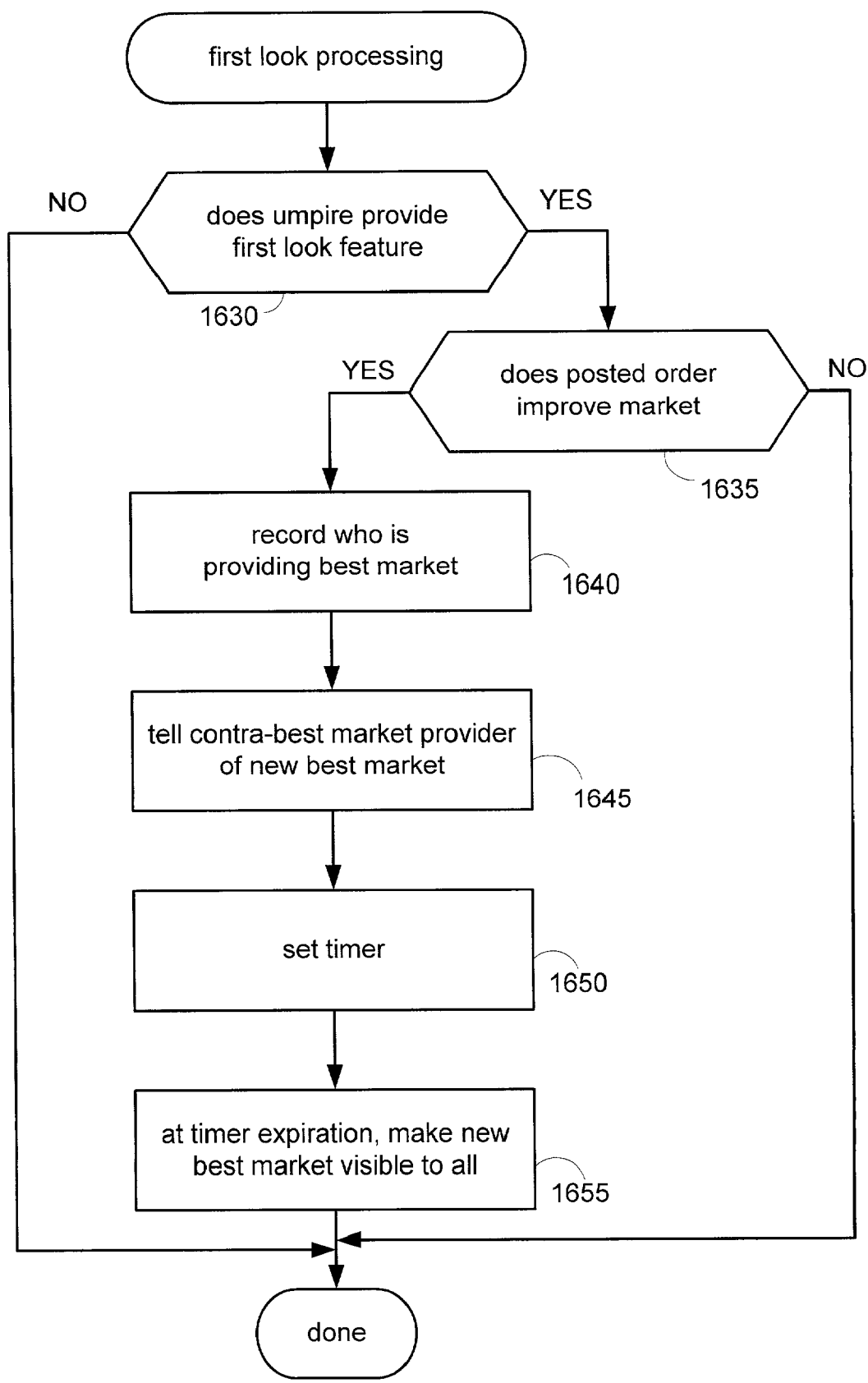

FIG. 76 depicts first look processing.

In the conventional human-directed OTC market, a market maker may manually provide a first look to selected brokers, based on the relationship between the market maker and brokers. Conventional systems are not configured to provide services based on the identity of the owners of orders, rather, conventional systems are directed to uniform treatment of all interactions between participants, and would have to be fundamentally revised to operate in this manner. In contrast, system 5 is concerned with automating human practices rather than maximizing the efficiency of computer code, and enables customized or personalized service for orders depending on relationships between the market provider and the order owner or handler.

Service

Price Setting Mechanism

An order umpire may provide order executions according to a BidPlus method, using liquidity curves associated with orders to determine premiums offered or demanded at a particular price, and then pairing the orders in accordance with their respective premiums and setting the price for each pairing based upon the premiums of the orders in the pair.

Tables 13A-13G present an example of BidPlus processing.

The known Optimark system uses liquidity curves to match orders. Optimark is an implementation of a pattern match system, whereas BidPlus is more akin to a dutch auction in which prices come down as bidding continues.

Optimark is directed to matching as many orders as possible, whereas BidPlus is directed to rewarding a party taking the largest risk relative to the market price by giving such party superior priority in pairing with the best contra side order. Fundamentally, the objective of matching as many orders as possible is inconsistent with rewarding the largest risk takers. Stated otherwise, Optimark is concerned with maximizing interchange of items, whereas BidPlus rewards traders who take risks.

Optimark is fairly complex, and requires traders to indicate how happy they would be at various prices; BidPlus is much simpler, and requires only that traders select a suitable liquidity curve. An outside party may provide a liquidity curve as a service.

Platform Services

Platform Services

Stop Order Manager

An order ELF obtains a short-term option (stop) by requesting a stop from an umpire that provides stops. When an order umpire that supports stops receives a stop request from an order ELF, the umpire checks whether the requesting ELF is eligible for stops, and if so, grants the stop by (i) notifying the order ELF that the stop is granted, (ii) sequestering the number of shares in the stop request, so that the shares are available for the ELF; it will be understood that shares are sequestered when the ELF wishes to buy, whereas purchasing power is sequestered when the ELF wishes to sell, and (iii) requesting that platform services create an instance of stop order manager 67 to measure the duration of the stop.

The duration of a stop is determined either by the stop request from the order ELF, or by the order umpire as an ELF-specific default value or a universal default value. In some embodiments, order umpires measure the duration of stops on their own, and may or may not notify ELFs when the stop expires.

In other embodiments, platform services measures the duration of stops and notifies the umpire and ELF when the stop expires. When an umpire requests that a stop duration be measured, platform services instantiates a stop order manager to measure the duration of the stop. This is a particularly advantageous procedure for linked orders, as platform services may need to extend the duration of a stop to guarantee prices for a linked order, and can readily extend the duration of the stop when its own stop order manager is responsible for declaring when a stop expires. This procedure is also advantageous for preventing timing disputes between ELFs and umpires.

Figure 7:
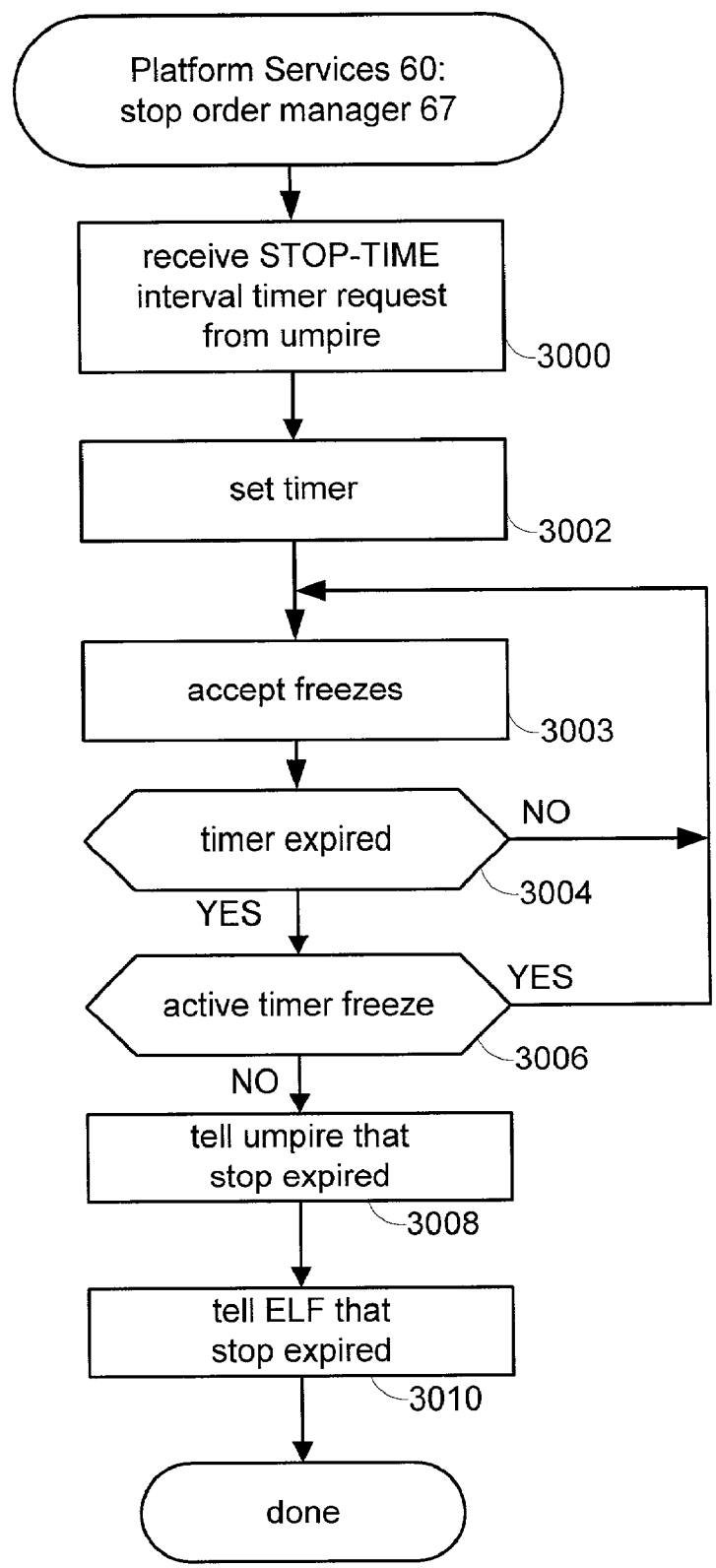
FIGS. 7-10, 12 and 14-15 are flowcharts referred to when describing platform services 60.

FIG. 7 is a flowchart illustrating stop order manager 67. At step 3000, platform services 60 receives a request from an umpire to measure the duration of a stop and instantiates stop order manager 67. The stop measurement request includes information identifying (i) the umpire requesting the measurement, (ii) the ELF that requested the stop, (iii) an identifying code, as an ELF may request multiple stops from an umpire, and (iv) the temporal duration of the stop.

At step 3002, stop order manager 67 sets a timer for the duration in the measurement request. At step 3003, stop order manager is ready to accept freeze requests and cancellations of the freeze requests. As explained below, a freeze request is generated by linked order execution manager 61 during execution of a linked order and operates to extend the expiration time of a stop for a predetermined amount, specified in the freeze or according to a default value, such as 250 milliseconds.

At step 3004, stop order manager 67 checks whether the stop measurement timer has expired, and if not, keeps checking whether the timer has expired. When the timer expires, at step 3006, stop order manager 67 checks whether a timer freeze is active, specifically, whether any timer freezes have been received, remain uncanceled, and extend the expiration time. If so, stop order manager 67 resets the stop measurement timer and returns to step 3004.

When the stop measurement timer has expired and there are no active freezes, at step 3008, stop order manager 67 notifies the umpire that the stop expired, and at step 3010, notifies the ELF that the stop expired. Then, this instance of stop order manager 67 is terminated.

If a freeze request is generated by linked order execution manager 61 after a stop has expired, platform services 60 rejects the freeze request on behalf of the terminated stop order manager 67.

Platform Services

Linked Order Execution Manager

Figure 8:
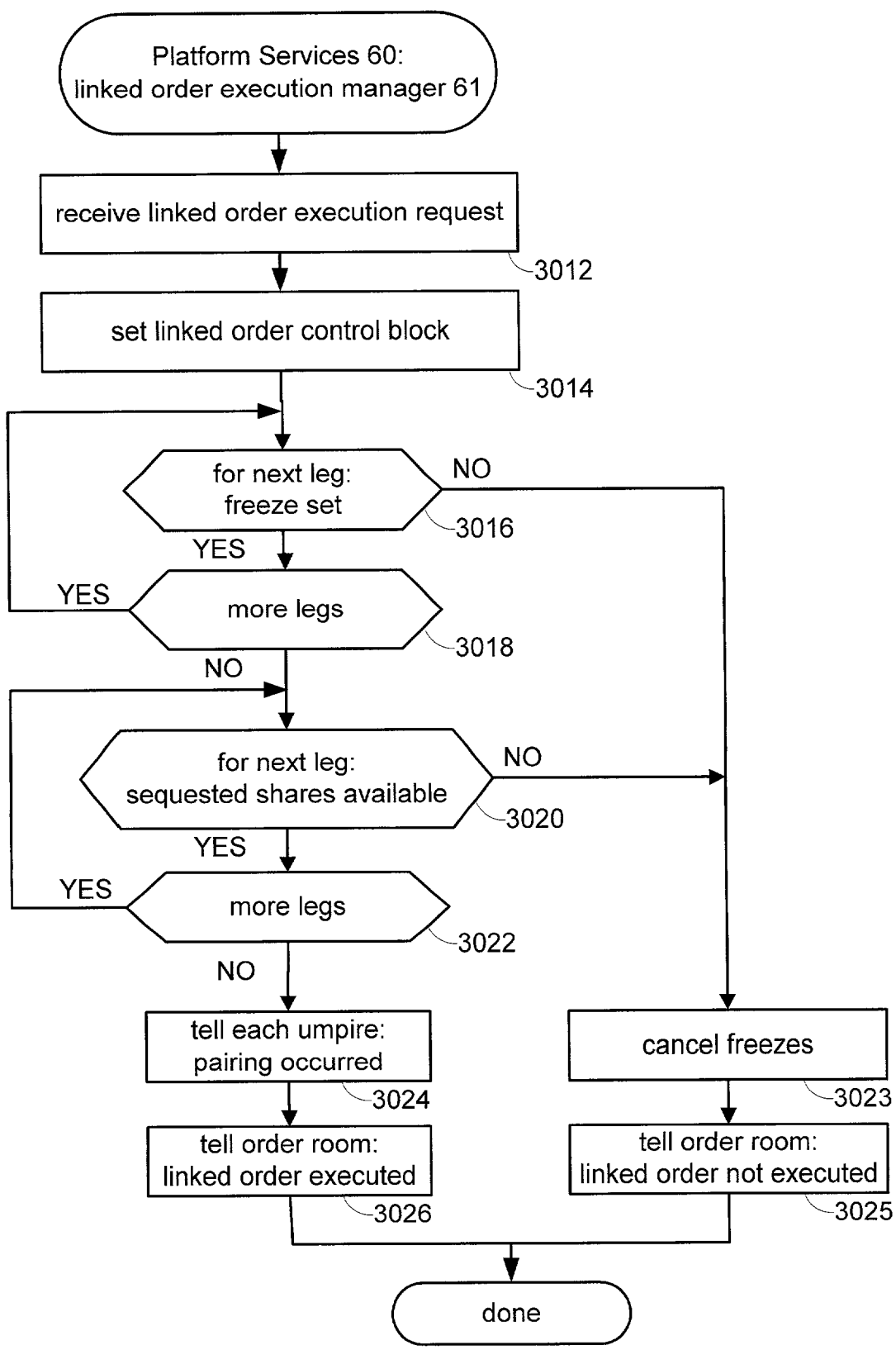

To enable guaranteed execution of linked orders, platform services 60 includes linked order execution manager 61, shown in FIG. 8. For a guaranteed linked order, after an order room determines that an objective function has been satisfied for a linked order and stops have been obtained by the order room for each of the legs, the list of legs is sent to linked order execution manager 61 to cause all of the legs to be executed. In short, linked order execution manager 61 is able to extend the duration of all stops for the legs, to ensure none of the stops expire before the other stops are acted upon, and then linked order execution manager 61 acts upon all of the stops on behalf of the ELFs that requested the stops. Thus, a guaranteed linked order execution is obtained.

At step 3012, platform services 60 receives a request from an order room to execute a linked order and instantiates linked order execution manager (LOEM) 61. The linked order execution request includes a list of the stops obtained for each of the legs, which umpire granted the stop, which order ELF requested the stop, and the identifying code for the stop provided from the umpire to the ELF.

At step 3014, LOEM 61 confirms that the order room is the owner of each of the order ELFs in the linked order execution request, sets a linked order control block for this order, and sets itself to the first leg of the order. At step 3016, for the current leg of the order, LOEM 61 generates a freeze request for the associated stop, sends the freeze request to the appropriate instance of stop order manager 67, and checks whether the freeze request was accepted by the appropriate instance of stop order manager 67. If so, then at step 3018, LOEM 61 checks whether there are more legs and if so, sets itself to the next leg of the order and returns to step 3016. If a freeze is not accepted for any leg, then at step 3023, LOEM 61 cancels all freezes for this linked order, and at step 3025, reports to the order room that the linked order could not be executed.

When freezes have been accepted for all legs of the linked order, at step 3020-3022, LOEM 61 confirms with each umpire that the sequestered shares are still available. If any umpire fails to affirm availability, such as by being inoperative, then LOEM 61 proceeds to step 3023.

When all umpires have confirmed availability of the sequestered shares, at step 3024, LOEM 61 tells the umpire for each leg that a pairing has occurred. That is, LOEM 61 exercises the stop on behalf of the order room that owns the order ELF that requested the stop. At step 3026, LOEM 61 reports to the order room that the linked order was executed.

Platform Services

Order Control and Platform Status Monitor

Ordinarily, an order ELF, such oE 10, is in control of what happens to its orders even when it has posted its orders to umpires, and expects order umpires to ask for affirmation that it is permissible to execute the orders. It will be recalled that an order ELF can post its order to multiple umpires. Order ELFs and order umpires follow a two-phase commit protocol: in phase one, the umpire asks for an affirmation, and in phase two, after the umpire has received an affirmation, the umpire pairs (executes) the order. This two-phase commit protocol is the regular mode of system 5.

Because orders can be in multiple places simultaneously, system 5 must provide an infrastructure for managing simultaneity to prevent duplicate unwanted executions. The infrastructure comprises the protocols and platform services of system 5. Given this infrastructure, many new trading methodologies may be rapidly and cost-effectively implemented.

When an order ELF agrees to let its order be in fast symbol mode at an umpire, the order ELF relinquishes most of its control over its order. When at order ELF agrees to let its order be in-process at an umpire, the order ELF relinquishes all of its control over its order.

Fast symbol mode will now be discussed.

There are times when umpires will not permit the two phase commit process for one or more securities. The usual reason for this is high activity. When these circumstances occur, the umpire announces fast symbol mode for the affected securities. When an umpire declares fast symbol mode, it informs all order ELFs with orders in the affected symbol(s). Each order must be affirmed by its ELF within a specified time period or will be canceled. Orders for a non-affirming order ELF are cancelled by an umpire when the umpire enters fast symbol mode. During fast symbol mode, oE 10 has sharply reduced its control over its orders that are at any umpire in fast symbol mode. Specifically, oE 10 can cancel all or part of its order, and otherwise the fast symbol mode umpire can execute the order at its discretion. Order ELFs ensure that each of their orders is at no more than one order umpire in fast symbol mode. An umpire is solely responsible for ending its own fast symbol mode.

Some processes are permanently in fast symbol mode. They are called "forced" processes. No fast symbol notification is broadcast in this case because it is assumed that any oE that registers and participates at an umpire that has a forced process knows that it will not be given the chance to affirm an order that it has given to the umpire.

Conventional trading systems are forced processes.

The in-process state will now be discussed.

When an umpire is about to start a process that requires it to enter the "in-process" state such as an auction or match, the umpire posts this change of state to system status board 74. Other umpires that wish to act upon an order check system status board 74 to ensure that none of the umpires at which the order is represented have gone in-process prior to the current umpire.

There are two kinds of in-process states: those that apply to all orders in an umpire, and those that apply to selected orders at an umpire. When any periodic umpire begins its processing/pricing cycle, it indicates to system status board 74 that it is in-process, as mentioned above. All umpires before acting on an order test whether it is in-process at a periodic umpire, and bypass those orders that are. When a non-periodic umpire begins to deal with a specific order, affirmation processing, which occurs in all but fast symbol situations, marks the affected order as individually in-process until the action with regard to that order reaches a definitive conclusion, i.e., either the order is executed or it is not. Umpires are responsible for sending end of in-process notifications. Platform services 60 is responsible for periodically assessing the health of umpires, and ensures that orders marked in-process are released on failure of the umpire at which they were in-process.

When an oE registers for a crowd, any bids the oE may make are in-process—no chance for affirmation will be provided and, in this case, may not be canceled.

Platform status monitor 62 will now be discussed.

Platform status monitor 62 prevents deadlocks based on faults such as an inoperative umpire, or a hardware failure such as a node becoming disconnected from a network. Platform status monitor 62 ensures that in-process orders at disfunctional umpires are released. Platform status monitor 62 returns control of orders at disfunctional fast symbol and/or in-process umpires to the order ELFs that submitted the orders. In other embodiments, platform services 60 monitors when umpires change their state in the system status board to "in-process" and when the umpires reset their status to "not in-process" and platform services 60 ascertains if an umpire exceeded its parametric maximum time for processing and takes appropriate action.

Figure 9:
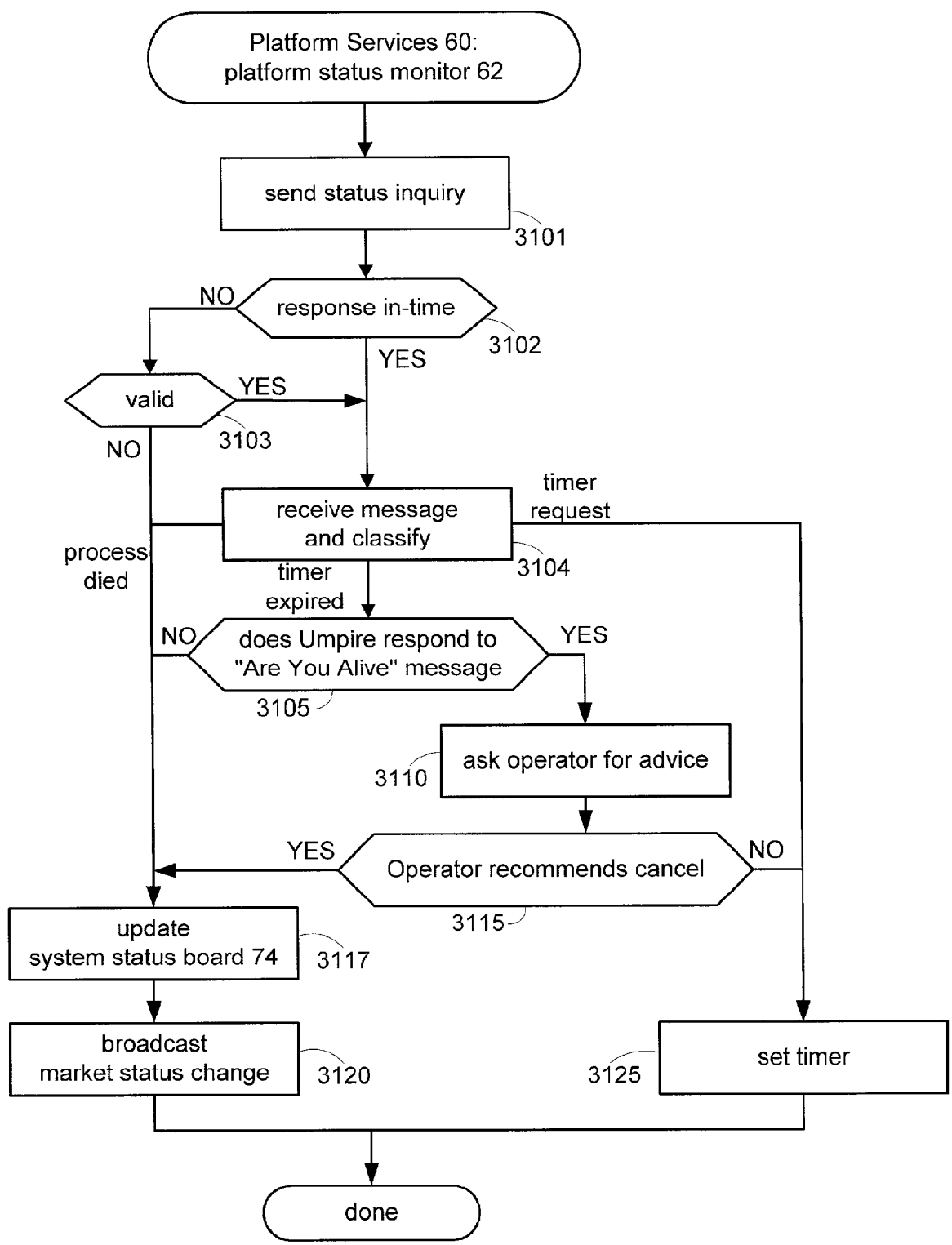

FIG. 9 is a flowchart for platform status monitor 62. At step 3101, platform status monitor 62 sends a status inquiry to all processes it monitors. In this embodiment, platform status monitor 62 monitors functioning umpires to ensure they are functioning. At step 3102, platform status monitor 62 determines, for each status inquiry, if there was a response within the expected response time. If all umpires respond within the expected response time, processing proceeds to step 3104. For each status inquiry that was not responded to in time, at step 3103, platform status monitor 62 executes a validity check. If the validity check process indicates that the umpire is not in a valid state, platform status monitor 62 proceeds to step 3117 to advise platform users of the change in state of the umpire. If the validity check indicates that the umpire is in a valid state, processing proceeds to step 3104. After an umpire has been found to be in an invalid state, error processing (not shown) is executed.

At step 3104, platform status monitor 62 receives a message from an umpire or ELF and classifies the message.

If the message is that a process has died, platform status monitor 62 proceeds to step 3117.

If the message is that a timer has expired, platform status monitor 62 proceeds to step 3105. An example of an expired timer is when an order ELF has not received a response in an expected time from an order umpire.

If the message is that a timer has been requested, platform status monitor 62 proceeds to step 3125.

At step 3105, platform status monitor 62 sends an "are you alive" message to the umpire and checks whether the umpire responded thereto. If not, then at step 3117, platform services 60 platform status monitor 62 updates system status board 74 and at step 3120, broadcasts the change in market status. If the umpire responded to the "are you alive" message, then at step 3110, platform services 60 asks a human computer systems operator for advice. At step 3115, platform services 60 checks the response from the human operator. If the operator has given permission to cancel, then processing proceeds to step 3117. If the operator has not given permission to cancel, then at step 3125, platform services 60 sets a timer and notifies the message sender that a timer has been set.

Platform Services

Contra-Party Preference Updating

FIG. 10 is a flowchart that shows contra-party preference updating processing. Generally, contra-party preference updating tracks interaction between market participants. Based on the track record established by the parties, and their preferences determined by this process, the oEs may allow or disallow future transactions. Order room 70 can designate a contra-party as one of a set of predetermined states, such as "friendly" or "rogue." Order room 70 can also designate (i) a comparison time (hours, days or months, or some combination thereof), (ii) a number of trades as an experience threshold, and (iii) a number as a neutrality threshold for each contra-party. An aspect of contra-party preference updating is that users assign contra-parties to categories based on the users' preferences, while system 5 computes statistics and assigns contra-parties to another set of categories based on the computed statistics.

All umpires, including oU 30, record each trade between contra-parties. A process of platform services 60, namely, contra-party preference updating 63, executes as a background process to update its database of contra-party preferences. Each pair of market participants can have its own two-sided rating, allowing each market participant to independently specify a scheme for contra-party rating. Generally, after oE 10 and oE 12 participate on opposite sides of an order pairing, oU 30 makes a record of the trade.

Subsequently, contra-party preference updating 63 reads the trade record and updates both sides of the rating between oE 10 and oE 12. In some embodiments, oU 30 updates the rating, either as each trade is recorded or in a batch process at a predetermined interval, such as every minute.

During execution, contra-party preference updating process 63 reads the records made by oU 30 and the other umpires of the trades by all parties. Humans assign certain ratings such as "friendly" or "rogue" for a contra, and "anonymous" for themselves. Statistical ratings are assigned by contra-party preference updating 63, such as "well-behaved," "apprentice," "new" and "naughty." The statistical ratings are assigned by figuring out how much money is being made or lost, on a per share basis, over enough trades to be of significance, with each umpire or trader specifying the significance threshold. The human assigned rating and the statistical ratings are integrated by, e.g., assigning scores to the various human provided ratings and normalizing the statistical ratings to the human provided ratings.

For each trade, contra-party preference updating 63 compares the price at the comparison time with the trade price to determine whether the party has gained money or lost money trading with the contra, referred to as "trade comparison tracking" and updates statistics. Contra-party preference updating 63 also notes the amount of money gained or lost, and maintains the amount gained or lost on a per share basis. If the per share amount is less than the neutrality threshold, then contra-party preference updating does not change the classification. In other embodiments, instead of maintaining a per share average, contra-party preference updating 63 maintains a cumulative total. If the per-share total indicates that the party has gained money trading with the contra, then contra-party preference updating classifies the contra-party, according to the criteria of the order room, as "well-behaved." If the per-share total indicates that the party has lost money trading with the contra, then contra-party preference updating classifies the contra-party as "naughty." If desired, contra-party preference updating 63 can also classify a contra-party as "apprentice/promising" based on a comparison of computed statistics with user-set thresholds.

It will be appreciated that order room 70 can indicate preferences in this manner, typically in its call list, such as "friendly," and can refuse to trade with contra-parties designated, for example, as "rogue." Further, order room 70 can opt out of being classified by contra-parties by classifying itself as "anonymous." However, oU 30 can still perform statistical computations on anonymous parties. Having performed the above analysis, at step 1430, contra-party preference updating revises its contra-party preference database.

An example of contra-party preference updating will now be discussed. Let parameters be defined as follows:

| | |
|---|---|
| trade-shares | number of shares in a particular trade |
| trade-price | price for a particular trade |
| comp-price | a comparison price, such as the market price at a predetermined time relative to the trade, or an execution price at some time interval relative to the trade |
| total-shares | the sum of trade-shares for a set of trades |

The system statistical metric is defined as follows, with the summation being over all trades in the set of trades:

$$\text{METRIC} = (\text{total shares})^{-1} * \Sigma(\text{trade-price} - \text{comp-price}) * \text{trade-shares}$$

For a set of contra ELFs, whose identity may remain anonymous, let it be assumed that the following metrics have been computed:

| | total-shares | METRIC |
|---|---|---|
| contra ELF 1 | 200,000 | −0.21 |
| contra ELF 2 | 500,000 | +0.04 |
| contra ELF 3 | 10,000 | +0.50 |
| contra ELF 4 | 125,000 | +0.11 |
| contra ELF 5 | 0 | 0 |

Let it also be assumed that the trader has supplied a "rogue" list as follows (ELF 2), and that ELF 2 has elected to opt out of having its performance tracked by specifying itself as "unknown," and that the quantity threshold for "apprentice" level is 50,000 shares.

A contra-ELF is classified as one of the following ordered categories:

| | |
|---|---|
| friendly | on a trader supplied list of friendly contra ELFs |
| well-behaved | METRIC ≧ .1, and not (on any trader-supplied lists or unknown or apprentice or new) |
| apprentice | total-shares < a specified quantity threshold, and not (on any trader-supplied lists or unknown or new) |
| new | no trade history relative to this contra ELF, and not (on any trader-supplied lists or unknown) |
| unknown | the contra ELF does not permit price comparison tracking of its trades |
| naughty | METRIC < .1 and not (on any trader-supplied lists or unknown or apprentice or new) |
| rogue | on a trader supplied list of rogue contra ELFs |

In this example, the contra ELFs are as follows:

| | |
|---|---|
| well-behaved | ELF 4 |
| apprentice | ELF 3 |
| new | ELF 5 |
| unknown | ELF 2 |
| naughty | ELF 1 |

The call list for this order ELF may be as follows, assuming seven levels of disclosure, with level 1 being the least amount of disclosure and level 7 being the most amount of disclosure:

(i) if (a contra ELF is on my specified disclosure list) then (provide disclosure as specified); or
  (ii) if (a contra ELF is well-behaved or better) then (disclose at level 6); or
  (iii) if (a contra ELF is naughty or worse) then (disclose at level 2);
  (iv) else (disclose at level 4).

It should be understood that this scheme of permitting the order room to specify formulae for the establishment of its contra-party preferences also allows the order room to force preferences for particular contra-parties, named both explicitly and implicitly. Implicit naming allows the order room to refer to a particular contra-party even though it was unknown to the order room at the time. Implicit references include, among others, specifying the contra-party by the time at which some pairing occurred, or by specifying the order room's order on the other side of which was the contra-party to be identified.

In this embodiment, contra-party preference updating 63 is substantially an off-line batch process. In other embodiments, contra-party preference updating 63 is integrated with real-time on-line operations so that contra-party preferences change dynamically based on trading history.

In a modification, oE 10 can specify the rules for assigning a category to a contra-party. For example, if a contra-party has negotiated n times but never agreed to a pairing, then the contra-party should be classified as a rogue.

In some embodiments, the rules for assigning contra-parities to categories are defined by order umpires. Accordingly, contra-party ratings are specific to an umpire, that is, oE 10 and oE 12 may be unacceptable trading partners at oU 30, but may be acceptable trading partners at oU 32.

Platform Services

System Status Board

FIG. 11 shows system status board data structure 74 maintained by system status board process 64C of platform services 60. System status board 74 includes one entry for every umpire in system 5. Among the fields maintained for each umpire are:
Open/closed/suspended—a field that reflects the operational status of the umpire, e.g., whether the umpire is available and is open or closed, or whether it has been suspended and when.
Open/fast symbol/in-process—a field with one or more subfields, each reflecting the status of each symbol processed by this umpire, e.g., whether the symbol at that umpire is:
  1. Fast mode symbol—available, but not allowing affirmations from the ELF prior to pairing.
  2. In-process—a periodic market is processing its orders. During the time the umpire is in-process, it will not allow any operations on the order, such as cancel.
  3. Suspended—trading in a symbol has been suspended by a market authority.
  4. Closed
  5. Open-none of the above.
List of ELFs registered the identity and disclosure levels of all ELFs currently registered at this umpire.

An umpire grants an access right to an ELF for the information in system status board 74 for a particular depth of information relating to the umpire. An order umpire can learn about any ELF registered therewith from system status board 74. An ELF checks with an umpire to find out about another ELF.

A function of system status board 74 is to make it easy for order ELFs to obtain the status of an umpire, that is, centralizing umpire information in system status board 74 removes the need for an order ELF to query an umpire merely to ascertain the status of the umpire or another ELF.

Another function of system status board 74, used in conjunction with order tails, is to help order umpires manage the simultaneity arising from the ability of an order to be in multiple markets. Each order ELF is responsible for ensuring that the order tails of all of its orders accurately reflect the order umpires at which the order is posted. An umpire, such as a match umpire, checks an order's order tail before executing the order to rapidly find the order umpires at which the order is posted, then checks system status board 74 to determine if any of these order umpires entered an in-process state earlier than this umpire entered its in-process state. If so, this order umpire skips the order. If not, this order umpire deems itself as having authority to execute the order according to its process methodology. Without system status board 74, this order umpire would have to ask for affirmations on an order-by-order basis, and wait for all responses before it could act; this is time-consuming and generates a lot of intra-system traffic.

Figure 12:
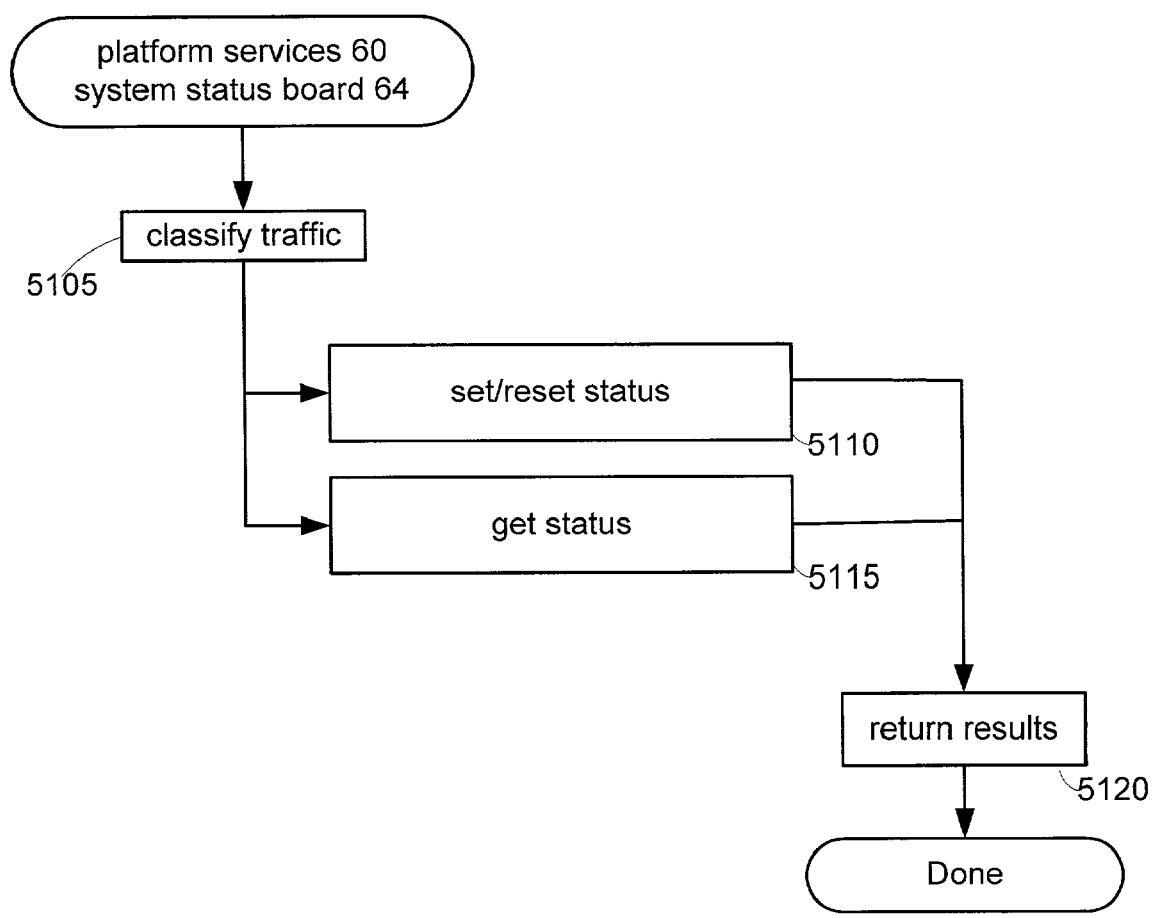

FIG. 12 is a flowchart showing processing for system status board process 64.

At step 5105, system status board 64C classifies the traffic, performs appropriate processing at step 5110 or 5115, returns results, if any, at step 5120 and processing is complete.

At step 5110, traffic coming from an umpire, an ELF or platform services, such as master umpire platform status monitor 62, sets or resets the corresponding status data for that umpire or ELF.

At step 5115, system status board 64C checks whether a requesting party has authorization for information it is requesting, and if so, responds to the request for the status of an order umpire or order ELF.

At step 5120, system status board 64C returns the results of its efforts to the requesting party.

Platform Services

Market Status Board

Figure 13:
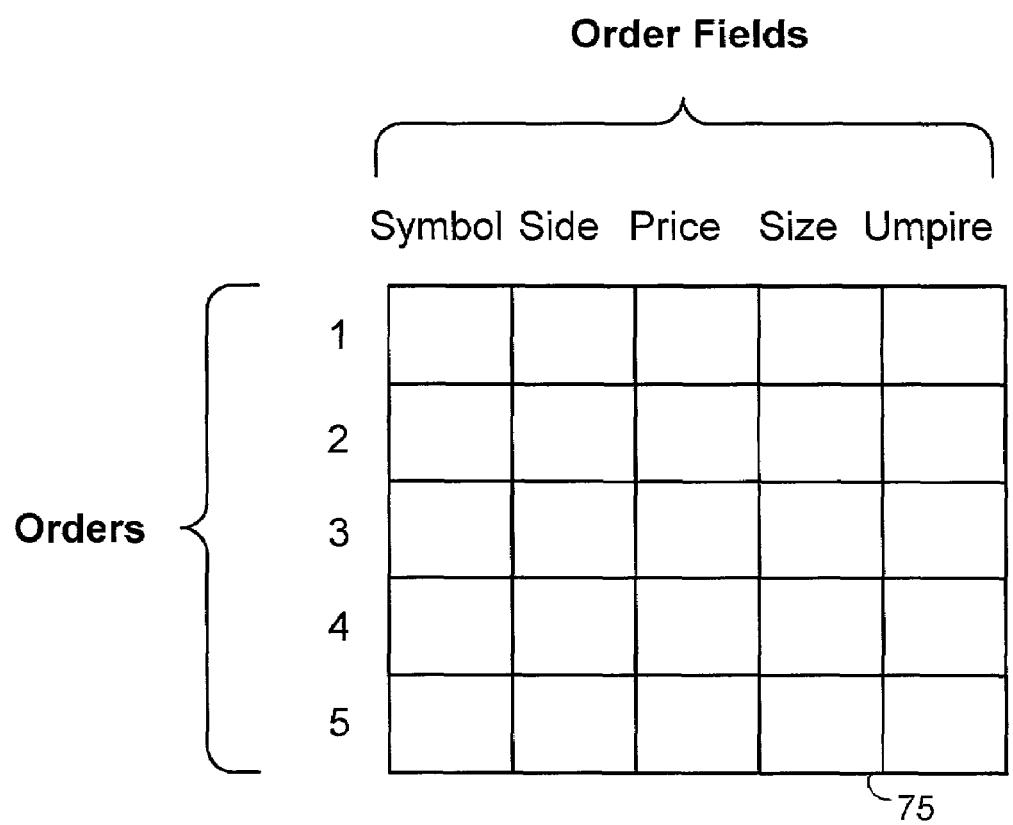

FIG. 13 shows market status board data structure 75 maintained by market status board process 65 of platform services 60. Market status board 75 enables fast discovery by an order ELF.

Market status board 75 functions as a combined order book for all umpires in system 5. Umpires reveal to market status board 75 all their orders. Each ELF receives a certificate from an umpire authorizing the ELF to access certain information. Accordingly, since an order may be represented at multiple umpires, the same order may be represented multiple times on market status board 75.

Figure 14:
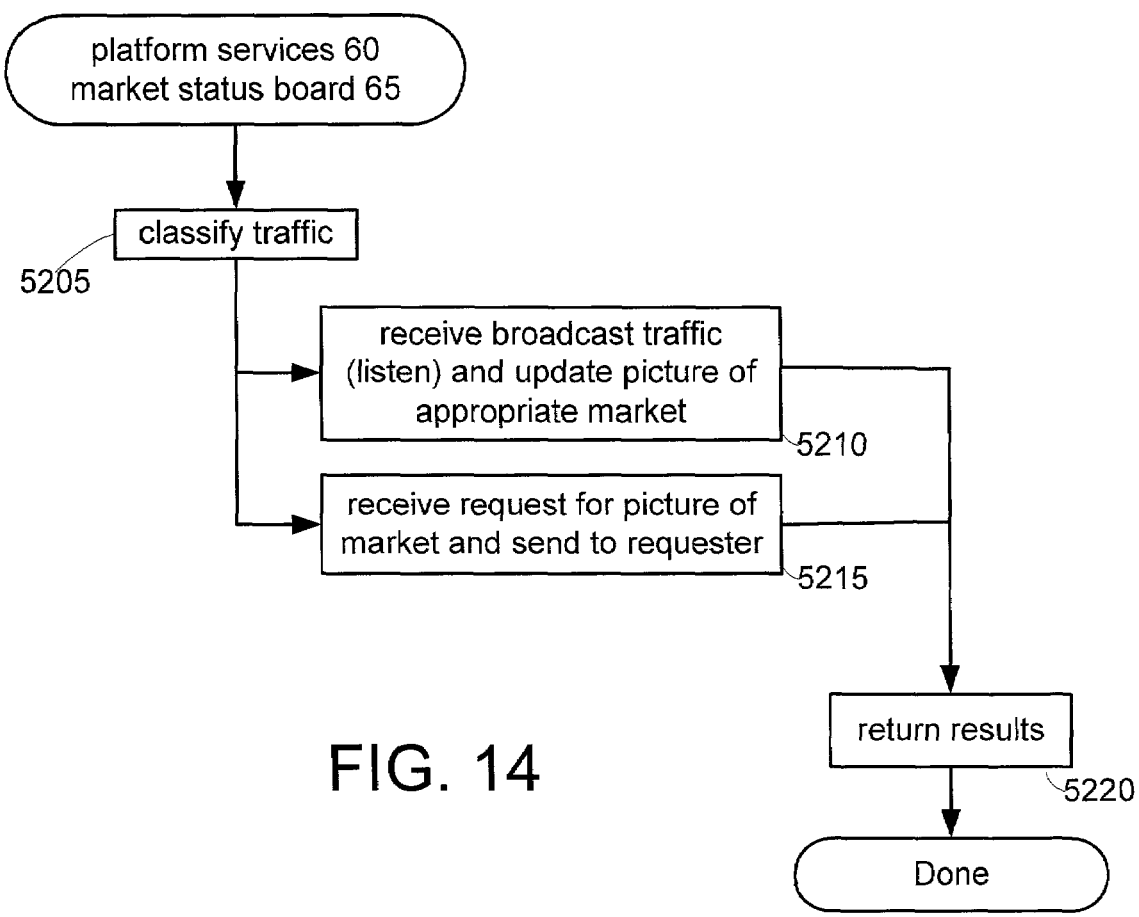
Figure 15:
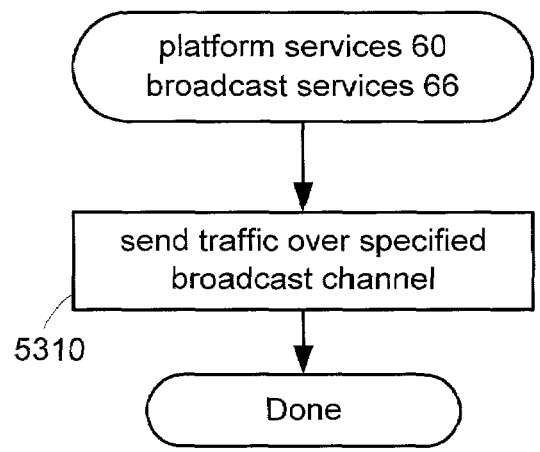

FIG. 14 is a flowchart showing market status board process 65.

ELFs can access market status board 75, but are limited to those portions to which they are entitled. ELFs get entitlement from umpires at registration, via certificate. As discussed elsewhere, access may also be limited by the disclosure levels of the ELF that posted the order. In one embodiment, umpires transmit any changes to their books via broadcast services 66 and market status board 65 receives these transmissions and updates market status board 75. In another embodiment, market status board process 65 observes the books of the order umpires and updates market status board 75 accordingly.

At step 5205, market status board 65 classifies the traffic.

At step 5210, market status board 65 listens to the unsolicited market traffic from umpires and updates its copy of the orders in the market status board.

At step 5215, market status board 65 receives a request for information and retrieves the requested information.

At step 5220, market status board 65 returns a result to the requester.

The concept of a centralized limit order book (CLOB) is well-known. A CLOB assumes that all parties from a variety of markets send their orders to one book which is centrally controlled. In contrast, market status board 75 has distributed control, as access to the information is controlled by the umpire that submitted the information, and the access rights may depend on the identity of the order ELF holding the access rights. Platform services 60 enforces the access rights to information mechanism.

In other words, the conventional CLOB assumes that control over information is associated with possession of the information, whereas system 5 separates control over information from possession of the information.

Platform Services

Broadcast Services

Broadcast services process 66 of platform services 60 is a mechanism for transmitting unsolicited data from umpires to any interested ELFs. In some embodiments, broadcast services 66 transmits all data generated by umpires to ELFs. Only umpires may supply data to broadcast services 66 for broadcast and only ELFs (or platform services) may listen for the data that interests them. Furthermore, ELFs are restricted to listening for data for which they are authorized. Access may also be limited by the disclosure levels of the ELF that posted the order. When ELFs are restricted to using only non-modifiable code, a user cannot readily create a situation, intentionally or unintentionally, in which it accesses data to which it has no permission.

At step 5310, broadcast services 66 sends data as provided by an umpire to be broadcast over a specified channel and exits. As used herein, a channel is a communication path between an umpire and an ELF, or between platform services and an umpire, or between platform services and an ELF.

Order ELF Setup

Figure 16:
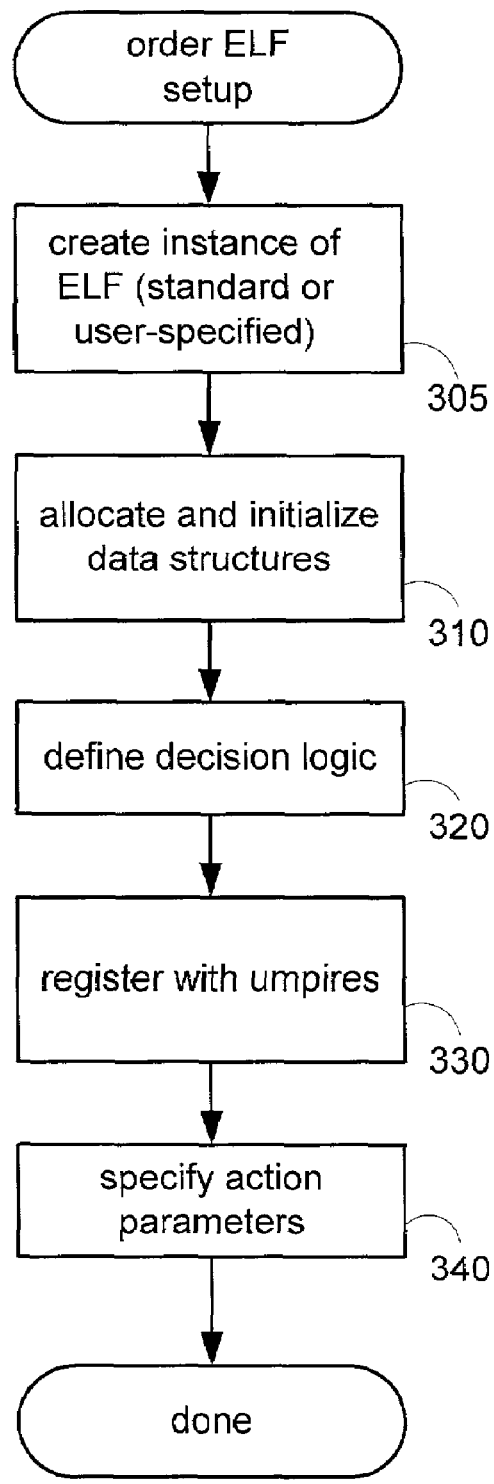
FIG. 16 is a flowchart of the set-up phase for an order ELF.

FIG. 16 is a flowchart of the set-up phase for an oE, such as oE 10.

At step 305, a user such as a trader selects a template for oE 10 from a set of standard templates or, in some embodiments, from a previously approved custom template. A custom template is privately written logic, and may or may not contain calls to decision engine 100. When ELFs are prohibited from including privately written code, their behavior can be more readily managed, which makes system 5 more powerful and trustworthy. As explained further below, when decision engine 100 is called, a decision table, such as decision table 110, must be specified. At this time, an instance of the selected template is created.

At step 310, data structures for the oE are allocated and initialized. Generally, data for oE 10 is kept in ELF data structure 145. Table 3 shows a skeleton for ELF data structure 145. The ELF data structure 145 includes, for example, instrument type and instruments used, call list, decision table in use, its links (see Table 8, below), disclosure level, time-outs, how many orders have been processed by oE 10, statistics on the number of buys vs. sells for each symbol represented, statistics relating to orders received from order room 70, variables reflecting external data and so on.

TABLE 3

| Field | Description |
| --- | --- |
| Instrument type | Type of instrument that this ELF can handle. Characteristics include how prices are quoted, e.g. decimal, or sixteenths, currency. |

TABLE 3-continued

| Field | Description |
| --- | --- |
| Instruments | List of symbols within the instrument type, e.g., IBM and DELL. |
| Decision table | Decision table in use |
| Call list | A list of parties to whom an order may, or may not, be shown and what the disclosure signature will be for each listed party. |
| Links table | Links to umpires and data sources (see Table 8, below) |
| Time-outs | Time-out periods that are required for operation of this ELF. e.g., discovery time-out, and maximum time-out for umpires in-process. |
| Disclosure | Maximum disclosure level that this ELF can allow |
| Statistics fields | Statistics kept by the ELF, e.g., buys and sells for each instrument. |
| External variables | Storage for variables obtained from umpires |

At step 320, the user specifies decision logic for oE 10, including the decision table and the following decision making parameter:

DTO (discovery time out) specifies the maximum time that the oE will wait for discovery. Table 4A shows order 115, as received from order room 70. oE 10 has a separate instance of Table 4A for each order represented by oE 10.

TABLE 4A

| Field | Description |
| --- | --- |
| Ordinary Order Fields | Ordinary order fields |
| Order Extension | Additional order fields that augment the order room's instructions for this order. For example, the order room may make process-specific parameters available to the ELF to use in its selection of umpires, acceptance of prices, and so forth |
| Order Tail | List of umpires at which this order has been posted |

Table 4B shows the Ordinary Order fields from Table 4A.

TABLE 4B

| Field Name | Description |
| --- | --- |
| Instrument type | Type of instrument in this order, e.g., level of price granularity (eighths, tenths). |
| Symbol | The symbol used to represent the individual item being bought or sold, e.g., IBM |
| Side | Buy, Sell, or Sell-Short |
| Price | Price is the amount of one trading unit of the item that the buyer/seller represented by this order is willing to pay/accept for the trade and to disclose to the public. In the case of an auction, this would be either the reserve (upset) price or the opening bid price. |
| Size | The number of trading units being bid/offered. |
| Minimum Lot Size | Minimum lot size of the order. If a trade occurs where multiple contra orders are needed to fill this order, this is the minimum size of the combined contra orders. |
| Order Type | Market, Limit, Stop, Trial, and so on |
| Time In Force | How long the order is valid, i.e., At Opening, Day, Good 'til cancelled, Immediate or Cancel, Fill or Kill, and so on. |

Table 4C shows the Order Extension fields from Table 4A. The fields of Table 4C are for features not in conventional systems but supported in system 5. Table 4C is associated with the ordinary order fields of Table 4B, which comprise order 115.

TABLE 4C

| Field Name | Description |
|---|---|
| Linked Order | Indicates whether this order is one leg of a set of linked orders. |
| Action | What the ELF should do with the order, e.g., Validate, Execute, route and so on |
| Code | A code indicating, for example, how much will be paid/accepted for a trade. |
| Stoppable | Whether this order can be used to satisfy a contra-party's stop request. |
| Alpha | An alphanumeric message with information to be used in conjunction with processing this order |
| Price Aggressiveness | How insistent is the customer on a better price for the order. |
| Time Urgency | A measure of the urgency to fill this order. The higher the urgency, the better (for a potential contra party) the price that will be bid/offered. |
| Call List | List of eligible parties with associated disclosure signatures. |
| Overrides | A list of checks that can be bypassed, such as total order cost. |

Table 4D shows the order tail from Table 4A. The order tail is a list of all the umpires at which the order is currently represented.

TABLE 4D

Umpire-1
Umpire-2
.
.
.

Figure 17:
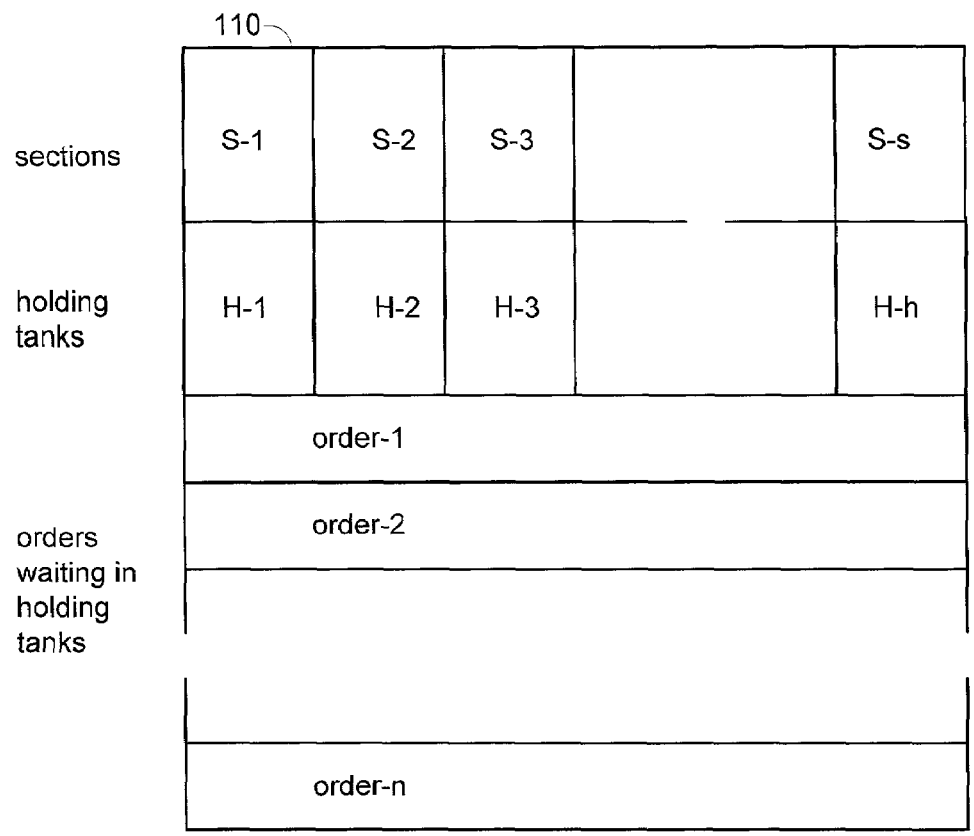
Figure 18:
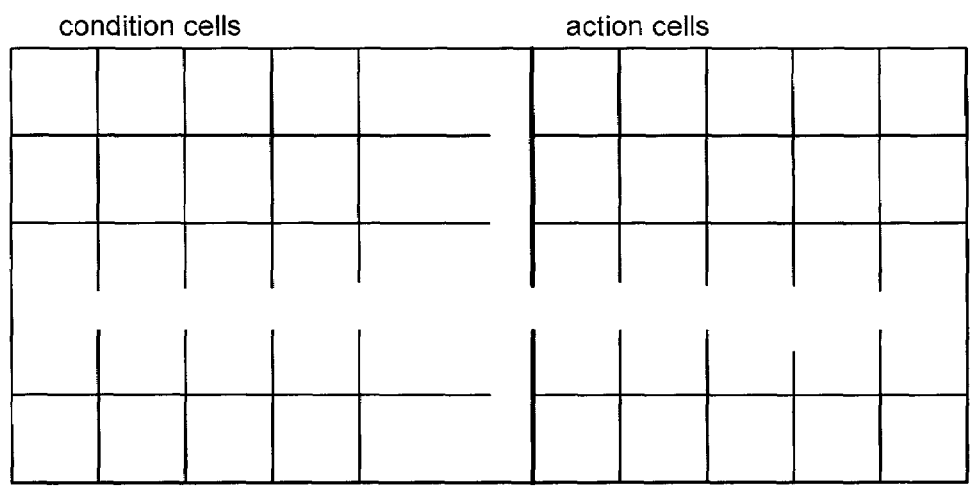

FIG. 17 shows decision table 110 consisting of sections {S-1, S-2, ... S-s}, holding tanks {H-1, H-2, ... H-h}, and waiting orders {order-1, order-2, ... order-n}. Each section and each holding tank has the structure shown in FIG. 18, that is, rows of condition cells and action cells. The condition cells and action cells in a row are sometimes referred to as a rule. Decision table 110 determines the subset of umpires at which oE 10 will attempt discovery for a particular order.

Section labels {S-1, S-2, ... S-s} each identify a respective section in decision table 110, and are used when the action in an action cell is to go to a particular section. Each condition cell represents one condition, such as "if the weather is sunny" or "if the price of XYZ option has changed by more than 10% in the last hour" and so on. When all of the conditions are present, that is, all of the condition cells evaluate to being "true," then the order is actionable and the action cells are executed by decision engine 100 of oE 10. Each action cell represents one action to be taken, such as "buy 100 XYZ at market" or "ask eU 40 for its projected value of XYZ" or "go to section 8 of this decision table." The sequence of execution of the actions is indicated by the actions themselves, either implicitly by their placement in the decision table, or explicitly by "go to" actions.

In some embodiments, the condition cells are evaluated according to a Boolean formula, including AND, OR and/or NOT operators. In some embodiments, the action cells are evaluated according to a Boolean formula.

Generally, parameters for conditions are related to the order itself or to market conditions. At least one rule should be based on the order itself and be executable; the action may be to put the order in a holding tank until one or more conditions change. Holding tanks may be employed to wait for either external or internal conditions, or both.

If none of the rules in the decision table are executable for an order, then an error message is generated.

A holding tank is a storage area for an order, or a pointer to the order, and associated conditions that need to occur to remove the order from the holding tank, and actions to take when the conditions are true. The order in the holding tank may have an associated rule consisting of a rule condition (when the market is above kkk) and a rule action (go to section aa of decision table xxx) (k, a, and x are arbitrary integers). Additionally, the order in the holding tank may have other rules, one of which may contain a rule condition (when time=nnnn) and a rule action (go to section 1 of decision table mm) (n and m are arbitrary integers). As shown in FIG. 17, there may be several holding tanks in decision table 110. Each holding tank may be created with a different set of conditions such that all orders placed therein are evaluated against the same set of conditions. For example, one holding tank may be set up to evaluate when a certain period of time has elapsed, while another holding tank may be set up to evaluate when a market index has reached a certain level. The conditions specified may be arbitrarily complex.

It will be appreciated that decision table 110 may be implemented in various ways, such as a table or series of files.

Generally, an ELF makes a decision using a decision table, a set of conditional rules applied at the specified point in the trading process, such as when an order is received, when a price is first received, when a price improvement opportunity is received when the ELF is in the crowd for an umpire, or upon reporting of an execution to make an allocation of the executed quantity among appropriate parties. The ELF's decision-making parameters are transparent to an umpire. Tables 5-7 provide examples of decision tables.

TABLE 5

| Security | Size | Price | Action |
|---|---|---|---|
| XYZ | any | last sale ± 5% | take |

The rule in Table 5 is that, for any size order, if the price is within 5% of the last sale price, then take the offered price.

TABLE 6

| Security | Size | Price | Action |
|---|---|---|---|
| XYZ | any | ask improved 25% and T2 < 3 | take |
| XYZ | <10,000 | ask improve any & (trend = away) | counter-offer (ask improve .1) |
| XYZ | <10,000 | ask improve any & (trend = toward) | request auction |
| XYZ | any | any | crowd |

The first rule in Table 6 is that if the offered price is better than the market ask price by 25% and the umpire returns a price within 3 time-units, such as seconds, then take the offered price. The second rule in Table 6 is that, for any amount less than 10,000 shares, if the offered price is better than the market ask price by any amount, and the market trend is away from what would be a better price, then counter-offer by the market ask price adjusted by 0.1. The third rule in Table 6 is that, for any amount less than 10,000 shares, if the offered price is better than the market ask price by an amount, and the market trend is towards a better price, then request an auction. The fourth rule in Table 6, applied when none of the prior rules have been able to be used, is to join the crowd. Table 6 is defined so that it can be applied whether the order is to buy or sell. In other cases, a rule is written so it applies only when buying, or only when selling.

TABLE 7

| Security | Size | Price | Action |
| --- | --- | --- | --- |
| XYZ | any | ask improved 25% | take |
| XYZ | <10,000 | (ask improve any) & (offered improved 5% over previous offered) | counter-offer (ask improve 10%) twice then (take if within approved price) |
| XYZ | <10,000 | ask improve any & (trend = toward) | request auction |
| XYZ | any | any | order room |

Table 7 is similar to Table 6, except as noted. In the second rule of Table 7, for any amount less than 10,000 shares, if the offered price is better than the market ask price and at least 5% improved over the previously offered price, then counter-offer twice by improving the price by 10% and on the third iteration, take the offered price if within the approved price. The fourth rule in Table 7, applied when none of the prior rules have been able to be used, is to request instructions from the order room.

Operational uses of decision table 110 specified at step 320 of FIG. 16 include:
1. Deciding which umpires to utilize for each order;
2. Specifying, acceptable and/or unacceptable contra-parties;
3. Evaluating whether to accept a proposed pairing;
4. Provisional price acceptance processing;
5. Determining whether and how to make a counter-offer, and any modifiers for the counter-offer;
6. Deciding whether to join and remain in the crowd for an umpire;
7. Deciding whether to post an order with an umpire; and
8. Deciding whether to offer an improved price during a price improvement period of an umpire.

In some embodiments, instead of specifying some or all of the above logic, decision table 110 of oE 10 may indicate that order room 70 should be apprised of the existing situation and provide a decision.

Each rule may also specify a time for taking action, expressed as either an absolute time, e.g., at 10:20 a.m., an offset time, e.g., 10 seconds before the market closes, a conditional time, e.g., when eU 40 advises acting, or a complex conditional time, e.g., 23 seconds after eU 40 advises acting. A rule may specify "wait" as an action.

FIG. 19 shows symbol table 150, essentially a set of rows, each row having the following fields: name of symbol, type, attributes, default value and value. Symbol table 150 is used to pass parameters in and out of the decision engine 100. Symbol table 150 contains all symbols used in conditions and actions in decision table(s) 110. An example of an attribute is "base class," and the default value is used unless explicitly overridden by another value. A base class is the structure from which the "type" of this symbol is derived. During oE 10's operational phase, when an order is received, the decision table will be used to determine, among other purposes, which of the registered umpires to utilize for that order.

At step 330 of FIG. 16, links are allocated and initialized with the list of umpires and data sources supplied by oE 10's creator. The links are pointers to the umpires to which this ELF will attempt to connect to transact its orders, to obtain services, or to obtain other data that it requires.

At this point in its setup phase, oE 10 attempts to register with the linked umpires and, where registration is accepted, obtains umpire parameters and populates an instance of umpires table 140, shown in Table 8, for each umpire with which oE 10 is registered. The umpire parameters returned by an umpire to oE 10 may depend on the characteristics of oE 10.

TABLE 8

| Field Name | Description |
| --- | --- |
| Name | The name of the Umpire for this row of the table. |
| Method | The pricing method this Umpire uses. |
| Method Modifier | The meaning of this field depends on the method. An example would be the rebate paid by this Umpire for each trade executed with him. Another example is whether auction mode during discovery is supported. |
| T1 | How long this umpire takes to complete discovery. |
| In-Process Time | The maximum amount of time that the Umpire will require when it is in-process. An example is how long this umpire takes to run an auction. |
| Stop fee | The charge an umpire levies per share for issuing a stop. |
| T2 | How long prices obtained during discovery are valid. Values may be "soft," meaning that the price is an indication only, or "instant," meaning that the price is good for long enough to get electronic confirmation, or the length of time that the price will be held. |
| Code | (Y/N) Does this Umpire return codes for prices. |
| Alpha | (Y/N) Does this Umpire return alphas for prices. |
| Value | (Y/N) Does this Umpire return values for prices. |
| Depth | How deep will the Umpire let this order ELF look into its book. |
| Packages | Whether this Umpire supports (within this same Umpire) linked orders. |
| Contra Discovery | (Y/N) Will this Umpire disclose who the contra parties are |
| Posting Mode | Regular or first look (OTC). Under first look posting mode, if an order is posted inside the market, the ELF representing the best bid or offer on the other side will be given a period of time to see the new order before it is visible to others. |
| Market Open Time | The time the market opens. |
| Market Close Time | The time the market closes. |
| Table of Symbols | The trading symbols that this Umpire handles, and their current status, i.e., trading suspended. |

Table 9 shows Price Response Table 120 that represents, for all umpires at which oE 10 has discovered prices for a particular order 115, the discovered prices. Price Response Table 120 includes the prices taken so far and the prices that oE 10 attempted to take.

TABLE 9

| Field Name | Description |
| --- | --- |
| Symbol | The symbol used to represent the actual item being bought or sold. |
| Side | Buy, Sell, or Sell-Short |
| Size | The number of trading units being bid or offered. |
| Cumulative Size | Total number of trading units represented by all entries in the price response table up to and including this entry |
| Price | The amount of one trading unit of the item that the contra is willing to pay/accept for the trade. |
| Code | A private code defined between a given umpire and ELF, indicating, for example, how much will be paid/accepted for a trade, or that the umpire will meet the "Best market price." |

TABLE 9-continued

| Field Name | Description |
| --- | --- |
| Alpha | An alphanumeric message with information, for example, on how to proceed with the trade. Such as "Call Jim @ 212-343-9410." |
| Cumulative Average Price | Weighted average price of all trading units represented by all entries in the price response table up to and including this entry |
| Umpire Name | The name of the umpire from which this price came. |

At step 340 of FIG. 16, action parameters are specified, including special representation functions such as auctions, if any, and disclosure policies operative when oE 10 is in the crowd for an order umpire. The action parameters must be consistent with the methods offered by an umpire. The following action parameters are also specified:

Participation specifies whether the oE will register in a crowd, and if so, to what degree it will be disclosed to other oEs in the crowd:

1. not in crowd—not registered in the crowd
2. do not disclose—in the crowd, but anonymous
3. ordinary—in the crowd, disclosed, but not representing a large block
4. serious—in the crowd, disclosed, and representing a large block There is one instance of order control table 130 for each order represented by oE 10. The order control fields are a control mechanism for the order so that oE 10 can keep track of what is live at each umpire. In this embodiment, oE 10 does not keep a transaction history.

In one embodiment, order control table 130 comprises one or more instances of Table 10. Each instance of Table 10 can be thought of as a row in order control table 130, shown in FIG. 20. There is one row in order control table 130 for each umpire at which some part of the order is represented. Each row in order control table 130 is used to keep track of that part of the order that is at the umpire named in the row in any state other than executed or canceled, e.g., posted, or in-process. FIG. 20 illustrates order control table 130 as having entries for three umpires: umpire 342, umpire 30 and umpire 154, indicating that at least a portion of the order has been sent to each of these umpires.

TABLE 10

| Field Name | Description |
| --- | --- |
| Name | The name of Umpire where this order is represented. |
| In-process (1) | The number of shares, if any, at this umpire that are in-process due to ELF originated actions. |
| Posted Amount | The number of trading units posted at this umpire |
| Posted Price | Price at which the amount, above, was posted |
| In Crowd | The number of trading units represented in the crowd |
| In-Process (2) | The number of shares, if any, at this umpire that are in-process due to umpire originated actions. |
| Reserved Amount | The number of trading units reserved at this umpire (e.g. stop granted). |
| Reserved Price | The price of each trading unit for which the stop was granted |
| Reserved Time | The time at which this stop expires. |
| Pending Queue | A queue of actions pending, if any, for the in-process shares at this umpire |

In some embodiments, in addition to the rows in order control table 130, order control table 130 may contain summary fields that sum over all of its rows, or sum over all rows for each umpire, or both. For example, there may be a summary field, Total Amount In-process, that sums the In-process Amount field for all rows in order control table 130.

It will be seen that an oE can be defined entirely by parameters and decision tables set by the user, such as order room 70, or can be defined by a combination of parameters, decision tables and privately written code. In some embodiments, privately written code from the user is not supported.

During oE setup, oE 10 receives parameters from order room 70 that specify with which umpires to register and how to determine, during oE operation, which of the registered umpires to utilize during the processing of any order. During oE operation, described below, as oE 10 executes decision engine 100, passing from section to section of decision table 110, shown in FIG. 17, oE 10 selects umpires for a particular order from umpires table 140, shown in Table 8, which contains umpires with which oE 10 is registered.

Order ELF Operation

FIGS. 21-43 are flowcharts depicting the operation of an order ELF, such as oE 10.

Figure 21:
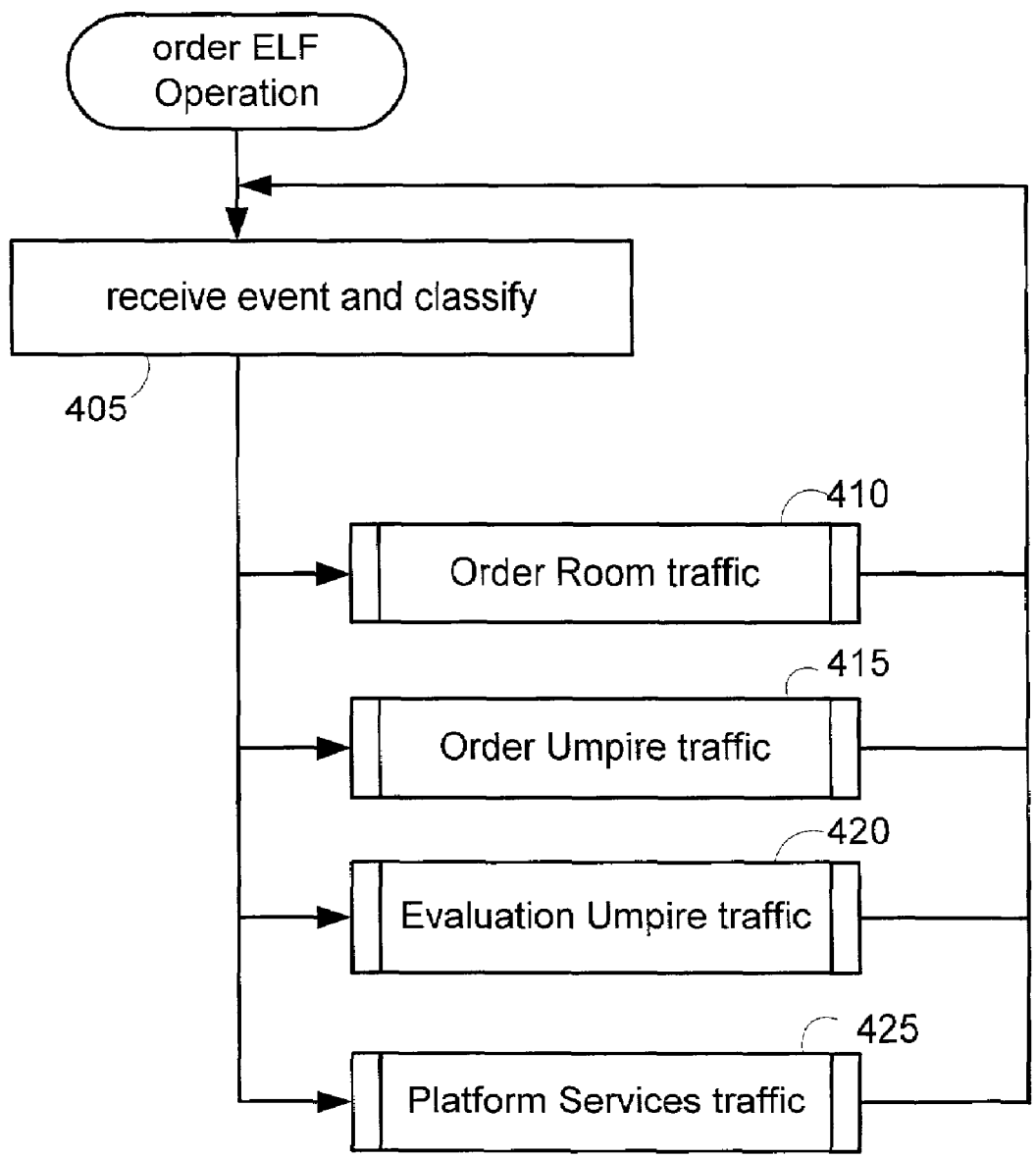
FIGS. 21-43 are a flowchart of the operational phase for an order ELF.

As shown in FIG. 21, after oE 10 is set up, at step 405, it waits for an event, responds appropriately, shown in detail for each event in a separate flowchart, and then returns to step 405 to wait for another event.

Figure 22:
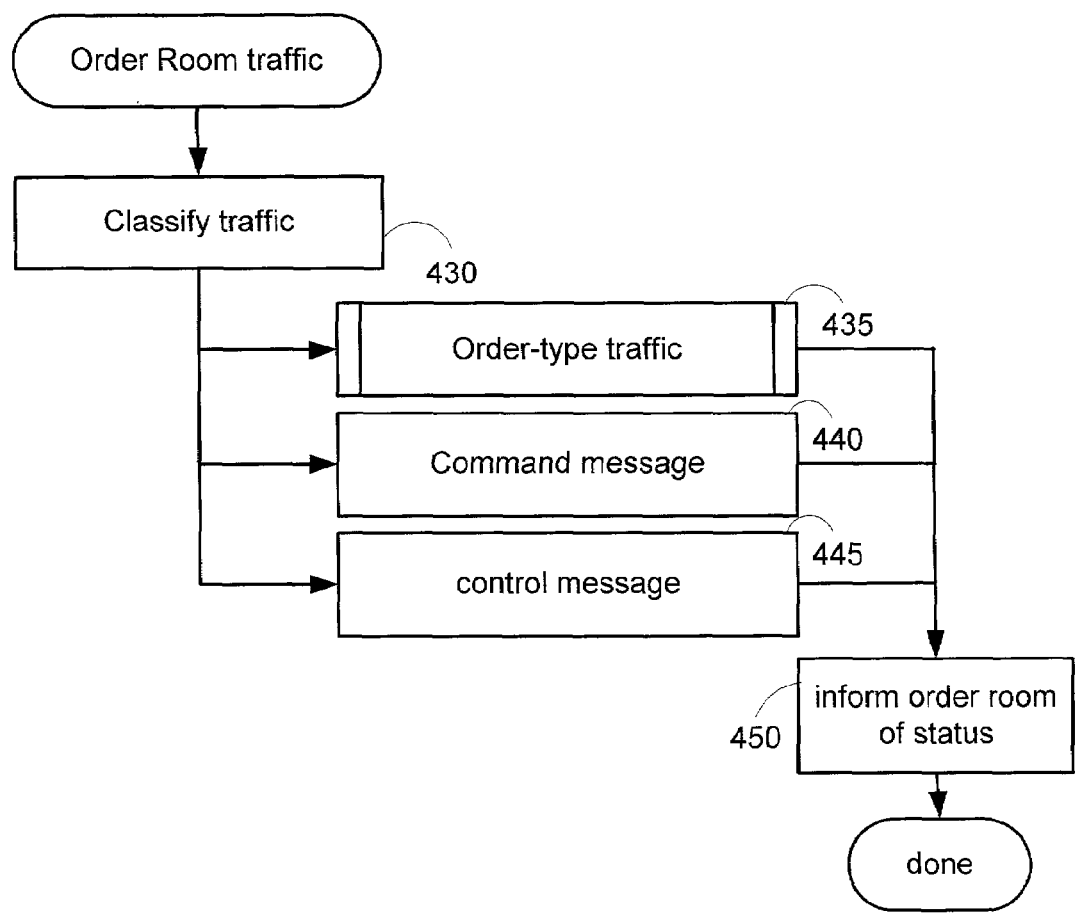

At step 410, oE 10 receives traffic from the order room, invokes the logic shown in FIG. 22, and then returns to step 405.

Figure 32:
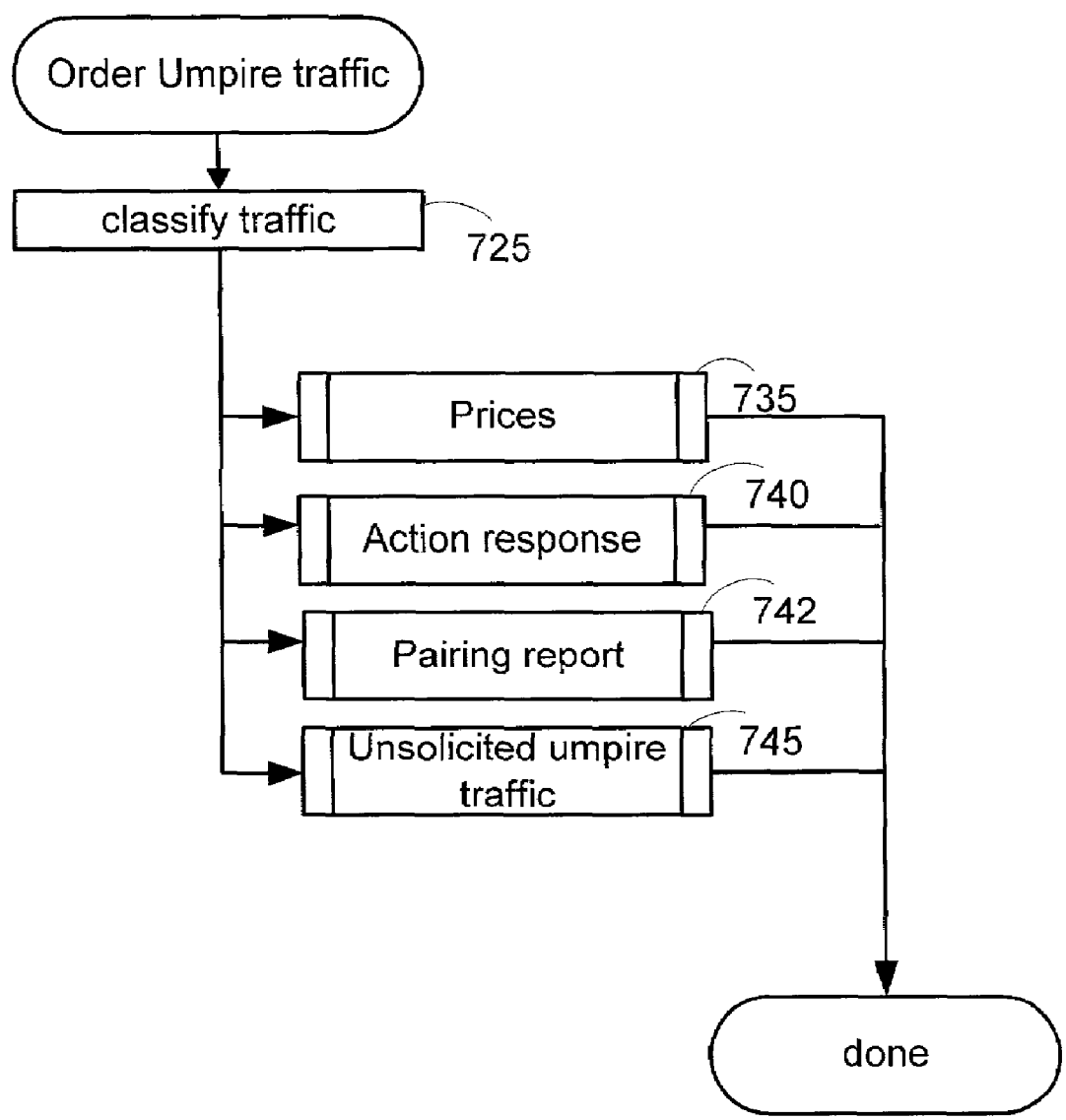

At step 415, oE 10 receives traffic from an order umpire such as oU 30, invokes the logic shown in FIG. 32, and then returns to step 405.

Figure 42:
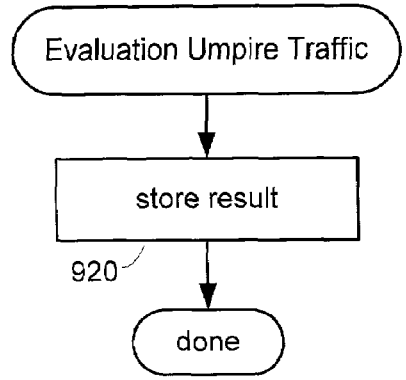

At step 420, oE 10 receives traffic from an evaluation umpire such as eU 40, invokes the logic shown in FIG. 42, and then returns to step 405.

Figure 43:
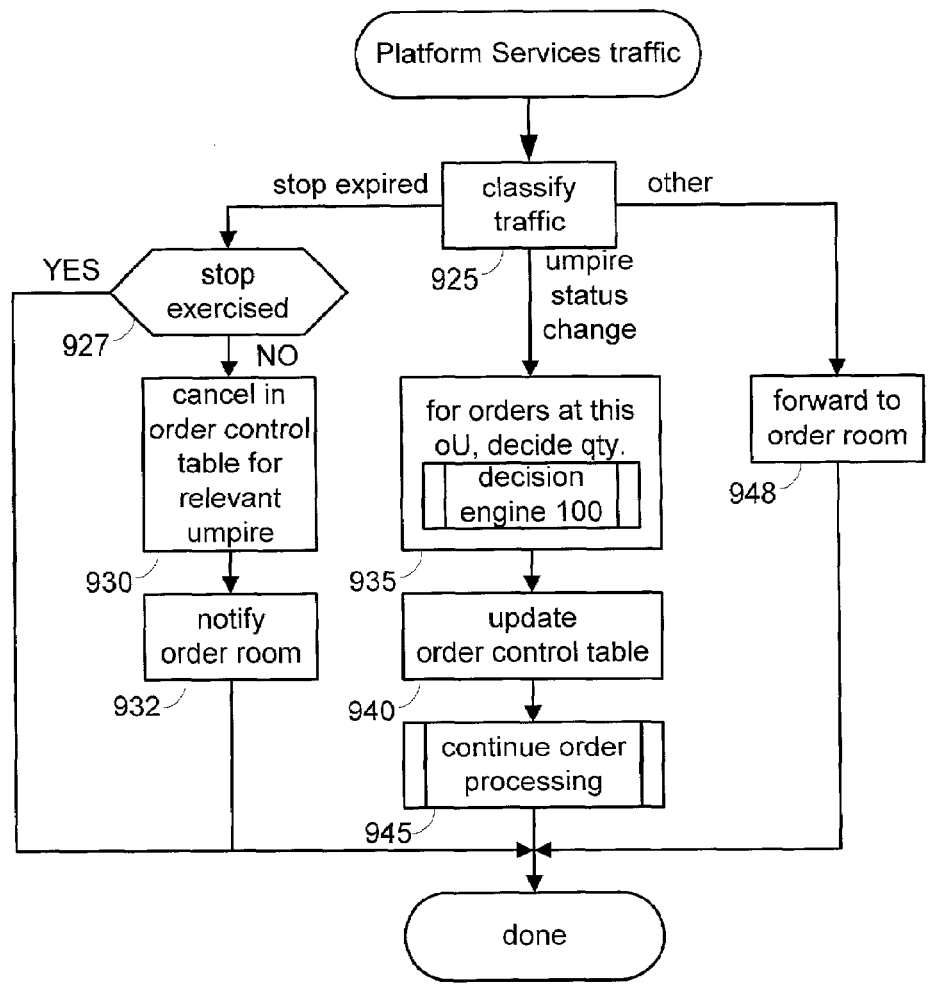

At step 425, oE 10 receives a traffic from platform services 60, invokes the logic shown in FIG. 43, and then returns to step 405.

FIG. 22 is a flowchart showing how oE 10 responds to receiving message traffic from order room 70.

At step 430, oE 10 determines the type of the traffic, and responds accordingly.

Figure 23:
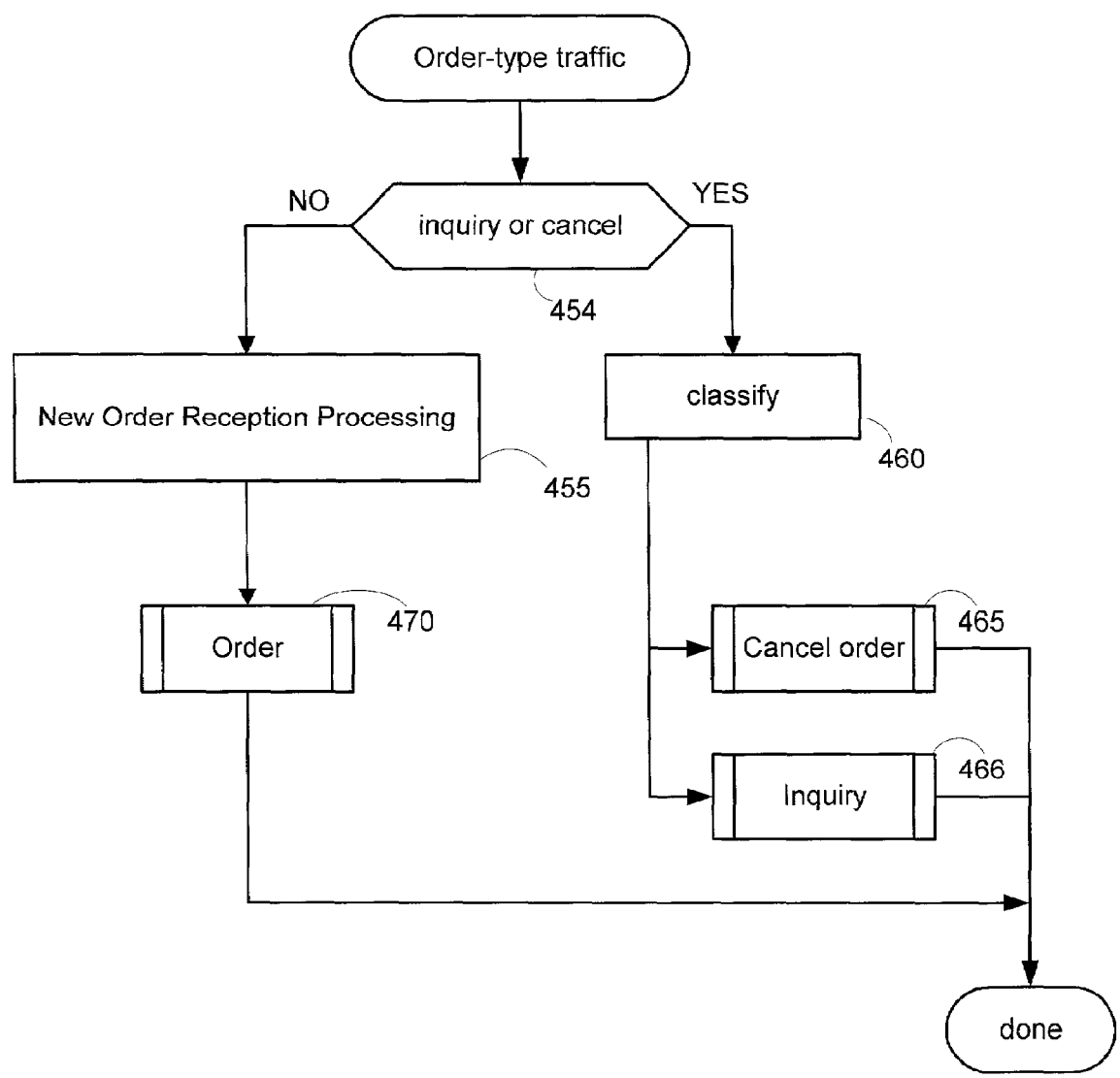

If the message is order-type traffic, then at step 435, oE 10 invokes the logic shown in FIG. 23, and then proceeds to step 450.

If the message is a command message, then at step 440, oE 10 processes the command, which directs the processing of orders such as signaling the beginning or end of direct trader control, or supplying, interactively, parameters to be used in the processing of an order such as contra-party preference information ("friendly" or "rogue") and associated trading quantity and discretion information, preference information about this order ELF ("anonymous"), and then oE 10 proceeds to step 450.

If the message is a control message, then at step 445, oE 10 processes the control message, which directs the operation of the ELF such as starting and stopping operations, or changing the list of umpires with which to register, and then oE 10 proceeds to step 450. Among the control messages the order room can send to the ELF is an instruction to change "phases" taken into account in-processing of decision table 110 to select among several processing strategies. For example, there may be one strategy for securities prior to the closing of the NYSE and a different one after that.

At step 450, oE 10 informs order room 70 of the status of the order, command, or control, and processing returns to FIG. 21, step 405.

FIG. 23 is a flowchart showing how oE 10 responds to order-type traffic from order room 70.

At step 454, oE 10 determines whether the traffic is an inquiry message or a cancel order instruction. If not, processing proceeds to step 455. If so, processing proceeds to step 460.

At step 455, oE 10 performs new order reception processing, generally comprising validating the order by checking that the order is a legal order and logically consistent, i.e., in the proper format, does not have contradictory fields, has parameters in acceptable ranges, such as being for an element (trading symbol) suitable for oE 10 and suitable for at least one order umpire. While most of the validation is done in the order room, some of the available information may have changed from the time the order was processed at the order room and the time the ELF initiates processing that order. For example, an umpire may no longer be available, or a trader's authorization limit may have been exceeded. oE 10 stores the validated order and acknowledges that it is stored to its user, order room 70. In addition, oE 10 rescans the links for all umpires selected for this order to determine their current status, including their current availability.

Figure 24:
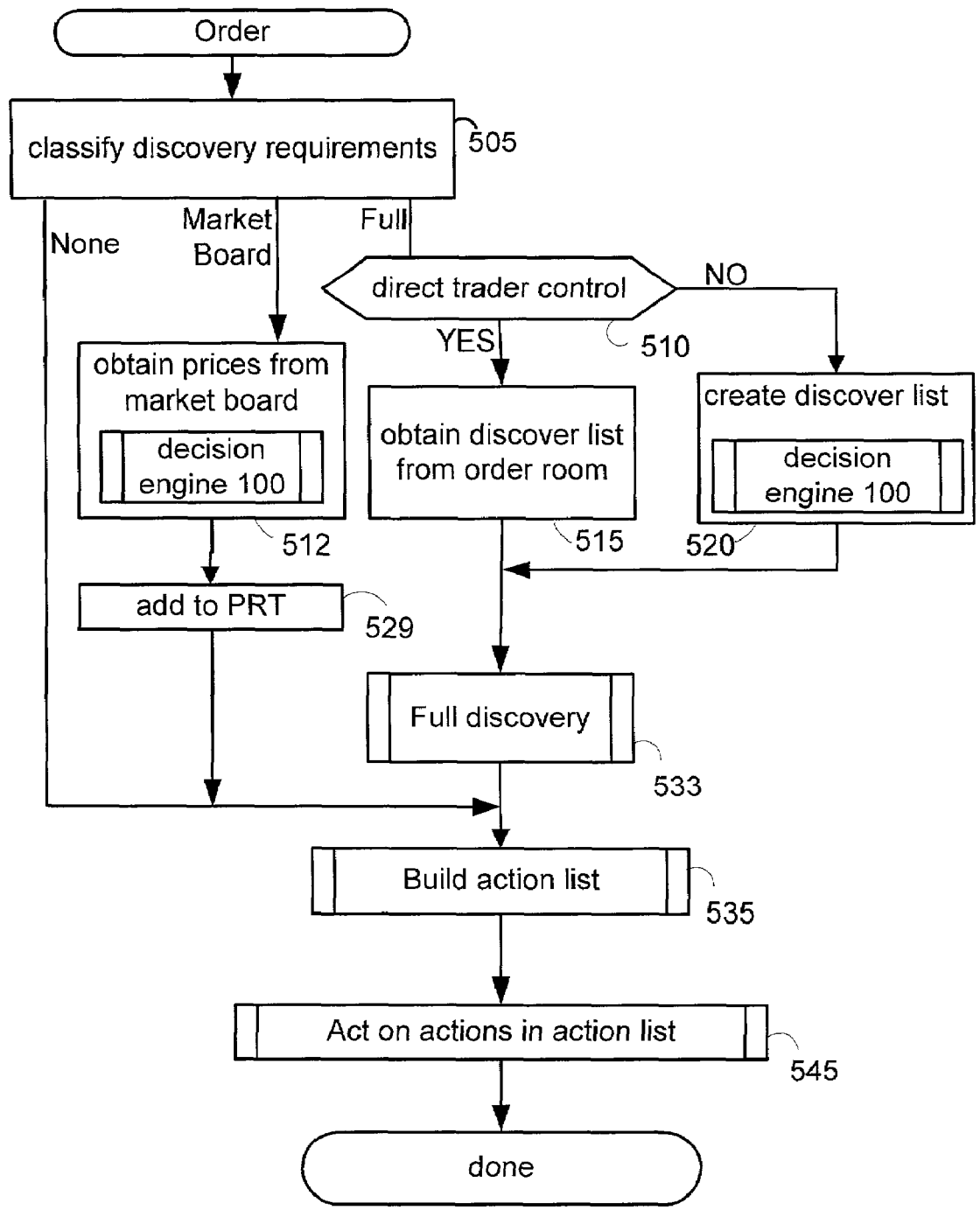

At step 470, oE 10 invokes the logic shown in FIG. 24, and then processing of order-type traffic is complete.

If the traffic was an inquiry message or a cancel order instruction, then at step 460, oE 10 determines the type of the message traffic, and responds accordingly.

Figure 29A:
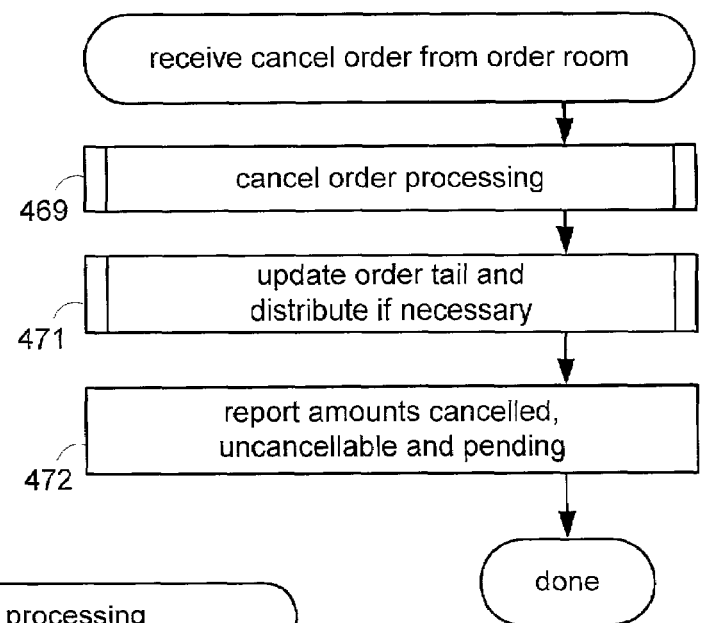

If the message is a "cancel order" message, then at step 465, oE 10 invokes the logic shown in FIG. 29A, and then order-type traffic processing is complete.

Figure 31:
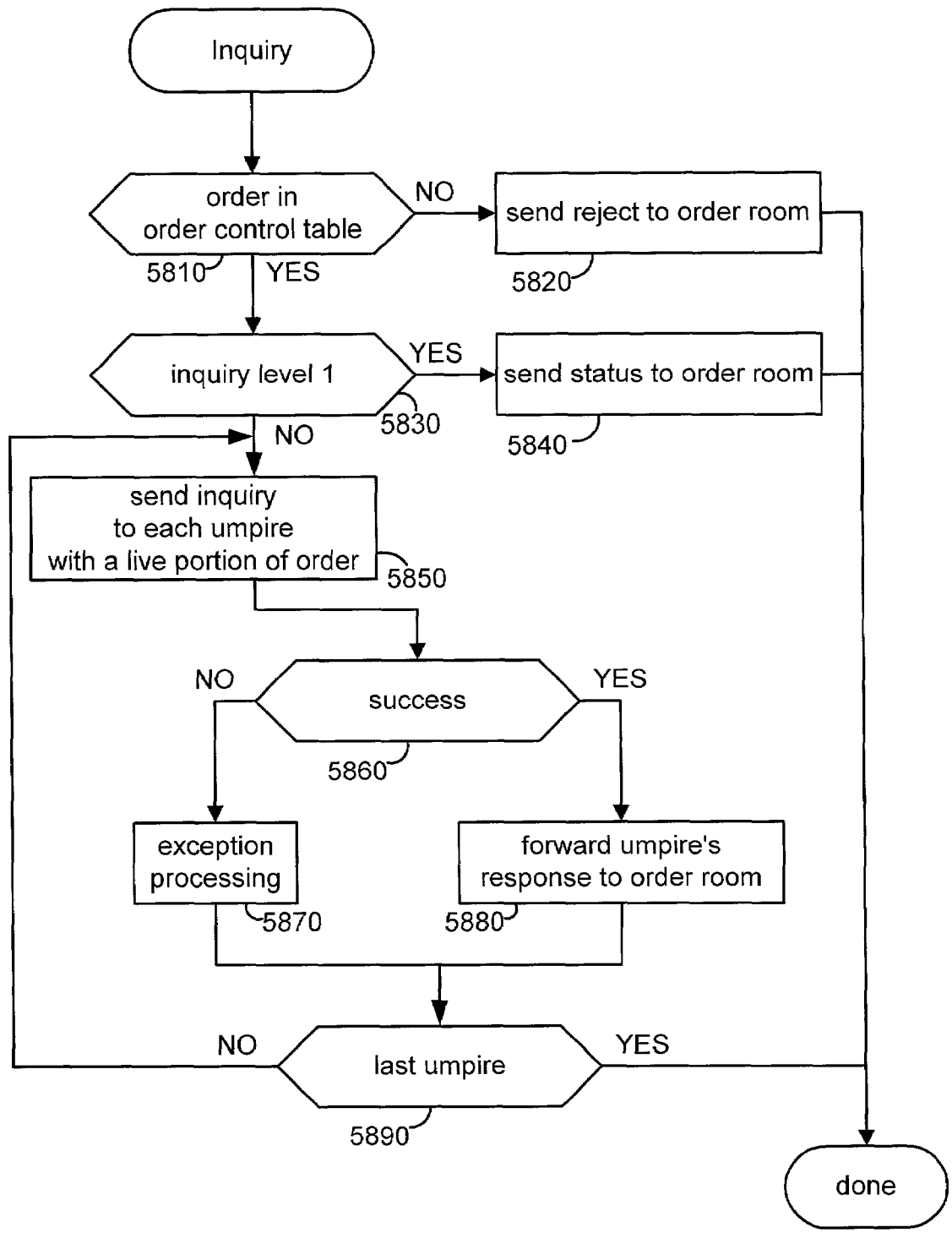

If the message is an inquiry, then at step 466, oE 10 invokes the logic shown in FIG. 31, and then order-type traffic processing is complete.

Figure 25:
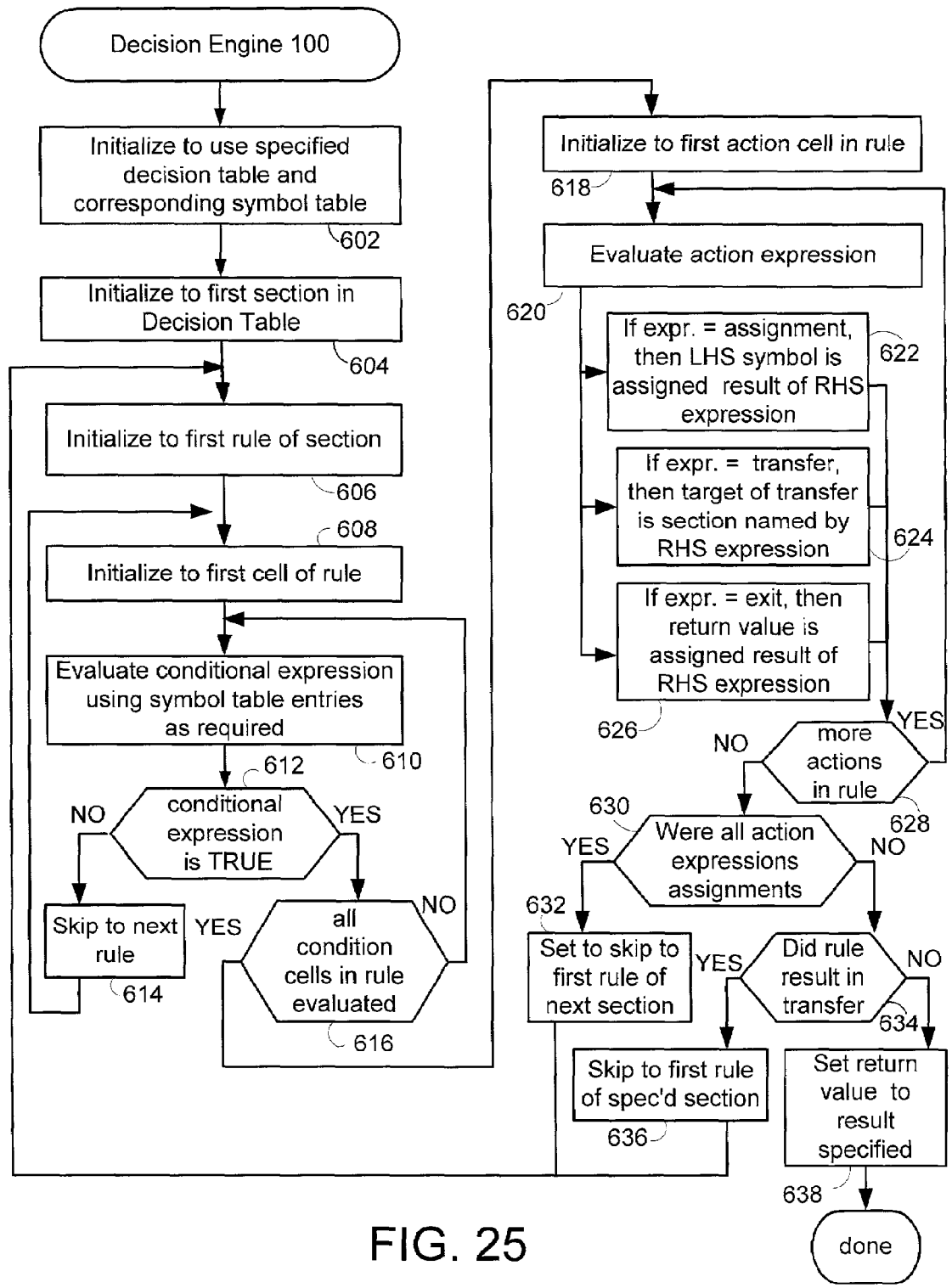
Figure 26:
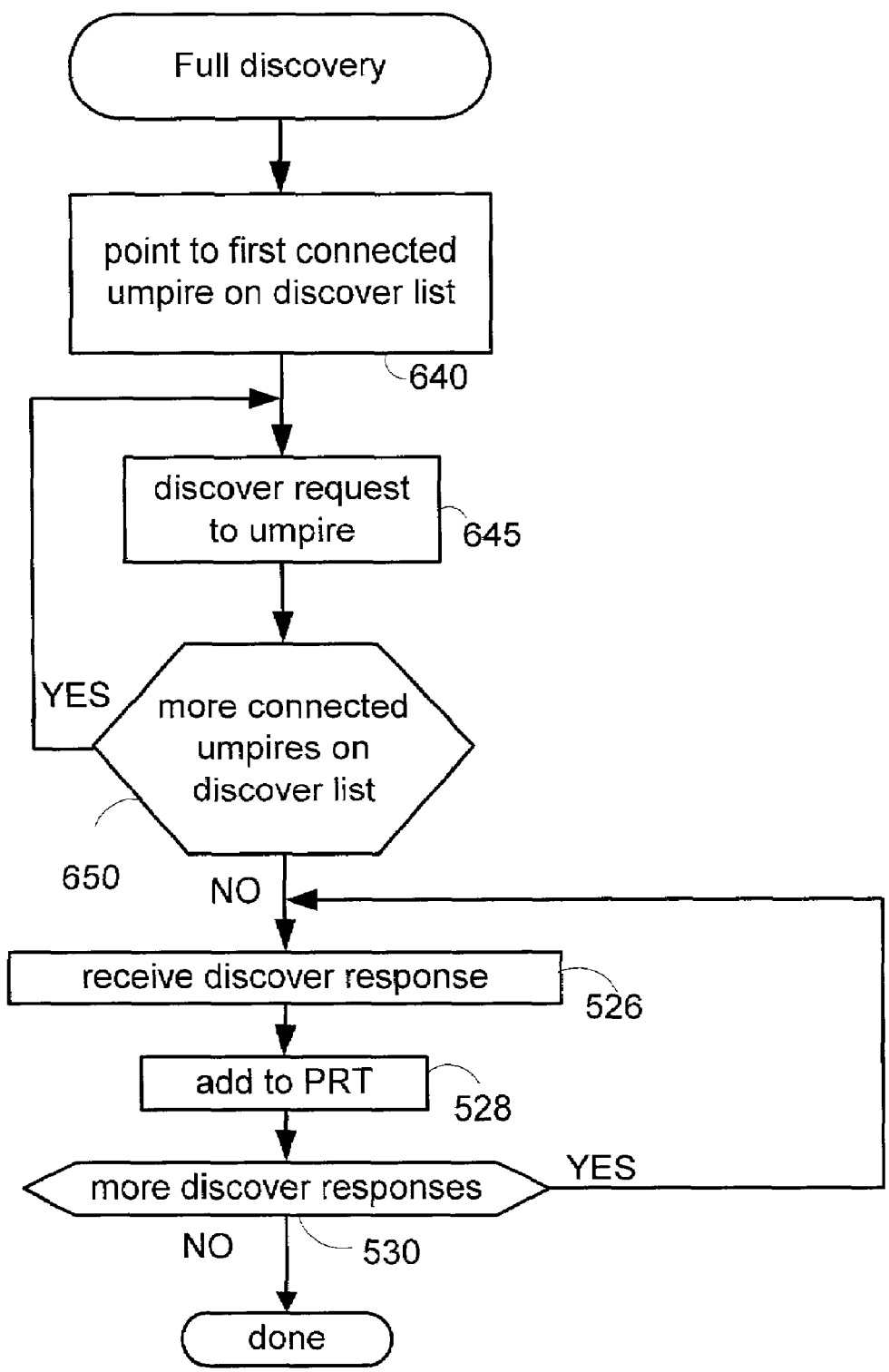

FIG. 24 is a flowchart showing how oE 10 processes an order. At step 505, oE 10 ascertains how much discovery is required for this order. If none, oE 10 proceeds to step 535. If this order can utilize market status board 75 to obtain prices for this order, oE 10 proceeds to step 512, invokes decision engine 100 to obtain prices from market status board 75, at step 529, adds the prices obtained from the market status board to its prices response table, and proceeds to step 535. If full discovery is required, then at step 510, oE 10 tests whether this order is under direct trader control. If so, at step 515, oE 10 solicits the order room for the discover list for this order. If the order is not under direct trader control, at step 520, oE 10 invokes decision engine 100, shown in FIG. 25, to determine the discover list for this order. At step 533, oE 10 performs full discovery as shown in FIG. 26 using its discover list. Processing continues at step 535.

During auction mode discovery, an inquiring order ELF can accept auction mode pricing, meaning that if any order ELFs in the crowd for the umpire provide a better price than what is in the book, the inquiring order ELF must accept the crowd price. As an example, assume that inquiring oE 10 asks superbook oU 30 for a quote for 10,000 shares of the symbol being traded at oU 30, and states that oE 10 accepts auction mode. Several scenarios are possible:

oU 30 has no crowd order ELFs, or none of its crowd order ELFs provides a better price. Here, oU 30 returns a price, or possibly a series of prices, and inquiring oE 10 is not necessarily obligated to execute based on the prices.

oU 30 gives its crowd of order ELFs an opportunity to improve oU 30's proposed price. One of the crowd order ELFs provides a better price for all 10,000 shares. oE 10 must pair its 10,000 shares with the crowd order ELF.

oU 30 gives its crowd of order ELFs an opportunity to improve oU 30's proposed buy price of "3,000 shares at 16 and 7,000 shares at 15.5." One of the crowd order ELFs states that it will buy 5,000 shares at 15.7. oE 10 must pair 3,000 shares at 16 and 5,000 shares at 15.7. oE 10 can decide whether it wants to pair the remaining 2,000 shares at 15.5.

Figure 27:
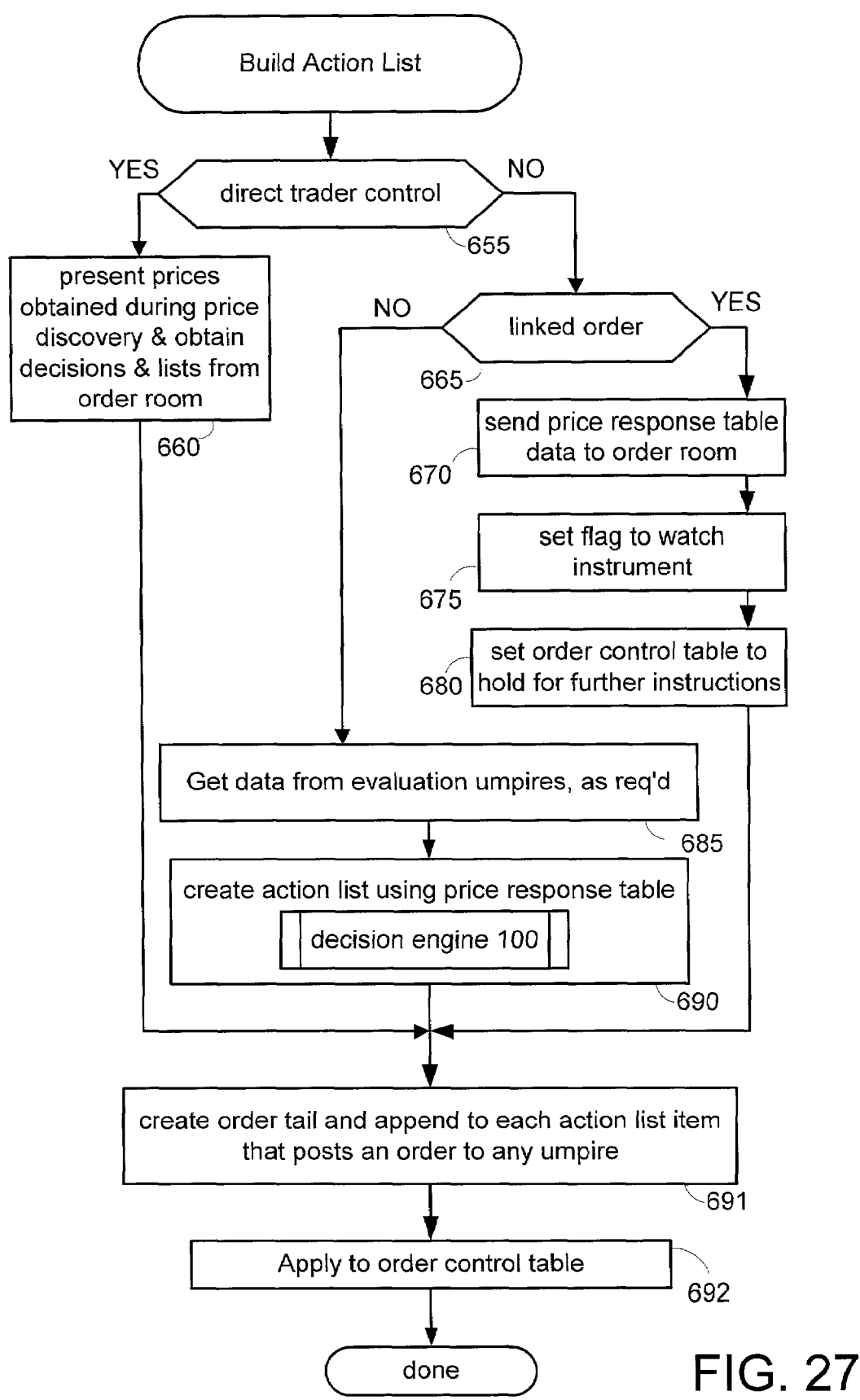
Figure 28:
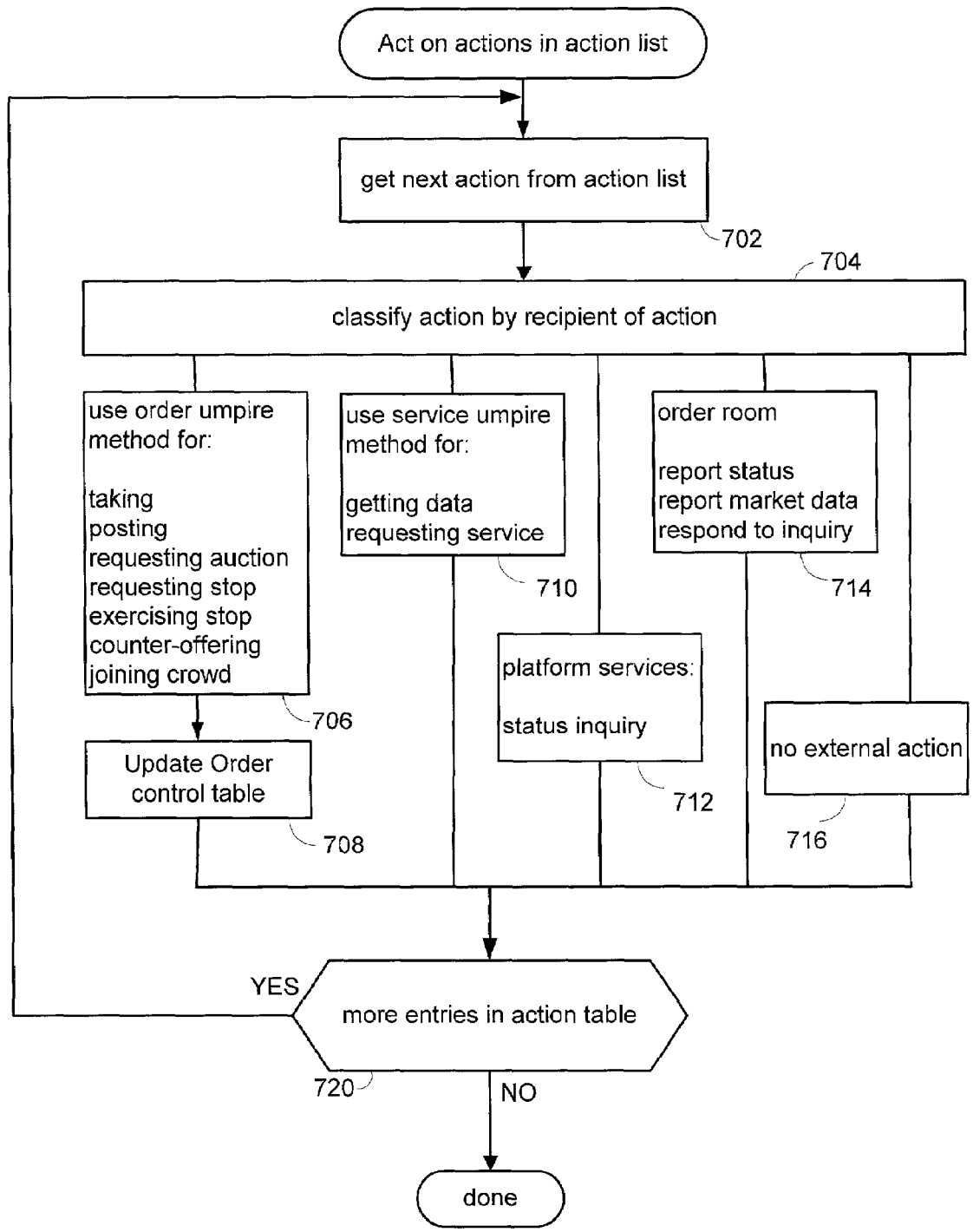

At step 535, oE 10 executes a decision process to build an action list, shown in FIG. 27. An "action" can consist of, among other things, "taking" some portion of an order discovered at an umpire, posting part of the order at some umpire, routing an order to an umpire for processing, joining the crowd at some umpire, or forwarding obtained information to order room 70. It will be understood that the mechanics of taking part of an order and posting may differ by umpire, but the interface with the ELF is uniform and the result of posting is that the posted order quantity is available to interact with the umpire and/or the umpire's crowd subject to the umpire's methods. At step 545, oE 10 acts on the actions in the just-created action list, such as by transmitting the actions to umpires, as shown in FIG. 28, or sending discovery information to the order room. Order processing is now complete FIG. 25 is a flowchart showing decision engine 100. More specifically, when oE 10 is executing the logic shown in FIG. 25, oE 10 is operating as a decision engine. At step 602, oE 10 initializes to the specified decision table, such as decision table 110 shown in FIG. 17, and corresponding symbol table, such as symbol table 150 shown in FIG. 19. At step 604, oF 10 initializes to the first section in the specified decision table. At step 606, oE 10 initializes to the first rule of the first section. At step 608, oE 10 initializes to the first cell of the first rule of the first section. At step 610, oE 10 evaluates the conditional expression in the first cell. At step 612, oE 10 tests whether its evaluation is TRUE. If not, then at step 614, oE 10 skips to the next rule and repeats platform services at steps 608-612. When a conditional expression is TRUE, then at step 616, oE 10 tests whether all the condition cells in the rule have been evaluated. If not, then oE 10 returns to step 610 to evaluate the next condition cell in the rule. When all of the condition cells in a rule have been evaluated, oE 10 proceeds to step 618.

It is assumed that the last rule in a section is an exit rule. In other embodiments, this may not be the case, and so after step 614, there is a test for remaining rules in this section, and if none remain, processing proceeds to another section. Finally, if there are no more sections and no rules were applicable, in these other embodiments, appropriate exception processing occurs, such as rejecting the order to order room 70.

At step 618, oE 10 initializes to the first action cell in the rule. At step 620, oE 10 evaluates the action expression in the rule. An action expression is a formulation of operands separated by arithmetic and logical operations, the syntax of which is defined and similar to standard programming languages such as Java and C++. The operands may include constants and anything provided in the symbol table, which includes numbers, strings, and tables. Tables are indexed. Indices may, in turn, be any legal expression.

If the expression is an assignment, then at step 622, the left-hand-side symbol is assigned the result of the right-hand-side expression, e.g., (P0=P0+1). If the expression is a transfer, then the target of the transfer is the section named by the right-hand-side expression, e.g., ([TRANSFER]

="section 17"). If the expression is an exit, then the return value is assigned the result of the right-hand-side expression, e.g., ([EXIT]=34). At step 628, oE 10 checks whether there are more action cells in the rule. If so, the processing returns to step 620 to evaluate the next action expression. When there are no more action cells in the rule, then oE 10 proceeds to step 630 and tests whether all of the action expressions were assignments. If so, then at step 632, oE 10 configures itself to skip to the first rule of the next section and proceeds to step 606. If at least one of the action expressions was not an assignment, then at step 634, oE 10 checks whether the rule resulted in a transfer. If so, then at step 636, oE 10 configures itself to skip to the first rule of the specified section and proceeds to step 606. If the test at step 634 was negative, then the action must be an exit, so at step 638, oE 10 sets its return value to the result specified, and processing is complete.

FIG. 26 is a flowchart showing how oE 10 discovers prices for an order using the discover list. First, at step 640, oE 10 initializes to start with the first entry in the discover list. The discover list is a list of umpires at which discovery is to be attempted. It will be recalled that the discovery list may be received from the order room or created by oE 10 using decision engine 100 to determine with which umpires to connect for this order. At step 645, oE 10 attempts discovery at the specified umpire. Then, oE 10 tests, at step 650, whether there are more entries in the discover list, and, if so, sets up to attempt discovery at the next umpire in the list and transfers to step 645. If there are no more entries in the discover list, processing is complete.

FIG. 27 is a flowchart for Build Action List logic whose purpose is to arrange the opportunities discovered during price discovery in order from most attractive to least attractive and to build an action list that will be used to attempt to fill the order accordingly. "Attractiveness" is a measure that is determined by the rules in oE 10's decision table or by the order room if the decision process is under direct trader control, i.e. manual control. At step 530 in FIG. 26, price-response table 120 was ordered by price. At step 655 of FIG. 27, oE 10 tests if there is direct trader control for this order. If so, at step 660, oE 10 presents the prices obtained during discovery to the order room, and obtains the action list and decisions about such things as worst-case prices, minimum lot sizes, and whether stops will be required, and processing is complete.

If the order is not under direct trader control, at step 665, oE 10 tests if this is a linked order. If not, oE 10 proceeds to step 685. If this is a linked order, at step 670, oE 10 sends price response table data to order room 70, and at step 675, sets a watch flag, or parameter, so that umpire market data updates for the specified instrument are transmitted to the order room. At step 680, oE 10 marks the waiting field of the order control block for this order to wait for further instructions from the order room and then processing is complete.

At step 685, oE 10 obtains the values, if any, that the decision logic will need from various evaluation umpires. At step 690, oE 10 invokes decision engine 100 to create the action list including the parameters for the umpires in the action list, such as minimum lot size, and reserve price. The decision process may involve a parameter from other sources. The parameter may be found in, for example, umpires table 140, and/or an externally supplied parameter as referred to in decision table 110. An example of a parameter is whether an umpire will make a payment or give a credit to oE 10 for placing its order with that umpire. Another source of parameters is global parameters accumulated and maintained in ELF data structure 145. The decision logic at step 690 may also include rules for deciding ties based on characteristics of an umpire, or preference for executing portions of an order at the same umpire and so on. In addition, if the decision logic at step 690 does not find enough quantity to fill the entire order from the price response table, it may add entries in the action list to direct oE 10 to take other actions such as joining the crowd or posting at an umpire, triggering an auction, and so on. At step 691, if the action is to post an order to an umpire, oE 10 creates an order tail, shown in Table 4C, for this order and appends it to each action list that posts the order to any umpire. Other actions, such as sending a stop request order or a stop exercise order, do not require an order tail. At step 692, oE 10 applies the just built action list to order control table 130, creating an entry for each umpire at which some action will be taken.

FIG. 28 shows a flowchart for act on actions in action list logic. At step 702, oE 10 gets the next entry in the action list. At step 704, oE 10 classifies the action by its recipient, if any.

If the action relates to an order umpire, processing proceeds to step 706, step 708 and then to step 720. At step 706, oE 10 uses the order umpire-specified method for acting, such as taking, posting, requesting an auction, requesting a stop, exercising a stop, counter-offering or joining the crowd. At step 708, oE 10 updates its internal control structures, such as its order control table, to reflect the result of its activity.

If the action relates to a service umpire, such as an evaluation umpire, processing proceeds to step 710 where oE 10 uses the service umpire-specified method for acting, such as getting data or requesting a service, and then processing proceeds to step 720.

If the action relates to platform services, processing proceeds to step 712 to send a message to platform services, such as a status inquiry, and then processing proceeds to step 720.

If the action relates to the order room, processing proceeds to step 714 to send a message to the order room, such as reporting status, reporting a discovery result, responding to an inquiry and so on, and then processing proceeds to step 720.

If no external action is required, processing proceeds to step 716 for updating any internal control structures, as needed, and then processing proceeds to step 720.

At step 720, oE 10 checks whether there are more actions in its action table, and if so, processing returns to step 702. When there are no more actions, processing is complete.

For example, let it be assumed that the pertinent portion of price-response table 120 is as shown in Table 11, the midpoint of the market is 18, the order is SELL1000 XYZ, and the pertinent decision table rule is: "if (current price is within ¾ point from the market) then (sell)."

TABLE 11

| BUY XYZ | |
|---|---|
| 17½ | 500 |
| 17¼ | 200 |
| 17 | 300 |

In this example, the lowest price acceptable to the seller under the decision table rule, above, is 18−¾=17¼. The entries for 17½ and 17¼ are both acceptable relative to the least acceptable price. The first entry in oE 10's action list might point to the best of these acceptable entries, that is, the first entry in Table 11. At step 706, oE 10 uses the method associated with the umpire that provided the price to take the order quantity, and at step 708, oE 10 updates its price-response table to reflect the results of the taking at step 706 and its order control structure. Using the above-described example, the result of steps 706-708 would be to take the entry at 17½. At step 720, oE 10 determines whether there is any more of the order to fill, and if so, whether there are any actions remaining in the table. In this example, the quantity remaining is 1000–500=500. If so, then oE 10 repeats steps 706-720 until the order is filled, or as much of the order is filled as possible at acceptable prices. In the next iteration, the entry at 17¼ would be taken, and the amount remaining would be 1000–(500+200)=300. However, the entry at would be ignored, since the price is unacceptable. At step 706, in addition to "taking" order fragments from an umpire, oE 10 could also post its order to the umpire's book, or in other cases the order could be "posted" through oE 10 joining the crowd for the umpire.

Submitting a market order to an umpire for execution is considered to be posting the order to the umpire without a price.

FIG. 29A is a flowchart showing how oE 10 processes a "cancel order" message from order room 70. At step 469, oE 10 invokes cancel order processing, shown in FIG. 29B. At step 471, oE 10 invokes update order tail processing, shown in FIG. 30. At step 472, oE 10 reports three values to order room 70: the amount of the order that was canceled, the amount not cancelable, and the amount pending possible cancellation, and cancel order processing is complete. An amount may not be cancelable because it is too late to cancel, i.e., the amount was executed, or because the amount is in-process. Processing is now complete.

Figure 29B:
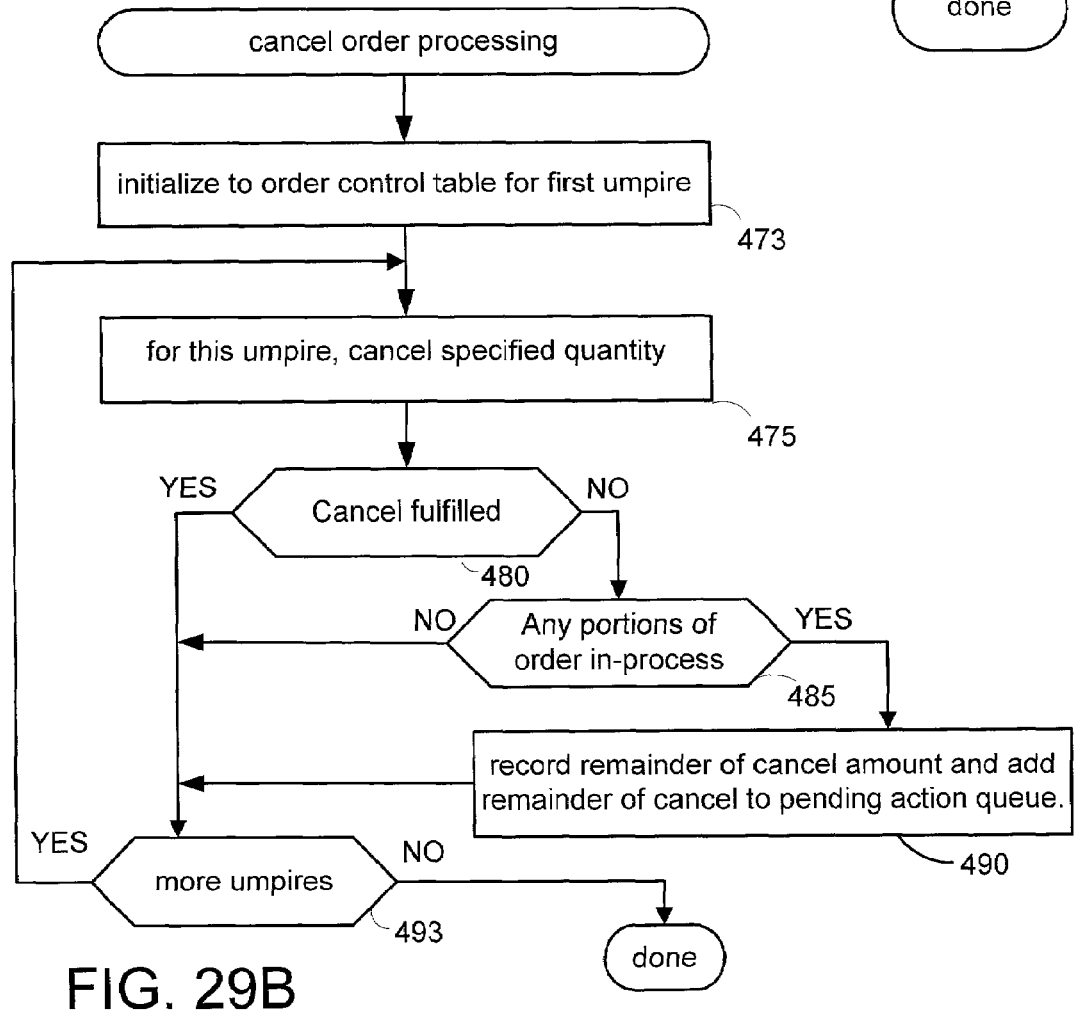

FIG. 29B is a flowchart showing cancel order processing. When order room 70 sends a message to oE 10 to cancel an order without specifying which market, oE 10 assumes that this means to cancel the order in all markets in which the order is represented. In some embodiments, the order room can define desired handling for cancel orders lacking a market specification. When the cancel order message from order room 70 specifies the markets at which the order should be cancelled, then oE 10 cancels the order from only the indicated markets. In some embodiments, oE 10 uses its decision table to determine from which markets an order should be canceled, when the cancel order message is not explicit.

At step 473, oE 10 initializes to loop through all the umpires in the order control table. At step 475, oE 10 sends a cancel for the specified quantity of the order to the appropriate umpires, if any. It is expected that the umpire will return the amount cancelled and the amount in-process, and thus not cancelled. If a fragment of the order is in-process, as described below, the cancel will be enqueued and when the fragment is released from in-process, enqueued actions will be applied. A fragment of an order is said to be "in-process" if the umpire at which the fragment of the order is represented is waiting for a response to some action or the umpire itself is in-process, such as a periodic match umpire performing match processing. The "in-process" state may occur, for example, when the umpire has changed its state to "in-process" in the system status board 64. Another example of an "in-process" state is when an ELF tries to "take" an order fragment from an umpire, but before the umpire can confirm the extent to which the "take" was successful. As appropriate, oE 10 updates order control table 130.

At step 480, oE 10 determines if the amount of the order to be canceled has been fulfilled. If so, processing continues at step 493. If the cancel request was not fulfilled, at step 485, oE 10 checks the response from the umpire to determine if any portions of the order are "in-process." If not, processing continues at step 493. If there are portions of the order are "in-process," at step 490, oE 10 records the amount of the order remaining to be canceled and adds an action to the pending action queue for cancellation following its release from in-process, and then proceeds to step 493. At step 493, oE 10 checks if there are more umpires in order control table 130, and if so, processing returns to step 475. Otherwise, if there are no more umpires, processing is complete.

Figure 30:
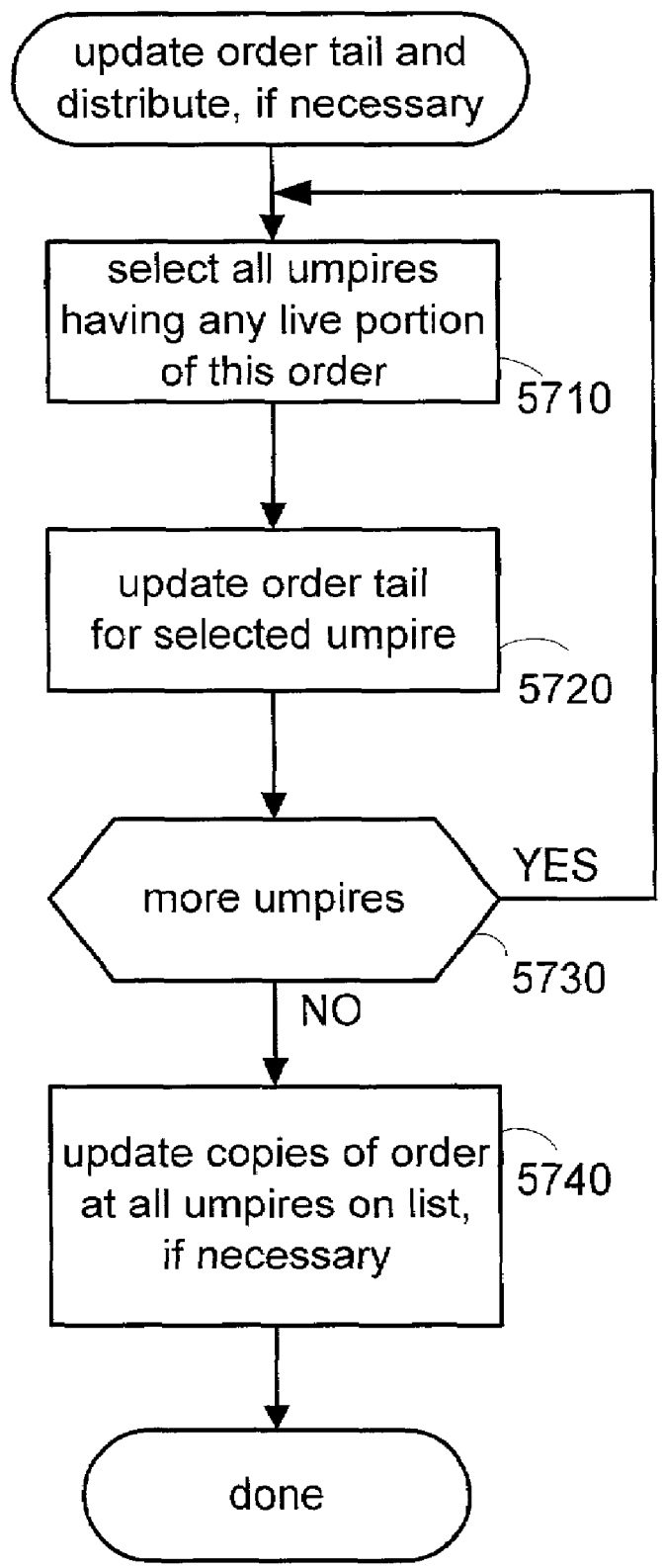

FIG. 30 is a flowchart showing processing logic for update order tail and distribute, if necessary. At step 5710, oE 10 examines all umpires in order control table 130 and the current order tail and selects the umpires at which oE 10 has any part of the order. At step 5720, oE 10 updates the order tail to reflect the fact that this umpire is one of the umpires at which some part of the order is working. At step 5730, oE 10 tests whether any more selected umpires remain. If so, oE 10 continues to loop at step 5710. Otherwise, at step 5740, oE 10 creates an order tail consisting of only those umpires identified in step 5720 and distributes the new tail to all the umpires listed in that tail.

FIG. 31 is a flowchart showing inquiry message processing. At step 5810, oE 10 checks whether the order is in its order control table 130. If not, then at step 5820, oE 10 sends a reject message to order room 70. If the order is in its order control table 130, then at step 5830, oE 10 checks the level of the inquiry. If the inquiry level is local, also referred to as level 1, then at step 5840, oE 10 reports the order status to order room 70 based on its local information, such as what is in order control table 130. If the inquiry level requires an umpire response, also referred to as level 2, then at step 5850, oE 10 sends an inquiry to each order umpire having a live portion of the order. At step 5860, for each umpire, oE 10 determines whether a response has been received within a predetermined interval. If so, then at step 5880, the umpire's response is forwarded to order room 70. If not, then at step 5870, exception processing occurs. At step 5890, oE 10 checks whether all umpires have been polled. If not, processing returns to step 5850. If so, then processing of the inquiry message is complete.

FIG. 32 is a flowchart showing how oE 10 responds to traffic from oU 30.

At step 725, oE 10 classifies the traffic and transfers to the appropriate logic section.

Figure 33:
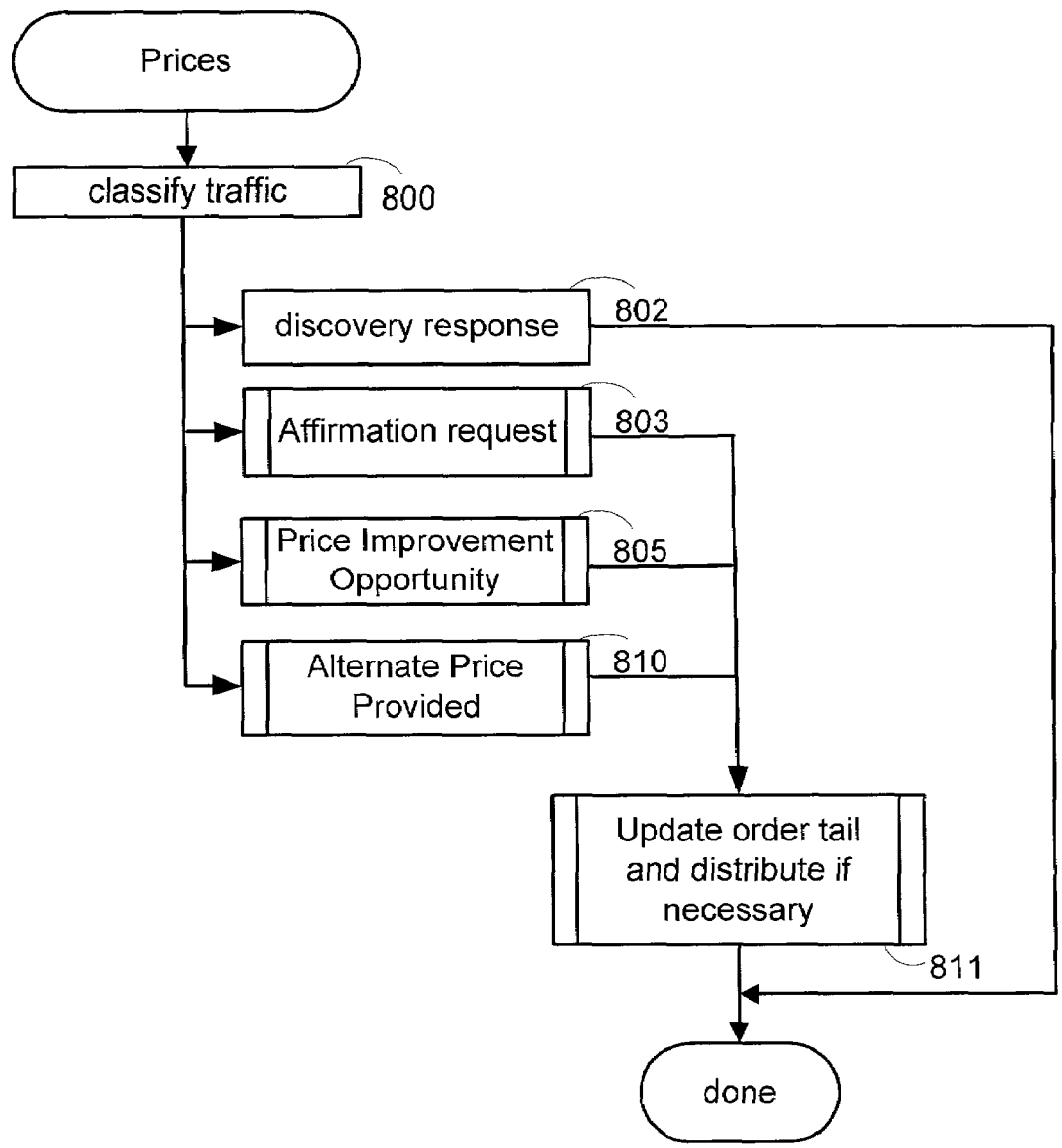

At step 735, oE 10 receives prices from an umpire, invokes the logic shown in FIG. 33, and then returns to step 405 in FIG. 21.

Figure 37:
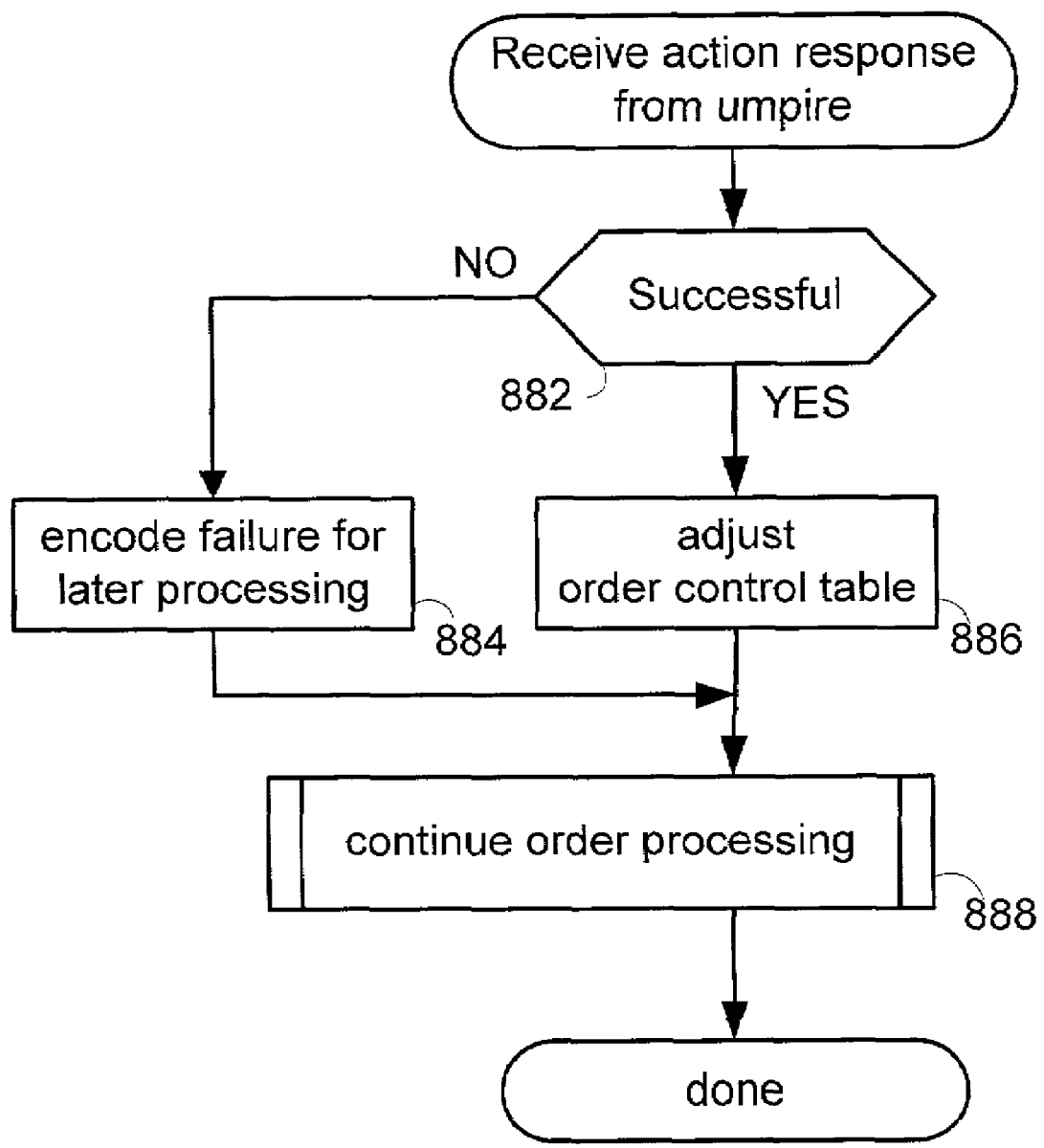

At step 740, oE 10 receives an action response from an umpire, invokes the logic shown in FIG. 37, Receive Action Response from Umpire, and then returns to step 405 in FIG. 21.

Figure 40:
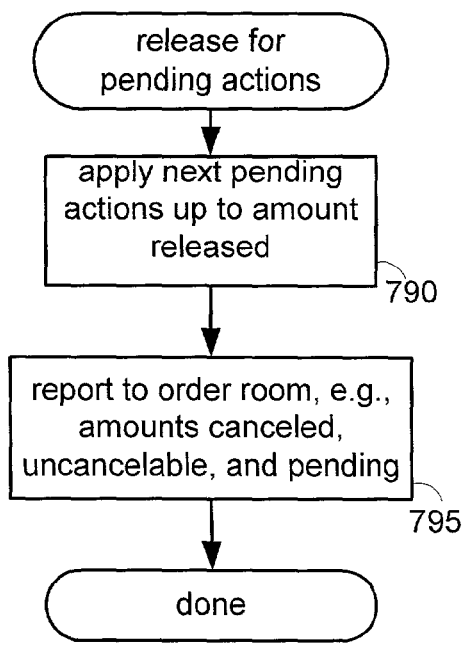

At step 742, oE 10 receives a pairing report from an umpire, invokes the logic shown in FIG. 40, and then returns to step 405 in FIG. 21.

Figure 41:
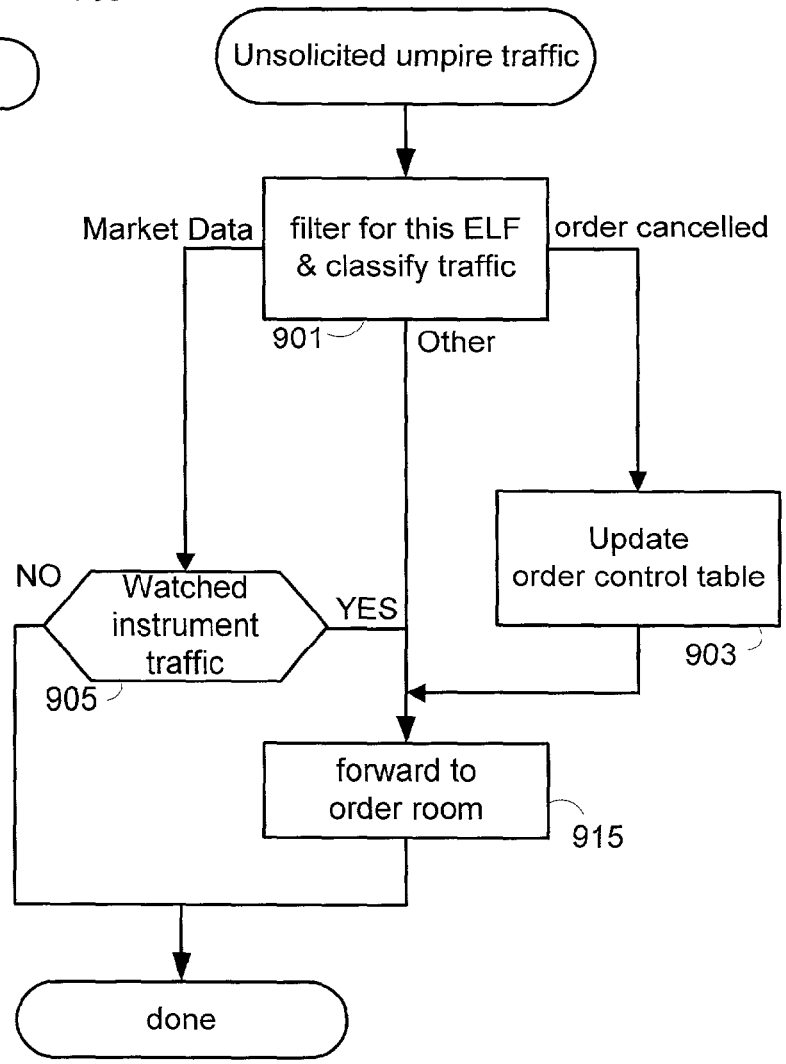

At step 745, oE 10 receives unsolicited traffic from an order umpire, such as market data, invokes the logic shown in FIG. 41, and then returns to step 405 in FIG. 21.

FIG. 33 is a flowchart showing processing logic for price traffic. At step 800, oE 10 classifies the price traffic and proceeds accordingly.

At step 802, oE 10 updates its price response table with the discovery response and processing is complete.

Figure 34:
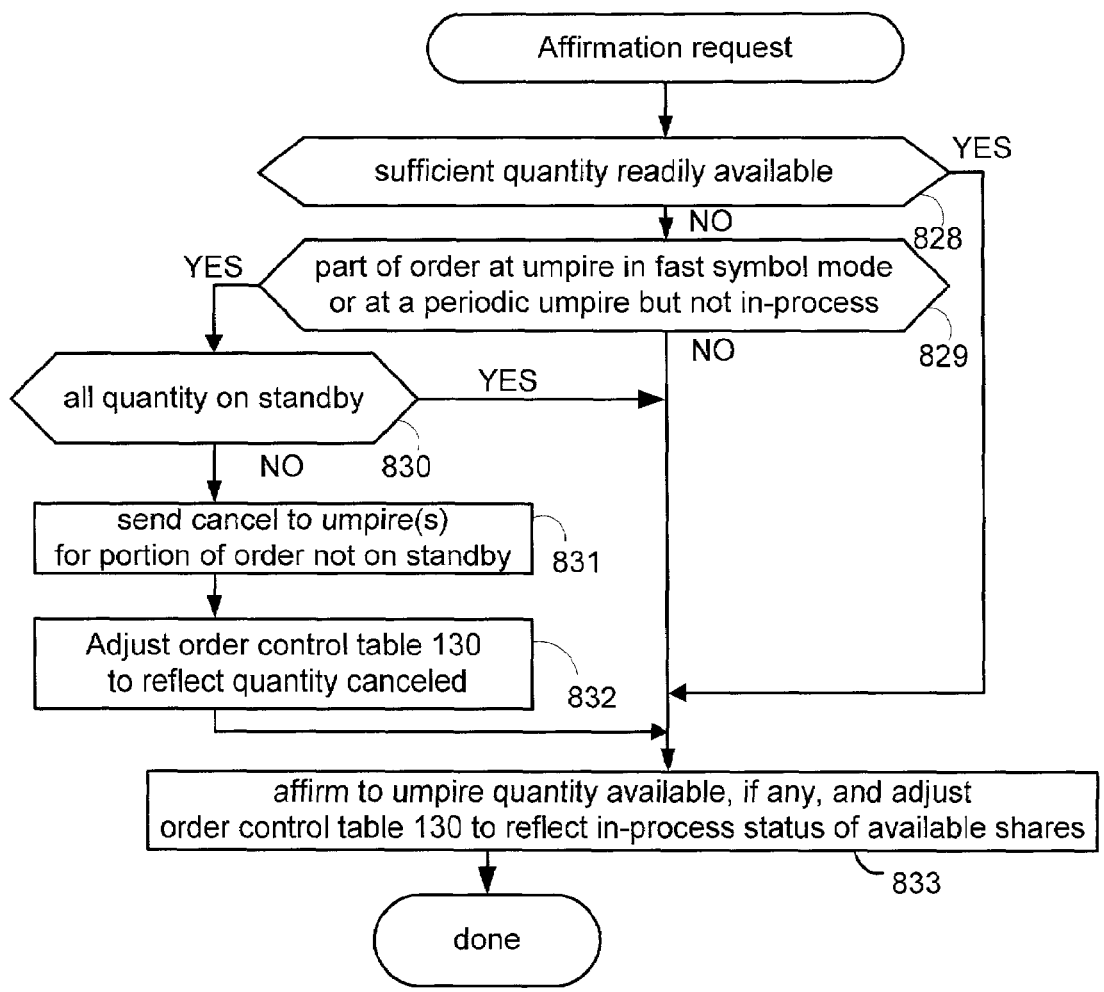

At step 803, oE 10 invokes affirmation request processing, shown in FIG. 34, and processing continues at step 811.

Figure 35:
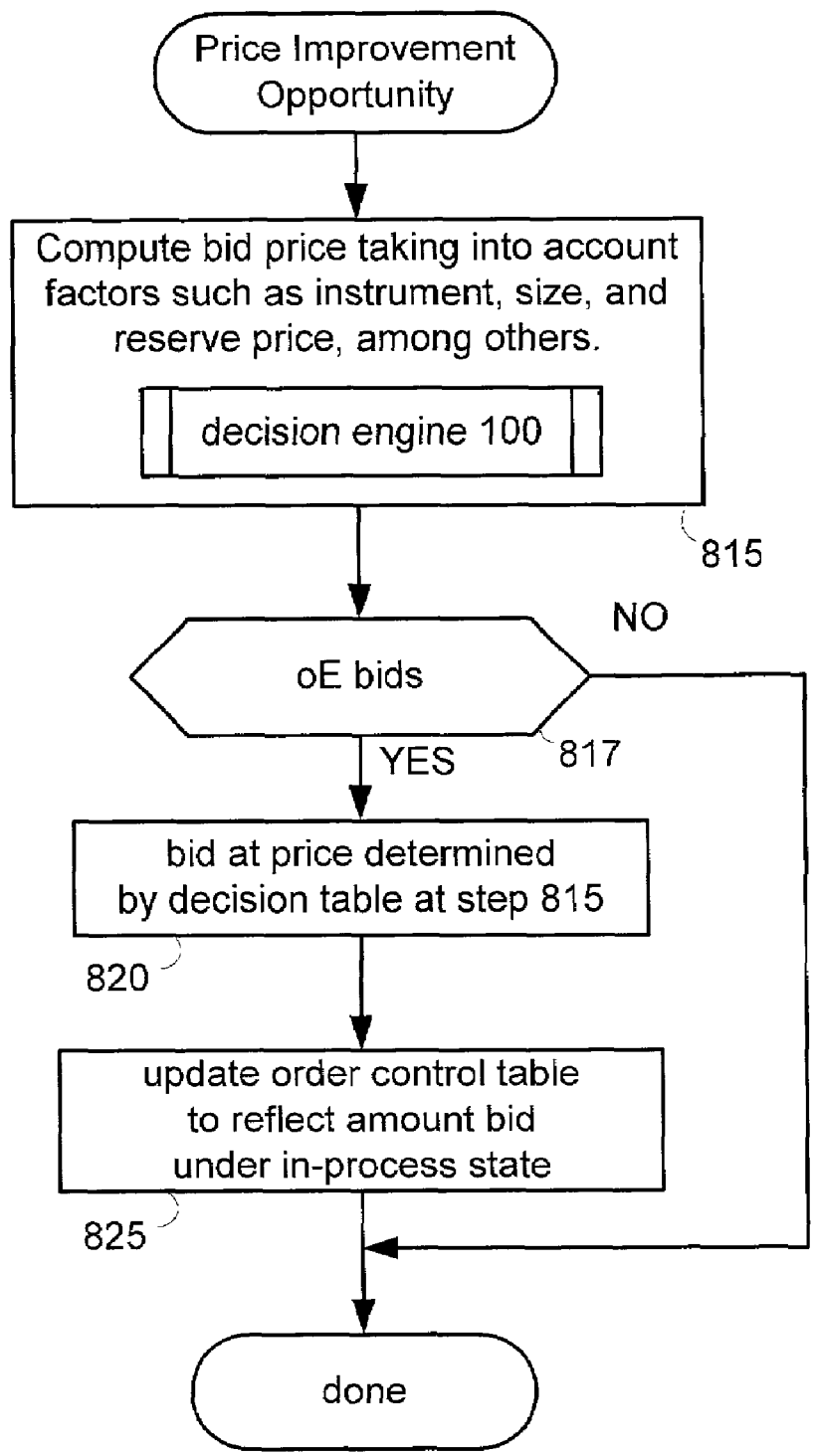

At step 805, oE 10 invokes price improvement opportunity processing, shown in FIG. 35, and processing continues at step 811.

Figure 36:
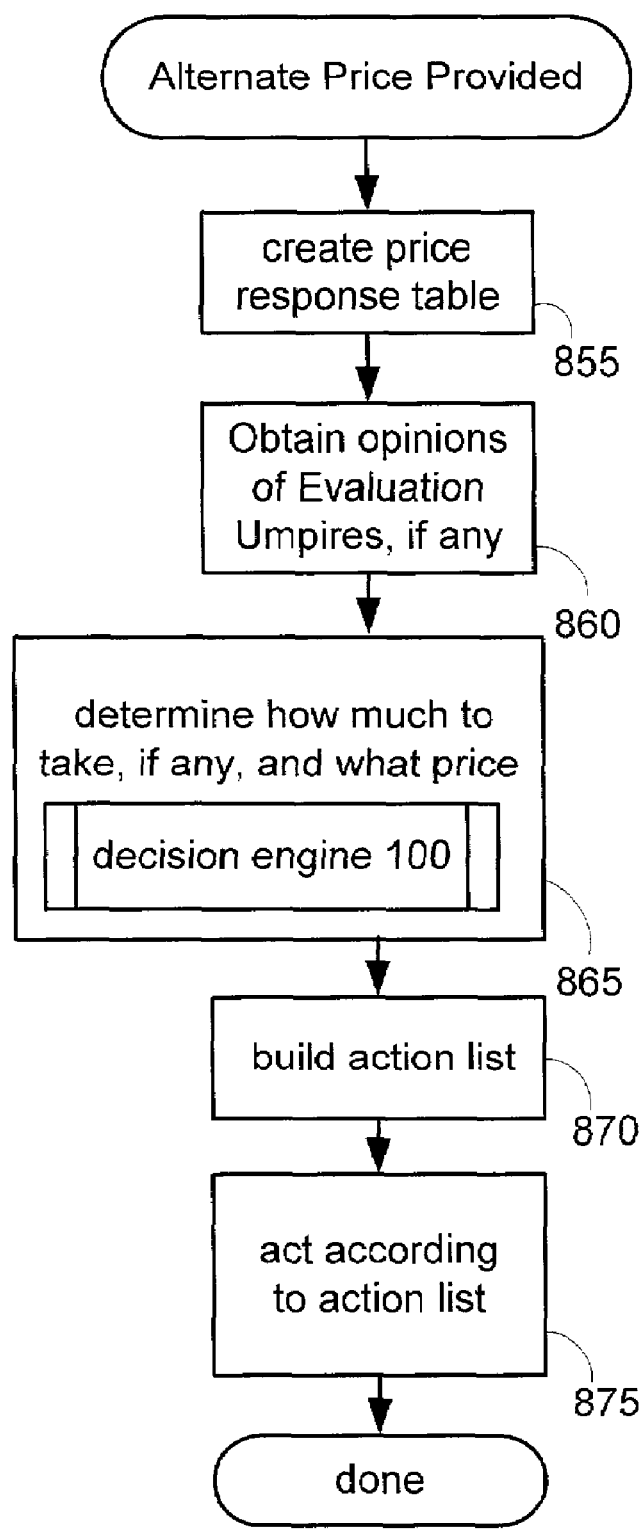

At step 810, oE 10 invokes alternate price provided processing, shown in FIG. 36, and processing continues at step 811.

At step 811, oE 10 invokes the logic to update order tail and distribute, if necessary, shown in FIG. 30, and processing is complete.

FIG. 34 is a flowchart showing processing for an affirmation request. This processing occurs at oE 10 when one of its orders posted at an umpire is "hit," which occurs when a contra-side ELF is trying to "take" the quantity posted. The relevant umpire transmits two shares wanted numbers: the number of shares required definitely, and the number of shares the umpire would like on a standby (conditional) basis. At step 828, oE 10 checks order control table 130 and puts into a results register the number of shares available and "free," i.e., not being represented at a periodic umpire or at an umpire in fast symbol mode for this stock. If the number of "free" shares is sufficient to meet the sum of the two shares wanted numbers, then processing continues at 833.

If the free shares are not enough to meet the shares wanted (sum of two numbers), oE 10 tries to free up more shares. At step 829, oE 10 checks whether part of the order is in fast symbol mode or at a periodic umpire that is not in-process, i.e., that the order is in a situation with a possibility of canceling the order. At step 830, oE 10 checks whether any shares of the order are indicated in order control table 130 as being on a standby basis. If the entirety of the order is on standby, oE 10 does not attempt to free any shares and processing proceeds to step 833.

If it is determined at step 830 that at least part of the order is not on standby, at step 831, oE 10 sends a cancel to the umpires involved; the cancel is for the portion of the order not on standby. The shares successfully canceled, up to the shares wanted, are added to the Result Register. At step 832, order control table 130 is adjusted to reflect the quantity cancelled.

At step 833, oE 10 marks the shares available as in-process in order control table 130 and affirms to the umpire the quantity available, if any. Processing is complete.

FIG. 35 is a flowchart showing how oE 10 performs crowd bid price improvement opportunity processing. At step 815, oE 10 computes whether to bid and, if so, the price to bid, taking into account factors such as instrument, size, and reserve price, among others. Next, at step 817, oE 10 checks whether it will bid. If not, then processing is complete. Otherwise, at step 820, oE 10 bids at the price determined by the decision table at step 815. At step 825, oE 10 updates the order control structure to reflect the amount bid and now in-process, and processing is complete.

FIG. 36 is a flowchart showing alternate price provided processing. This logic is invoked when, for example, a counter-offer has been received for oE 10's order. At step 855, oE 10 creates a price response table. At step 860, oE 10 obtains the opinions of evaluation umpires, if any. At step 865, oE 10 determines how much to take, if any, and at what price, using decision engine 100 shown in FIG. 25. At step 870, oE 10 builds an action list. At step 875, oE 10 acts according to the just-built action list. Processing is complete.

FIG. 37 is a flowchart showing the logic for receive action response from umpire processing. An example of an action response is an order status report following a take. At step 882, oE 10 checks whether the action was successful. If so, then at step 886, oE 10 appropriately adjusts its order control table, and at step 888, invokes continue order processing, shown in FIG. 38. If the action response was not successful, at step 884, oE 10 encodes the failure for later processing, and proceeds to step 888.

Figure 38:
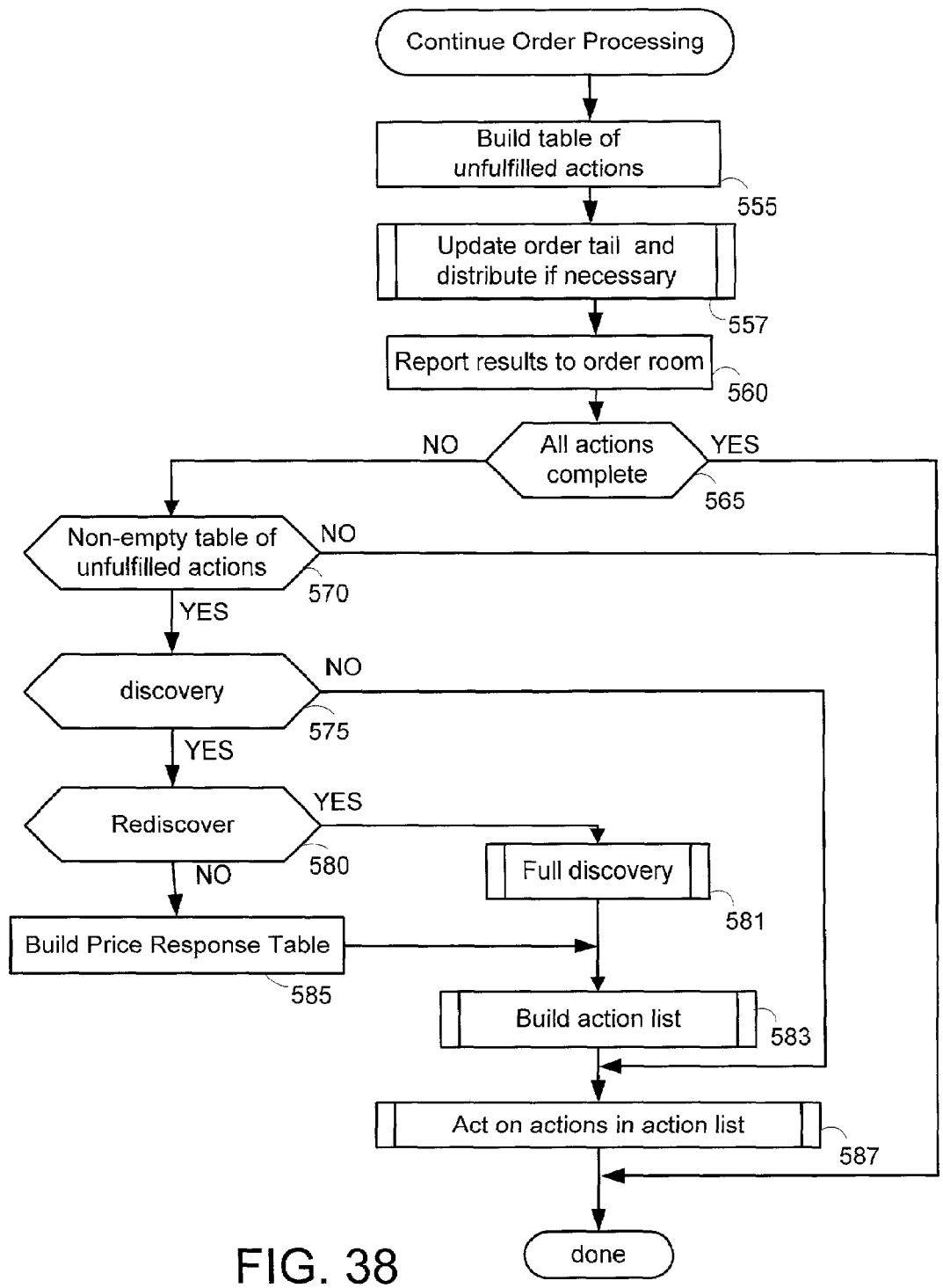

FIG. 38 is a flowchart showing continue order processing logic. At step 555, oE 10 adds any unfulfilled portions of the action engendering this response to the table of unfulfilled actions for this order. At step 557, oE 10 invokes the logic at update order tail and distribute, if necessary, shown in FIG. 30. At step 560, oE 10 reports what has just occurred to order room 70, and, in step 565, tests whether all the actions in the action list have just been completed. If so, processing is complete.

If all the actions in the action list have not been completed, at step 570, oE 10 tests whether there were any actions that are unfulfilled. If not, oE 10 determines that processing is complete. If there were unfulfilled actions, at step 575, oE 10 tests whether this was an order that required discovery. If not, oE 10 proceeds to step 587. Otherwise, at step 580, oE 10 tests whether sufficient time has elapsed since discovery was done for this order to make it necessary to rediscover. If full discovery is required, at step 581, oE 10 invokes full discovery logic, shown in FIG. 26, and proceeds to step 583. If new discovery is not required, at step 585, oE 10 modifies price response table 120 according to the table of unfulfilled actions, and proceeds to step 583.

At step 583, oE 10 invokes build action list processing, shown in FIG. 27, and then proceeds to step 587.

At step 587, oE 10 invokes act on actions in action list processing, shown in FIG. 28, and then processing is complete.

The test at step 565 may be controlled, in part, by settings established by the decision process during preliminary order processing. Those settings could specify whether oE 10 will actually wait for all actions to be complete prior to servicing unfulfilled actions.

Figure 39:
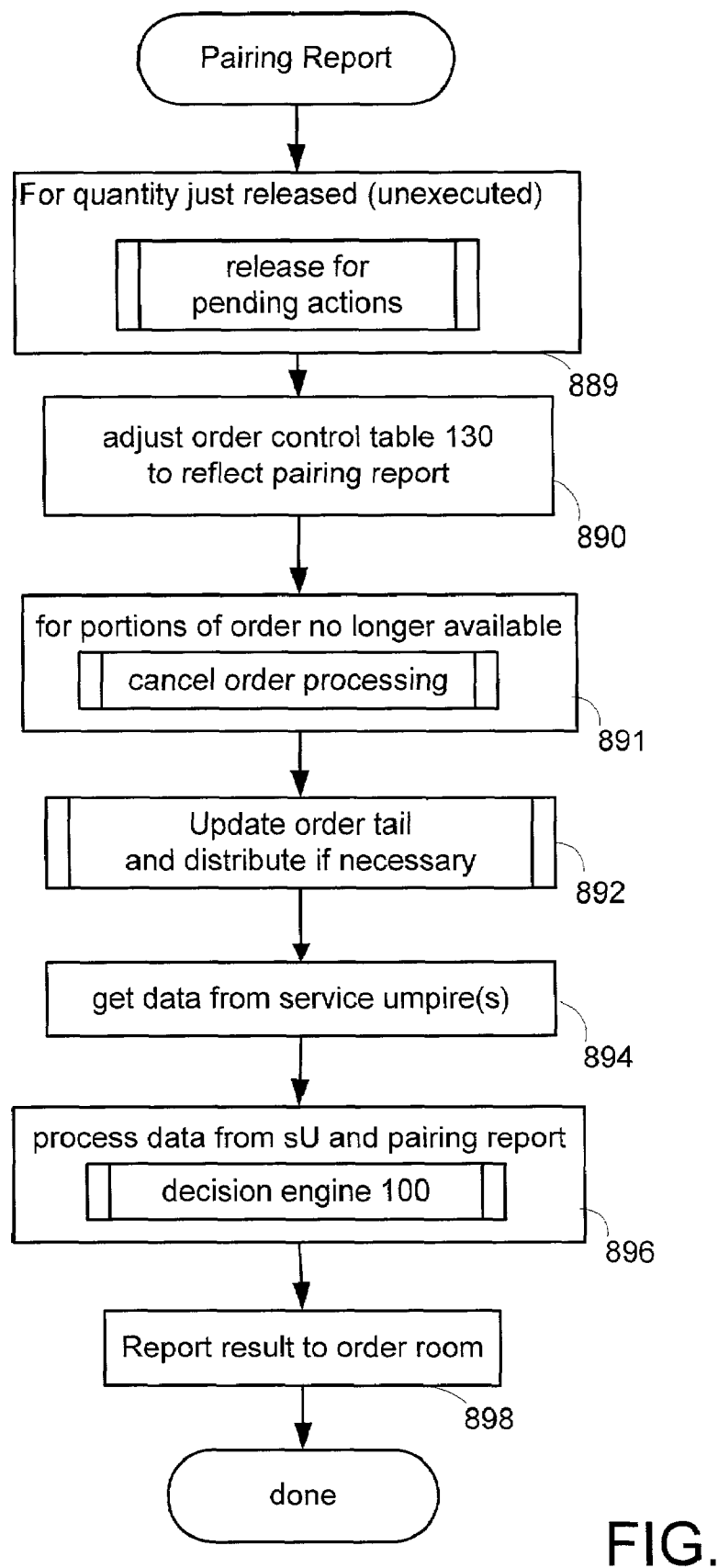

FIG. 39 is a flowchart showing pairing report processing. At step 889, for the unexecuted quantity just released, oE 10 performs release for pending actions processing shown in FIG. 40. Next, at step 890, order control table 130 is updated to reflect the activity reported in the pairing report. At step 891, for portions of the order no longer available, oE 10 invokes cancel order processing, shown in FIG. 29B. At step 892, oE 10 updates the order tail as shown in FIG. 30. At step 894, oE 10 gets data from a service umpire, if required. At step 896, oE 10 uses decision engine 100 to process the pairing report and data from the service umpire using its decision table. Generally, oE 10 is performing post-trade processing relating to delivery and payment for the trade identified in the pairing report. An example is allocating shares in the pairing report, and the allocation may be done by providing the total number of shares to a service umpire, and receiving as a result how the shares are to be allocated. At step 898, oE 10 reports the result to order room 70, and processing is complete.

FIG. 40 is a flowchart showing how oE 10 processes a release for pending action. At step 790, oE 10 applies the next pending actions up to the amount released. For example, if the pending action is a take or post, the logic shown in FIG. 28 is invoked; while if the pending action is a cancel, the logic shown in FIG. 29B is invoked. At step 795, oE 10 reports, to the order room, for example, the amount of the order that was canceled, the amount not cancelable, and the amount pending possible cancellation, and processing returns to wait for another message.

FIG. 41 is a flowchart showing unsolicited umpire traffic processing. Unsolicited traffic includes price broadcast streams from umpires, explicit addressed messages via umpire, announcements such as new security definitions or services announcements sent from appropriate umpires to subscribers, and status messages such as "umpire up, down, hours." Unsolicited traffic is sent to order room 70 but shown as message types. At step 901, oE 10 filters any traffic to which oE 10 is not entitled. For example, oE 10 is only entitled to the price broadcast stream for any umpires with which oE 10 is registered. At registration time, the umpire provides oE 10 with a certificate that controls the data from this umpire to which oE 10 is entitled. The certificate thus obtained may, in fact, further restrict oE 10 to a subset of the data transmission by the umpire. oE 10 classifies the unsolicited traffic as either market data, order cancellations or other traffic. If the traffic is market data, oE 10 proceeds to step 905. If the traffic is an order cancellation, for example, a cancellation by an umpire about to enter fast symbol mode, oE 10 proceeds to step 903 and updates its order control table, then proceeds to step 915. If the traffic was other unsolicited traffic, at step 915, oE 10 forwards the unsolicited traffic to the order room. At step 905, oE 10 tests whether the market data is for a watched instrument. If the traffic is watched instrument traffic, at step 915, oE 10 forwards the unsolicited traffic to order room 70. An example of watched instrument traffic is all changes the oU transmits related to a particular instrument or set of instruments. The watched instrument traffic, in this embodiment, keeps the order room's snapshot of the market in an instrument up-to-date. The snapshot may be used by the order room to determine when market conditions are right for triggering actions such as linked order executions. Another example of unsolicited traffic that is forwarded to order room 70 is a message from an order umpire that a new synthetic instrument has been created. If the market data is not for a watched instrument, or after appropriate traffic has been forwarded to order room 70, processing is complete.

FIG. 42 is a flowchart showing processing logic for traffic from an evaluation umpire. At step 920, oE 10 stores the message from the evaluation umpire. It will be appreciated that the information in the message may act as a trigger for other processing, according to decision table 110.

FIG. 43 is a flowchart showing processing logic for traffic from platform services 60. At step 925, oE 10 classifies the message received from platform services 60.

If the message is that a stop expired, at step 927, oE 10 checks whether the stop was already exercised. If so, processing is complete. If the stop was not exercised, then at step 930, oE 10 removes the order from its order control table, and at step 932, reports the stop expiration to order room 70.

If the message is that the status of an umpire changed or is about to change, such as from regular mode to fast symbol mode, or from regular to in-process, at step 935, oE 10 invokes decision engine 100 to determine what to do with its orders at the affected umpire. At step 940, oE 10 updates its order control table accordingly, and at step 945, oE 10 invokes continue order processing, shown in FIG. 38. In some embodiments, ELF status change messages are handled similarly.

For all other messages, oE 10 forwards the message to order room 70.

Order Umpire Setup

Figure 44:
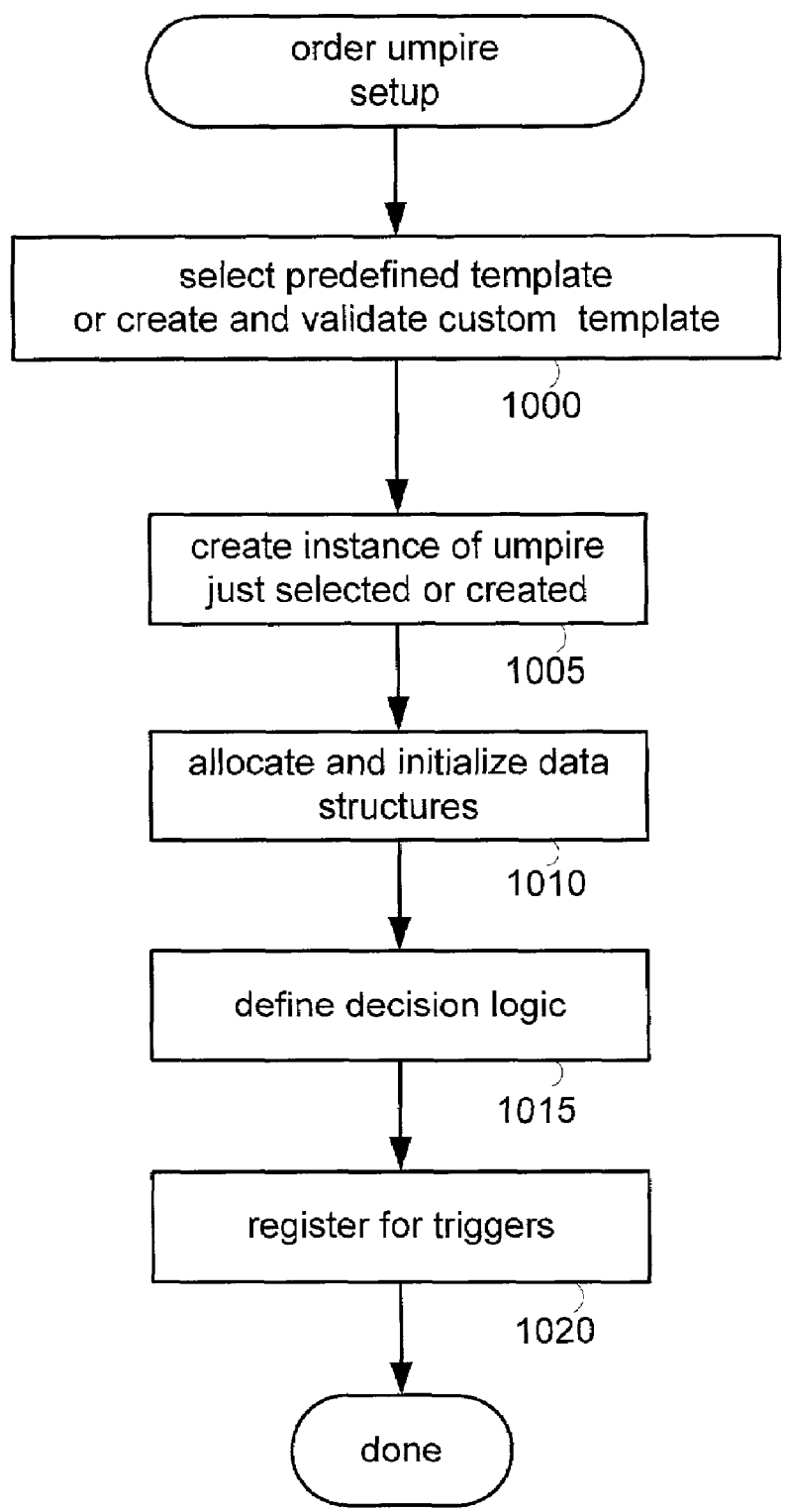
FIG. 44 is a flowchart of the set-up phase for an order umpire.

FIG. 44 is a flowchart of the set-up phase for an order umpire program, such as oU 30.

At step 1000, the user selects a template from among the standard templates and the previously validated custom templates. If none of the templates available for selection are suitable, the user may create a new template and submit it for validation for use on the platform.

At step 1005, the template selected for oU 30 is instantiated, that is, system 5 creates an operational instance of the selected template.

At step 1010, data structures are allocated and initialized, such as the hours of operation and usage fees of oU 30. For example, the dimension of the instruments that will be handled by the oU is established. Securities have one dimension (price), futures have two dimensions (date and price), while options have four dimensions (security, put/call, strike price, expiration date). This flexibility facilitates dynamic creation of synthetic instruments for trading. Decision table(s) to be used by oU 30 are also specified. In some embodiments, oEs and oUs use decision tables according to the same procedures, but the actions specified in the decision table rules are different for oEs and oUs.

At step 1015, the price discovery and crowd interaction parameters, discussed above with regard to FIG. 5, are specified for oU 30. Generally, the parameters include price, any mirror ELFs, whether representation is permitted, and reporting procedures. Also, the sources of pricing information for oU 30 are specified. The default mode for pricing information is one cancels other (OCO), meaning that a current price over-writes a previously provided price for the same instrument. At least one of the following is indicated as a source of current price information:

Entry from an external point;

Stored price information from orders in the order book file kept by oU 30;

Auction among the crowd of oEs registered at oU 30;

Subscribe to feeds from selected dEs that provide, e.g., prices from an external market.

Also at step 1015, the procedure for computing a current price is specified. Usually, a market for a financial instrument is two-sided, representing buyers and sellers, and so current price is understood to mean a best price on each side of the market, or the contra-side relative to the oE's order. Additionally, the procedure for disseminating the current price is specified. In a typical book umpire, the current price is provided on demand, or to a newly registering oE in the crowd. In a superbook umpire, when the current execution price is about to change relative to the previous execution price, the proposed new price is provided to oEs registered as being in the crowd for oU 30. Further, the decision table that the umpire will use is specified, and the parametric settings that will be given to a registering oE are specified. To execute the decision table, the umpire uses the decision engine 100 logic that is used by an ELF. In a modification, the decision engine for an umpire is different than the decision engine for an ELF.

At step 1020, the trigger response logic and action parameters for oU 30 are established. For example, for a periodic match umpire, a trigger may be that a predetermined amount of time has passed, and the associated response is to match orders that have arrived in the predetermined amount of time. Other examples of triggers and responses are:

The arrival of a theoretical price from a dE, and the associated response is to advise the crowd that the theoretical price will be used as the next price unless the crowd provides an improved price (not shown in this embodiment).

The arrival of an order that signals an auction process to hold an auction.

After oU 30 is setup, oU 30 makes information about its order handling methodology and parameter values available to all oEs on system 5, such as by publishing this information in a file accessible to all oEs.

After oU 30 is setup, oU 30 accepts registrations from order ELFs using oU 30's decision table to allow different treatment for different ELFs. During the registration process, oU 30 authorizes an oE to receive unsolicited traffic from, e.g., broadcast services 66, and authorizes the oE to access selected information about oU 30 in system status board 74 and market status board 75. Other appropriate activity also occurs during registration.

An order ELF registering with an umpire is a different procedure than an order ELF registering in the crowd for an umpire. An ELF must register with an umpire to interact with the umpire in any way, including registering in the crowd for the umpire.

Figure 45:
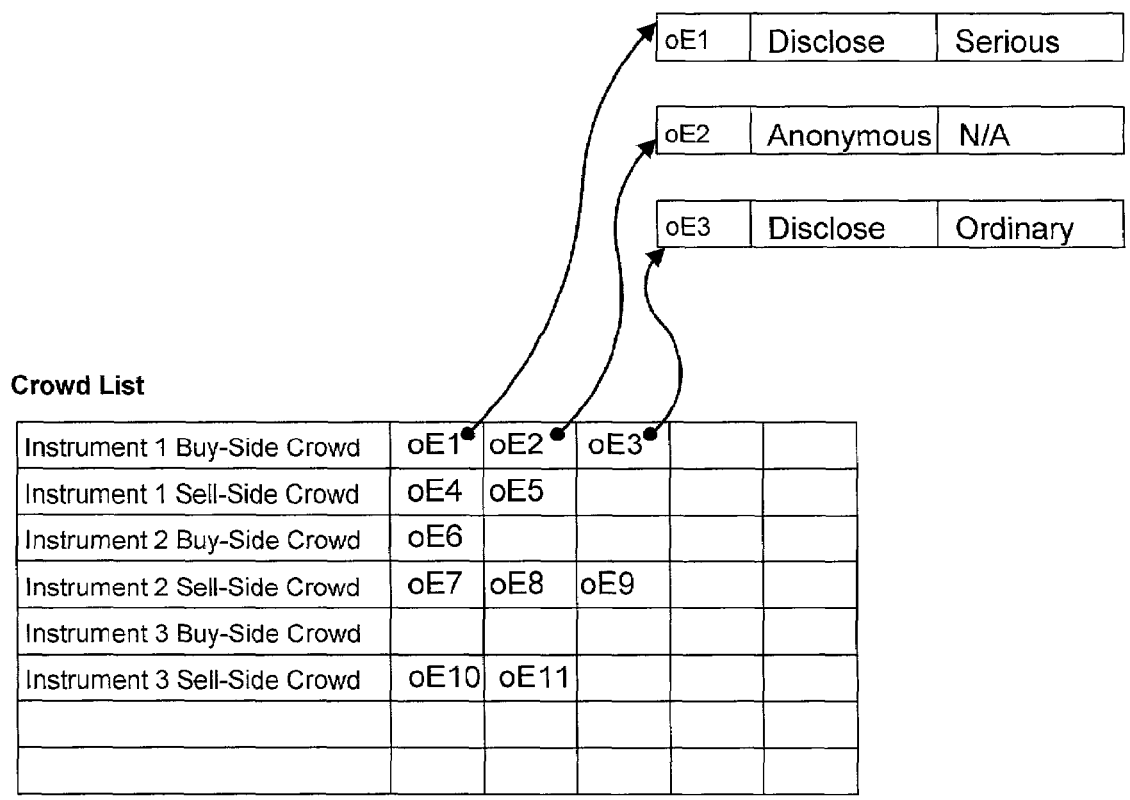
FIG. 45 is a diagram of a data structure used by an order umpire.

FIG. 45 is a diagram of a registered crowd list data structure used by an order umpire. For each instrument that oU 30 supports for trading, the registered crowd list indicates, on the buy side and on the sell side, the oEs that are registered in the crowd for oU 30. For each oE in its registered crowd, oU 30 maintains the name of the oE, the disclosure signature of the oE, e.g. anonymous or not, and the magnitude of the quantity, e.g. ordinary or serious, if disclosed.

The registered crowd list structure shown in FIG. 45 is used for, among other things, putting ELFs in touch with one another when one announces its presence by not being anonymous when it registered in the crowd.

Order Umpire Operation

FIGS. 46-92 are a flowchart of the operational phase for an order umpire, such as oU 30.

Figure 46:
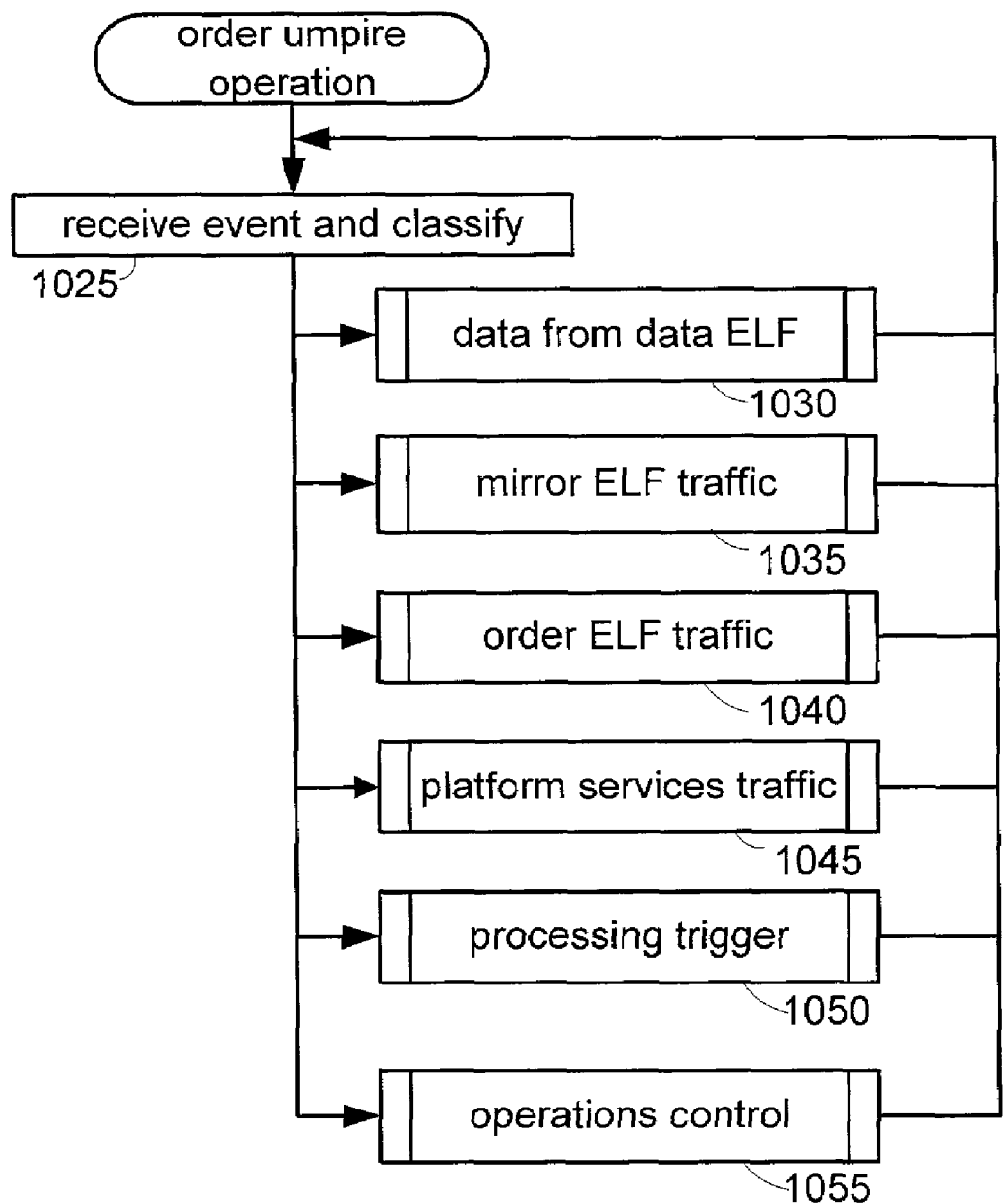
FIGS. 46-92 are a flowchart of the operational phase for an order umpire.

As shown in FIG. 46, after oU 30 is set up, oU 30 waits for an event, responds appropriately, shown in detail for each event in a separate flowchart, performs housekeeping, and then waits for another event.

At step 1025, oU 30 receives an event and classifies the event.

Figures 47, 48:
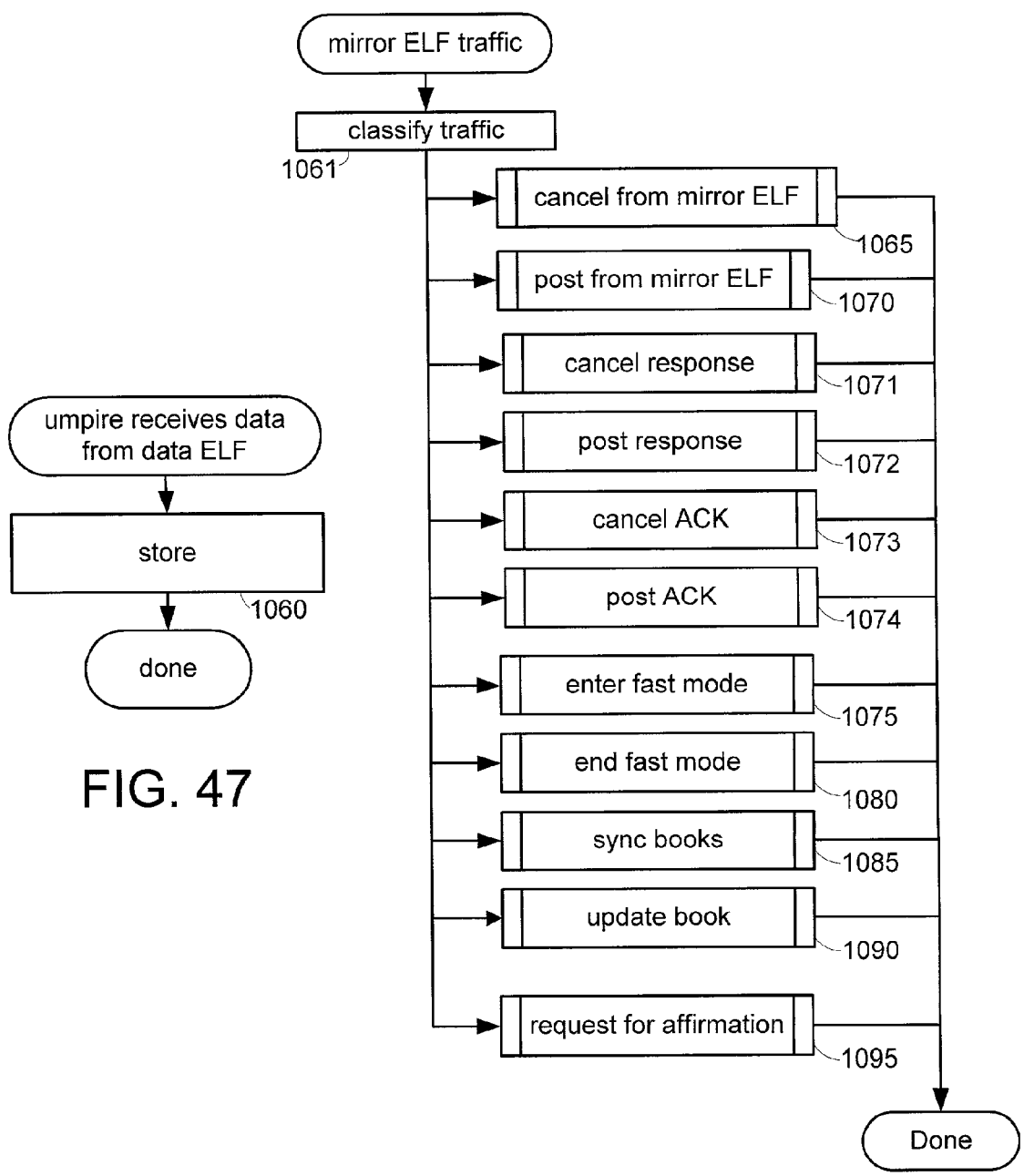

At step 1030, oU 30 receives data from a dE, processes the data as shown in FIG. 47, and then returns to step 1025.

At step 1035, oU 30 receives traffic from a mirror ELF, processes the mirror ELF traffic as shown in FIG. 48, and then returns to step 1025.

Figure 59:
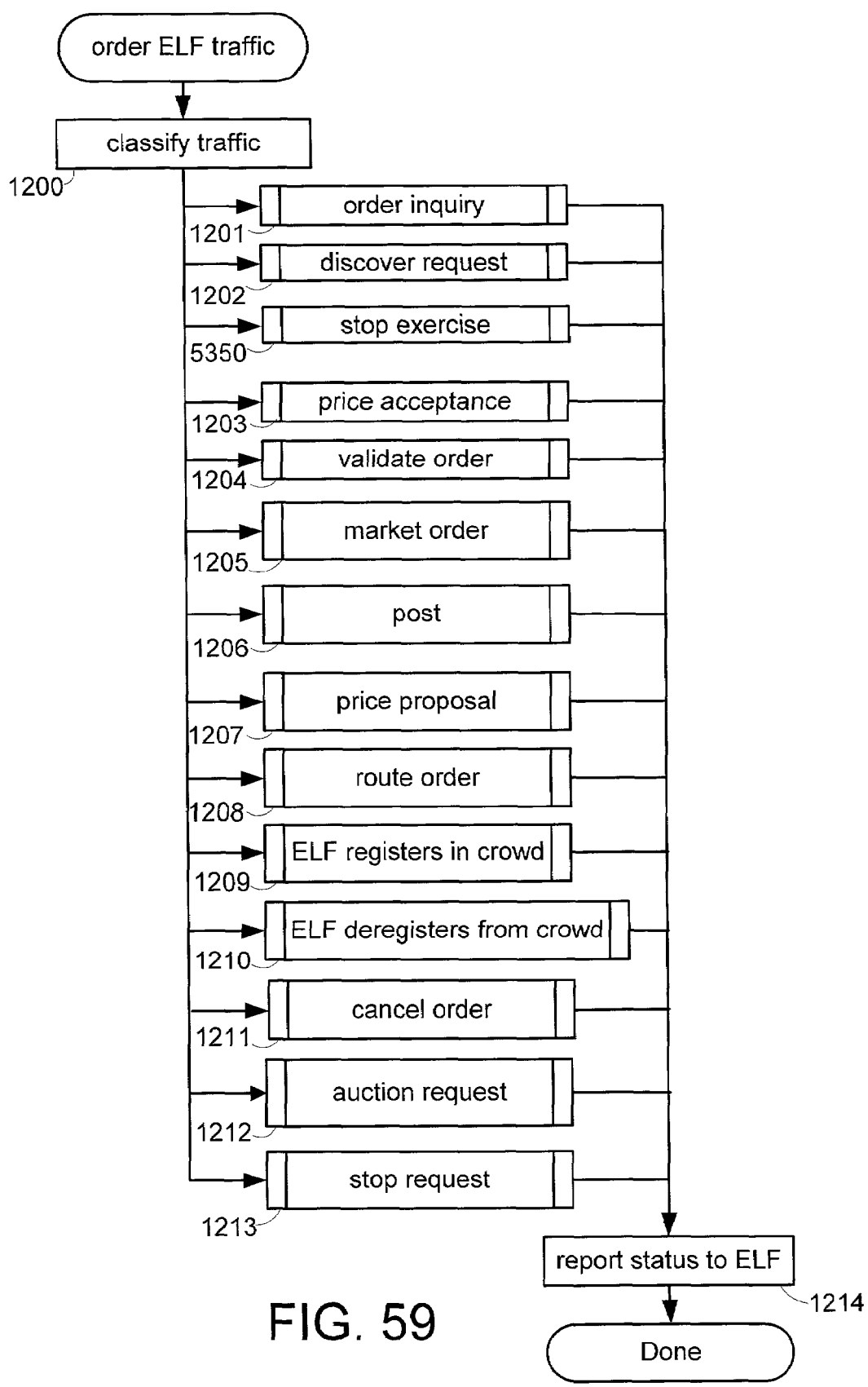

At step 1040, oU 30 receives traffic from an oE, processes the oE traffic as shown in FIG. 59, and then returns to step 1025.

Figure 84:
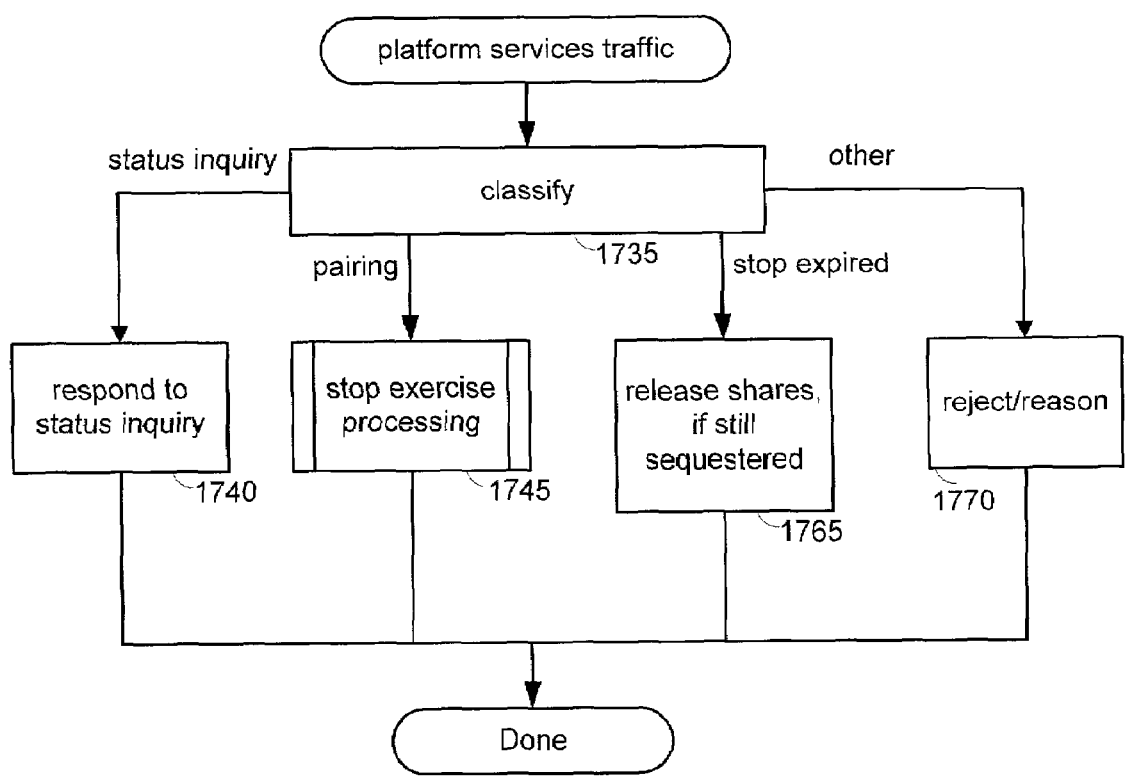

At step 1045, oU 30 receives traffic from platform services 60, processes the platform services traffic as shown in FIG. 84, and then returns to step 1025.

Figure 89:
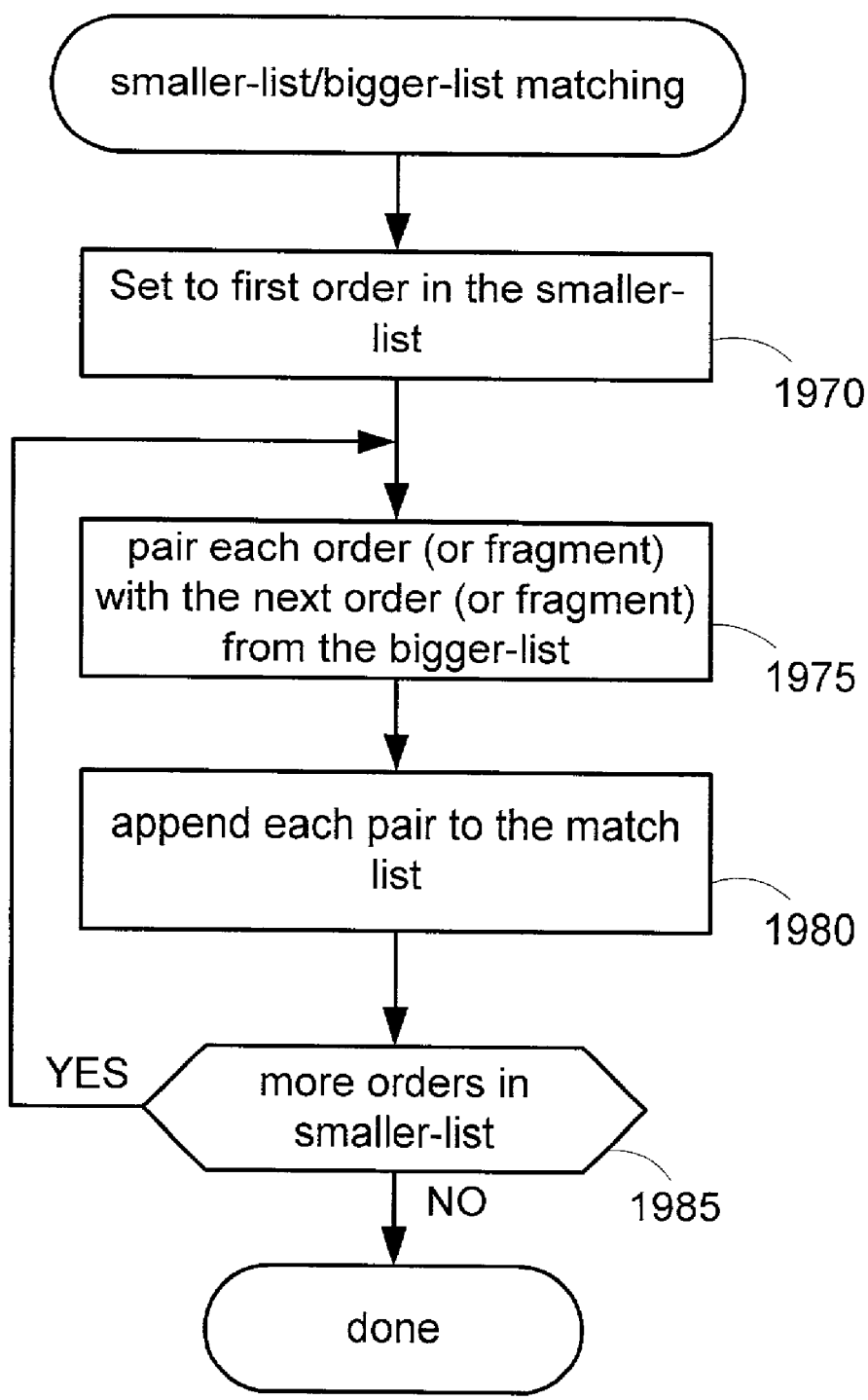

At step 1050, oU 30 receives a processing trigger, processes the trigger as shown in FIG. 89, and then returns to step 1025.

Figure 96:
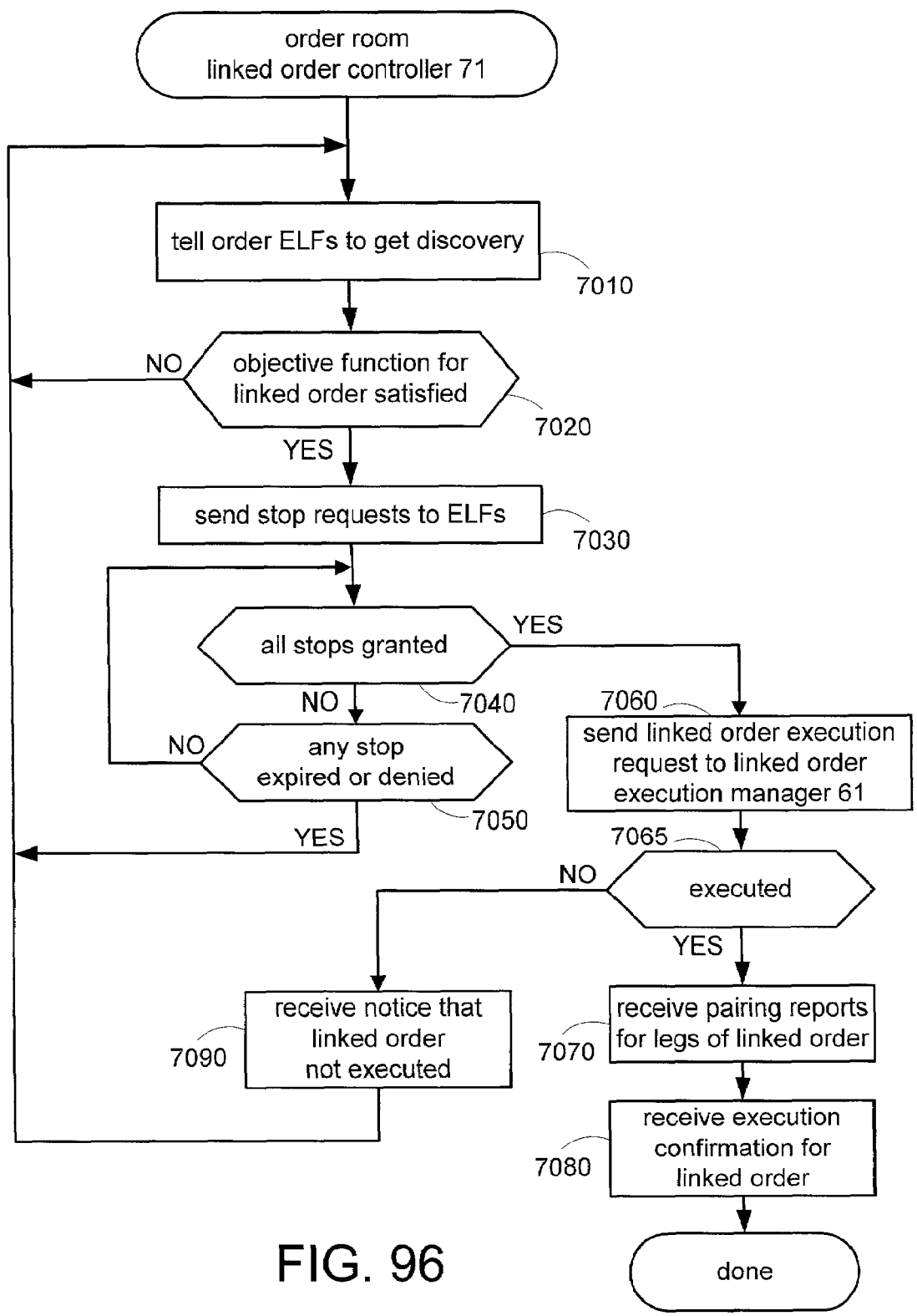
FIG. 96 is a flowchart for the order room linked order controller.

At step 1055, oU 30 performs operations control, as shown in FIG. 96, and then returns to step 1025.

FIG. 47 is a flowchart showing how oU 30 responds to receiving data from a dE. At step 1060, oU 30 stores the received data, and then returns to FIG. 30. It will be understood that the umpire may store the data so that it replaces the previous value, or so that it becomes the latest value in a succession of values received over time. For example, the newest data received becomes the latest value for that data element while the prior latest value becomes the next to latest value and the next to latest value becomes the value before that, etc. The method of storing data is a function of the parametric settings for the particular umpire and for each particular data element.

FIG. 48 is a flowchart showing how mirror ELF traffic is processed by oU 30. In this embodiment, mirror ELF 50 is a conduit for the synchronization of the order books at oU 30 and external site 80. As discussed in association with explaining the operation of FIG. 5, the posting, canceling, and pairing of orders may not be unilaterally committed by the oU or by the exchange prior to checking with the other party through the mirror ELF.

At step 1061, oU 30 classifies the traffic from mirror ELF 50, and branches to the appropriate processing to complete processing of the mirror ELF traffic.

Figure 49:
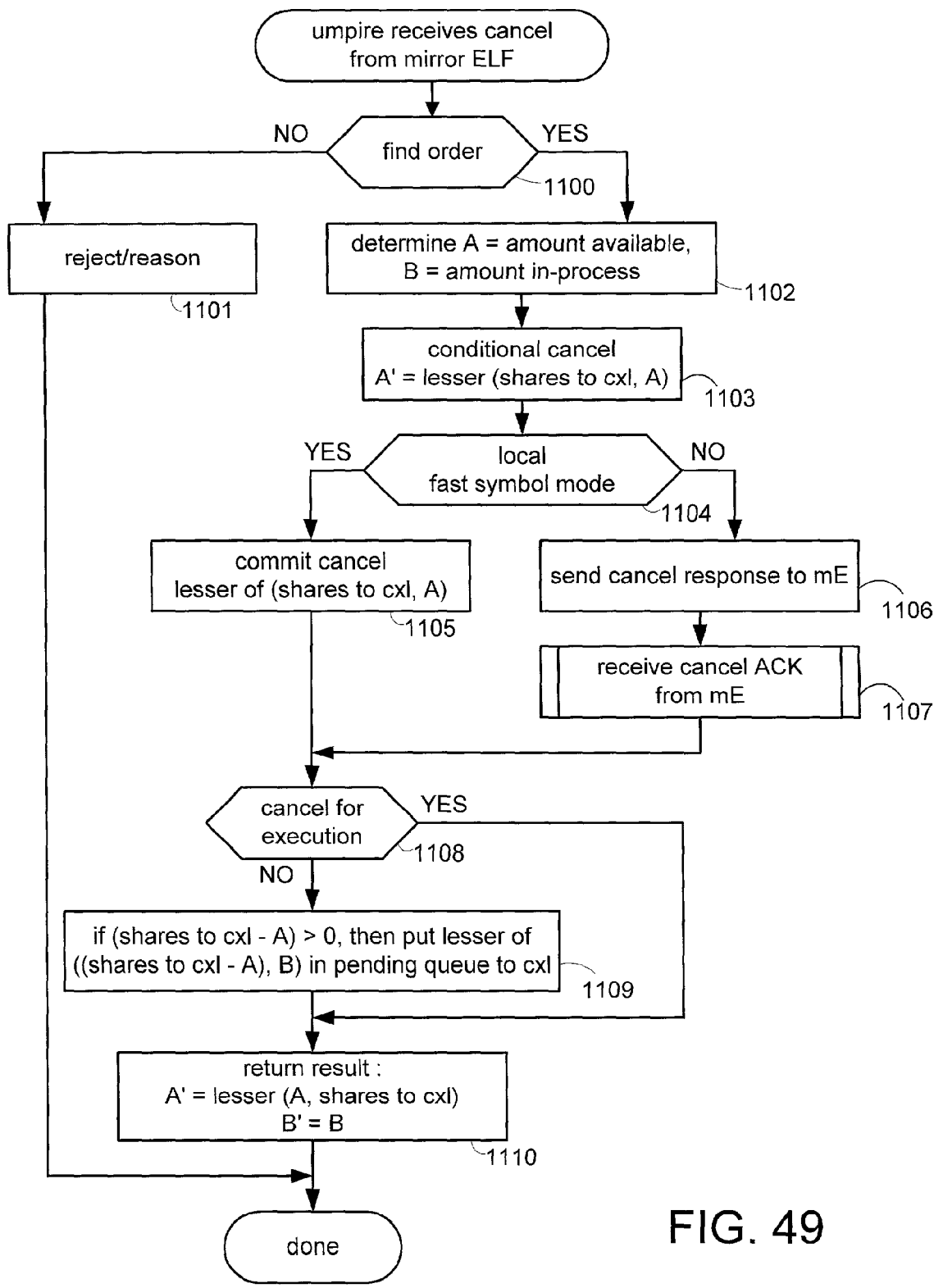

At step 1065, oU 30 receives a cancel message from mirror ELF 50, and processes the cancel from mirror ELF as shown in FIG. 49.

Figure 50:
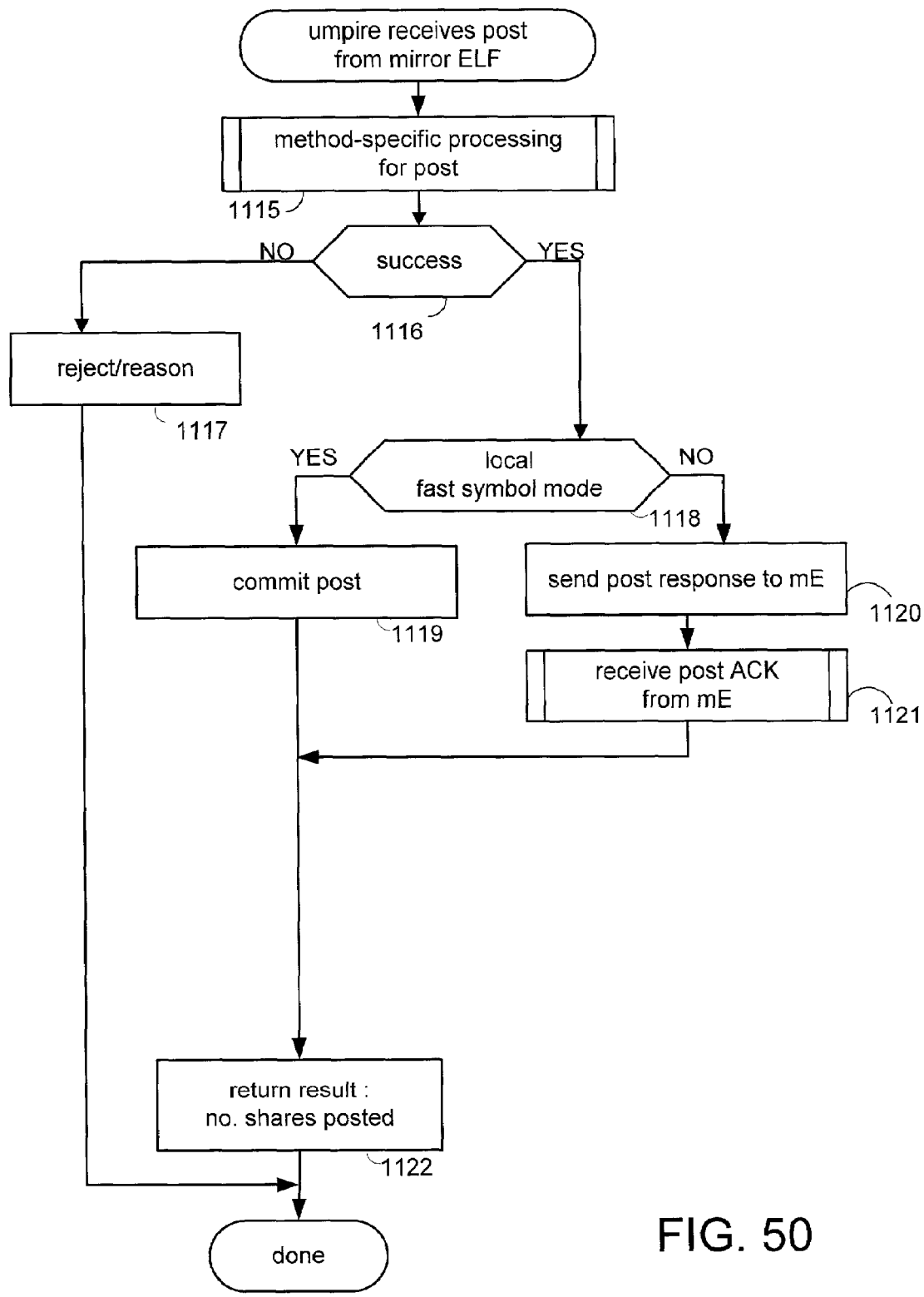

At step 1070, oU 30 receives a post message from mirror ELF 50, and processes the post from mirror ELF as shown in FIG. 50.

Figure 51:
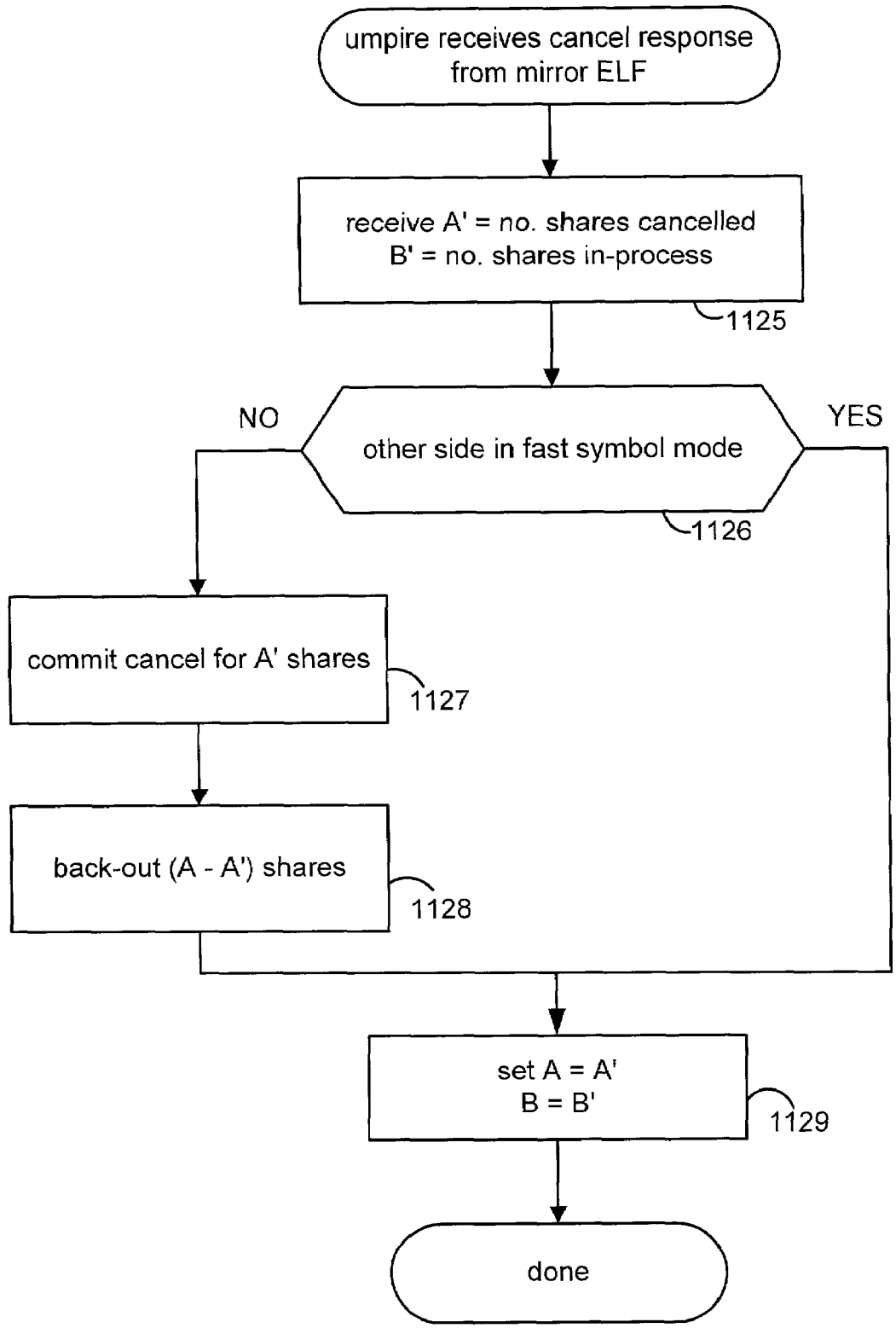

At step 1071, oU 30 receives a cancel response message from mirror ELF 50, and processes the cancel response as shown in FIG. 51.

Figure 52:
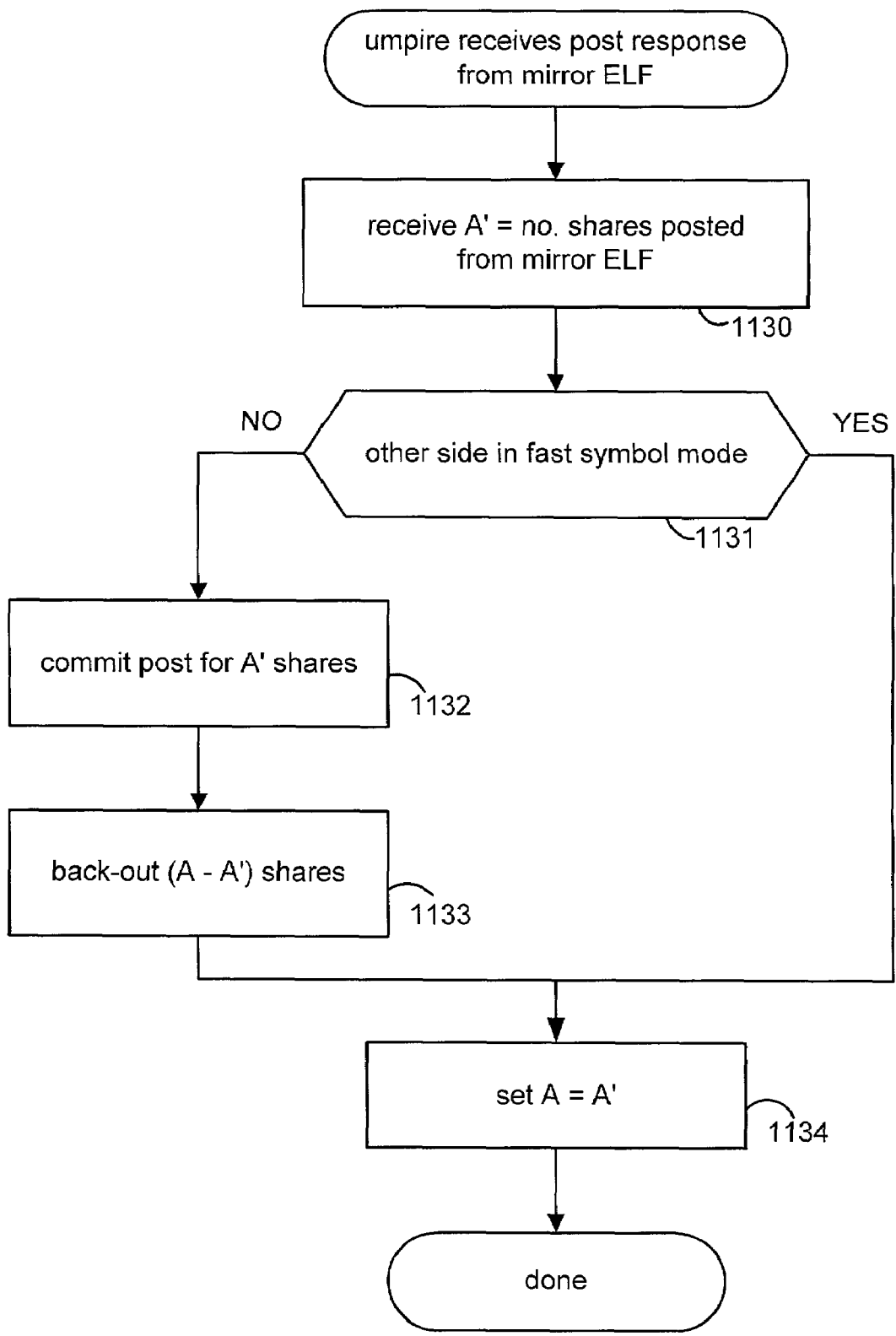

At step 1072, oU 30 receives a post response message from mirror ELF 50, and processes the post response as shown in FIG. 52.

Figure 53:
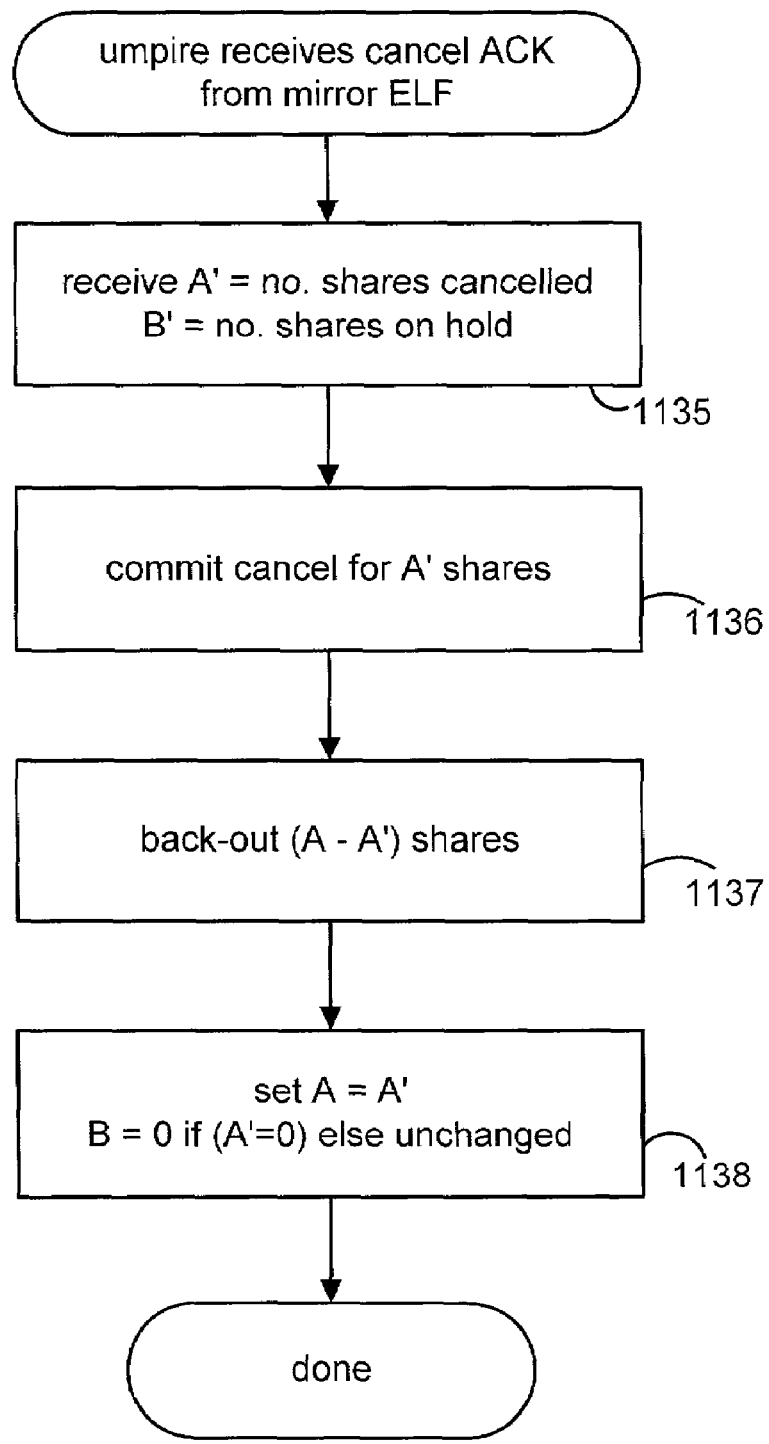

At step 1073, oU 30 receives a cancel ACK message from mirror ELF 50, and processes the cancel ACK as shown in FIG. 53.

Figure 54:
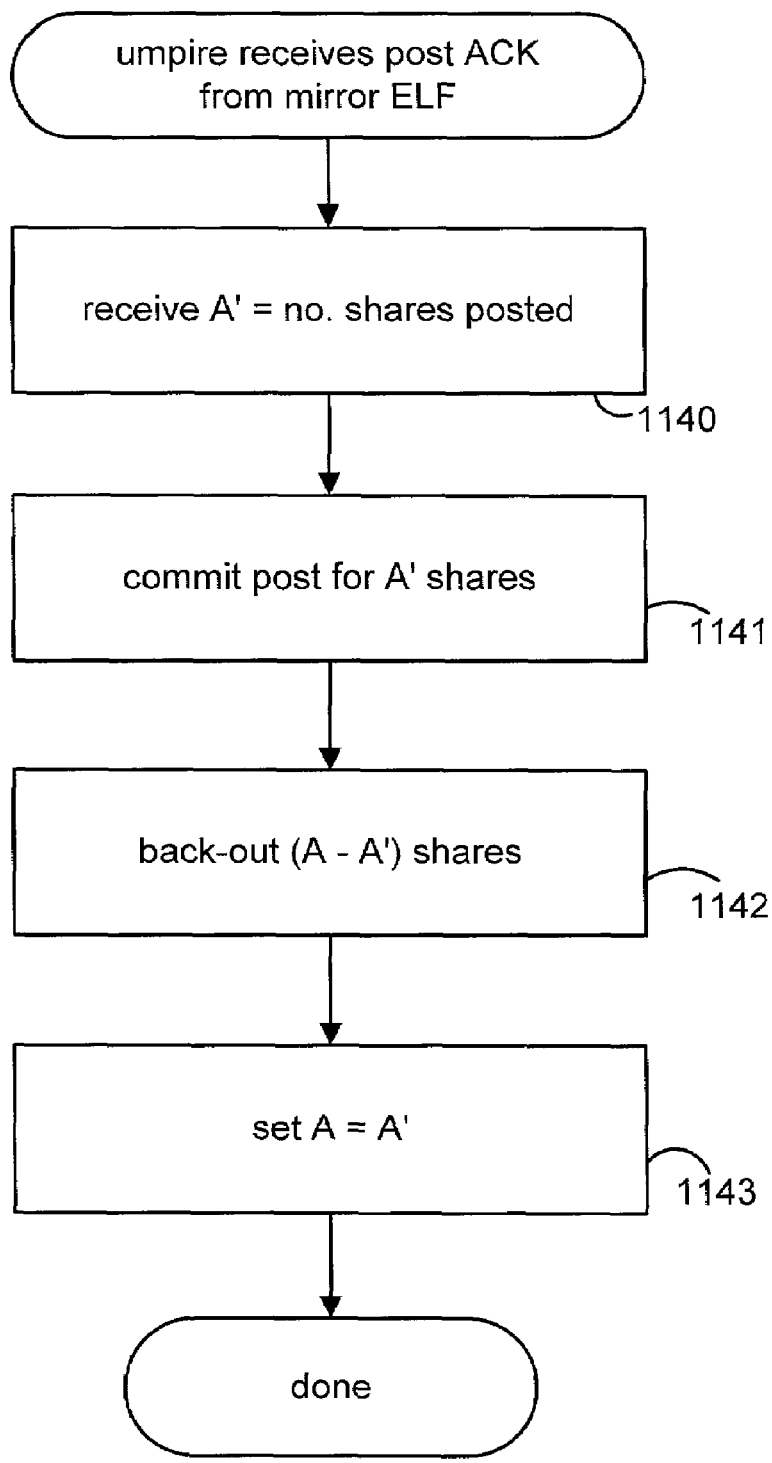

At step 1074, oU 30 receives a post ACK message from mirror ELF 50, and processes the post ACK as shown in FIG. 54.

Figure 55A:
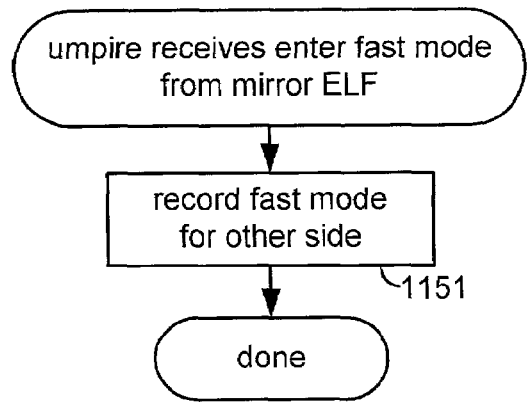

At step 1075, oU 30 receives an "enter fast mode" message from mirror ELF 50, and processes the enter fast mode message from mirror ELF 50 as shown in FIG. 55A.

Figure 55B:
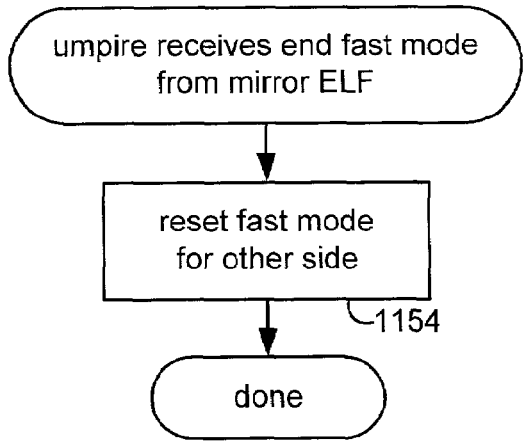

At step 1080, oU 30 receives an "end fast mode" message from mirror ELF 50, and processes the end fast mode message from mirror ELF 50 as shown in FIG. 55B.

Figure 56:
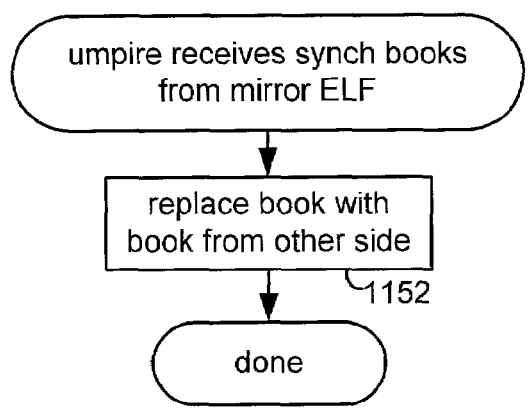

At step 1085, oU 30 receives a "synch books" message from mirror ELF 50, and processes the synch books message from mirror ELF 50 as shown in FIG. 56.

Figure 57:
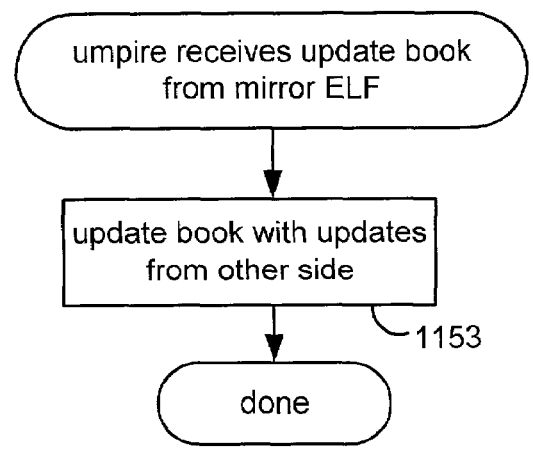

At step 1090, oU 30 receives an "update book" message from mirror ELF 50, and processes the update book message from mirror ELF 50 as shown in FIG. 57.

Figure 58:
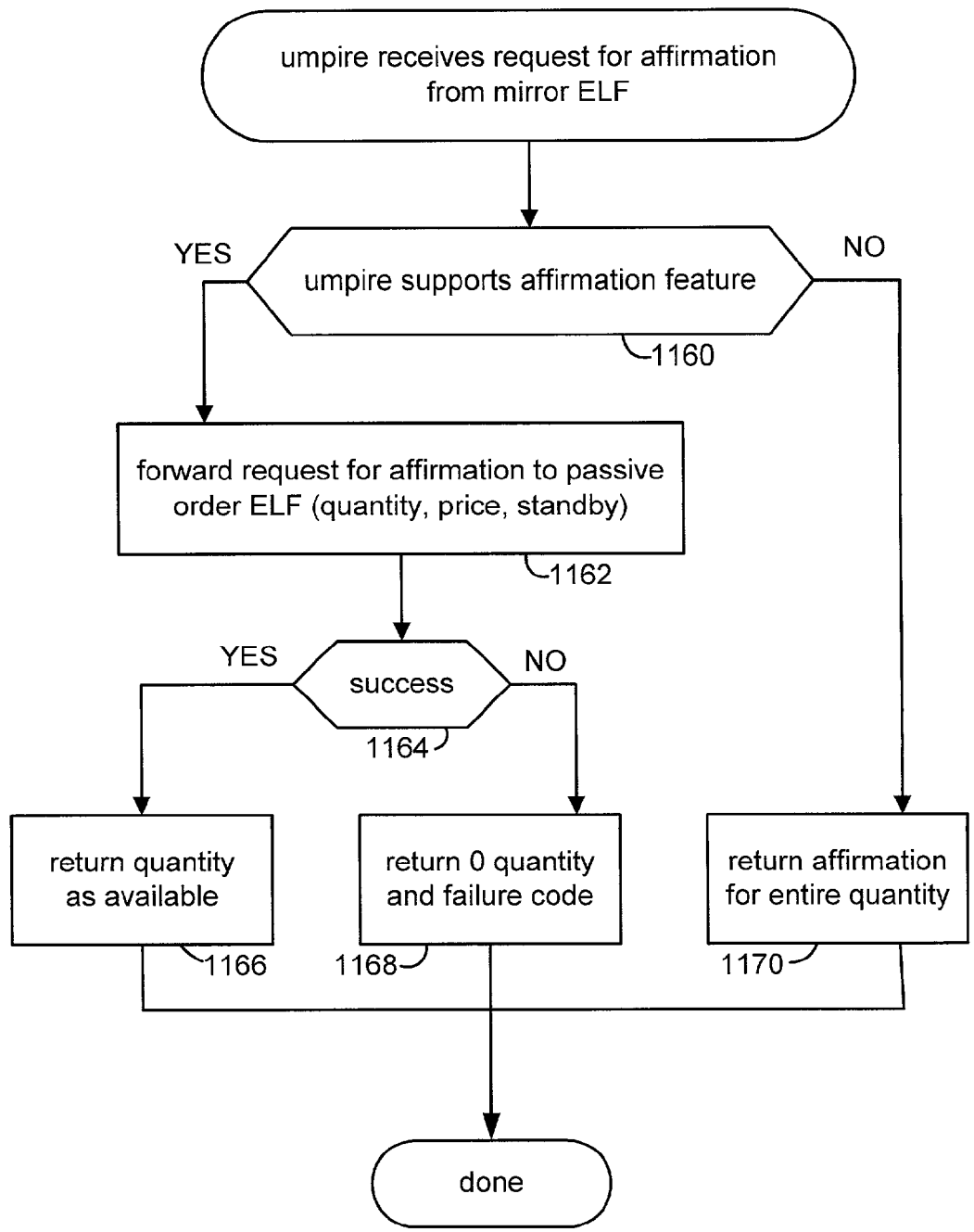

At step 1095, oU 30 receives a request for affirmation from mirror ELF 50, and processes the affirmation request as shown in FIG. 58.

FIGS. 49-58 are flowcharts that show how oU 30 responds to traffic from mirror ELF 50. A purpose of mirror ELF 50 is to synchronize two books, in whole or in part. The protocol ensures that an order, or cancel order message, that is submitted for posting is either posted in both books or in neither of the books. In this embodiment, the protocol is symmetrical because mirror link adapter 85 is configured to ensure symmetry. In other embodiments, the protocol need not be symmetrical. Mirror ELF 50 also allows for one or the other books to enter or end fast symbol mode in which all book entries for one or more symbols are maintained, unsynchronized, in only one book.

FIG. 49 is a flowchart showing cancel from mirror ELF processing. A practical application of cancel from mirror ELF processing is as follows. Let it be assumed that a party at an external point cancels its order at external exchange 80, which is linked via mE 50 to oU 30. In response to the party's cancellation, external 80 sends a cancel order message to mE 50 which forwards the cancel to oU 30. The cancel message from mE 50 is processed by oU 30 as described below.

At step 1100, oU 30 tries to find the order corresponding to the cancel from mirror ELF 50. If oU 30 cannot find the order, at step 1101, oU 30 sends a reject back to mE 50 with an appropriate reason code. Reject processing is not described herein for brevity.

If oU 30 finds the order indicated in the cancel message from mE 50, then at step 1102, oU 30 sets a parameter "A" to be the number of shares of the order that are available for immediate cancellation, and sets another parameter "B" to be the number of shares of the order that are in-process. For example, if the order is stored in oU 30's book and is not interacting with any contra-side orders, then all shares of the order are available.

At step 1103, oU 30 conditionally cancels the lesser of "A," the available shares, and the number of shares specified in the cancel message from mE 50. Conditional cancellation may be thought of as marking, in oU 30's order book, the conditionally cancelled shares as being on hold but intended for cancellation.

At step 1104, oU 30 tests whether the symbol of the order is in fast mode at oU 30. If so, oU 30 is not following a two phase order processing protocol, and at step 1105, oU 30 cancels the lesser of "A," the available shares, and the number of shares specified in the cancel message from mE 50. Processing continues at step 1108. If oU 30 is not in fast mode for this symbol, then at step 1106, oU 30 sends a cancel response message to mE 50. It is expected that mE 50 will acknowledge receipt of the cancel response message, and when the acknowledgement arrives, at step 1107, oU 30 performs receive cancel ACK from mirror ELF processing, shown in FIG. 53. Processing continues at step 1108.

At step 1108, oU 30 tests whether the cancel message from mE 50 was a regular cancel or a cancel for execution. In the scenario given above, since the party owning the order generated a cancel message, mE 50 sent a regular cancel message. However, if external 80 had wanted to execute the order, then mE 50 would have sent a cancel for execution message. If the message was a regular cancel, then at step 1109, oU 30 checks whether the amount available was less than the amount specified in the cancel message, and if so, puts the lesser of the difference and the amount in-process in a pending queue for cancellation and then proceeds to step 1110. Accordingly, whenever the amount not available is released from being in-process, oU 30 will try to cancel the just released amount. This is the best that oU 30 can do to fulfill the cancel message from mE 50. Otherwise, if the message was a cancel for execution, oU 30 proceeds directly to step 1110.

At step 1110, oU 30 returns a result to mE 50 comprising two numbers: A', the amount cancelled, and B', the amount in-process.

FIG. 50 is a flowchart showing post from mirror ELF processing. As can be discerned from comparing FIGS. 49 and 50, processing for a post message from mE 50 is generally a simplified version of processing for a cancel message from mE 50. A practical application is when a party owning an order posts the order at external 80, and external 80 sends a post message via mE 50 to oU 30.

Figure 75:
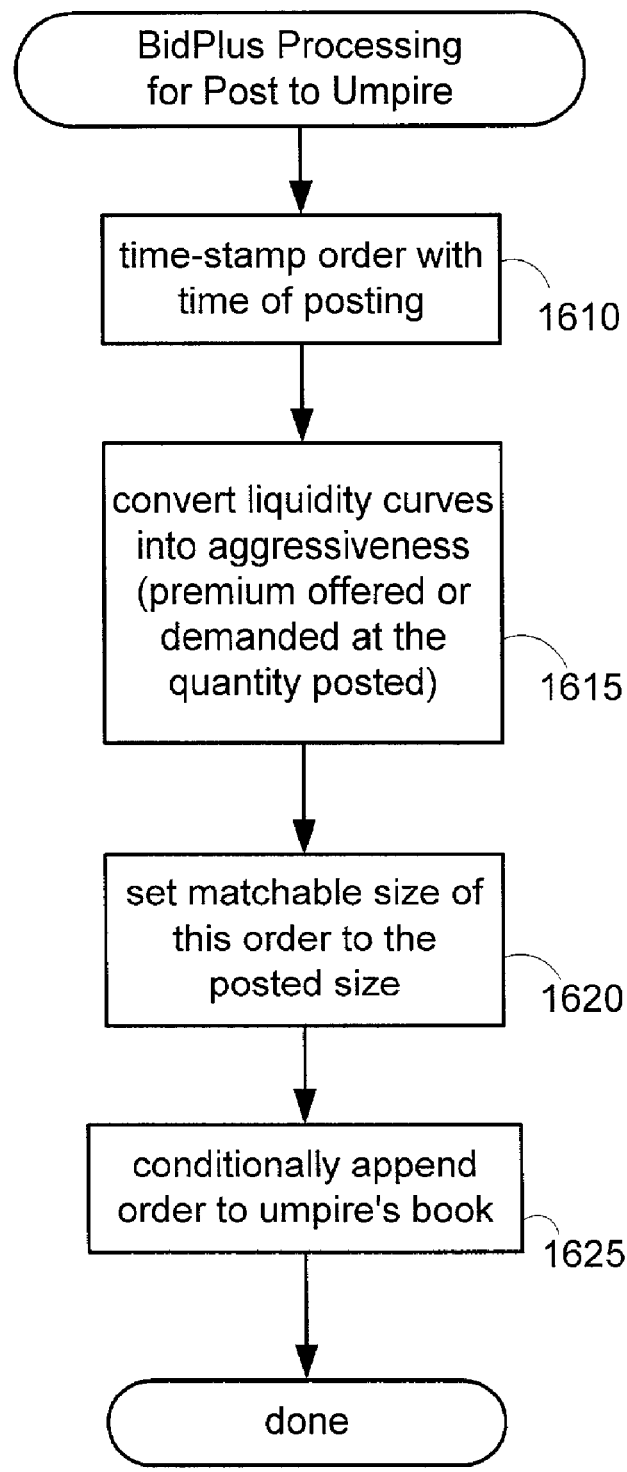

At step 1115, oU 30 conditionally posts, that is, posts the order received from mirror ELF 50 to its book with a hold, using method-specific processing, if necessary. An example of method-specific processing for the BidPlus method is shown in FIG. 75. At step 1116, oU 30 checks whether the post was successful. If not, at step 1117, oU 30 sends a reject back to mE 50 with an appropriate reason code. Reject processing is not described herein for brevity.

If the post was successful, at step 1118, oU 30 checks if it is in fast mode for this symbol. If so, at step 1119, oU 30 performs a commit post, that is, enters the order in its book. Processing continues at step 1122. If the symbol involved in the order is not in fast mode at oU 30, at step 1120, oU 30 sends a post response message to mE 50. It is expected that mE 50 will acknowledge receipt of the post response message, and when the acknowledgement arrives, at step 1121, oU 30 performs receive post ACK from mirror ELF processing, shown in FIG. 54. Processing continues at step 1122.

At step 1122, oU 30 sends the result, namely, the number of shares it posted, to mirror ELF 50 and processing is complete.

FIG. 51 is a flowchart showing processing for a cancel response message from a mirror ELF. This logic is invoked when oU 30 is trying to cancel an order on behalf of an order ELF, as shown, for example, in FIG. 81. At step 1125, oU 30 receives a cancel response message from mE 50 indicating A', the number of shares cancelled by the other side of mE 50, and B', the number of shares in-process at the other side of mE 50. At step 1126, oU 30 checks whether the other side is in fast symbol mode. If so, then oU 30 was simply routing the cancel message via mE 50 and did not take any local action, so processing proceeds to step 1129. If the other side was not in fast symbol mode, then the other side as well as oU 30 are following a two phase order handling protocol. Accordingly, at step 1127, oU 30 commits to canceling A' shares, which were previously conditionally cancelled, and at step 1128, oU 30 backs out the conditionally cancelled shares that were not permanently cancelled at step 1127. Processing continues at step 1129.

At step 1129, oU 30 sets the parameter A to be the number of shares permanently cancelled at step 1127, and the parameter B to be the number of shares in-process at the other side of mE 50, and processing is complete.

FIG. 52 is a flowchart showing processing for a post response message from a mirror ELF. This logic is invoked when oU 30 is trying to post an order on behalf of an order ELF, as shown, for example, in FIG. 74. At step 1130, oU 30 receives a post response message from mE 50 indicating A', the number of shares posted by the other side of mE 50. At step 1131, oU 30 checks whether the other side is in fast symbol mode. If so, then oU 30 was simply routing the post message via mE 50 and did not take any local action, so processing proceeds to step 1134. If the other side was not in fast symbol mode, then the other side as well as oU 30 are following a two phase order handling protocol. Accordingly, at step 1132, oU 30 commits to posting A' shares, which were previously conditionally posted, and at step 1133, oU 30 backs out the conditionally posted shares that were not permanently posted at step 1132. Processing continues at step 1134.

At step 1134, oU 30 sets the parameter A to be the number of shares permanently posted at step 1127, and processing is complete.

FIG. 53 is a flowchart showing processing for a cancel ACK message from a mirror ELF. This logic is invoked when oU 30 is trying to cancel an order in response to a cancel message from mE 50, as shown, for example, in FIG. 49. At step 1135, oU 30 receives a cancel ACK message from mE 50 indicating A', the number of shares cancelled by the other side of mE 50, and B', the number of shares on hold at the other side of mE 50. At step 1136, oU 30 commits to canceling A' shares, which were previously conditionally cancelled, and at step 1137, oU 30 backs out the conditionally cancelled shares that were not permanently cancelled at step 1135. At step 1138, oU 30 sets the parameter A to be the number of shares permanently cancelled at step 1136, and the parameter B to be zero if no shares were permanently cancelled, and processing is complete.

FIG. 54 is a flowchart showing processing for a post ACK message from a mirror ELF. This logic is invoked when oU 30 is trying to post an order in response to a post message from mE 50, as shown, for example, in FIG. 50. At step 1140, oU 30 receives a post ACK message from mE 50 indicating A', the number of shares posted by the other side of mE 50. At step 1141, oU 30 commits to posting A' shares, which were previously conditionally posted, and at step 1142, oU 30 backs out the conditionally posted shares that were not permanently posted at step 1141. At step 1143, oU 30 sets the parameter A to be the number of shares permanently posted at step 1141, and processing is complete.

In FIG. 55A, oU 30 receives an enter fast mode message from mE 50, and at step 1151, oU 30 records fast mode for this symbol on the other side.

In FIG. 55B, oU 30 receives an end fast mode message from mE 50, and at step 1154, oU 30 resets fast mode for this symbol on the other side.

In FIG. 56, oU 30 receives a synch books message from mE 50 and at step 1152, oU 30 replaces its book for this symbol with the one received.

In FIG. 57, oU 30 receives an update book message from mE 50, and at step 1153, oU 30 updates its book for this symbol with the update received.

FIG. 58 is a flowchart showing processing at an order umpire for receiving, from a mirror ELF, a request for affirmation that a posted order is available. At step 1160, oU 30 checks whether it supports the feature of affirming availability of an order. If not, then at step 1170, oU 30 returns a "simulated" affirmation for the entire quantity, which effectively defers affirmation to the time when an execution occurs. If oU 30 supports affirmation, then at step 1162, oU 30 forwards the request for affirmation to the order ELF that posted the order. At step 1164C, oU 30 checks whether a response was received successfully and within a predetermined response time. If so, then oU 30 replies to mE 50 with the quantity affirmed by the order ELF. If a response was not successfully received, then at step 1168, oU 30 returns an affirmation for 0 shares, and a failure code. Processing is complete.

FIG. 59 is a flowchart showing how oU 30 responds to traffic received from an oE.

At step 1200, oU 30 classifies the traffic and responds appropriately, shown in detail for each event in a separate flowchart.

Figure 60:
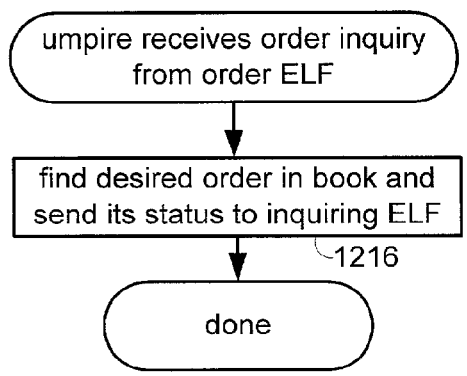

At step 1201, oU 30 receives an order inquiry message from an oE, invokes the logic shown in FIG. 60, and proceeds to step 1214.

Figure 61:
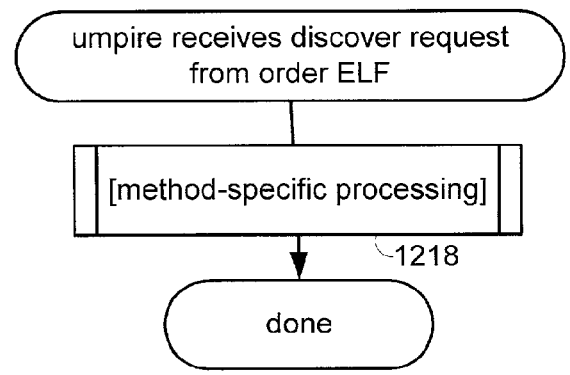

At step 1202, oU 30 receives a discover request from an oE, invokes the logic shown in FIG. 61, and proceeds to step 1214.

Figure 64A:
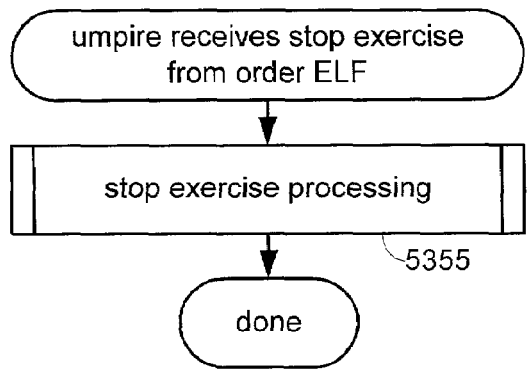

At step 5350, oU 30 receives a stop exercise order from an oE, invokes the logic shown in FIG. 64A, and proceeds to step 1214.

Figure 64B:
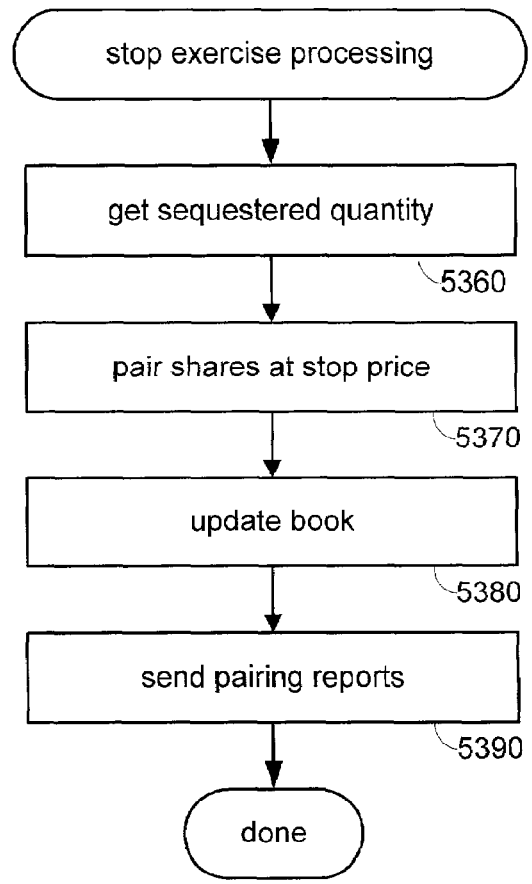
Figure 64C:
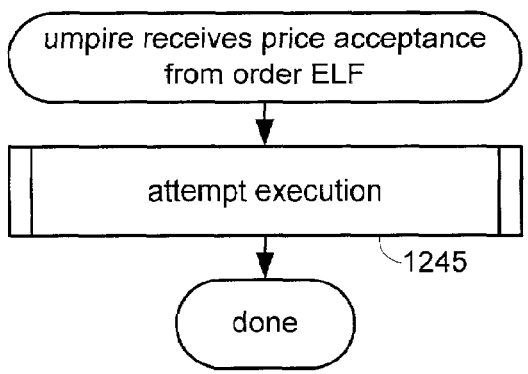

At step 1203, oU 30 receives a price acceptance from an oE, invokes the logic shown in FIG. 64C, and proceeds to step 1214. An example of a price acceptance is taking a price provided during discovery. At step 1204, oU 30 receives a validate order request from an oE, invokes the logic shown in FIG. 72, and proceeds to step 1214.

Figure 73:
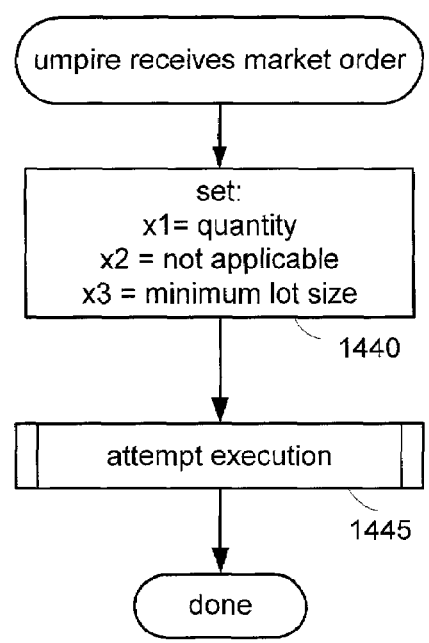

At step 1205, oU 30 receives a market order from an oE, invokes the logic shown in FIG. 73, and then proceeds to step 1214.

Figure 74:
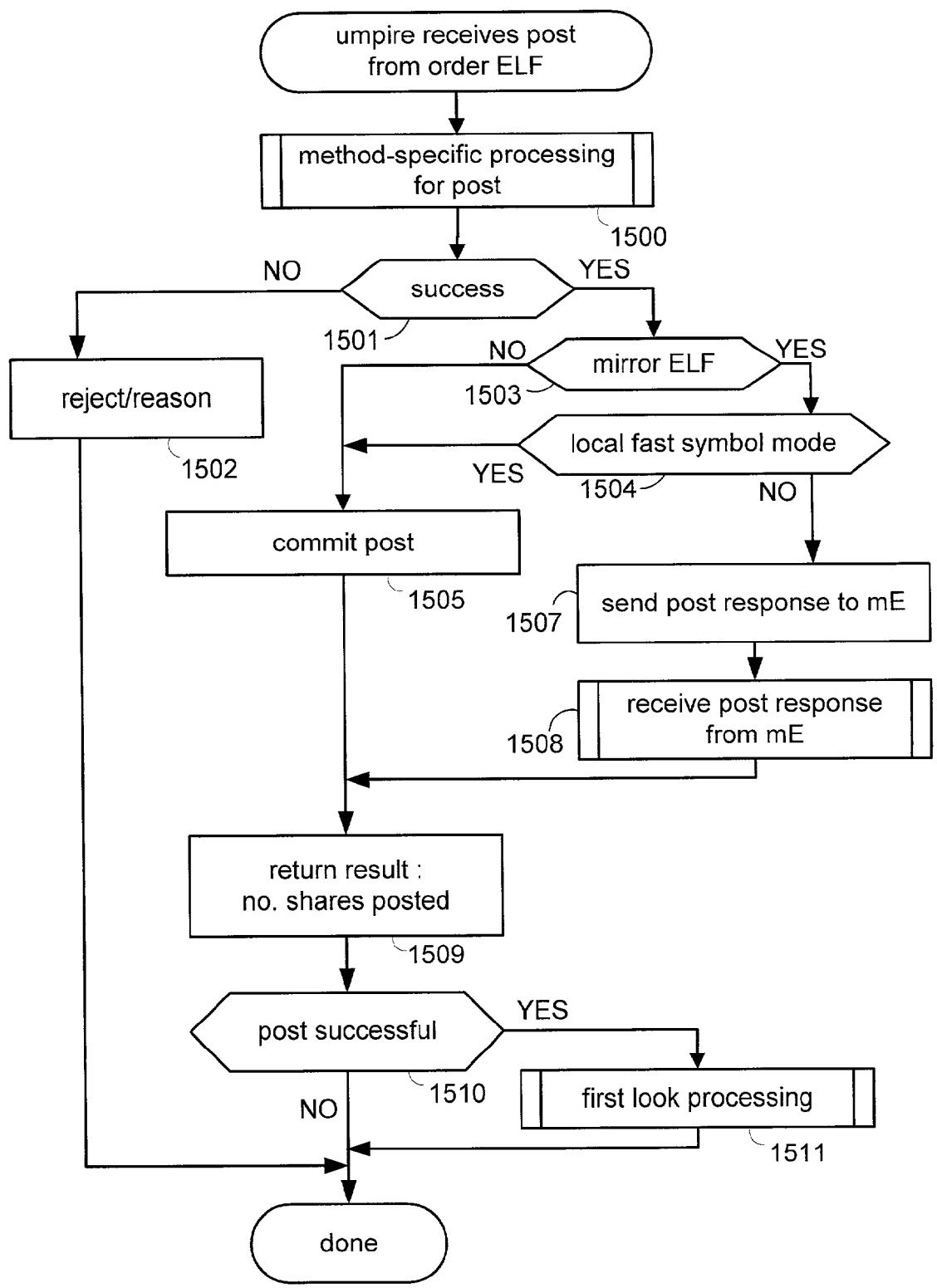

At step 1206, oU 30 receives a post to umpire request from an oE, invokes the logic shown in FIG. 74, and then proceeds to step 1214.

Figure 77:
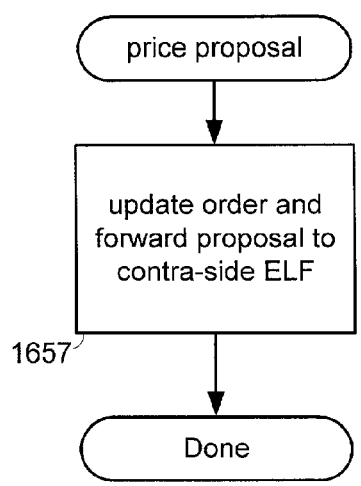

At step 1207, oU 30 receives a price proposal from an oE, invokes the logic shown in FIG. 77, and then proceeds to step 1214.

Figure 78:
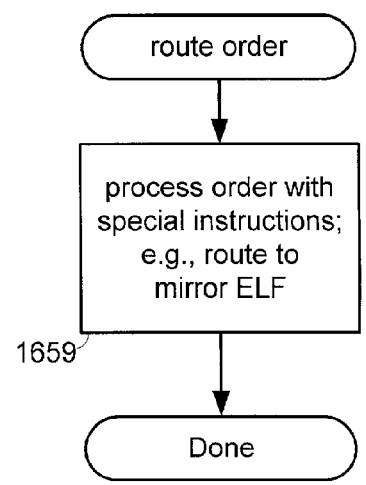

At step 1208, oU 30 receives a route order from an oE, invokes the logic shown in FIG. 78, and then proceeds to step 1214.

Figure 79:
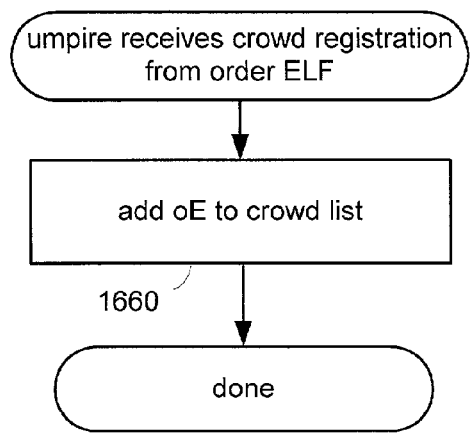

At step 1209, oU 30 receives a crowd registration request from an oE, invokes the logic shown in FIG. 79, and proceeds to step 1214.

Figure 80:
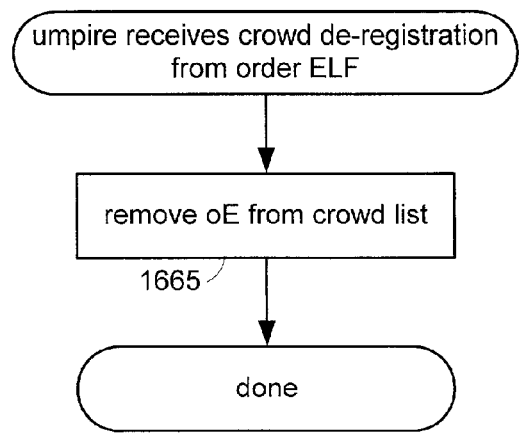

At step 1210, oU 30 receives a crowd deregistration request from an oE, invokes the logic shown in FIG. 80, and proceeds to step 1214.

Figure 81:
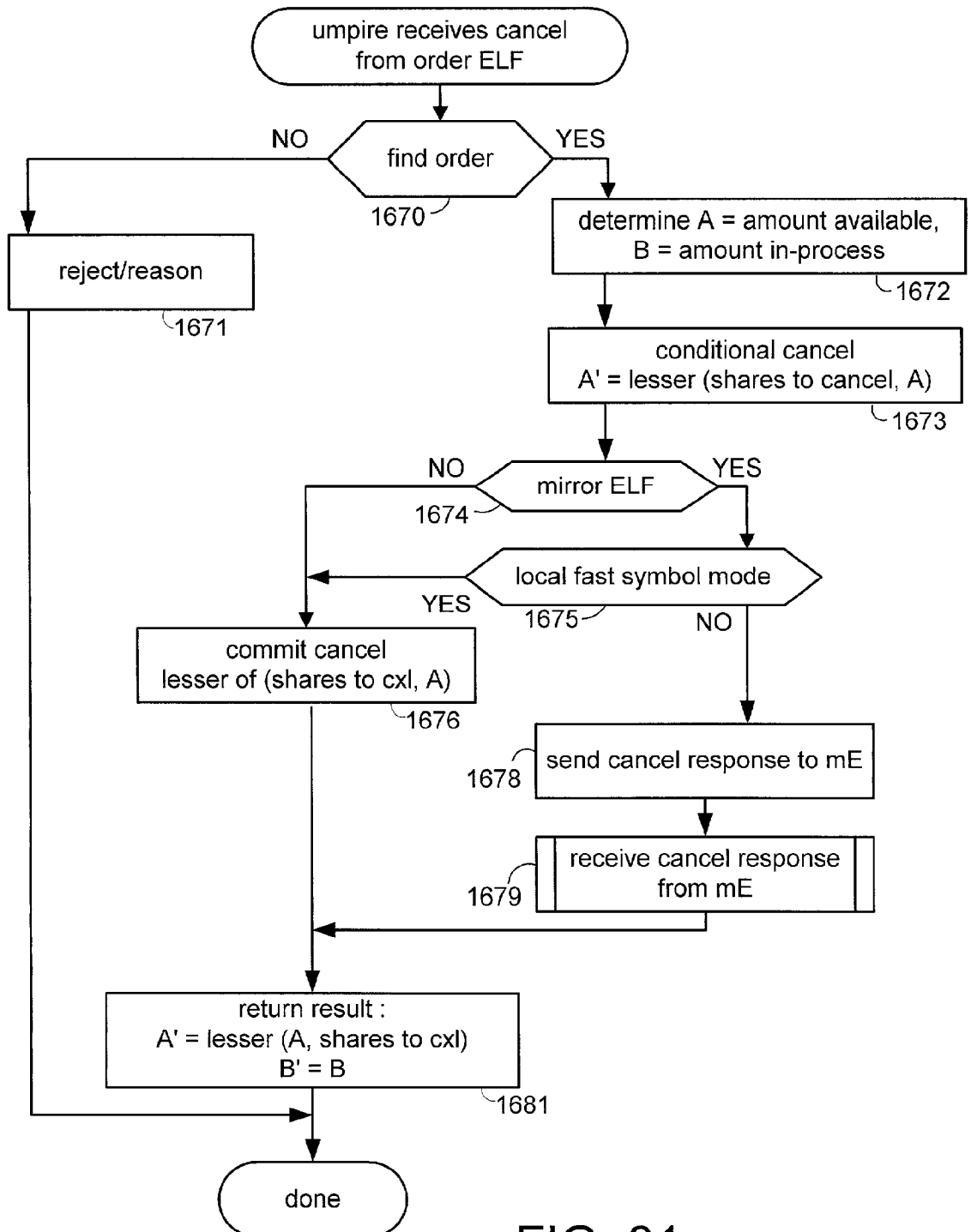

At step 1211, oU 30 receives a cancel order instruction from an oE, invokes the logic shown in FIG. 81, and then proceeds to step 1214.

Figure 82:
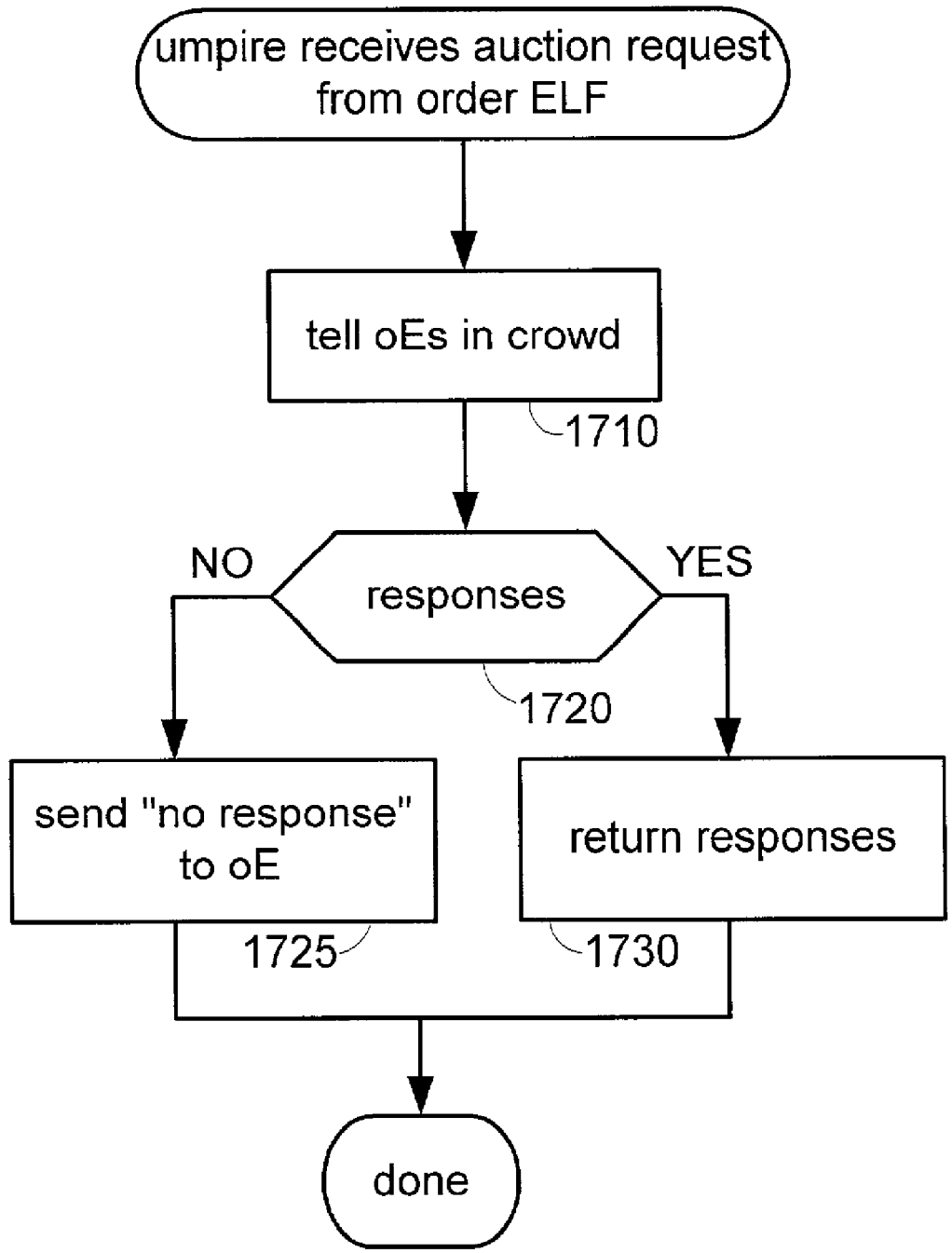

At step 1212, oU 30 receives an auction request from an oE, invokes the logic shown in FIG. 82, and then proceeds to step 1214.

Figure 83:
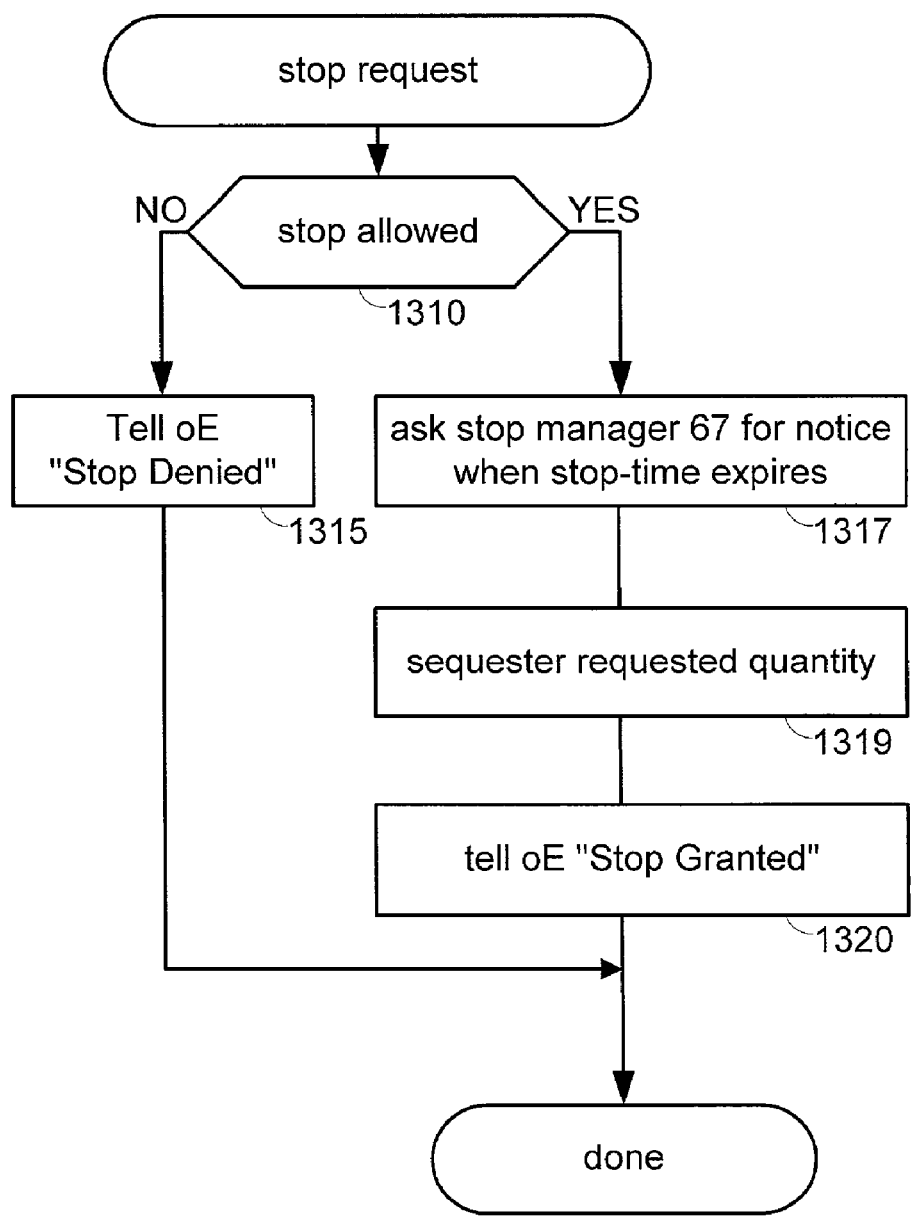

At step 1213, oU 30 receives a stop request from an oE, invokes the logic shown in FIG. 83, and then proceeds to step 1214.

At step 1214, oU 30 reports the status of its response to the traffic from the order ELF, thereby completing processing of the order ELF traffic. For example, if the message from the order ELF was a stop request, then at step 1214, a full report of the stop request response is provided to the requesting order ELF.

FIG. 60 is a flowchart showing how oU 30 responds to receiving an order inquiry message from an order ELF. It will be appreciated that order inquiry level 1 messages are handled locally by an order ELF, and all other order inquiry levels require responses from appropriate umpires. At step 1214, oU 30 finds the order being inquired about in its book and sends the status of this order to the inquiring order ELF.

Figure 62:
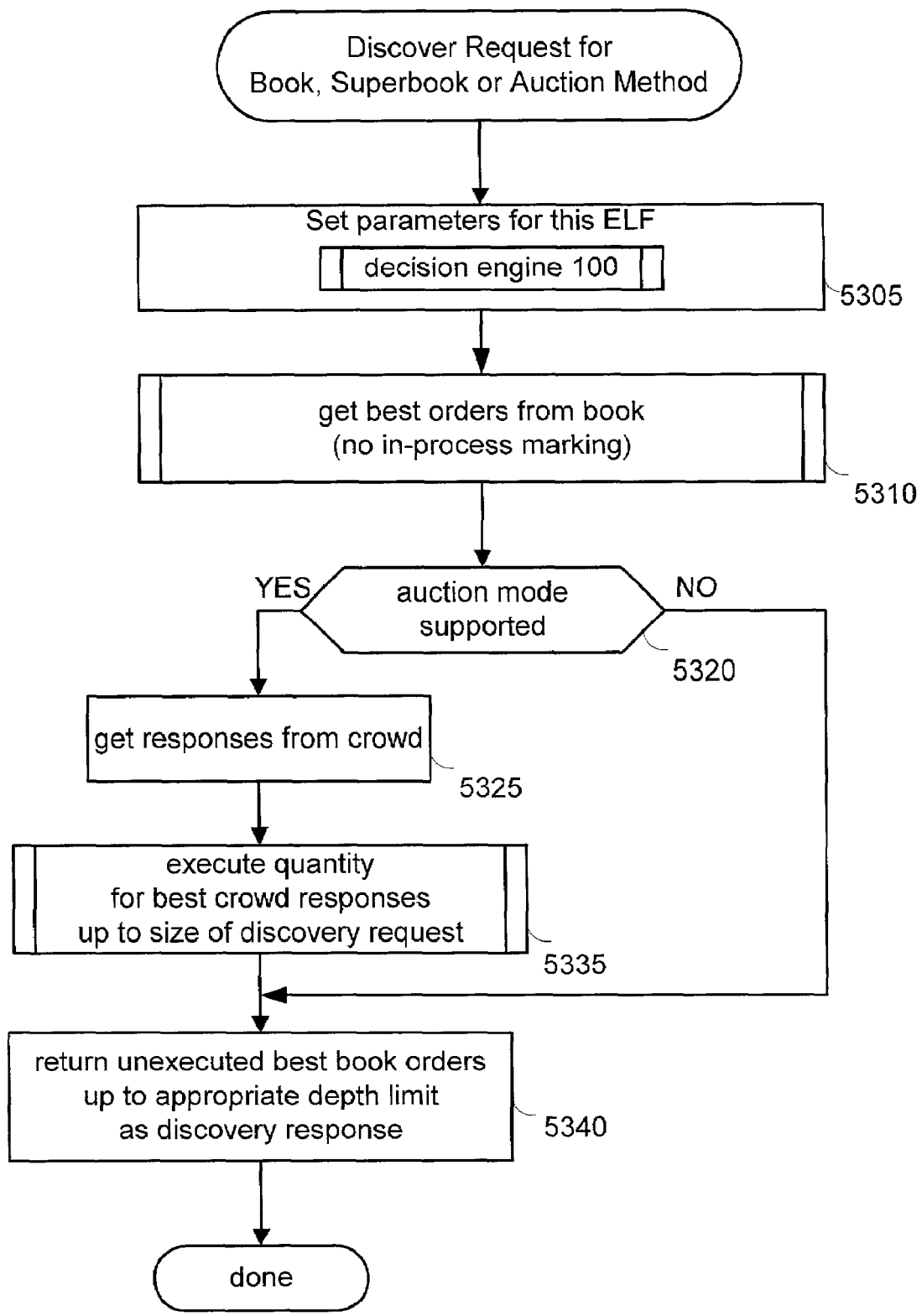
Figure 63:
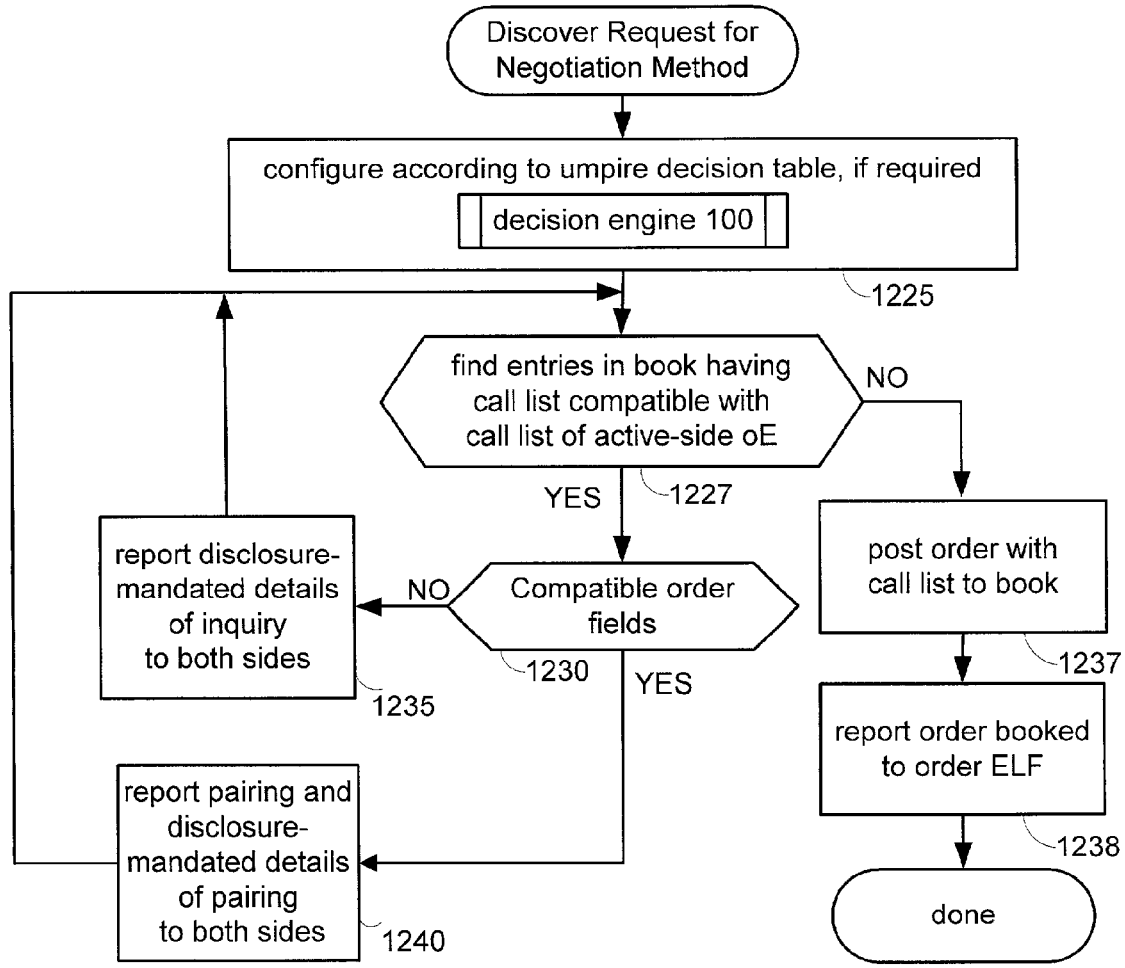

FIG. 61 is a flowchart showing how oU 30 responds to receiving a discover request from an inquiring oE. oU 30 follows its published market methodology in responding to discover requests, including considering contra-party preference information, disclosure level compatibility between booked orders and the inquiring party, and so on. At step 1215, oU 30 invokes method-specific processing for responding to a discover request to provide a price to the requesting oE, and continues as described above. FIGS. 62 and 63 show examples of processing for responding to a discover request for respective methods.

FIG. 62 is a flowchart showing method-specific processing for responding to a discover request when oU 30 provides prices using the book method, the superbook method or an auction method. At step 5305, oU 30 uses its own its umpire decision table and decision engine 100, as generally shown in FIG. 25, to set the parameters for this ELF.

Figure 67:
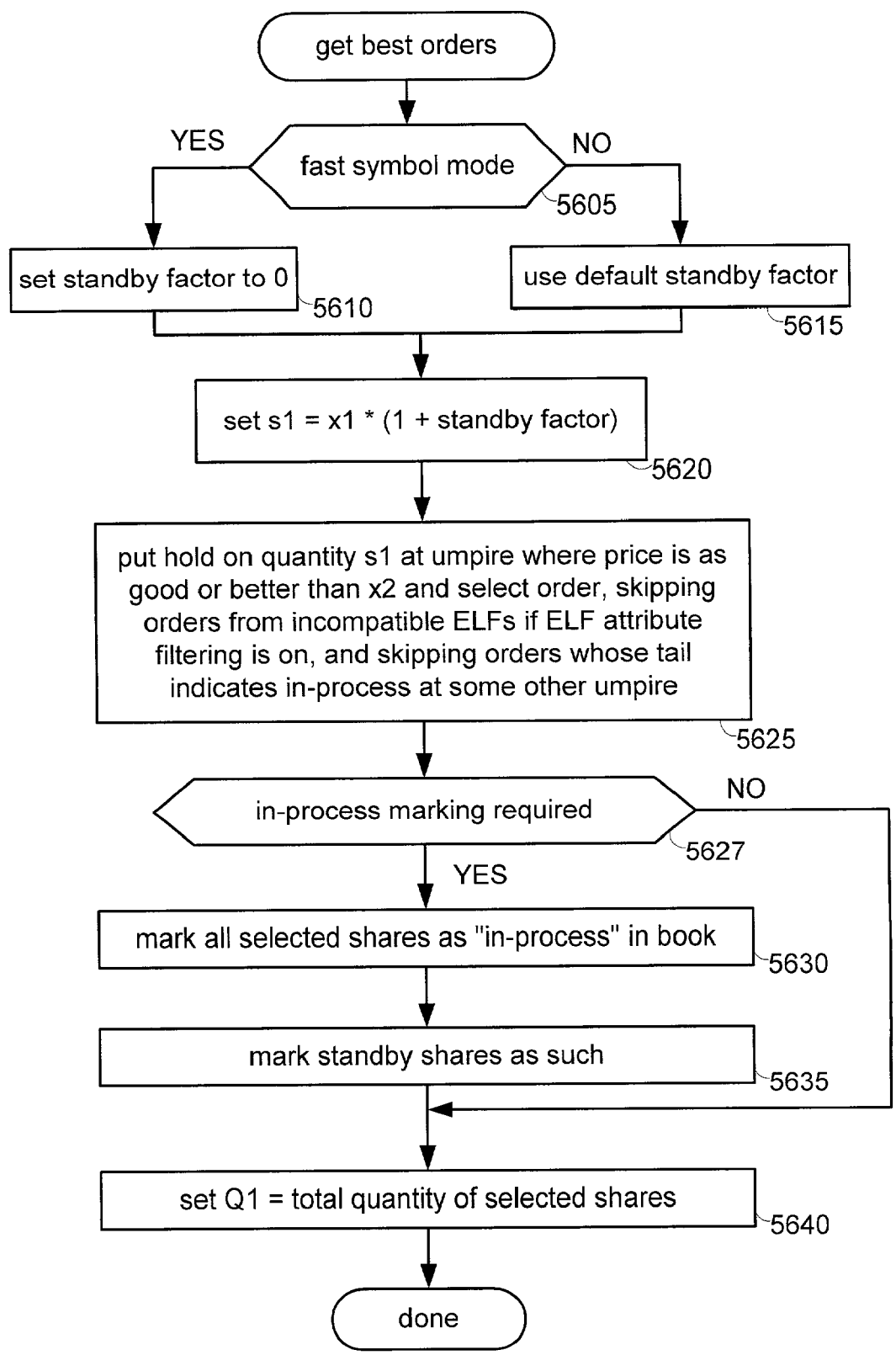

At step 5310, oU 30 invokes the logic shown in FIG. 67 to get the best orders from the book, without in-process marking. In this embodiment, it is assumed that most discovery requests will not result in an execution. When an execution is desired, an order must be marked as in-process so that it is unavailable to other parties. The extent of the discovery response from oU 30 depends on the parameters for the inquiring order ELF determined in step 5305. In this embodiment, the standby factor is used when responding to discovery requests. In other embodiments, the standby factor need not be used.

At step 5320, oU 30 checks whether it supports auction mode. If not, processing proceeds to step 5340. If oU 30 supports auction mode, and auction mode has been requested by the inquiring order ELF, then at step 5325, oU 30 notifies its crowd of the price(s) it proposes to provide to the inquiring order ELF and obtains responses, if any, from its crowd. The crowd responses must improve the price provided by oU 30. The crowd responses are ordered by price. At step 5335, oU 30 executes the crowd responses with the order ELF's discovery request, treated as an order, up to the size of the discovery request. If there is more crowd quantity than is needed for the inquiring ELF, oU 30 follows its specified procedure for allocating quantity, such as proportionally allocating the quantity or following a first-come-first-served strategy.

A discovery auction may occur at computer processing speeds, when all crowd ELFs are able to make decisions without guidance from their order rooms. However, when order room guidance is involved, the discovery auction occurs at much slower human response times.

At step 5340, oU 30 eliminates trial order information from its discovery response, and provides the book discovery, in an appropriate depth, to the inquiring order ELF. As appropriate for its disclosure policy and the disclosure levels associated with the orders, oU 30 notifies the owners of the booked orders that information has been provided about their orders in response to an inquiry.

FIG. 63 is a flowchart showing method-specific processing for responding to a discover request when oU 30 provides prices using a negotiation method. At step 1225, oU 30 configures itself according to the umpire decision table, if required, calling its decision engine 100. At step 1227, oU 30 checks whether it can find at least one entry in its book whose call list is compatible with the call list for the order being represented by the oE doing discovery. A call list reflects the disclosure preferences of the order ELF that submitted the order. Compatibility of call lists means that the call list associated with one order allows disclosure in some form to the oE on the other side and vice versa. oU 30 actually checks all the entries in its book for compatibility, discussed below. The ability of oU 30 to return all compatible entries is an extremely powerful discovery mechanism.

If at least one entry is found, at step 1230, oU 30 checks for compatibility of the order fields. Compatibility of order fields means that the instruments are the same, the sides of the order are opposing (buy vs. sell), the sizes are compatible, and the prices are compatible. Compatible sizes means that the size specified for one order is at least as great as the minimum lot size for the other order and vice versa. Compatible prices means that the prices are the same or the price of the order to buy is greater than the price of the order to sell. If any of the order fields are omitted for either order, it is automatically considered compatible with the same field in the other order. If the order fields were compatible, at step 1240, both sides are informed of a pairing and each is informed of the details of the other's order up to the limits established by the disclosure signature of that other order. That is, at step 1240, oU 30 has determined that it could be fruitful for the parties to negotiate. If the order fields were not compatible, at step 1235, both sides are informed of the details of the other's order up to the limits established by the disclosure signature of that other order. Processing returns to step 1227. When there are no more entries in the book having call lists compatible with the oE's order, at step 1237, oU 30 posts the order for which discovery is being done into its book and, at step 1238, reports to the order ELF that its order was booked. In other embodiments, discovery does not necessarily always result in posting.

FIG. 64A is a flowchart showing how oU 30 responds to receiving a stop exercise order from an oE. It will be appreciated that oU 30 must have granted a stop request order before an associated stop exercise order can be processed. At step 5355, oU 30 invokes stop exercise processing logic, depicted in FIG. 64B.

FIG. 64B is a flowchart showing stop exercise processing logic. At step 5360, oU 30 gets the quantity of shares sequestered when the stop was granted. At step 5370, oU 30 pairs the just gotten quantity with the active side stop exercise order. At step 5380, oU 30 updates its book to indicate that the quantity is no longer sequestered, how much was just paired and how much was released. At step 5390, oU 30 sends pairing reports to the active and passive side oEs. If appropriate, external reporting occurs at this time. Stop exercise processing is now complete.

FIG. 64C is a flowchart showing how oU 30 responds to receiving a price acceptance from an oE. At step 1245, oU 30 invokes attempt execution logic, depicted in FIG. 65, and proceeds as described above.

Figure 65:
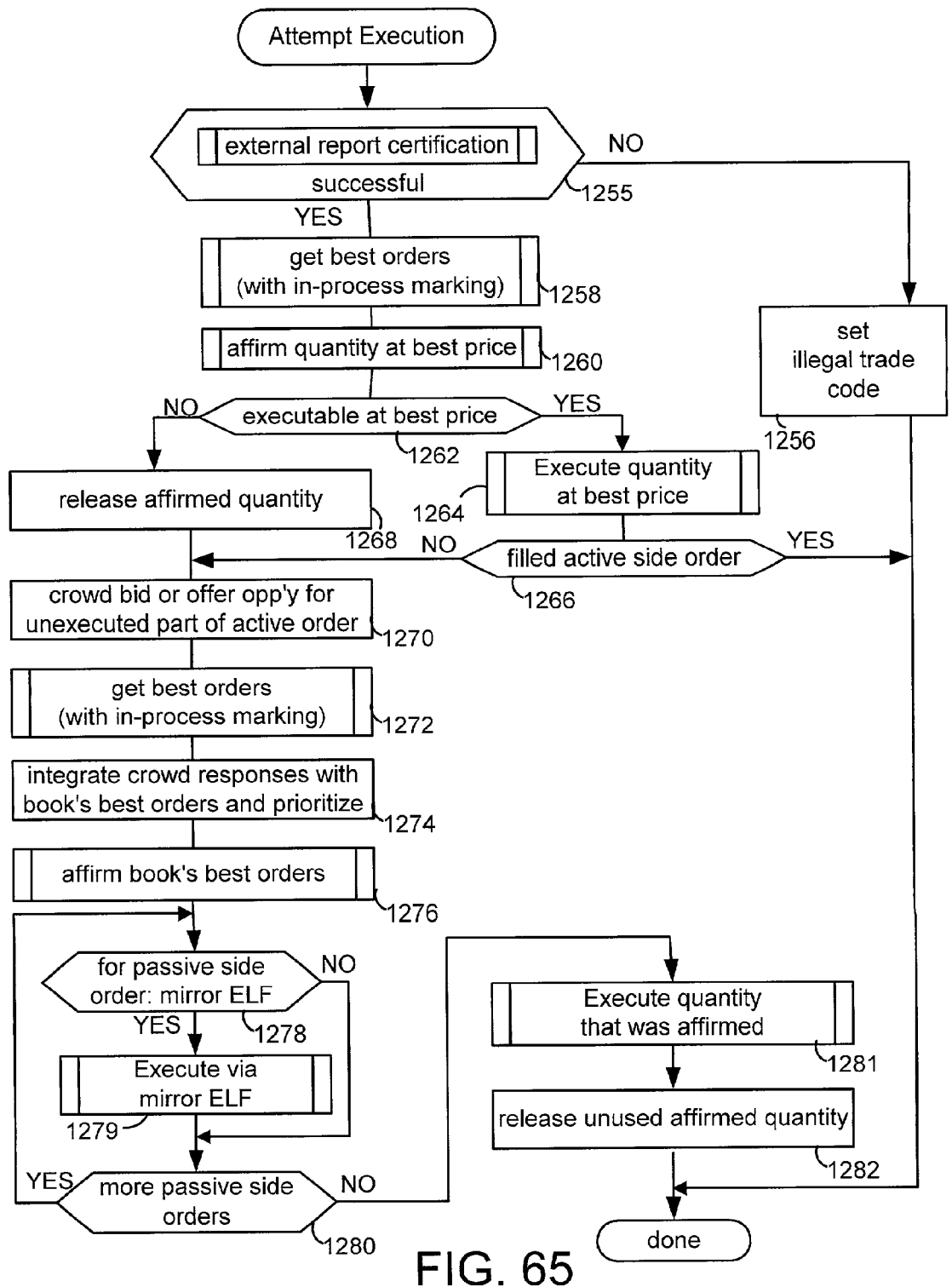

FIG. 65 is a flowchart showing attempt execution logic. Let "x1" be the quantity to take, "x2" be the worst-case price, "x3" be the minimum lot size and "Q1" be the total quantity of appropriate shares found in the book. The parameter Q1 is updated as processing occurs. At step 1255, oU 30 invokes external report certification processing, shown in FIG. 66, and checks whether the processing was successful. If the external report certification processing was unsuccessful, then at step 1256, oU 30 sets an illegal trade code, and attempt execution processing is complete.

If the external report certification processing was successful, at step 1258, oU 30 invokes get best order logic shown in FIG. 67 with in-process marking. Next, at step 1260, oU 30 invokes affirm quantity processing, shown in FIG. 68, for the orders at the best price. At step 1262, oU 30 checks whether there is sufficient quantity for execution at the best price, that is, inter alia, whether the minimum lot size of the active side order is satisfied. If so, then at step 1264C, oU 30 invokes execute quantity processing, shown in FIG. 70, for the quantity at the best price. A check is made for whether a mirror ELF is involved in a passive side order, and if so, the execution is via mirror ELF, as generally shown in steps 1278-1280, discussed below. At step 1266, oU 30 checks whether the active side order has been filled. If so, then processing is complete.

If, at step 1262, it was determined that the affirmed quantity at the best price was not executable, then at step 1268, oU 30 releases the affirmed quantity. oU 30 will now attempt to execute the quantity at another price. Since its price is changing, and oU 30 is following the superbook method, oU 30 will advise its crowd of a price improvement opportunity. The crowd auction will take time, particularly if the auction is conducted at human response times, and the quantity at the best price is available to other order ELFs while an auction is occurring for the present active side order ELF.

After releasing the affirmed quantity at step 1268, or after determining at step 1266 that the active side order was not filled by the affirmed quantity at the best price, at step 1270, oU 30 notifies its crowd of a price improvement opportunity for the unexecuted part of the active side order. oU 30 retains the crowd responses, if any. At step 1272, oU 30 again gets the best orders from its book, according to the logic shown in FIG. 67, with in-process marking. At step 1274, oU 30 integrates the crowd responses with the book's best orders and prioritizes by price and time. At step 1276, oU 30 invokes the affirmation logic shown in FIG. 68, adjusting the status of a book order from regular to standby as appropriate in view of the crowd responses, if any.

At step 1278, for each passive side order, oU 30 checks whether a mirror ELF is involved. If so, then at step 1279, oU 30 invokes mirror ELF execution logic shown in FIG. 69. At step 1280, oU 30 checks whether it has tested all passive side orders for a mirror ELF; if not, processing returns to step 1278. When all passive side orders have been checked for the presence of a mirror ELF, processing proceeds to step 1281.

Figure 70:
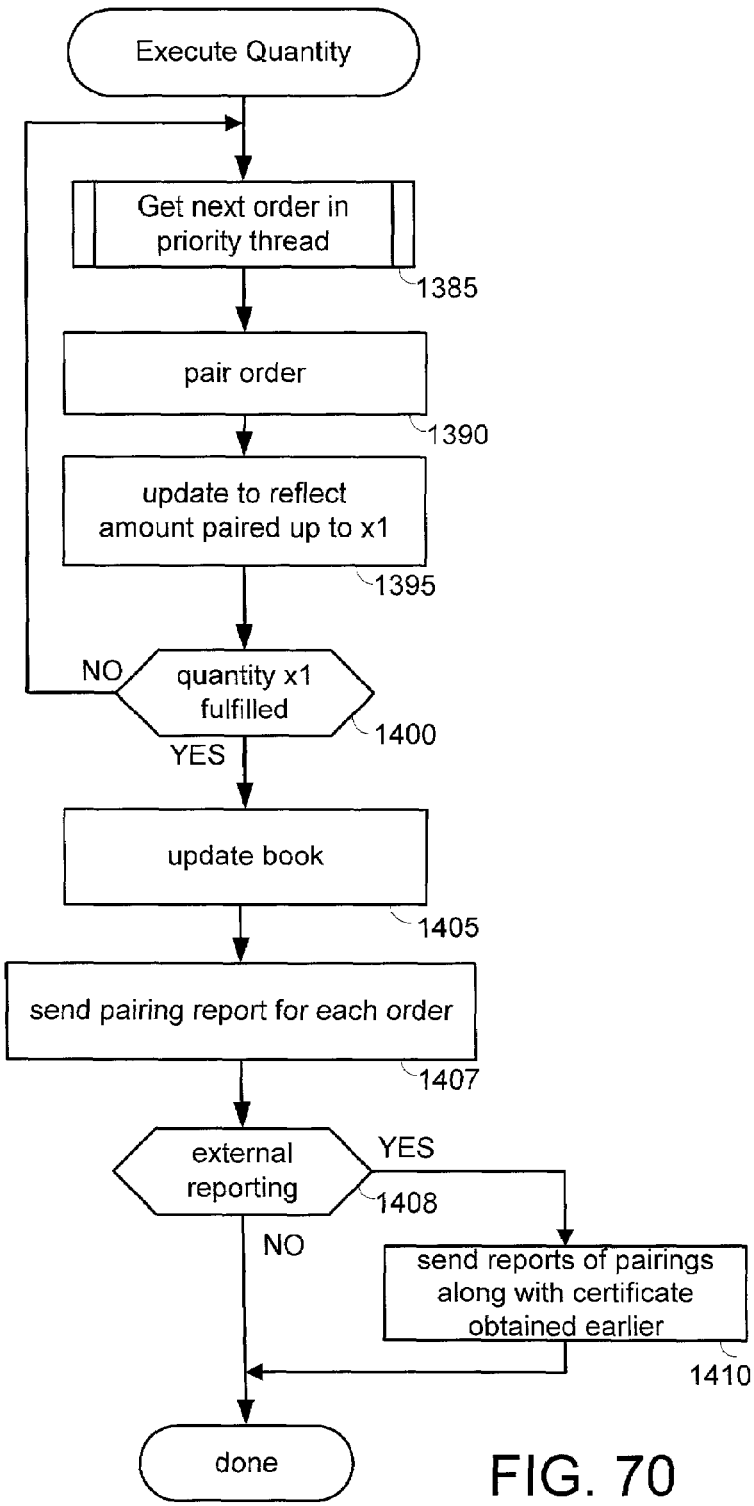

At step 1281, oU 30 invokes the execution logic shown in FIG. 70, for the affirmed quantity; crowd responses are assumed to be implicitly affirmed. At step 1282, oU 30 releases any unused affirmed quantity, and processing is complete. If the affirmed quantity is inadequate, oU 30 repeats the above-described processing until the active side order is filled (this logic is not shown for brevity).

Figure 71:
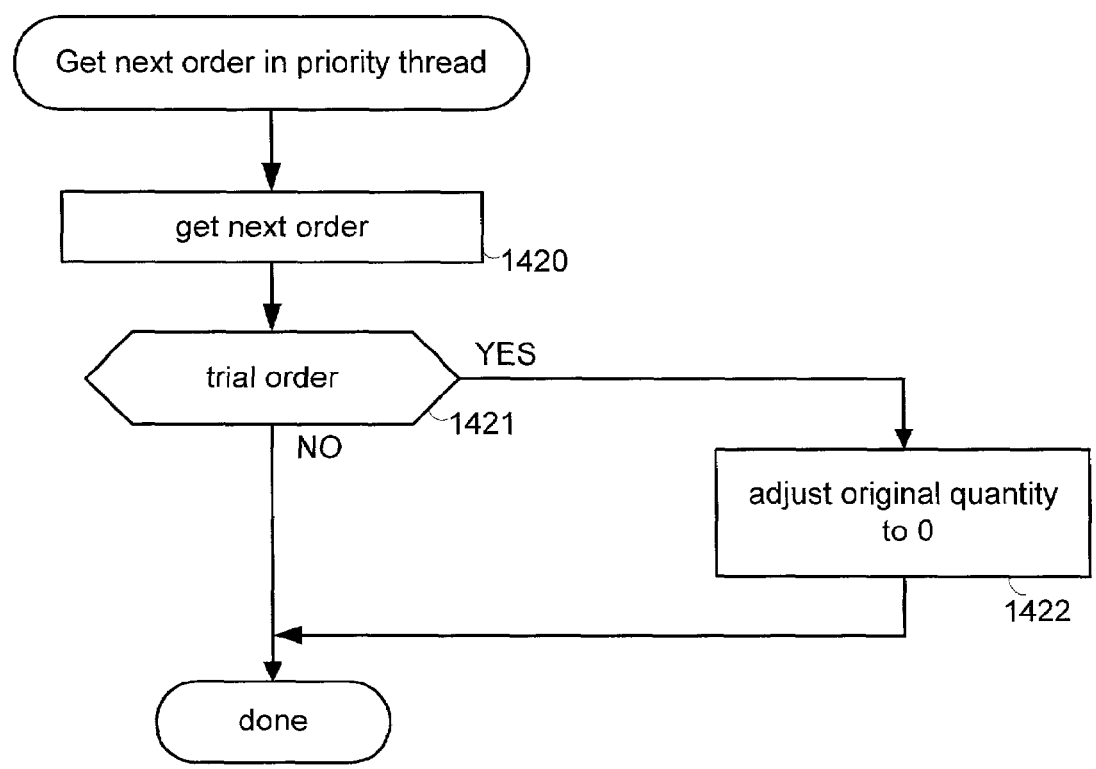

An example of attempt execution processing is provided after discussion of FIG. 71.

Figure 66:
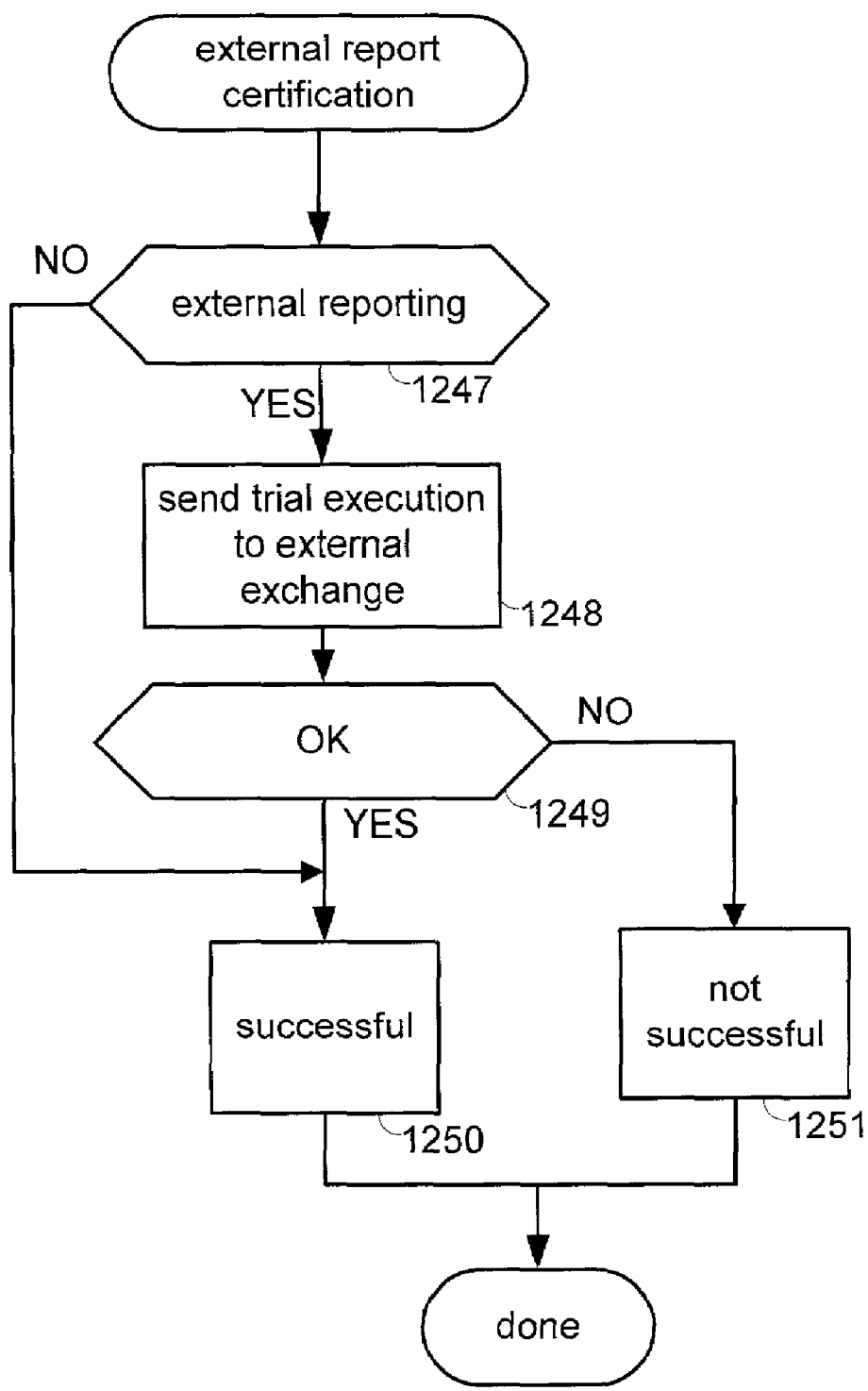

FIG. 66 is a flowchart showing external report certification processing. At step 1247, oU 30 checks whether external reporting is required. If so, then at step 1248, oU 30 sends a trial execution to the external point. At step 1249, oU 30 checks whether the trial execution was successful. If not, then at step 1251, oU 30 sets its result to not successful and processing is complete. If the trial execution was successful or if external reporting is not required, then at step 1250, oU 30 sets its result to successful and processing is complete.

FIG. 67 is a flowchart showing the processing logic for get best orders. At step 5605, oU 30 determines whether it is in fast symbol mode. It will be recalled that in fast symbol mode, passive-side oEs do not get a chance to affirm. If so, at step 5610, oU 30 sets its standby factor to zero (it will not need to obtain any standby quantity because no oEs can change the quantities to which they committed to oU 30). Otherwise, at step 5615, oU 30 sets its standby factor to the default parametric value. The standby factor is a function of the instrument and is set during order umpire set up to optimize the process. At step 5620, oU 30 sets s1, the quantity to take to x1 times one plus the standby factor. This quantity attempts to account for the quantity removed by the passive oEs when they are asked to affirm their orders. Now, at step 5625, oU 30 marks as in-process a quantity s1 at the umpire where the price is as good or better than x2, records orders in a temporary location, Reg-1, and updates Q1. In the process of obtaining orders from its book, if ELF filtering is on, oU 30 skips orders from incompatible ELFs. The test here is tripartite: (i) is the order priced appropriately, (ii) is the order not in-process at another umpire or in-process for another ELF, and (iii) is the order compatible with attribute filtering. Any order that passes these tests is a best order up to the quantity s1.

At step 5627, oU 30 checks whether in-process marking is required. During discovery, in-process marking is not required, while during execution, in-process marking is required. If in-process marking is required, at step 5630, oU 30 marks as in-process, in the book, all orders now in Reg-1 and proceeds to step 5635 where oU 30 identifies the standby orders as such. After in-process marking, or if in-process marking was not required, at step 5640, oU 30 sets Q1 to the total quantity of shares represented by the orders in Reg-1 and processing is complete.

It will be appreciated that the processing described in FIG. 67 has omitted some implementation details for simplicity. Specifically, oU 30 maintains a waiting queue for active side orders and an affirmation queue for passive side orders, for each of its buy and sell sides. When an active order arrives, passive side regular orders and passive side standby orders corresponding to the standby factor are identified. The active order is placed at the end of the waiting queue. The passive orders are placed at the end of the affirmation queue, and oU 30 asks the owners of the passive side orders for an affirmation that the quantity is still available. Time passes, and the affirmations eventually arrive, not necessarily in the order they were requested. When affirmations for all of the passive side orders for an active order arrive, then oU 30 tries to pair the active order with affirmed passive orders. If there is insufficient passive side quantity, then oU 30 uses the next passive side orders in the affirmation queue to satisfy the active order. If there is too much passive side quantity, then the standby is available for the next active order in the waiting queue. The result is that active orders are paired with passive orders according to a first come first served protocol. It will be appreciated that while a passive order is in the affirmation queue, a new incoming passive order may have a better price, but since it lacks time priority, the new order does not displace the enqueued order. When all active orders in the waiting queue have been paired, any quantity remaining in the affirmation queue is returned to the book. In some embodiments, separate queues are not maintained, and the priority of orders is otherwise reflected.

Figure 68:
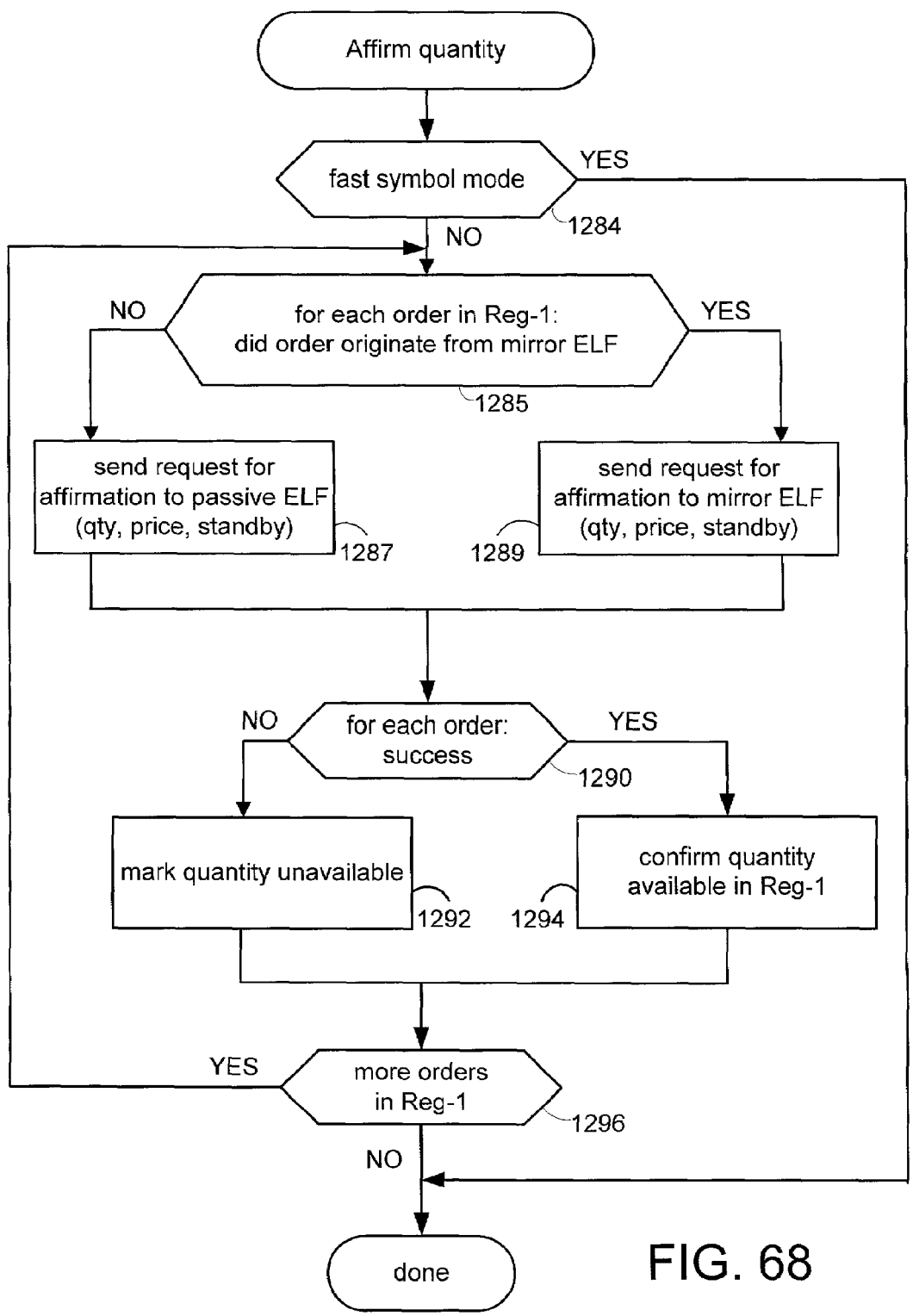

FIG. 68 is a flowchart showing affirm quantity processing. When asking an ELF to affirm a quantity previously given to an umpire, the ELF either affirms it, or returns a qualification, e.g., the quantity that is actually available (possibly none). At step 1284, oU 30 checks whether there is a fast symbol mode. If so, there is no affirmation process, so processing is complete. If there is no fast symbol mode, at step 1285, oU 30 identifies the origin of each order in Reg-1. If the order came from an order ELF, then at step 1287, oU 30 sends the quantity and price to each passive ELF from which affirmation is requested, along with how much of the order is a standby order and how much of the order is a regular order. If the order came from a mirror ELF, then at step 1289, oU 30 sends the quantity and price to each mirror ELF from which affirmation is requested, along with how much of the order is a standby order and how much of the order is a regular order.

At step 1290, oU 30 checks whether any answers were received that affirm availability of the requested quantity. If not, then at step 1292, oU 30 marks the quantity unavailable in Reg-1. If an affirming answer is received, at step 1294, oU 30 confirms the quantity as available in Reg-1. At step 1296, oU 30 checks whether there are any more orders in Reg-1. If so, processing returns to step 1285. When there are no more orders in Reg-1, processing is complete.

Figure 69:
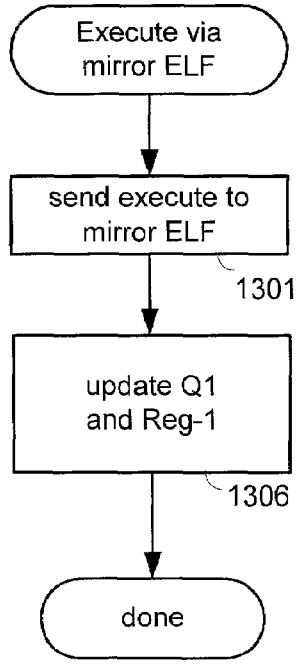

FIG. 69 is a flowchart showing execute via mirror ELF processing. At step 1301, oU 30 sends an execution to mirror ELF 50. If an answer is received in time, at step 1306, oU 30 updates Q1 and puts the executed quantity in Reg-1 and processing is complete.

FIG. 70 is a flowchart that shows execute quantity processing. At step 1385, oU 30 performs get next order in priority thread processing, shown in FIG. 71. At step 1390, oU 30 pairs the order returned from priority thread processing with the active side order attempting to execute, such that the total paired quantity does not exceed the quantity of the active side order. At step 1395, oU 30 updates Reg-1 to reflect the amount just paired. At step 1400 checks whether the full active side order quantity, x1, was filled. If not, processing returns to step 1385.

After the quantity is filled, at step 1405, oU 30 updates its book to reflect the activity that just occurred, including reducing the amount of each order in its book by the amount of that order paired at step 1390, removing orders from its book that have been reduced to zero quantity, and releasing holds on entries remaining in the book. An order can become a zero quantity order when its shares are paired, or, if it was a trial order, when its shares are adjusted to zero after it would have been paired, had it been a regular order.

At step 1407, oU 30 sends pairing reports. A pairing report indicates a quantity of shares paired, a price at which the pairing occurred, and enough detail about the contra-party in the pairing for subsequent post-trade processing. A pairing report may also include a pairing time, an identification of the oU that prepared the pairing report and/or a transaction identifier.

Generally, if an order has a pairing report for only 0 shares, such as a trial order, or if the order was affirmed but not paired, including regular and standby orders, oU 30 sends a pairing report for 0 shares to the owner of the order; however, if the order has multiple pairing reports, pairing reports for 0 shares are not sent. Each pairing report includes the number of shares released from in-process, which triggers the recipient order ELF into applying its pending action queue to the shares released from in-process. In some embodiments, the pairing report triggers oU 30 into applying its pending action queue.

At step 1408, oU 30 checks whether external reporting is required. If so, then at step 1410, oU 30 sends reports of pairings along with the earlier obtained certificate to the external points. The prior discussion of the terms "take," "pair," "report" and "execution" clarifies how a pairing becomes an execution. Processing is now complete.

FIG. 71 is a flowchart showing get next order in priority thread processing. At step 1420, oU 30 gets the next order from Reg-1. At step 1421, oU 30 checks whether this is a trial order.

If so, then at step 1422, oU 30 adjusts, in Reg-1, the original quantity of the trial order to zero, and processing is complete. If the order is not a trial order, then processing is complete.

An example of attempt execution processing will now be provided. Let it be assumed that the active side order is a market order to buy 800 shares, i.e., x1=800, and that oU 30 is a superbook umpire supporting trial executions.

Table 12A shows pertinent portions of Reg-1 after FIG. 65, step 1258, get best orders. In this example, the standby factor was 1.1. Accordingly, oU 30 needed to obtain at least s1=800*(1+1.1)=1680 shares. The amount obtained, Q1, is seen to be 2100 shares summed across the six best sell orders in the book.

TABLE 12A

| order ID | price | original qty. | af-firmed | after mirror ELF exec'n | after get next order | paired | total shares paired |
|---|---|---|---|---|---|---|---|
| AA | 17 | 400 | | | | | |
| BB | 17 | 200 | | | | | |
| CC-trial | 17 | 100 | | | | | |
| DD | 17 | 300 | | | | | |
| EE | 17.3 | 500 | | | | | |
| FF | 17.6 | 600 | | | | | |
| Q1 | | 2100 | | | | | |

Table 12B shows pertinent portions of Reg-1 after FIG. 65, step 1260, affirm quantity. In this example, order AA was affirmed for 0 shares, and only a portion of each of orders BB and EE was affirmed. The entirety of the other orders was affirmed. Accordingly, Q1 has been updated to 1500 shares.

TABLE 12B

| order ID | price | original qty. | af-firmed | after mirror ELF exec'n | after get next order | paired | total shares paired |
|---|---|---|---|---|---|---|---|
| AA | 17 | 400 | 0 | | | | |
| BB | 17 | 200 | 100 | | | | |
| CC-trial | 17 | 100 | 100 | | | | |
| DD | 17 | 300 | 300 | | | | |
| EE | 17.3 | 500 | 400 | | | | |
| FF | 17.6 | 600 | 600 | | | | |
| Q1 | | 2100 | 1500 | | | | |

Table 12C shows pertinent portions of Reg-1 after checking each order to see if a mirror ELF is involved. In this example, none of the orders had a mirror ELF involved. Table 12C also shows Reg-1 during processing of FIG. 65, step 1264C, specifically, after the second iteration of FIG. 70, get next order in priority thread. In this example, the 100 affirmed shares of order BB were paired with the active side order.

TABLE 12C

| order ID | price | original qty. | af-firmed | after mirror ELF exec'n | after get next order | paired | total shares paired |
|---|---|---|---|---|---|---|---|
| AA | 17 | 400 | 0 | 0 | 0 | 0 | 0 |
| BB | 17 | 200 | 100 | 100 | 100 | 100 | 100 |
| CC-trial | 17 | 100 | 100 | 100 | | | |
| DD | 17 | 300 | 300 | 300 | | | |
| EE | 17.3 | 500 | 400 | 400 | | | |
| FF | 17.6 | 600 | 600 | 600 | | | |
| Q1 | | 2100 | 1500 | 1500 | | | |

Table 12D shows pertinent portions of Reg-1 during subsequent processing of FIG. 65, step 1264C, specifically, after the third iteration of FIG. 70, get next order in priority thread. In this example, oU 30 detected that order CC was a trial order, set its original quantity in its book to 0 shares (also shown in the third column of Table 12D) and sent a pairing report for 0 shares to the order ELF that posted order CC.

TABLE 12D

| order ID | price | original qty. | af-firmed | after mirror ELF exec'n | after get next order | paired | total shares paired |
|---|---|---|---|---|---|---|---|
| AA | 17 | 400 | 0 | 0 | 0 | 0 | 0 |
| BB | 17 | 200 | 100 | 100 | 100 | 100 | 100 |
| CC-trial | 17 | 0 | 100 | 100 | 0 | 0 | 100 |
| DD | 17 | 300 | 300 | 300 | | | |
| EE | 17.3 | 500 | 400 | 400 | | | |
| FF | 17.6 | 600 | 600 | 600 | | | |
| Q1 | | 2100 | 1500 | 1500 | | | |

Table 12E shows pertinent portions of Reg-1 after pairing the orders at the best price of 17.3. Accordingly, oU 30 conducted a price improvement auction among its crowd of registered ELFs, got a response, indicated as order GG, for 100 shares at 17.2, and paired the crowd response with the active side order. So far, 500 shares of the 800 shares in the active side order have been paired.

TABLE 12E

| order ID | price | original qty. | af-firmed | after mirror ELF exec'n | after get next order | pair-ed | total shares paired |
|---|---|---|---|---|---|---|---|
| AA | 17 | 400 | 0 | 0 | 0 | 0 | 0 |
| BB | 17 | 200 | 100 | 100 | 100 | 100 | 100 |
| CC-trial | 17 | 0 | 100 | 100 | 0 | 0 | 100 |
| DD | 17 | 300 | 300 | 300 | 300 | 300 | 400 |
| GG-crowd | 17.2 | 100 | NA | NA | 100 | 100 | 500 |
| EE | 17.3 | 500 | 400 | 400 | | | |
| FF | 17.6 | 600 | 600 | 600 | | | |
| Q1 | | 2100 | 1500 | 1500 | | | |

Table 12F shows pertinent portions of Reg-1 during subsequent processing of FIG. 65. In this example, oU 30 again got order EE and noticed that the price had changed, from 17.2 to 17.3. Accordingly, oU 30 conducted a price improvement auction among its crowd of registered ELFs, but got no responses. So, order EE was returned as the next order. However, the quantity of order EE exceeded the quantity of the active side order, so only a portion of order EE was paired. At this point, all 800 shares in the active side order have been paired. At step 1405 of FIG. 70, the book is updated to reduce the quantity of order BB by 100 shares, remove orders CC and DD, and reduce the quantity of order EE by 300 shares. The holds and in-process indications for all orders, as adjusted, are released.

TABLE 12F

| order ID | price | original qty. | af-firmed | after mirror ELF exec'n | after get next order | pair-ed | total shares paired |
|---|---|---|---|---|---|---|---|
| AA | 17 | 400 | 0 | 0 | 0 | 0 | 0 |
| BB | 17 | 200 | 100 | 100 | 100 | 100 | 100 |
| CC-trial | 17 | 0 | 100 | 100 | 0 | 0 | 100 |
| DD | 17 | 300 | 300 | 300 | 300 | 300 | 400 |
| GG-crowd | 17.2 | 100 | NA | NA | 100 | 100 | 500 |
| EE | 17.3 | 500 | 400 | 400 | 400 | 300 | 800 |
| FF | 17.6 | 600 | 600 | 600 | | | |
| Q1 | | 2100 | 1500 | 1500 | | | |

Figure 72:
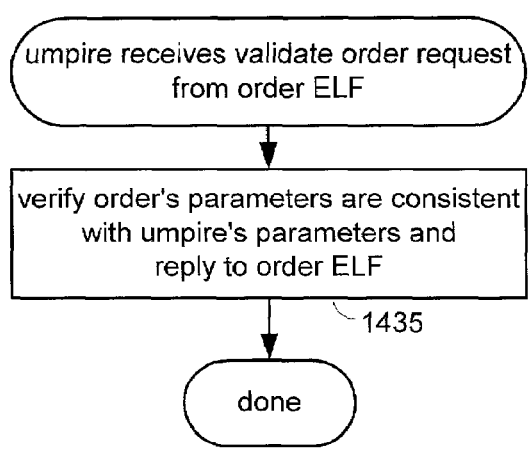

FIG. 72 is a flowchart showing how oU 30 responds to receiving a validate order request from an oE. At step 1435, oU 30 verifies that the order's parameters are consistent with its own parameters, replies to the requesting oE that the order is valid or invalid, and processing is complete.

FIG. 73 is a flowchart showing how oU 30 responds to receiving a market order. At step 1440, oU 30 sets x1 to the quantity, x2 as not applicable, and x3 as the minimum lot size. At step 1445, oU 30 performs attempt execution processing, shown in FIG. 65, and processing is complete.

FIG. 74 is a flowchart showing how oU 30 responds to receiving a "post to umpire" request from an order ELF, such as oE 10. At step 1500, oU 30 conditionally posts, that is, posts the order received from order ELF 10 to its book with a hold, using method-specific processing, if necessary. An example of method-specific processing for the BidPlus method is shown in FIG. 75. At step 1501, oU 30 checks whether the post was successful. If the post is not successful, at step 1502, oU 30 sends a reject back to oE 10 with an appropriate reason code. Reject processing is not described herein for brevity. Processing is complete.

If the post was successful, at step 1503', oU 30 checks whether there is a mirror ELF for this symbol. If not, processing proceeds to step 1505. If so, at step 1504, oU 30 checks if it is in fast mode for this symbol. If so, at step 1505, oU 30 performs a commit post, that is, enters the order in its book. Processing continues at step 1509. If the symbol involved in the order is not in fast mode at oU 30, then at step 1507, oU 30 sends a post response message to the mirror ELF. It is expected that the mirror ELF will respond to the post response message, and when the response arrives, at step 1508, oU 30 performs receive post response from mirror ELF processing, shown in FIG. 52. Processing continues at step 1509.

At step 1509, oU 30 sends the result, namely, the number of shares it posted, to oE 10.

At step 1510, oU 30 checks whether the post was successful, and if so, at step 1511, performs first look processing shown in FIG. 76 and processing is complete.

In some embodiments, the first look processing is integrated with the conditional posting and/or commit posting.

FIG. 75 is a flowchart showing BidPlus processing for posting to an umpire. At step 1610, oU 30 timestamps the order to indicate the time at which the order was posted. At step 1615, oU 30 converts liquidity curves into "aggressiveness," that is, the premium offered or demanded at the quantity posted relative to the market price. At step 1620, oU 30 sets the matchable size of this order to the posted size. At step 1625, oU 30 conditionally appends the order to its book. If the conditionally appended order is not confirmed within a predetermined time, then it will automatically be un-appended. Processing is complete.

FIG. 76 is a flowchart showing first look processing logic. At step 1630, oU 30 tests whether it provides the first look feature. If not, processing is complete. If oU 30 provides a first look feature, then at step 1635, oU 30 tests if the posted order improves the market. If not, then processing is complete. If the posted order improves the market, at step 1640, oU 30 records the current oE as providing the best market. At step 1645, oU 30 informs the contra best market provider of the new best market order. Since the contra best market provider is receiving this information in advance of the rest of the market, the contra best market provider has a first look at the new market. At step 1650, oU 30 sets a timer and, at step 1655, when the timer expires, oU 30 makes the new best market visible to all other oEs registered therewith.

FIG. 77 is a flowchart showing the logic for price proposal processing. At step 1657, oU 30 updates the order control table and forwards the proposal to the contra-side ELF.

FIG. 78 is a flowchart showing the logic for route order processing. At step 1659, oU 30 processes this order for any special instructions. An example of special instructions would cause the order to be forwarded, as is, to the mirror ELF. In this case, oU 30 is operating as an input station to the other side, which is in fast mode for the symbol specified in this order.

FIG. 79 is a flowchart showing how oU 30 responds to receiving a crowd registration request from an oE. At step 1660, oU 30 adds the oE to its registered crowd list shown in FIG. 36. Processing is now complete. It will be appreciated that only ELFs that have been accepted to register with this umpire in the first place may interact with it at all, including registering in the crowd.

FIG. 80 is a flowchart showing how oU 30 responds to receiving a crowd deregistration request from an oE. At step 1665, oU 30 removes the oE from its registered crowd list. Processing is now complete.

FIG. 81 is a flowchart showing how oU 30 responds to receiving a cancel order instruction from an order ELF, such as oE 10. At step 1670, oU 30 tries to find the order corresponding to the cancel from oE 10. If oU 30 cannot find the order, at step 1671, oU 30 sends a reject back to oE 10 with an appropriate reason code. Reject processing is not described herein for brevity.

If oU 30 finds the order indicated in the cancel message from oE 10, then at step 1672, oU 30 sets a parameter "A" to be the number of shares of the order that are available for immediate cancellation, and sets another parameter "B" to be the number of shares of the order that are in-process. For example, if the order is stored in oU 30's book and is not interacting with any contra-side orders, then all shares of the order are available. At step 1673, oU 30 conditionally cancels the lesser of "A," the available shares, and the number of shares specified in the cancel message from oE 10. At step 1674, oU 30 checks whether there is a mirror ELF for this symbol. If not, processing continues at step 1676. If there is a mirror ELF for this symbol, at step 1675, oU 30 tests whether the symbol of the order is in fast mode at oU 30. If so, oU 30 is not following a two phase order processing protocol, and at step 1676, oU 30 cancels the lesser of "A," the available shares, and the number of shares specified in the cancel message from oE 10. When oU 30 unconditionally cancels shares, oU 30 updates its order book to reduce the amount of the order by the cancelled shares. Processing continues at step 1681. If oU 30 is not in fast mode for this symbol, then at step 1678, oU 30 sends a cancel response message to mE 50. It is expected that mE 50 will respond to the cancel response message, and when the response arrives, at step 1679, oU 30 performs receive cancel response from mirror ELF processing, shown in FIG. 51. Processing continues at step 1681.

At step 1681, oU 30 returns a result to oE 10 comprising two numbers: A', the amount cancelled, and B', the amount in-process. oE 10 may now enqueue an action for the in-process amount B'. In other embodiments, the enqueueing is performed by oU 30. In other embodiments, there is an enqueueing mechanism managed by platform services 60.

FIG. 82 is a flowchart showing how oU 30 responds to receiving an auction request from an oE. At step 1710, oU 30 tells the oEs in its crowd that an auction is occurring. All crowd interaction is done under the in-process state, i.e., if an oE in the crowd bids during and if the order is paired, the oE will not be given a chance to affirm its order prior to the pairing or to cancel. At step 1720, oU 30 checks whether any of the oEs in its crowd have responded. If there were no responses from the crowd, at step 1725, oU 30 advises the oE that requested the auction of the absence of responses. If there were response(s) from the crowd, at step 1730, oU 30 returns the responses to the order ELF that requested the auction. The bidding ELFs are notified of the outcome and the auction request processing is now complete.

FIG. 83 is a flowchart showing stop request processing. At step 1310, oU 30 checks whether it permits stops and whether other appropriate conditions are satisfied. If not, at step 1315, oU 30 tells the requesting order ELF that the stop is denied. If oU 30 permits stops and other appropriate conditions exist, then at step 1317, oU 30 asks platform services 60 to create an instance of stop order manager 67 to measure the expiration time for the stop order, and at step 1319, oU 30 sequesters the requested quantity. In the case of a buy, sequestering means holding the shares so no one else can buy them; in the case of a sell, sequestering means allocating purchasing power so it will not be used elsewhere. Generally, shares are sequestered from a dealer's inventory so the dealer bears the risk of price movement. However, if a customer's shares are sequestered, then the dealer generally compensates the customer for an adverse execution price. In some embodiments, a customer (order room) designates whether its order can be sequestered for a contra-party's stop when the customer posts the order. At step 1320, oU 30 tells the requesting order ELF that the stop is granted. Processing is now complete.

FIG. 84 is a flowchart showing how oU 30 responds to traffic received from platform services 60. At step 1735, oU 30 classifies the message received from platform services 60.

If the message is a status inquiry, then at step 1740, oU 30 responds to the status inquiry, and processing is complete.

If the message is a notice from platform services 60, specifically from linked order execution manager 61, that a pairing occurred, then at step 1745, oU 30 invokes stop exercise processing logic shown in FIG. 64B. Processing is complete.

If the message is a notice that a stop expired, then at step 1765, oU 30 releases the shares sequestered for the stop, if they are still sequestered, and processing is complete.

If oU 30 is in fast symbol mode, then oU 30 will reject most types of messages from platform services. At step 1770, oU 30 returns a reject to platform services 60, and processing is complete.

Figure 85:
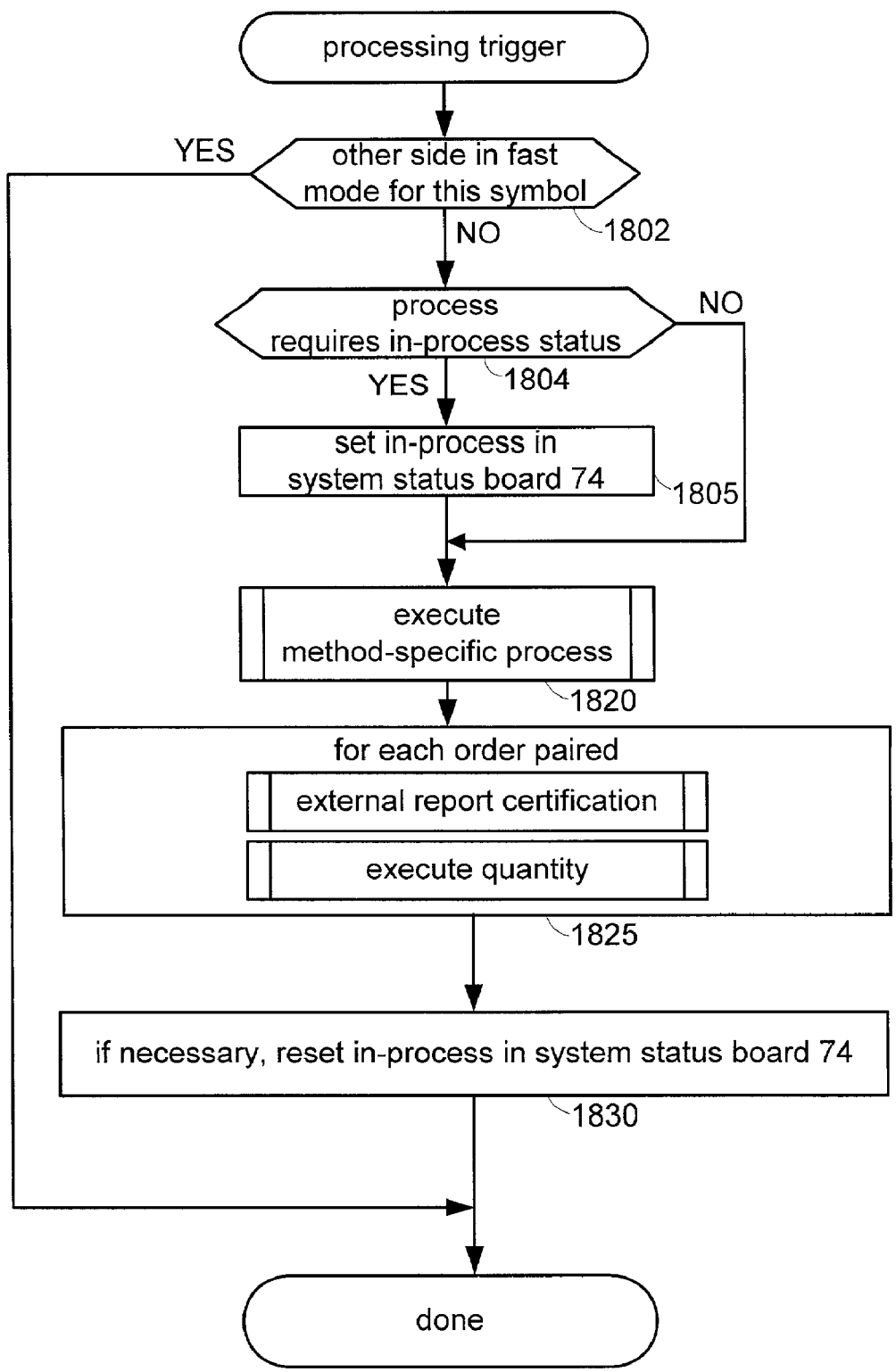

FIG. 85 is a flowchart showing how oU 30 responds to receiving a processing trigger. All umpire methods follow this pattern. First, at step 1802, oU 30 tests if the other side is in fast mode for the symbol involved and, if so, skips all further processing and exits this logic. Otherwise, at step 1804, oU 30 tests whether this process requires an in-process state. If so, oU 30 continues at step 1805. Otherwise, oU 30 resumes at step 1820. At step 1805, oU 30 sets the in-process state in system status board 74. At step 1820, oU 30 invokes method-specific execution processing. Examples of method-specific execution processing are provided in FIGS. 86, 87 and 88. At step 1825, for each order paired, oU 30 performs external report certification processing, shown in FIG. 66, and performs execute quantity processing, shown in FIG. 70. At step 1830, if the process required an in-process state, oU 30 resets the in-process status in system status board 74.

Figure 86:
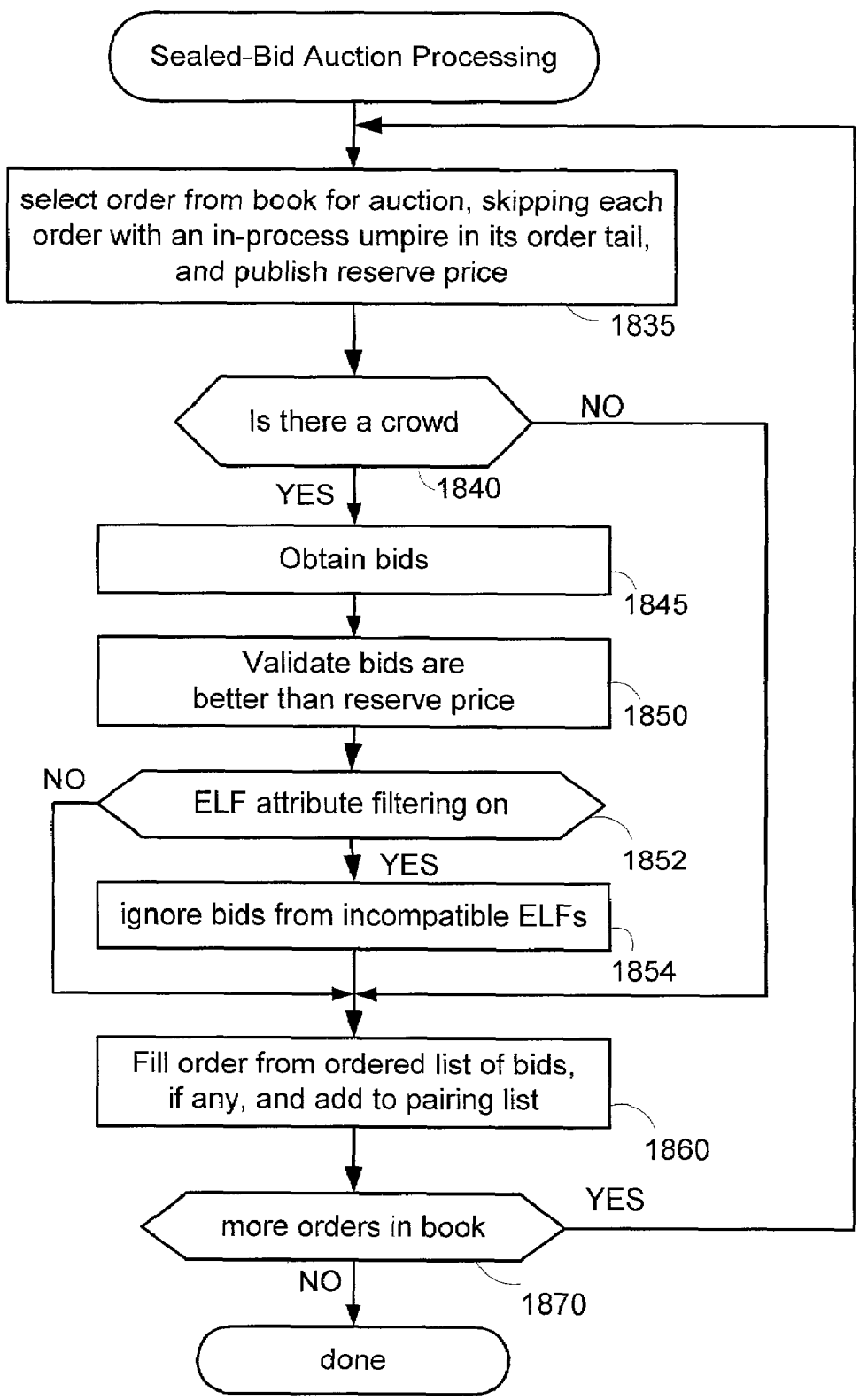

FIG. 86 is a flowchart of sealed-bid auction processing by oU 30. Sealed-bid auction processing is a forced take situation. Generally, an active side oE will have requested an auction from oU 30. At step 1835, oU 30 selects an order from the book for auction, skipping each order with at least one umpire in its order tail that was in-process before this umpire started, and publishes the reserve price. At step 1840, oU 30 checks whether there is a crowd registered therewith. If there is no crowd, then processing proceeds to step 1860. If there is a crowd, then at step 1845, oU 30 obtains bids from the crowd for the active side order, using the published reserve (or upset) price. At step 1850, oU 30 validates that the bids from the crowd, if any, are better than the reserve price, and passes only bids that improve the reserve price to step 1852. If ELF filtering is on, at step 1852, oU 30 checks if the bids are from ELFs incompatible with the one whose order is up for auction and ignores them if so.

After the best price has been discovered as described above, at step 1860, if there were any bids, oU 30 fills the order. At step 1870, oU 30 checks whether there are more orders in its book. If so, processing returns to step 1835. If not, sealed-bid auction processing is complete.

Figure 87:
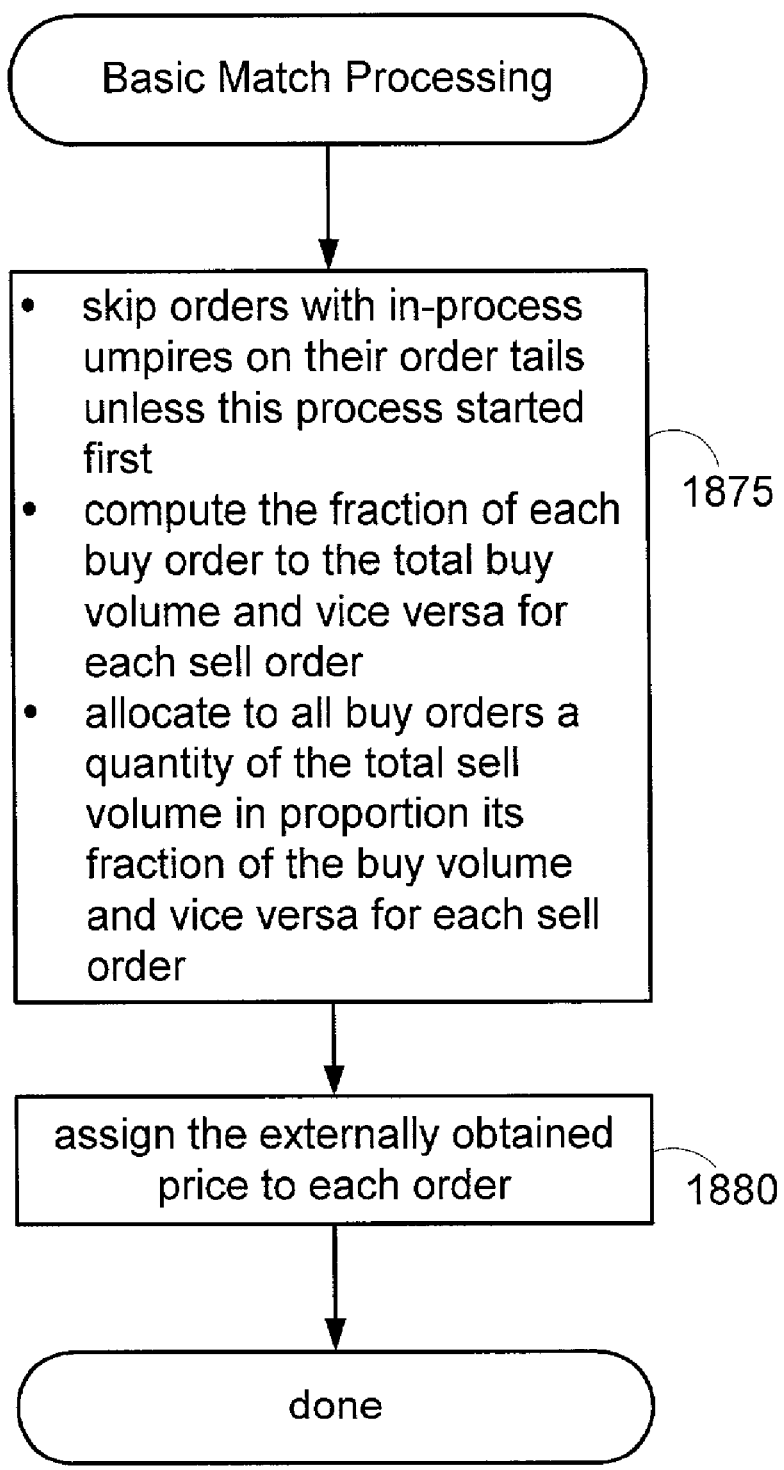

FIG. 87 is a flowchart of match processing by oU 30. Match processing is a forced situation. At step 1875, oU 30 skips orders with umpires in their respective order tails that were in-process before this umpire started. Then oU 30 computes the fraction of each buy order to the total buy volume and vice versa for each sell order. Then oU 30 allocates to all buy orders a quantity of the total sell volume in proportion its fraction of the buy volume and vice versa for each sell order. At step 1880, oU 30 prices each order by assigning the externally obtained price to each order. oU 30 then exits.

In other embodiments, instead of proportionally allocating the imbalance, oU 30 may favor certain orders, such as the oldest orders, and so on. Other allocation and pricing schemes will readily be apparent.

Figure 88:
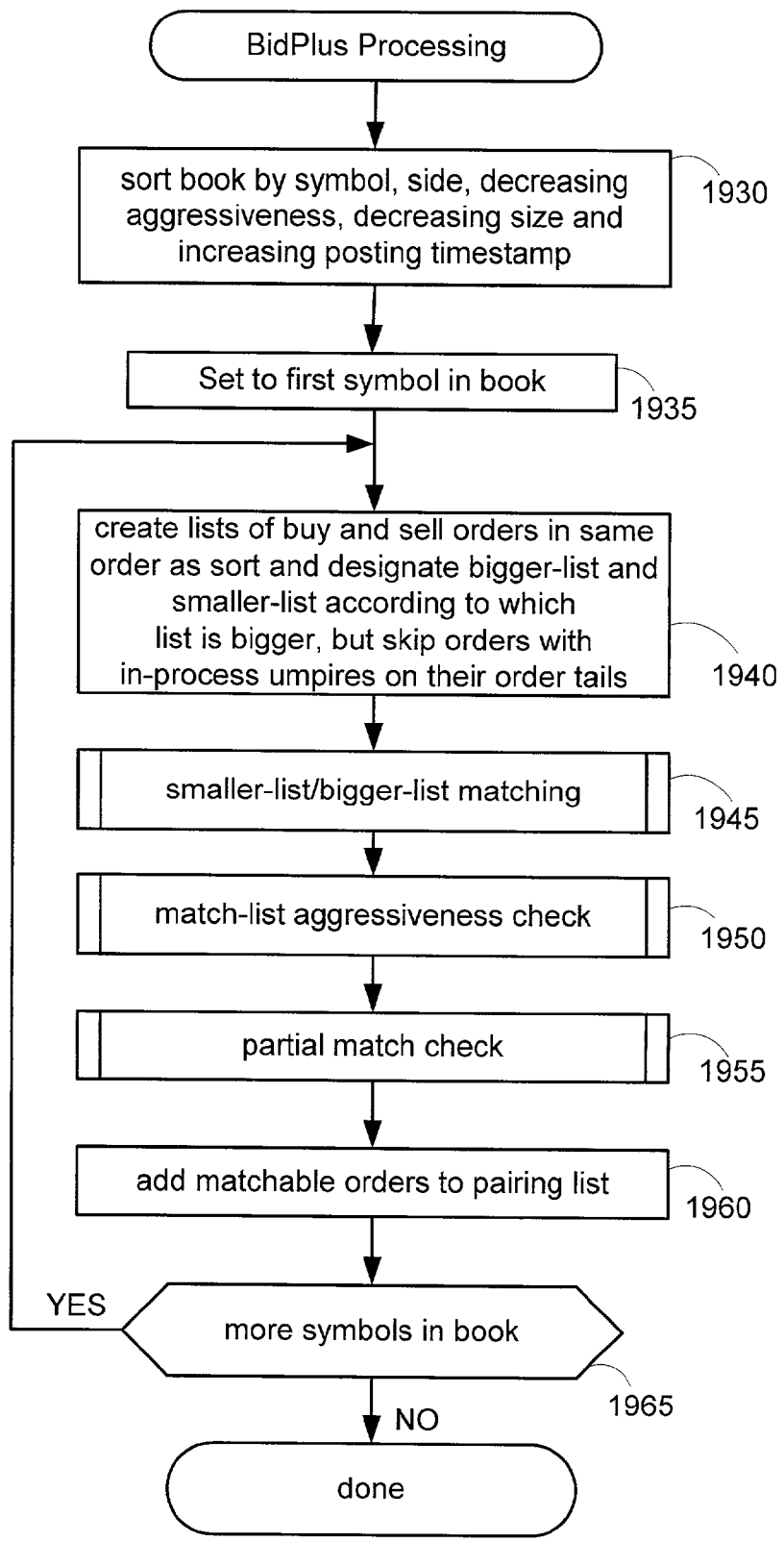

FIG. 88 is a flowchart showing BidPlus processing. A result of BidPlus processing is to reward a party that takes the most market risk. Generally, each order is associated with a liquidity curve selected from a set of predefined liquidity curves. A liquidity curve plots shares on the abscissa (x-axis) versus premium relative to the current market price on the ordinate (y-axis). In some embodiments, user-supplied liquidity curves are accepted. The current premium for an order is also referred to as the "aggressiveness" of the order. If the aggressiveness is a positive value, then the order is offering a premium relative to the market. If the aggressiveness is a negative value, then the order is demanding a premium relative to the market.

At step 1930, oU 30 sorts its book by symbol, side, decreasing aggressiveness, decreasing size and increasing posting timestamp. At step 1935, oU 30 goes to the first symbol in its newly sorted book. At step 1940, oU 30 creates lists of buy and sell orders in the same order as the sort, skipping orders that are have in-process umpires in their respective order tails, and sets the list with the greatest total quantity to be bought or sold to be the bigger-list and the list with the lesser total quantity to be bought or sold to be the smaller-list. At step 1945, oU 30 invokes smaller-list/bigger-list match processing, shown in FIG. 89. At step 1950, oU 30 invokes match list aggressiveness processing, shown in FIG. 90. At step 1955, oU 30 invokes partial match check processing, shown in FIG. 91. At step 1960, oU 30 adds the matchable orders to its pairing list. At step 1965, oU 30 checks whether there are more symbols in its book; if so, processing returns to step 1940, and if not, processing is complete.

FIG. 89 is a flowchart showing smaller-list/bigger-list match processing. At step 1970, oU 30 initializes to the first order in the smaller-list. At step 1975, oU 30 pairs each order, or order fragment from the smaller-list, with the next order, or order fragment, from the bigger-list. At step 1980, oU 30 appends each pair thus created to its match list. At step 1985, oU 30 checks whether there are more orders in the smaller-list; if so, processing returns to step 1970, and if not, processing is complete.

Figure 90:
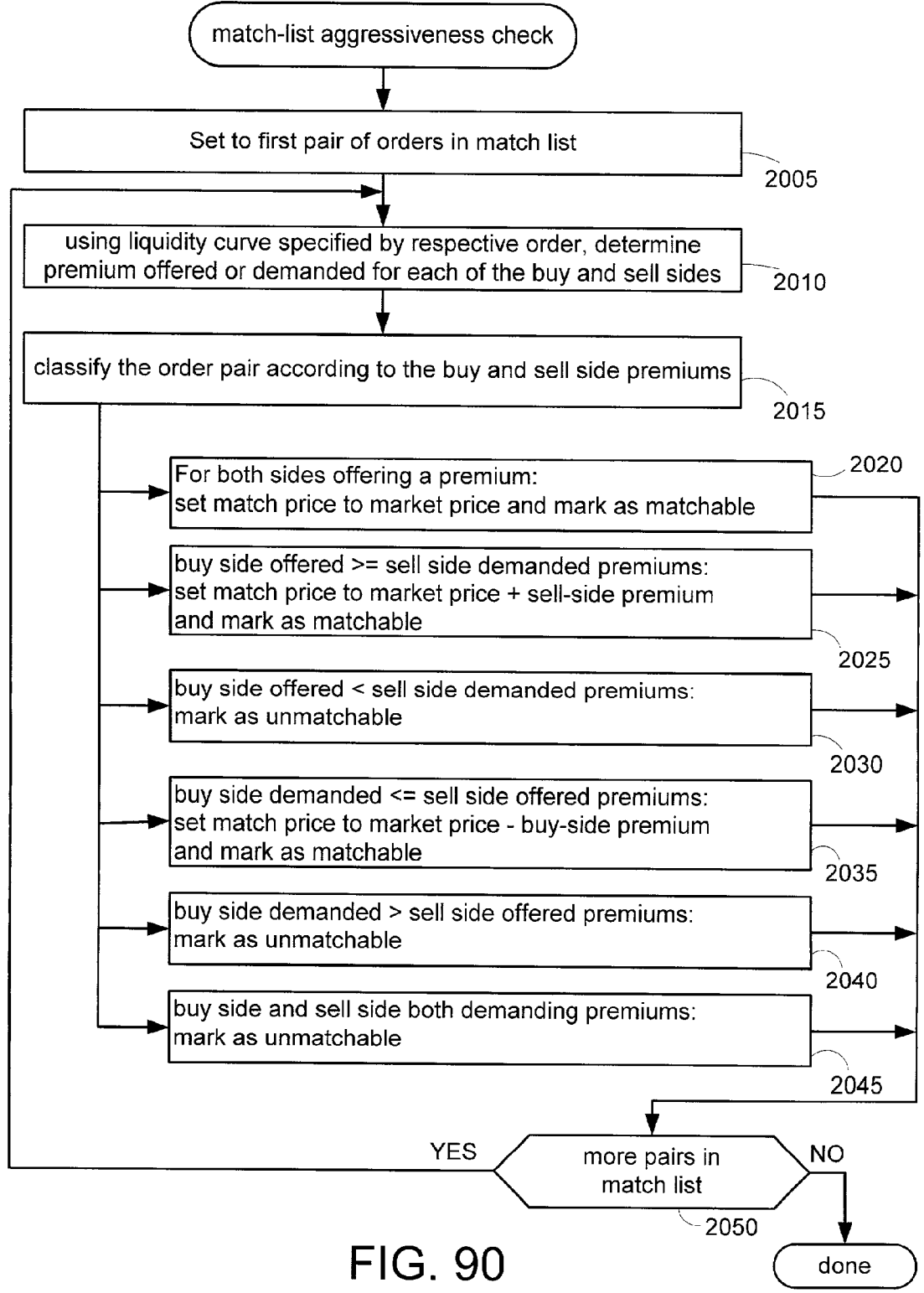

FIG. 90 is a flowchart showing match list aggressiveness processing. At step 2005, oU 30 initializes to the first pair of orders in its match list. At step 2010, using the liquidity curve specified by the respective order, and its matchable size, oU 30 determines the premium offered or demanded for each of the buy and sell sides. At step 2015, oU 30 classifies the order pair according to the buy and sell side premiums.

If the classification is that both sides are offering a premium, then at step 2020, oU 30 sets the match price to the market price, and marks the order pair as matchable.

If the classification is that the premium offered by the buy side is at least as large as the premium demanded by the sell side, then at step 2025, oU 30 sets the match price to the market price plus the sell side premium, and marks the order pair as matchable.

If the classification is that the premium offered by the buy side is less than the premium demanded by the sell side, then at step 2030, oU 30 marks the order pair as unmatchable.

If the classification is that the premium demanded by the buy side is smaller than or equal to the premium offered by the sell side, then at step 2035, oU 30 sets the match price to the market price less the buy side premium, and marks the order pair as matchable.

If the classification is that the premium demanded by the buy side is greater than the premium offered by the sell side, then at step 2040, oU 30 marks the order pair as unmatchable.

If the classification is that the buy side and the sell side are both demanding premiums, then at step 2045, oU 30 marks the order pair as unmatchable.

At step 2050, oU 30 checks whether there are more pairs in its match list; if so, processing returns to step 2010, and if not, processing is complete.

Figure 91:
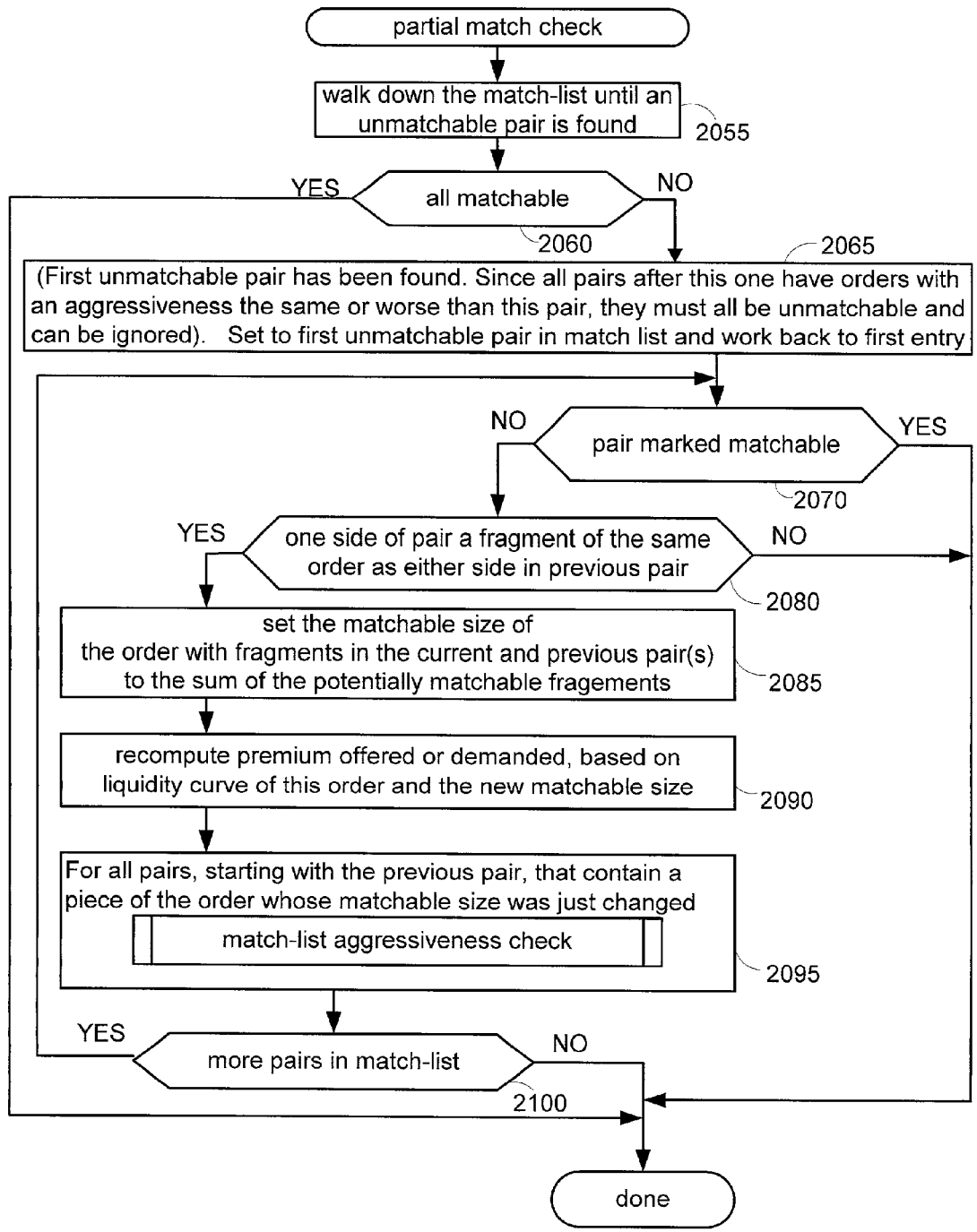

FIG. 91 is a flowchart showing partial match check processing. At step 2055, oU 30 examines the pairs on its match list until an unmatchable pair is found. At step 2060, oU 30 checks whether all pairs are matchable. If so, then processing is complete. If at least one unmatchable pair exists, then at step 2065, oU 30 initializes to the first unmatchable pair. At step 2070, oU 30 checks whether any pair is marked matchable. If so, then processing is complete. If there is a pair marked unmatchable, then at step 2080, oU 30 checks whether one side of the pair is a fragment of the same order as either side in the previous pair. If not, then processing is complete. If the test at step 2080 is positive, then at step 2085, oU 30 sets the matchable size of the order with fragments in the current and previous pair(s) to the sum of the potentially matchable fragments. At step 2090, oU 30 recomputes the premium offered or demanded based on the liquidity curve of this order and the new matchable size. At step 2095, oU 30 performs, for all pairs, starting with the previous pair, that contain a piece of the order whose matchable size was just changed, match list aggressiveness processing as shown in FIG. 90. At step 2100, oU 30 checks whether there are more pairs in its match list; if so, processing returns to step 2070, and if not, processing is complete.

An example of BidPlus processing is now provided.

(1) At the beginning of the match cycle the Umpire's book is as shown in Table 13A.

TABLE 13A

| Side | Size | Matchable Size | Symbol | Curve # | Time-stamp | Aggres-siveness | Order # |
|---|---|---|---|---|---|---|---|
| B | 2000 | 2000 | XXX | 4 | 1 | −1 | 101 |
| B | 1000 | 1000 | XXX | 5 | 2 | −2 | 102 |
| S | 1200 | 1200 | XXX | 4 | 3 | 1 | 103 |
| S | 500 | 500 | XXX | 5 | 4 | 2 | 104 |
| S | 700 | 700 | XXX | 6 | 5 | 3 | 105 |
| B | 1000 | 1000 | XXX | 1 | 6 | 3 | 106 |
| S | 1000 | 1000 | XXX | 3 | 7 | −1 | 107 |

(2) After sorting the Umpire's book by symbol, side, decreasing aggressiveness, decreasing size, increasing timestamp, the Umpire's book is as shown in Table 13B.

TABLE 13B

| Side | Size | Matchable Size | Symbol | Curve # | Time-stamp | Aggres-siveness | Order # |
|---|---|---|---|---|---|---|---|
| B | 1000 | 1000 | XXX | 1 | 6 | 3 | 106 |
| B | 2000 | 2000 | XXX | 4 | 1 | -1 | 101 |
| B | 1000 | 1000 | XXX | 5 | 2 | -2 | 102 |
| S | 700 | 700 | XXX | 6 | 5 | 3 | 105 |
| S | 500 | 500 | XXX | 5 | 4 | 2 | 104 |
| S | 1200 | 1200 | XXX | 4 | 3 | 1 | 103 |
| S | 1000 | 1000 | XXX | 3 | 7 | -1 | 107 |

(3) The "smaller-list," all orders in the book with the symbol being processed with the smaller total size, is as shown in Table 13C.

TABLE 13C

| Side | Size | Matchable Size | Symbol | Curve # | Time-stamp | Aggres-siveness | Order # |
|---|---|---|---|---|---|---|---|
| S | 700 | 700 | XXX | 6 | 5 | 3 | 105 |
| S | 500 | 500 | XXX | 5 | 4 | 2 | 104 |
| S | 1200 | 1200 | XXX | 4 | 3 | 1 | 103 |
| S | 1000 | 1000 | XXX | 3 | 7 | -1 | 107 |

(4) The "bigger-list," all orders in the book with the symbol being processed with the larger total size, is as shown in Table 13D.

TABLE 13D

| Side | Size | Matchable Size | Symbol | Curve # | Time-stamp | Aggres-siveness | Order # |
|---|---|---|---|---|---|---|---|
| B | 1000 | 1000 | XXX | 1 | 6 | 3 | 106 |
| B | 2000 | 2000 | XXX | 4 | 1 | -1 | 101 |
| B | 1000 | 1000 | XXX | 5 | 2 | -2 | 102 |

(5) The match-list showing the orders from the smaller-list matched with orders from the bigger-list is as shown in Table 13E. The "matchable" status and price of each pair have been set using the "match-list aggressiveness check."

TABLE 13E

| Row # | Order A | Order B | Size | Price | Matchable |
|---|---|---|---|---|---|
| 1 | 105 | 106 | 700 | Market | Yes |
| 2 | 104 | 106 | 300 | Market | Yes |
| 3 | 104 | 101 | 200 | Market-1 | Yes |
| 4 | 103 | 101 | 1200 | Market-1 | Yes |
| 5 | 107 | 101 | 600 | — | No |
| 6 | 107 | 102 | 400 | — | No |

(6) Partial Match Check—The first unmatchable row, 5, is found. Since row 5 is unmatchable, and contains part of order 101, the matchable size of order 101 must be reduced from 2000 to 1400, as shown in Table 13F.

TABLE 13F

| Row # | Order A | Order B | Size | Price | Matchable |
|---|---|---|---|---|---|
| 1 | 105 | 106 | 700 | Market | Yes |
| 2 | 104 | 106 | 300 | Market | Yes |
| 3 | 104 | 101 | 200 | Market-1 | Yes |
| 4 | 103 | 101 | 1200 | Market-1 | Yes |
| 5 | 107 | 101 | 600 | — | No |
| 6 | 107 | 102 | 400 | — | No |

(7) The "match-list aggressiveness check" must be performed on rows 3 and 4 since the matchable size of order 101 changed. Due to change in matchable size of order 101, its aggressiveness changed. Row number 4 is now unmatchable. Since row 4 is unmatchable, the match list aggressiveness check must be performed again on row 3 because the matchable size of order 101 has changed. Row number 3 is still matchable, but at a different price since order 104 was offering a large enough premium to match with order 101's new aggressiveness. See Table 13G.

TABLE 13G

| Row # | Order A | Order B | Size | Price | Matchable |
|---|---|---|---|---|---|
| 1 | 105 | 106 | 700 | Market | Yes |
| 2 | 104 | 106 | 300 | Market | Yes |
| 3 | 104 | 101 | 200 | Market-2 | Yes |
| 4 | 103 | 101 | 1200 | — | No |
| 5 | 107 | 101 | 600 | — | No |
| 6 | 107 | 102 | 400 | — | No |

Table 13H shows how a price is set for a pairing based on the premiums offered or demanded by the orders involved in the pairing. Pairings are marked as unmatchable when the premiums indicate lack of a mutually acceptable price.

TABLE 13H

| | BUY | | |
|---|---|---|---|
| SELL | offer premium | demand premium $\leq$ | $>$ |
| offer premium | mkt | mkt − buy | unmatchable |
| demand premium $\leq$ $>$ | mkt + sell unmatchable | | unmatchable |

Figure 92:
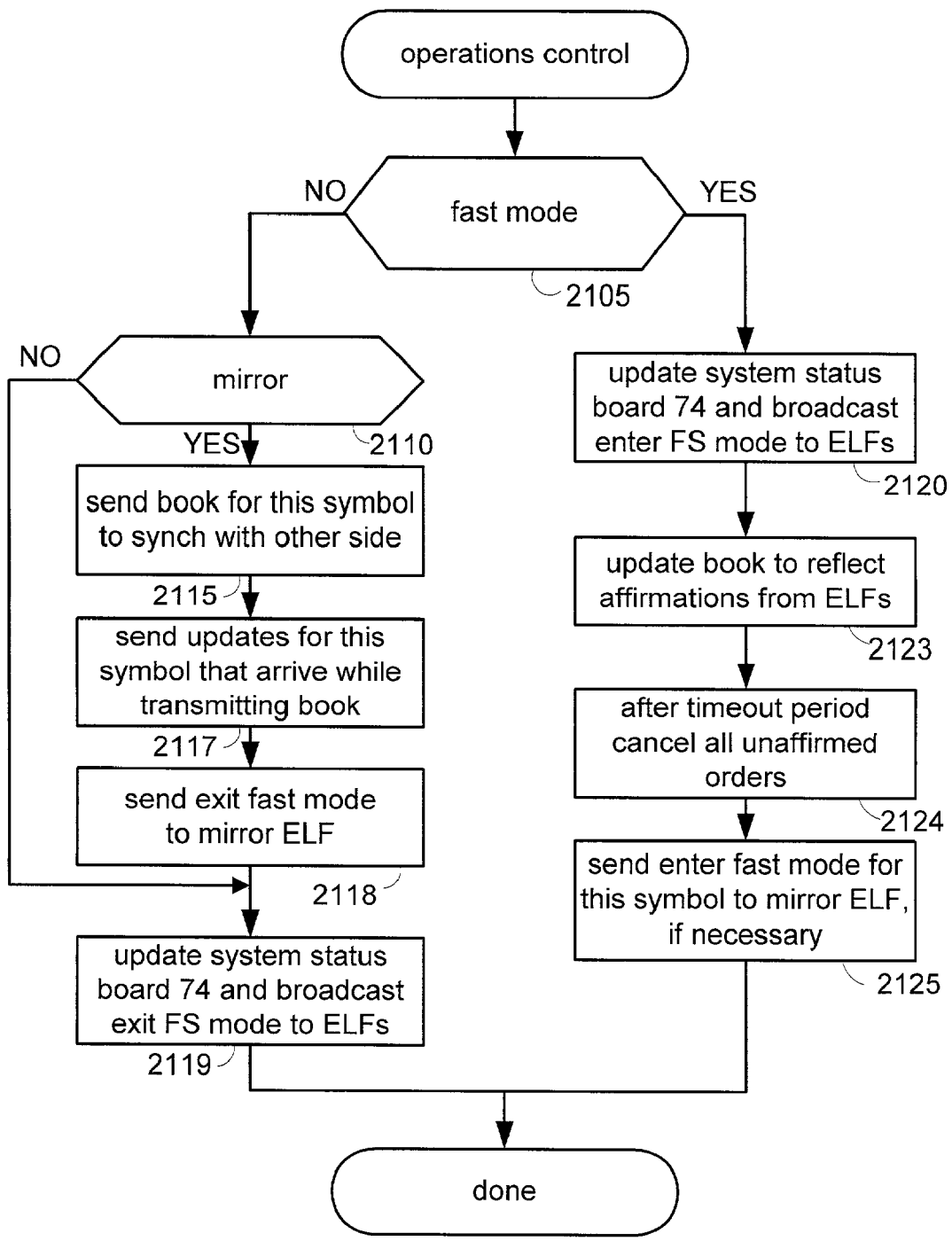

FIG. 92 is a flowchart showing operations control processing. Generally, oU 30 determines whether a fast symbol condition exists, sets the internal flag according to whether the condition has been detected, and informs all interested parties by broadcasting that fact as a parameter change. A fast symbol condition may be detected when certain queue lengths become greater than some threshold value.

At step 2105, oU 30 determines whether a fast symbol condition exists. If not, then at step 2110, oU 30 determines if there is a mirror ELF. If there is a mirror ELF, then at step 2115, oU 30 sends the book for this symbol to synch with the other side. At step 2117, oU 30 sends updates for this symbol that arrive while transmitting the book to the other side. At step 2118, oU 30 sends an exit fast mode message to the mirror ELF. At step 2119, oU 30 updates system status board 74 and broadcasts, as a parameter change, the fact that the fast symbol mode has been canceled. If, at step 2110, there was no mirror ELF, then oU 30 proceeds directly to step 2119. After step 2119, operations control processing is complete.

If, at step 2105, the fast symbol condition was determined to exist, then at step 2120, oU 30 updates system status board 74 and broadcasts an enter fast symbol mode notification. At step 2123, oU 30 updates its book to reflect affirmations to the fast symbol mode from order ELFs. At step 2124, at the duration of the predetermined time for an order ELF to assent to fast symbol mode, oU 30 cancels all unaffirmed orders. At step 2125, oU 30 sends an enter fast symbol message to the mirror ELF, if necessary. Processing is now complete.

Use Cases

Use Case

Representation of Order in Multiple Markets While Preventing Duplicate Executions FIGS. 93A-93C show oE 10 sending its market order to oU 30 and getting a pairing report therefore (FIG. 93A), and the contra-side in which oU 30 receives a limit order from oE 12 and pairs oE 12's limit order with oE 10's market order (FIG. 93B). Meanwhile, oE 12's order is also represented at oU 31, and even though oU 31 is simultaneously trying to pair shares of oE 12's order that were just paired with oE 10's market order, a duplicate execution is prevented (FIG. 93C).

FIG. 93A shows the general processing flow for an exemplary market order originating at order room 70.

First, oE 10 receives the market order from order room 70 and decides to send it to oU 30.

At step 4000, oE 10 receives the market order from order room 70 and processes the newly received order. More specifically, at FIG. 21, step 405, the incoming order is received and classified. At step 410, order room processing in FIG. 22 is invoked. In FIG. 22, at step 430, the order is classified and at step 435, order-type traffic processing in FIG. 23 is invoked. In FIG. 23, at step 454, it is determined that the order is not an inquiry or a cancel, and so at step 455, new order reception processing occurs and at step 470, order processing shown in FIG. 24 is invoked.

At step 4005, oE 10 conducts discovery for the market order. More specifically, at FIG. 24, step 505, oE 10 determines that since this is a market order, no discovery is required, and proceeds to step 535 to build an action list, invoking the logic shown in FIG. 27.

At step 4010, oE 10 builds an action list for the market order. More specifically, at FIG. 27, step 655, oE 10 determines that this order is not under direct trader control, and at step 655, that this is not a linked order. At step 685, no values are obtained from evaluation umpires and the price response table is empty. At step 690, oE 10 creates an action list using decision engine 100 processing shown in FIG. 25. The action list indicates that the market order should be posted to oU 30. At step 692, an order tail for the order is created, indicating that the order is represented at oU 30. oE 10 returns to FIG. 24 at step 540 and enters this market order in its order control table, recording that is has not yet been sent anywhere.

At step 4015, oE 10 takes action, namely, posting the market order to oU 30. More specifically, at FIG. 24, step 545, oE 10 invokes transmit actions to umpires logic, shown in FIG. 28. At FIG. 28, step 710, oE 10 posts the market order to oU 30, its umpire of choice, and at step 715, updates its order control table to record that the order is at oU 30.

Next, oU 30 receives the active side market order and pairs it against passive side contra-orders in its book. For this example, let it be assumed that there is one order in the book.

How the passive side limit order got into the book will now be discussed. Turning to FIG. 93B, at step 4200, oE 12 received a limit order from order room 72 and processed the limit order. The limit order is of the form, "SELL 1900 SHARES OF SYMBOL QXF AT A PRICE OF $16 OR BETTER." Specifically, oE 12 is operative according to FIG. 21 to invoke the logic shown in FIG. 22 when the limit order arrives. At step 430 of FIG. 22, this instance of order room traffic is classified as order-type traffic, and the logic shown in FIG. 23 is invoked. At step 454 of FIG. 23, this order is determined to not be an inquiry or cancel, so at step 455, new order reception processing is performed, and at step 470, the order processing logic of FIG. 25 is invoked.

At step 4205 of FIG. 93B, oE 12 performs discovery for the limit order. More specifically, at step 505 of FIG. 24, the order's discovery requirements are classified. For this example, assume that order room 72 has specified no discovery, and so processing proceeds to step 535. Discovery is illustrated in a subsequent use case, below.

At step 4210 of FIG. 93B, oE 12 builds an action list for the limit order. Specifically, at step 535 of FIG. 24, oE 12 invokes the logic shown in FIG. 27. Assume that the order is not under direct trader control, is not part of a linked order, and no values are required from evaluation umpires. At step 690 of FIG. 27, oE 12 creates an action list using decision engine 100. The price response table is empty, so a rule from the decision table is invoked, saying that:

if (the order is a limit order for QXF symbol)
    then (post the order to oUs 30 and 31)

At step 692, oE 12 creates an order tail for the limit order, indicating the order is at oUs 30 and 31, and appends the order tail to the limit order.

At step 4215 of FIG. 93B, oE 12 posts the limit order to oUs 30 and 31. FIG. 93B depicts the posting to oU 30, specifically, at step 545 of FIG. 24, oE 12 carries out the actions in its action list. FIG. 93C depicts the posting to oU 31 at step 4300.

At step 4100 of FIG. 93B, oU 30 receives the limit order from oE 12. Specifically, oU 30 is operative according to FIG. 46, and at step 1025 classifies the received message from oE 12 as order ELF traffic, and at step 1040, invokes the logic shown in FIG. 59. At step 1206 of FIG. 59, oE 12 invokes the post processing logic shown in FIG. 74.

At step 4105, oU 30 posts the limit order to its order book. More specifically, at step 1500 of FIG. 74, oU 30 conditionally posts the order to its book, then since there is no mirror ELF, at step 1505, commits the post. At this point, oU 30 represents the order from oE 12 as shown in Table 14A, oE 12 represents the order internally as shown in Table 15A and oU 31 represents the order from oE 12 as shown in Table 16A. It will be understood that oE 12 also keeps track of the price at which the order is posted in various markets, but this is not shown in Table 15A for brevity. The "in-process" column of Table 15A corresponds to the "in-process (2)" parameter described above. The "action" column of Table 15A corresponds to the "in-process (1)" parameter described above.

TABLE 14A

| posted | in-process | available |
|--------|------------|-----------|
| 1900   | 0          | 1900      |

TABLE 15A

|         | original | paired | posted | in-process | action | queue | available |
|---------|----------|--------|--------|------------|--------|-------|-----------|
| total   | 1900     | 0      |        | 0          |        |       | 1900      |
| oU 30   |          |        | 1900   |            |        |       |           |
| oU 31   |          |        | 1900   |            |        |       |           |

TABLE 16A

| posted | in-process | available |
|--------|------------|-----------|
| 1900   | 0          | 1900      |

What happens to oE 10's market order at oU 30 will now be discussed.

At step 4110, oU 30 receives the market order from oE 10, the active side order ELF, and processes the newly received order. The market order is of the form, "BUY 1000 SHARES OF SYMBOL QXF AT MARKET PRICE." More specifically, at FIG. 46, step 1025, the incoming market order is classified and, at step 1040, order ELF traffic processing logic of FIG. 59 is invoked. At FIG. 59, step 1160, the order is classified as a market order and at step 1180, market order processing of FIG. 73 is invoked. At FIG. 73, step 1440, the quantity x1 is set to the quantity of the incoming order, and the minimum lot size x3 is set in accordance with the incoming order, or a default value if no minimum lot size is specified. In this example, let x1=1000 shares and x3=100 shares. At FIG. 73, step 1445, oU 30 invokes attempt execution processing shown in FIG. 65.

At step 4115, oU 30 gets the best contra side passive orders in its book. More specifically, at FIG. 65, step 1255, oU 30, ensures that if an external exchange is involved, this order would be acceptable. At step 1258, oU 30 invokes the logic shown in FIG. 67 to get the best orders in its book. At FIG. 67, step 5605, oU 30 determines that fast symbol mode is not in effect, and uses its default standby factor. In this example, let the default standby factor be 0.2. At step 5620, oU 30 determines that the number of shares it should consider, s1, is given by s1=1000*(1+0.2)=1200 shares. Now, oU 30 goes to its book, and selects 1000 shares as regular orders and 200 shares as standby orders, in case some of the regular order quantity is not affirmed. Since the limit order from oE 12 is for 1900 shares, this is the only order obtained. At this point, oU 30 represents the order from oE 12 as shown in Table 14B.

TABLE 14B

| posted | in-process | available |
|--------|------------|-----------|
| 1900   | 1200       | 700       |

At step 4120, oU 30 asks passive oE 12 for affirmation that the quantity posted is still available. More specifically, returning to FIG. 65, at step 1260, it is determined that Q1(1200)>x3(100), and so at step 1262, oU 30 invokes affirm quantity processing shown in FIG. 68. At FIG. 68, step 1285, oU 30 asks oE 12 for affirmation.

Turning to FIG. 93B, at step 4220, oE 12 receives the affirmation request from oU 30 and at step 4225 affirms the availability of 1200 shares. More specifically, oE 12 is operative at FIG. 21 to, at step 415, invoke order umpire traffic processing shown in FIG. 32. At FIG. 32, oE 12 classifies the affirmation request from oU 30 as related to prices, and at step 735, invokes the prices processing logic shown in FIG. 33. At FIG. 33, oE 12 classifies the affirmation request as such, and at step 803, invokes the affirmation request processing logic shown in FIG. 34. At step 828 of FIG. 34, oE 12 determines that the requested 1200 shares are readily available as the order for 1900 shares is still posted at oUs 30 and 31, but neither umpire is in-process or in fast symbol mode. At step 833, oE 12 affirms to oU 30 that the 1200 shares are available, and adjusts its order control table to show that the 1200 shares are in-process at oU 30. At this point, oE 12 represents the order as shown in Table 15B; Table 15B may be considered as showing pertinent portions of the order control table.

TABLE 15B

|       | original | paired | posted | in-process | action | queue | available |
|-------|----------|--------|--------|------------|--------|-------|-----------|
| total | 1900     | 0      |        | 1200       |        |       | 700       |
| oU 30 |          |        | 1900   | 1200       |        |       |           |
| oU 31 |          |        | 1900   |            |        |       |           |

At step 4125, oU 30 receives the affirmation from oE 12 for the selected shares. Thus, at FIG. 68, step 1294, all 1200 shares in Reg-1 are affirmed. Returning to FIG. 65, at step 1267, oU 30 checks whether a mirror ELF is involved. In this example, assume no mirror ELF. Accordingly, at step 1275, oU 30 invokes execute quantity processing shown in FIG. 70.

At step 4130, oU 30 pairs the shares of the selected passive side orders with the shares of the active side order. More specifically, at FIG. 70, step 1385, oE 12's passive side order to be paired with oE 10's active side order is obtained, and at step 1390, 1000 shares of the passive side order is paired with the entire 1000 shares of the active side order.

At step 4135, oU 30 sends individual pairing reports to all oEs that participated in pairings. More specifically, at FIG. 70, step 1407, oU 30 sends a pairing report for 1000 shares to each of the oE 10 and oE 12. The pairing report also includes the amount released from in-process but not acted upon. In this example, the pairing report to oE 12 shows 1000 shares paired and 200 shares released from in-process. At this point, oU 30 represents the order from oE 12 as shown in Table 14C.

TABLE 14C

| posted | in-process | available |
|--------|------------|-----------|
| 900    | 0          | 900       |

In some embodiments, oU 30 accumulates pairing reports for an order ELF that are close in time, and sends the accumulated pairing reports together. Via FIG. 65, processing now returns to FIG. 73, and thence to FIG. 59.

At step 4040, oU 30 sends a final pairing report to oE 10, indicating that its order has been completely filled. At FIG. 59, step 1210, oU 30 reports to oE 10 that its order has been completely filled. oU 30 is now finished processing this market order.

At step 4035, oE 10 receives the pairing reports sent from oU 30 at step 4135. At FIG. 21, step 405, oE 10 classifies the pairing reports, and at step 415, oE 10 invokes order umpire traffic processing shown in FIG. 32. At FIG. 32, step 725, oE 10 classifies the pairing reports and at step 742, oE 10 invokes pairing report processing shown in FIG. 40.

At step 4040, oE 10 forwards the pairing reports to order room 70. More specifically, at FIG. 40, step 890, oE 10 updates its order control table and at step 896, reports the pairings to order room 70.

Similarly, at steps 4235 and 4240 of FIG. 99, oE 12 receives a pairing report for 1000 shares. oE 12's processing proceeds through FIG. 21, step 415, to FIG. 32, step 742, to FIG. 39. At step 890, the order control table is adjusted, going from 1900 shares with 1200 shares marked as "in-process," to 1900 shares with 1000 shares paired and 200 shares newly released for a total of 900 shares still available. At step 891 of FIG. 39, oE 12 invokes cancel order processing, shown in FIG. 29B, for the 1000 shares no longer available.

At step 4245 of FIG. 93B, oE 12 sends a cancel for the 1000 shares, just paired at oU 30, to oU 31. See FIG. 29B, step 475. It will be appreciated that oE 12 cancels at oU 31 only the shares posted at oU 30, that is, only the overlapping share amounts. At this point, oE 12 represents the order as shown in Table 15C.

TABLE 15C

|  | original | paired | posted | in-process | action | queue | available |
|---|---|---|---|---|---|---|---|
| total | 1900 | 1000 |  | 0 |  |  | 900 |
| oU 30 |  |  | 900 |  |  |  |  |
| oU 31 |  |  | 1900 |  | cancel 1000 |  |  |

At step 4045, oE 10 receives the order status report sent from oU 30 at step 4140. oE 10 treats this as unsolicited traffic, and at step 4050, forwards the status report to order room 70. See FIG. 21, step 415; FIG. 32, step 745; and FIG. 41, step 915.

FIG. 93C shows oE 12 canceling the 1000 shares of its limit order posted at oU 31 after the order was executed at oU 30, while allowing oU 31 to simultaneously execute only the remaining shares available, namely, 900 shares, despite oU 31's attempt to execute 1500 shares. Thus, duplicate execution of portions of oE 12's order is prevented.

At step 4300 of FIG. 93C, oU 31 receives the limit order posted by oE 12 (see FIG. 93B, step 4215). Assume that an active side order from another order ELF (not shown) has arrived at oU 31. The active side order is of the form, "BUY 5000 SHARES OF SYMBOL QXF AT MARKET PRICE." At step 4303, oU 31 is attempting execution to satisfy the active side order. oU 31 identifies 1500 shares of oE 12's order as part of its best orders. As explained above, identifying an order as a best order causes oU 31 to mark the order as in-process. See FIG. 65, step 1258, and FIG. 67, step 5630. At this point, oU 31 represents the order from oE 12 as shown in Table 16B.

TABLE 16B

| posted | in-process | available |
|---|---|---|
| 1900 | 1500 | 400 |

At step 4305, oU 31 asks oE 12 to affirm availability of 1500 shares; the affirmation request occurs as generally described above. See FIG. 65, step 1260, and FIG. 68, step 1287. Assume that oU 31 sends its affirmation request for 1500 shares to oE 12 at approximately the same time as oE 12 sends its cancel 1000 shares message to oU 31.

At step 4250, oE 12 receives the affirmation request for 1500 shares, and determines that 900 shares are available. Accordingly, oE 12 affirms 900 shares, and marks these shares as in-process in pertinent portions of its order control table 130, as shown in Table 15D. See FIG. 21, step 415; FIG. 32, step 735; FIG. 33; step 803; and FIG. 34, step 833.

TABLE 15D

|  | original | paired | posted | in-process | action | queue | available |
|---|---|---|---|---|---|---|---|
| total | 1900 | 1000 |  | 900 |  |  | 0 |
| oU 30 |  |  | 900 |  |  |  |  |
| oU 31 |  |  | 1900 | 900 | cancel 1000 |  |  |

At step 4310, oU 31 receives the cancel 1000 shares message, and determines that it can cancel only the available amount, namely 400 shares (see Table 16B). See FIG. 81, steps 1673 and 1676. The remaining (1000-400)=600 shares are in-process (see Table 16B).

At step 4320, oU 31 returns a cancel result to oE 12 of, "400 shares cancelled, 600 shares in-process." See FIG. 81, step 1681. While canceling the 400 shares, oU 31 reduces the amount posted by 400 shares, from 1900 shares to 1500 shares. At this point, oU 31 represents the order from oE 12 as shown in Table 16C.

TABLE 16C

| posted | in-process | available |
|---|---|---|
| 1500 | 1500 | 0 |

At step 4260, oE 12 receives the cancel result and updates its order control table to reflect that 400 shares were cancelled, and a 600 share cancel request is enqueued for oU 31. See FIG. 29B, step 490. At this point, pertinent portions of oE 12's order control table 130 are as shown in Table 15E.

TABLE 15E

|  | original | paired | posted | in-process | action | queue | available |
|---|---|---|---|---|---|---|---|
| total | 1900 | 1000 |  | 900 |  |  | 0 |
| oU 30 |  |  | 900 |  |  |  |  |
| oU 31 |  |  | 1500 | 900 |  | cancel 600 |  |

At step 4325, oU 31 receives the affirmation from oE 12 for 900 shares. See FIG. 68, step 1294. Let it be assumed that oU 31 pairs the 900 shares of oE 12's order with a contra-side active order (not shown) using the logic shown in FIG. 65, step 1275. At this point, oU 31 represents the order from oE 12 as shown in Table 16D.

TABLE 16D

| posted | in-process | available |
|---|---|---|
| 600 | 0 | 600 |

At step 4330, oU 31 sends a pairing report to oE 12 indicating that 900 shares were paired and 600 shares were released from in-process. See FIG. 70, step 1407.

At step 4265, oE 12 receives the pairing report, forwards the pairing report to order room 72 and updates its order control table to reflect that 900 additional shares were paired. See FIG. 21, step 415; FIG. 32, step 742, and FIG. 39, step 896. Accordingly, at step 4280, oE 12 sends a message to oU 30 to cancel 900 shares. See FIG. 39, step 891, and FIG. 29B, step 475. Meanwhile, the information in the pairing report that 600 shares were released from in-process at oU 31 causes oE 12 to, at step 4270, apply the enqueued actions for oU 31, see FIG. 39, step 889, and FIG. 40, step 790, and so, at step 4275, oE 12 sends a message to oU 31 to cancel 600 shares. See FIG. 40, step 790, and FIG. 29B, step 475. At this point, pertinent portions of order control table 130 for oE 12 are as shown in Table 15F.

TABLE 15F

|  | original | paired | posted | in-process | action | queue | available |
|---|---|---|---|---|---|---|---|
| total | 1900 | 1900 |  | 0 |  |  | 0 |
| oU 30 |  |  | 900 |  | cancel 900 |  |  |
| oU 31 |  |  | 600 |  | cancel 600 |  |  |

At step 4285, oE 12 receives the cancel result from oU 30, namely, that 900 shares were successfully canceled and no shares are in-process. See FIG. 29B, step 480.

At step 4345, oU 31 receives the cancel 600 shares message from oE 12 and conditionally cancels the 600 shares, then finally cancels the 600 shares. See FIG. 81, steps 1673 and 1676. At step 4350, oU 31 sends a cancel result message to oE 12, indicating that 600 shares were canceled and no shares are in-process. See FIG. 81, step 1681.

At step 4290, oE 12 receives the cancel result from oU 31, see FIG. 29B, step 480, and processing is complete.

Use Case

Mirror ELF Synchronizing Two Markets

FIG. 94 shows an example of canceling an order represented in two markets, oU 31 and oU 32, linked by a mirror ELF, mE 51.

At step 4400, oU 31 receives a cancel instruction from one of the order ELFs registered therewith. At step 4410, oU 31 determines the amount available, and at step 4420, conditionally cancels the available amount. Since there is a mirror ELF, at step 4430, oU 31 sends a cancel instruction to the mirror ELF for the available amount. See FIG. 81

At step 4432, mE 51 receives the cancel instruction from oU 31 and forwards it to oU 32. mE 51 also sets a local timer to the predetermined time interval within which oU 32 must respond. See FIG. 4

At step 4435, oU 32 receives the cancel instruction from mE 51, and at step 4445, conditionally cancels the amount in the cancel instruction. At step 4455, oU 32 sends a cancel response to mE 51, indicating the number of shares that were cancelled and the number of shares that are in-process. See FIG. 49.

At step 4456, mE 51 receives the cancel response from oU 32 and determines that it was received in time, that is, before the timer set at step 4432 expired. Accordingly, at step 4466, mE 51 forwards the cancel response to oU 31 and, at step 4476, sends an acknowledgement of the cancel response to oU 32. See FIG. 4.

At step 4470, oU 31 receives the cancel response from mE 51, and at step 4480, commits the cancel. At step 4490, oU 31 reports to its registered order ELF that the cancel instruction has been complied with. See FIGS. 51 and 81.

At step 4485, oU 32 receives the cancel acknowledgement from mE 51, and at step 4495, commits the cancel. See FIG. 53.

Figure 95:
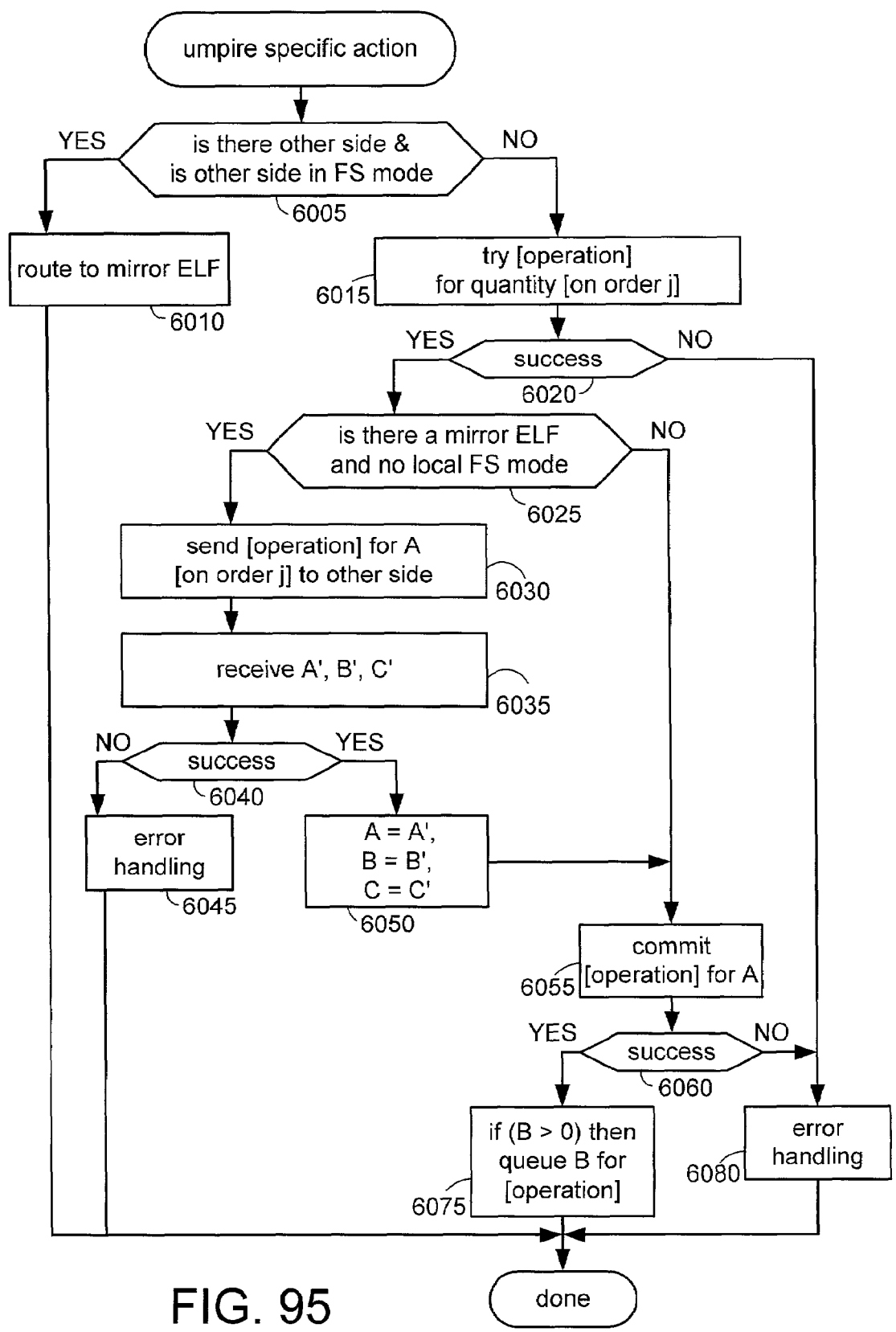
FIG. 95 is a flowchart showing a template for umpire action processing when a mirror ELF is involved.

FIG. 95 is a flowchart showing, generally, how an action is performed by an umpire that is on either end of a mirror ELF link. The action is received from either an order ELF or a mirror ELF, and specifies an operation and the number of shares involved. The operation may be, e.g., cancel, post, affirm or execute.

At step 6005, the umpire checks whether there is another umpire on the other side of the mirror ELF, and that other umpire is in fast symbol mode. If so, at step 6010, this umpire simply routes the action to the mirror ELF, and processing is complete.

If either of the conditions tested at step 6005 are not true, then at step 6015, this umpire conditionally performs the specified operation on the specified quantity. At step 6020, this umpire checks whether the specified conditional operation was successfully performed. If not, then at step 6080, this umpire performs appropriate error handling and processing is complete.

If the conditional operation was successfully performed, at step 6025, this umpire checks whether there is a mirror ELF and there is no local fast symbol mode. If not, processing proceeds to step 6055. If so, then at step 6030, this umpire sends an instruction, via the mirror ELF, to the umpire on the other side of the mirror ELF to perform the operation as specified. At step 6035, the umpire receives a response from the other side umpire, via the mirror ELF, identifying A', the quantity of shares on which the operation was performed, B', the quantity of shares in-process at the other side umpire, and C', a failure code, if any. At step 6040, this umpire checks whether the operation was successfully performed. If not, at step 6045, this umpire performs appropriate error handling and processing is complete. If the operation was successfully performed at the umpire on the other side of the mirror ELF, this umpire sets its local parameters corresponding to the information in the response, and processing proceeds to step 6055.

At step 6055, this umpire commits the operation, that is, unconditionally performs the operation. At step 6060, this umpire checks whether the operation was successfully performed. If not, processing proceeds to step 6080. If the operation was successfully performed, and there are some shares in-process, then the specified operation is enqueued for these shares. Processing is now complete.

Use Case

Linked Order

Linked order processing is the mechanism used by an order room to evaluate one or more markets and trigger executions once the markets satisfy some desired objective function. There are two forms of executions that are supported by system 5: best efforts execution and guaranteed execution. The guaranteed form is discussed below.

FIG. 96 is a flowchart showing an order room's linked order controller 71. In this embodiment, linked order controller 71 resides at order room 70. In other embodiments, linked order controller 71 resides on the platform of system 5, for example, in an order ELF.

At step 7010, linked order controller 71 requests discovery from as many of the order room's order ELFs as appropriate, and, via the order ELFs, from service umpires as desired. Based on this discovery, at step 7020, linked order controller 71 checks whether an objective function for the linked order is satisfied. Generally, an objective function comprises at least one condition for each leg of the linked order. An order room determines how many of the conditions need to be true for the objective function to be satisfied.

Thus, a trader can define a so-called program trade, and require that all legs precisely satisfy the objective function, or specify that, e.g., if 95% of the conditions are satisfied, then the objective function is satisfied. If the objective function is not satisfied, processing returns to step 7010 to monitor relevant market changes forwarded by the order ELFs.

When the objective function is satisfied, at step 7030, linked order controller 71 tells all pertinent order ELFs to request stops. At step 7040, linked order controller 71 checks whether stops have been granted for all legs of the linked order. In other embodiments, linked order controller 71 employs a different set of conditions at step 7040, that is, the conditions can be for other than whether stops have been granted for all legs of the linked order. If all stops have not yet been granted, at step 7050, linked order controller 71 checks whether any stop has been denied, or whether any granted stop has expired. If neither of these conditions has occurred, processing returns to step 7040. If a stop has been denied or expired, processing returns to step 7010. In some embodiments, linked order controller 71 is not responsible for obtaining stops, rather, linked order execution manager 61 of platform services 60 is responsible for obtaining stops for the legs of the linked order.

When all stops have been granted, or the appropriate conditions have been met, at step 7060, linked order controller 71 sends a linked order execution request to platform services 60, which creates an instance of linked order execution manager 61 to respond to the linked order execution request, as described above. At step 7065, linked order controller 71 receives a message and classifies it. If the message is not an execution report, at step 7090, linked order controller 71 receives notice from linked order execution manager 61 that the linked order was not executed (see FIG. 8, step 3025) and processing returns to step 7010. Otherwise, at step 7070, linked order controller 71 receives the pairing reports for the legs of the linked order from various umpires. At step 7080, linked order controller 71 receives a linked order execution confirmation from linked order execution manager 61.

In one embodiment of the best efforts form of linked order execution, steps 7060 and 7080 are omitted. Instead of step 7060, linked order controller 71 sends a "stop exercise" instruction to each order ELF. In a modification, stops are obtained only for selected legs, generally for symbols having fast moving markets. In another embodiment of the best efforts form of linked order execution, linked order controller 71 monitors for whether the objective function is satisfied, and when the objective function is satisfied, linked order controller 71 sends market orders to the appropriate order ELFs; linked order execution manager 61 is not used. In best efforts execution, there is a risk that a leg of the linked order cannot be obtained at the desired price. In some embodiments, linked order controller 71 omits stops entirely during best efforts execution, instead sending market or limit orders to its order ELFs as is done in conventional program trading.

FIG. 97 shows an example of linked order processing. When there are many instances of an entity involved, a processing box is shown with corresponding boxes offset behind the box.

At step 7100, linked order controller 71 requests discovery from its order ELFs. See FIG. 96, step 7010. At step 7105, the order ELFs receive the discovery request and obtain discovery, such as from market status board 75 or by querying at least one umpire. See FIG. 24, step 505. Discovery details are omitted from FIG. 97 for brevity. The order ELFs provide the requested discovery to linked order controller 71.

At step 7110, linked order controller 71 decides that the objective function for the linked 4 order is satisfied. See FIG. 96, step 7020. At step 7115, linked order controller 71 instructs pertinent ELFs to get stops for the legs of the linked order. See FIG. 96, step 7030. At step 7120, the order ELFs receive the request stop messages, and in turn, request stops from order umpires.

See FIG. 28, step 706. At step 7125, the order umpires receive the stop requests from the order ELFs, notify the order ELFs that the stops are granted, and ask platform services 60 to create instances of stop order manager 67 to manage the expiration time of the stops. See FIG. 83, step 1320. At step 7135, the order umpires sequester the shares for the stops. See FIG. 83, step 1319.

At step 7130, platform services 60 creates instances of stop order manager 67 to manage the expiration time for the stops. See FIG. 7, step 3002. At step 7140, the order LLFs receive the stop granted notices and forward them to linked order controller 71. See FIG. 37, step 882.

At step 7145, linked order controller 71 determines that all stops have been granted. See FIG. 96, step 7040. At step 7150, linked order controller 71 sends a linked order execution request to platform services 60. See FIG. 96, step 7060.

At step 7155, platform services 60 receives the linked order execution request and creates an instance of linked order execution manager 61 to manage guaranteed execution for the linked order. See FIG. 8, step 3012. At step 7160, LOEM 61 sends freezes to relevant stop order managers 67. See FIG. 8, step 3016. At step 7165, stop order managers 67 accept the freezes and acknowledge their acceptance to LOEM 61. See FIG. 7, step 3003. LOEM 61 ensures that all sequestered shares are still available. Now, LOEM 61 knows it is safe to exercise the stops.

At step 7170, LOEM 61 sends stop exercise orders to all the umpires involved in the stops. See FIG. 8, step 3024. At step 7175, the umpires receive the stop exercise orders and pair the shares from their books as per the stop exercise orders from LOEM 61. See FIG. 84, step 1745, and FIG. 64B, step 5370. At step 7180, the umpires send pairing reports to the order ELFs involved in the pairings. See FIG. 64B, step 5390. At step 7185, the order ELFs receive the pairing reports and forward them to linked order controller 71. See FIG. 39, step 898. At step 7190, linked order controller 71 receives the pairing reports for the legs of its linked order. See FIG. 96, step 7070.

At step 7195, LOEM 61 sends a linked order execution confirmation to linked order controller 71. See FIG. 8, step 3026. At step 7199, linked order controller 71 receives the linked order execution confirmation. See FIG. 96, step 7080.

Use Case

Trial Order Processing

FIG. 98 illustrates how an order ELF and an order umpire co-operate to process a trial order. A utility of trial orders is to provide discovery regarding market depth. It will be appreciated that pricing for small orders is not necessarily the same as pricing for large, negotiated orders. Further, a trial order returns results specific to the order umpire at which the trial order is posted. A trial order may be considered to be a type of limit order.

At step 4500, order ELF 12 receives a trial order from order room 72 and performs new order processing. See FIG. 21, step 410; FIG. 22, step 435; FIG. 23, step 455. At step 4505, oE 12 performs discovery at umpires that support trial orders. See FIG. 23, steps 505-533. At step 4510, oE 12 builds an action list for the trial order. See FIG. 24, step 535. At step 4515, oE 12 takes action according to the action list, namely, posting the trial order to oU 30. See FIG. 24, step 545, and FIG. 28, step 706.

At step 4520, oU 30 receives the posted trial order and processes it. See FIG. 46, step 1040, and FIG. 59, step 1206. At step 4525, oU 30 posts the trial order to its order book. See FIG. 74, steps 1500 and 1505. Let it be assumed that a contra-side order is posted and, at step 4530, oU 30 selects the trial order as one of the best orders for pairing with the newly posted contra-side order. See FIG. 65, step 1258. At step 4535, oU 30 asks oE 12 to affirm availability. See FIG. 65, step 1260, and FIG. 68, step 1287.

At step 4540, oE 12 receives the request for affirmation from oU 30, and determines that all of the posted shares in the trial order are still available. See FIG. 21, step 415; FIG. 32, step 735; FIG. 33, step 803; and FIG. 34, step 828. At step 4545, oE 12 sends an affirmation of availability to oU 30. See FIG. 34, step 833.

At step 4550, oU 30 receives the affirmation of availability from oE 12. See FIG. 68, step 1294. At step 4555, oU 30 obtains the trial order as the next order in the priority thread, detects that it is a trial order, so adjusts its amount to zero. See FIG. 65, step 1275; FIG. 70, step 1385; and FIG. 71, step 1422. oU 30 then pairs 0 shares of the trial order with the newly posted contra-side order. Accordingly, the priority of regular orders is not disturbed by the presence of the trial order. At step 4560, oU 30 sends a pairing report for 0 shares to oE 12. See FIG. 70, step 1407.

At step 4585, oE 12 receives the pairing report, see FIG. 21, step 415; FIG. 32, step 742; and FIG. 39, step 890; and at step 4590, forwards the pairing report for the trial order to order room 72. See FIG. 39, step 898.

Use Case

Voluntary Auction Mode During Discovery

FIG. 99 illustrates how an active-side order ELF, oE 10, a book umpire with a crowd, oU 30, and a crowd order ELF, oE 12, co-operate during auction mode discovery. In this example, oE 10 asks oU 30 for discovery with auction mode. oE 12 improves upon oU 30's book price, and oE 10 must take oE 12's price.

At step 4600, oE 10 receives an order from order room 70, see FIG. 21, step 410; FIG. 22, step 435; and FIG. 23, step 455, and at step 4605, creates a discover list, see FIG. 23, steps 470 and 520. As part of creating a discover list, at step 4610, oE 10 sends a discover request to order umpire 30, operative according to the superbook method, accompanied by an indication that oE 10 accepts auction mode. See FIG. 23, step 525, and FIG. 26, step 645.

At step 4620, oU 30 receives the discover request from oE 12. See FIG. 46, step 1040; FIG. 59, step 1202; FIG. 61, step 1218; and FIG. 62, step 5305. At step 4625, oU 30 gets its book prices, see FIG. 62, step 5310. At step 4630, oU 30 notifies its crowd of registered order ELFs that a price improvement opportunity exists. The notice includes the discover request and the price(s) oU 30 proposes to provide in response to the discover request. See FIG. 62, step 5325.

At step 4640, oE 12 receives the price improvement opportunity notice from oU 30. See FIG. 21, step 415; FIG. 32, step 735; and FIG. 33, step 805. At step 4645, oE 12 computes a bid price, and determines that its bid price improves upon oU 30's proposed price, see FIG. 35, step 815. At step 4650, oE 12 sends its bid price to oU 30, see FIG. 35, step 820.

At step 4660, oU 30 treats oE 12's crowd response as an order, treats oE 10's discovery request as an order, and pairs oE 12's order with oE 10's order. See FIG. 62, step 5335 and FIG. 70, step 1390. At step 4661, oU 30 sends pairing reports to oE 10 and oE 12. See FIG. 70, step 1407. At steps 4662-4663 and 4664-4665, oEs 10 and 12 respectively receive the pairing reports and forward them to order rooms 70 and 72. At step 4670, oU 30 sends the unexecuted book price(s) to oE 10. See FIG. 62, step 5340.

At step 4675, oE 10 receives the discover response price(s) from oU 30, see FIG. 23, step 526. At step 4680, oE 10 puts the discovered prices into its price response table 120, see FIG. 23, step 529. At step 4685, oE 10 builds an action list, see FIG. 23, step 535.

Use Case

Automatic Auction Mode During Execution (Superbook)

FIG. 100 illustrates how an active-side order ELF, oE 10, a superbook umpire, oU 30, a passive-side order ELF, oE 11, and a crowd order ELF, oE 12, co-operate during superbook execution.

At step 4700, oE 10 posts a market order that it has received from its order room to oU A more detailed explanation of receiving a market order and posting the market order is provided for FIG. 98, steps 4000-4015. See FIG. 21, step 410; FIG. 22, step 435; FIG. 23, step 470; FIG. 24, step 545; and FIG. 28, step 710.

At step 4705, oU 30 receives the market order from oE 10. See FIG. 46, step 1040; FIG. 59, step 1205; and FIG. 73, step 1445. At step 4710, oU 30 gets the best orders from its book to pair against the market order. See FIG. 65, step 1258. At step 4715, oU 30 asks the owners of the orders for affirmation of availability. See FIG. 65, step 1262; and FIG. 68, step 1287.

At step 4720, oE 11 receives the request for affirmation, checks the availability of the shares, see FIG. 21, step 415; FIG. 32, step 735; and FIG. 33, step 803, and affirms to oU 30 that the shares are available, see FIG. 34, step 833.

At step 4730, oU 30 pairs the passive side affirmed orders at the best price with the active side order, see FIG. 68, step 1264. At step 4735, oU 30 sends pairing reports, see FIG. 70, step 1407. At steps 4736 and 4737, oEs 10 and 11 respectively receive the pairing reports and forward the pairing reports to their order rooms; in this example, oE 10 and oE 111 are both owned by order room 70. oU 30 notices that the price will change to fill the as yet unfilled active side order, and at step 4740, notifies its crowd of registered order ELFs that a price improvement opportunity exists, see FIG. 65, step 1270. The notice includes the amount of the market order left to fill and the price(s) oU 30 proposes to provide to fill the market order. At step 4742, oU 30 gets the best book orders that will fill the active side order, see FIG. 65, step 1272.

At step 4745, oE 12 receives the price improvement opportunity notice from oU 30. See FIG. 21, step 415; FIG. 32, step 735; and FIG. 33, step 805. At step 4750, oE 12 computes a bid price, and determines that its bid price improves upon oU 30's proposed price, see FIG. 35, step 815. At step 4755, oE 12 sends its bid price to oU 30, see FIG. 35, step 820.

At step 4760, oU 30 integrates and prioritizes the crowd responses and the best book orders, see FIG. 65, step 1274. At step 4761, oU 30 affirms the book orders with the passive side oEs. At step 4762, passive side oE 11 affirms availability of its posted shares. At step 4765, oU 30 pairs the prioritized crowd responses and affirmed book orders with the active-side market order, see FIG. 65, step 1282, and FIG. 70, step 1390. At step 4770, oU 30 sends pairing reports to the order ELFs having orders involved in a pairing, including oEs 10, 11 and 12, see FIG. 70, step 1407.

At step 4775, active side oE 10 receives the pairing report and forwards it to order room 70. See FIG. 21, step 415; FIG. 32, step 742; and FIG. 39, step 896.

At steps 4777 and 4780, passive side oEs 11 and 12 respectively receive pairing reports and forward them to order room 72. See FIG. 21, step 415; FIG. 32, step 742; and FIG. 39, step 896.

Use Case

Inquiry Form of Negotiation

System 5 provides a mechanism for finding size liquidity, while reducing market and disclosure risk. The problem has been that, as size gets larger, giving information without getting any, such as posting in a book, becomes increasingly onerous. For this reason, large orders have always been worked by phone and even after 30 years of automated trading, computers play no direct role. But phone calls are not ideal either. They are time consuming and the trader still runs disclosure risk, i.e., the risk of giving up information without deriving benefit. The ELF-Umpire relationship described herein allows the trader to find the right conversation quickly, and without disclosure risk.

Using system 5, traders post call lists to inquiry umpires, that is, umpires supporting the inquiry form of negotiation, assigning discretion levels according to type of trade, and relationship. Suppose Tom Trader has 250,000 shares of a volatile stock to sell and wants to find a possible contra party. The ideal is for him to make just one phone call. Using the elements of system 5, Tom directs an ELF to send an appropriate request to an inquiry umpire to poll all possible contras specifying discretion signature 1. Rapidly, the ELF polls hundreds of inquiry umpires. A response on Tom's screen "call Joan 555-9000 on Interest xxx" indicates a match of interest and only the two involved would be aware of the inquiry. Note that this method relies on a human relationship (a level of trust between two traders) and human negotiation, but the preliminaries were at electronic speed. Tom has made, in effect, only one disclosing inquiry. System 5 supports a wide range of such interactions that combine personal relationships with electronic efficiency.

Elements of system 5 that support the inquiry form of negotiation include:

1. Call lists supplied with each order that specify the list of eligible contras and the disclosure signature for each. The eligible contras are specified either by name or by characteristics, in accordance with disclosure signatures.
2. Prices are really a triple of values as shown in Table 4B that include, in addition to a numerical price, a code and an alpha field. Depending on the umpire methodology, the disclosure signature, and other factors, when a price is stored or returned, it may contain one or more of the values found in the price triple. A typical use of the alpha field is for an alpha message directing the contra party to contact someone in regard to a potential mutual interest.
3. Umpires that use disclosure signature oriented methodologies, such as shown in FIG. 63. For example, in FIG. 63, the umpire maintains a book of orders with their respective call lists. Any new orders sent to the umpire either for discovery or posting in the book will be compared with all the relevant orders already in the book. If the call lists are mutually indicative of the intent to allow some form of interaction with the other party, then some form of swapping of information is possible. Information will be provided to each party on the basis of the disclosure signature specified by one party for the other. If the orders are compatible with one another, in addition to information swapping, each party will be notified of the potential of mutual interest.
4. ELFs allow for interaction between the trader (order room) and the order. For example, the trader may specify the list of umpires at which to contact the contras in the call list either statically in the form of parameters included with the order extension fields, or interactively in FIG. 24, steps 510-515. The trader may receive the results of the discovery and indicate to the ELF, interactively, what actions to take (see FIG. 27, steps 655-660).

FIG. 101 illustrates how an active-side order ELF, oE 10, co-operates with an order umpire, oU 30, and a community of order ELFs, represented by oE 12, in the inquiry form of negotiation. At step 4800, oE 12 receives a limit order from order room 72. It will be appreciated that the limit order may include varying levels of disclosure, and, depending on the call list for oE 12, the amount of information provided to other order ELFs may vary. See FIG. 21, step 410; FIG. 22, step 435; FIG. 23, step 470; and FIG. 24, step 505.

At step 4805, oE 12 determines that it should use the negotiation method for price discovery, and sends its price discovery request to oU 30. See FIG. 26, step 645. oU 30 reports to oE 12 that its order was booked. See FIG. 63, step 1238.

At step 4810, oE 12 builds an empty action list, corresponding to just waiting for another party to respond to the price oE 12 submitted to oU 30 in its price discovery request. See FIG. 24, step 535.

At step 4820, oU 30 receives the price discovery request from oE 12. For this example, assume that there are no other booked orders. Accordingly, oU 30 posts the order with its call list to its book. See FIG. 46, step 1040; FIG. 59, step 1202; FIG. 61, step 1218; and FIG. 63, step 1237. At step 4830, oE 10 receives a limit order from order room 70. See FIG. 21, step 410; FIG. 22, step 435; FIG. 23, step 470; and FIG. 24, step 505.

At step 4835, oE 10 determines that it should use the negotiation method for price discovery, and sends its price discovery request to oU 30. See FIG. 26, step 645.

At step 4840, oU 30 receives the price discovery request from oE 10. oU 30 determines that oE 12's posted order is compatible with oE 10's active side order. See FIG. 46, step 1040; FIG. 59, step 1202; FIG. 61, step 1218; and FIG. 63, step 1227.

At step 4845, oU 30 reports to each of the parties that a negotiation could be fruitful and forwards the information permitted by the other party's disclosure list. See FIG. 63, step 1240. It will be appreciated that although this example shows only the order from oE 12 being compatible, in practice, many orders may be compatible.

At step 4850, oE 10 receives the response(s) to its discover request, which may be information such as "call Jane Broker at 212 111-1111 about order 222-333" and "contact Bobgbrokerage.com mentioning order ID 12345," as permitted by the disclosure lists of the order ELFs for Jane Broker and Bob. oE 10 then builds an action list, such as to report the results to order room 70 when the response indicates that the contra party wishes to negotiate outside the platform of system 5. See FIG. 24, step 535.

At step 4855, oE 10 sends the discover results to order room 70. See FIG. 24, step 545.

At step 4860, oE 12 receives the discover results as unsolicited traffic, and forwards the discover results to order room 72. See FIG. 21, step 415; FIG. 32, step 745; and FIG. 41, step 965.

Use Case

Direct Negotiation

FIG. 102 illustrates an example of direct negotiation using system 5. Assume that oE 10 and oE 12 have submitted discover requests to oE 30 as described above with regard to FIG. 108; however, instead of the information permitted to be disclosed indicating that the party wishes to negotiate outside system 5, the permitted disclosure information can be used by the decision tables of oEs 10 and 12 to engage in automated offer and counter-offers. It will be appreciated that many negotiation strategies are possible.

At step 4900, oU 30 reports to each of the parties that a negotiation could be fruitful and forwards the information permitted by the other party's disclosure list. See FIG. 63, step 1240.

At step 4905, oE 12 receives the discover results as unsolicited traffic, and forwards the discover results to order room 72. See FIG. 21, step 415; FIG. 32, step 745; and FIG. 41, step 965.

At step 4910, oE 10 receives the disclosure permitted by oE 12, such as "oE 12, minimum lot size 20,000 shares" and uses this information to prepare an initial automated offer. See FIG. 24, step 535. At step 4915, oE 10 sends its offer to oU 30 for routing to oE 12. See FIG. 24, step 545.

At step 4920, oU 30 receives the offer from oE 10, and since it is an initial offer, oU 30 enters the offer into its book. Although not shown in this example, in practice, subsequent offers or counter-offers made by oE 10 will update the initial booked offer. See FIG. 46, step 1040; FIG. 59, step 1207; and FIG. 77, step 1657.

At step 4925, oE 12 receives the offer from oE 10, as forwarded by oU 30. It will be appreciated that oE 10 may select the amount of information to be disclosed to oE 12. In this example, assume that oE 12 automatically decides to accept the offer as it is within the limit order parameters received from order room 72 at step 4905. See FIG. 21, step 415; FIG. 32, step 735; FIG. 33, step 810; and FIG. 36, step 865.

At step 4930, oE 12 builds an action list comprising "accept price from oE 10." See FIG. 36, step 870. At step 4935, oE 12 acts upon its action list, and sends its price acceptance to oU 30. See FIG. 36, step 875.

At step 4940, oU 30 receives the price acceptance from oE 12 and attempts to pair the offer with the acceptance. See FIG. 46, step 1040; FIG. 59, step 1203; FIG. 64C, step 1245; and FIG. 65, step 1258. At step 4945, oU 30 asks oE 10 to affirm availability of the shares in the price acceptance. Note that when oE 12 accepted the price offer from oE 10, oE 12 became the active-side ELF. It will be appreciated that during a negotiation, the active-side party can change repeatedly. See FIG. 65, step 1262, and FIG. 68, step 1287.

At step 4950, oE 10 checks the availability of its shares, see FIG. 21, step 415; FIG. 32, step 735; FIG. 33, step 803; and FIG. 34, step 828; and at step 4955, oE 10 sends an affirmation of availability to oU 30. See FIG. 34, step 833.

At step 4960, oU 30 receives the affirmation from oE 10, see FIG. 68, step 1294, and at step 4965, oU 30 pairs the shares of oE 10's order and oE 12's acceptance, see FIG. 65, step 1275, and FIG. 70, step 1385. At step 4970, oU 30 sends a pairing report to each of oE 10 and oE 12, see FIG. 70, step 1390.

At step 4975, oE 10 receives the pairing report, see FIG. 21, step 415; FIG. 32, step 742; and FIG. 39, step 890, and at step 4980, oE 10 forwards the pairing report to order room 70, see FIG. 39, step 896.

At step 4985, oE 12 receives the pairing report, see FIG. 21, step 415; FIG. 32, step 742; and FIG. 39, step 890, and at step 4990, oE 12 forwards the pairing report to order room 72, see FIG. 39, step 896.

It will be appreciated that negotiation can continue, that is, the decision table for oE 10 can indicate that if an offer is accepted, another offer should be made at a close price, or the next result of the discover request should be explored, and so on. In some cases, oE 10 negotiates with multiple parties simultaneously, with each of the parties being used to pair some of the order represented by oE 10.

Use Case

Stop Order

FIG. 103 illustrates an example of stop order processing using system 5. At step 5100, oE 10 receives a stop order from order room 70. See FIG. 21, step 410, FIG. 22, step 435, FIG. 23, step 470. At step 5405, oE 10 decides to request the stop from oU 30. See FIG. 24, step 535 and FIG. 27, step 690. At step 5410, oE 10 requests a stop from oU 30. See FIG. 24, step 545 and FIG. 28, step 706.

At step 5415, oU 30 receives the stop request from oE 10. See FIG. 46, step 1040, and FIG. 59, step 1213. At step 5420, oU 30 ensures that it permits stops (FIG. 83, step 1310). At step 5425, oU 30 asks platform services 609 for notice when the stop expires (FIG. 83, step 1317). At step 5430, oU 30 sequesters the resource for the stop, such as by reserving shares or reserving purchasing power (FIG. 83, step 1319). At step 5435, oU 30 notifies oE 10 that the stop is granted (FIG. 83, step 1320).

At step 5450, oE 10 receives the stop granted notice. See FIG. 21, step 415, FIG. 32, step 740, and FIG. 37, steps 886-888. At step 5455, oE 10 reports the stop granted notice to order room 70 (FIG. 38, step 560).

Meanwhile, at step 5440, platform services 60 receives the stop expiration timing request from oU 30, and instantiates a stop order manager 67 process to fulfill the timing request (FIG. 7, step 3000). At step 5445, stop order manager 67 sets a timer (FIG. 7, step 3002). In this example, nothing occurs to adjust the timer. Accordingly, at step 5495, stop order manager 67 sends notices to oU 30 and oE 10 that the stop has expired (FIG. 7, steps 3008 and 3010), and this instance of stop order manager 67 terminates itself.

In this example, before the stop has expired, order room 70 decides to exercise the stop, and at step 5460, oE 10 receives a stop exercise order from order room 70. See FIG. 21, step 410, FIG. 22, step 435, and FIG. 23, step 470. At step 5465, oE 10 forwards the stop exercise order to oU 30 (FIG. 24, steps 535 and 545).

At step 5470, oU 30 receives the stop exercise order. See FIG. 46, step 1040 and FIG. 59, step 5350. At step 5475, oU 30 pairs the sequestered resource with the stop exercise order (FIG. 64B, step 5370). At step 5480, oU 30 sends pairing reports to the owner of the sequestered resource and to oE 10 (FIG. 64B, step 5390).

At step 5485, oE 10 receives the pairing report. See FIG. 21, step 415 and FIG. 32, step 742. At step 5490, oE 10 forwards the pairing report to order room 70 (FIG. 39, step 898).

Sometime later, at step 5497, oU 30 receives the stop expiration notice from stop order manager 67 (FIG. 46, step 1045 and FIG. 84, step 1765). At step 5499, oE 10 receives the stop expiration notice from stop order manager 67 (FIG. 21, step 425 and FIG. 43, step 927).

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method of facilitating trading, comprising:
automatically receiving a request for a short term option, wherein the request for the short term option is received as a result of trading activity of a user without an explicit request for the short term option from the user,
automatically receiving a timer request for a timer to measure the duration of the short term option, wherein the term of the short term option is about ten seconds or less measured from when the short term option is granted, and wherein the request is received from a market process, the market process being a computer program executing on a computer system and implementing rules of engagement by which information or merchandise is exchanged between trading processes,
in response to the timer request, automatically instantiating the timer and setting the timer to indicate the short term option expiration time, and
automatically terminating the instance of the timer upon expiration of the short term option.

2. The method of claim 1, further comprising resetting the timer to ensure that the short term option remains valid.

3. The method of claim 1, further comprising sending a short term option expiration notice to the market process.

4. The method of claim 1, wherein the timer request also includes identification of a trading process, and further comprising sending a short term option expiration notice to the trading process.

5. The method of claim 1, further comprising creating a short term option manager process in response to the timer request, and upon expiration of the short term option, terminating the short term option manager process.

6. The method of claim 1, wherein the automatically receiving and setting are performed by a platform process.

7. A method of facilitating trading, comprising:
automatically receiving a short term option request from a user, the term of the short term option being about ten seconds or less measured from when the short term option is granted, wherein the short term option request is automatically received as a result of user trading activity without an explicit request for the short term option from the user, and
automatically requesting the short term option from a market process, the market process being a computer program executing on a computer system and implementing rules of engagement by which information or merchandise is exchanged between trading processes.

8. The method of claim 7, further comprising automatically selecting one of a plurality of market processes from which to request the short term option.

9. The method of claim 7, further comprising receiving notice from the market process that the short term option was granted.

10. The method of claim 9, further comprising forwarding the notice that the short term option was granted to the user.

11. The method of claim 7, wherein the term of the short term option is about one second or less measured from when the short term option is granted.

12. The method of claim 7, wherein the automatically receiving and requesting are performed by a trading process, the trading process being a computer program configured to act as an agent that, when executed, represents an order from the user and interacts with the market process according to the rules of engagement.

13. A method of facilitating trading, comprising:
receiving, at a computer program executing on a computer system and implementing rules of engagement by which information or merchandise is exchanged between trading processes, a request for a short term option having a term of about ten seconds or less measured from when the short term option is granted, wherein the request for the short term option is automatically received as a result of trading activity of a user without an explicit request for the short term option from the user, and
automatically granting the short term option.

14. The method of claim 13, wherein the short term option request is received from a trading process.

15. The method of claim 13, wherein the term of the short term option is about one second or less measured from when the short term option is granted.

16. The method of claim 13, wherein the request includes the term of the short term option.

17. The method of claim 13, further comprising automatically requesting a platform process to instantiate and set a timer to indicate when the short term option has expired and terminate the instance of the timer when the short term option has expired.

18. The method of claim 13, wherein the short term option request indicates a desired resource, and further comprising automatically reserving the desired resource until the expiration time of the short term option.

19. The method of claim 18, further comprising automatically releasing the reserved resource at the expiration of the short term option when the short term option has not been exercised.

20. The method of claim 18, wherein the short term option request indicates a price for the desired resource, the method further comprising receiving an instruction to exercise the short term option, and automatically pairing the reserved resource at the price in the request in response to the exercise instruction.

21. The method of claim 20, wherein the exercise instruction is received from a trading process.

22. The method of claim 20, wherein the exercise instruction is received from a platform process.

23. The method of claim 13, wherein the automatically receiving and granting are performed by a market process.

24. The method of claim 7, wherein the short term option request is automatically received as a result of processing a linked order received from the user.

25. The method of claim 12, wherein the automatically receiving and requesting are performed by multiple trading processes that are simultaneously and independently representing multiple orders of the user.

26. The method of claim 13, wherein the request for the short term option is automatically received as a result of processing a linked order received from the user.

27. The method of claim 14, further comprising receiving multiple requests for short term options from multiple trading processes that are simultaneously and independently representing multiple orders of a user.

28. The method of claim 1, wherein the term of the short term option is about one second or less measured from when the short term option is granted.

29. A computer-accessible medium having executable instructions stored thereon for facilitating trading, wherein the instructions form a trading process that, when executed, causes a computer to:
generate a short term option request on behalf of a user, wherein the short term option request is generated as a result of user trading activity without an explicit request for the short term option from the user; and
communicate the short term option request to a market process,
wherein the term of the short term option is about ten seconds or less measured from when the short term option is granted, and wherein the market process is a computer program executing on a computer system and implementing rules of engagement by which information or merchandise is exchanged between trading processes.

30. The computer-accessible medium of claim 29, wherein the instructions further cause the computer to select one of a plurality of market processes from which to request the short term option.

31. The computer-accessible medium of claim 29, wherein the instructions further cause the computer to receive notice from the market process that the short term option was granted.

32. The computer-accessible medium of claim 31, wherein the instructions further cause the computer to forward the notice that the short term option was granted to the user.

33. The computer-accessible medium of claim 29, wherein the term of the short term option is about one second or less measured from when the short term option is granted.

34. The computer-accessible medium of claim 29, wherein the short term option request is generated as a result of processing a linked order received from the user.

35. A system for facilitating trading, comprising:
a computer having a processing component configured to implement rules of engagement by which information or merchandise is exchanged between trading processes, wherein the processing component is configured to receive a request for a short term option having a term of about ten seconds or less measured from when the short term option is granted, and to grant the short term option, the short term option request being received as a result of user trading activity without an explicit request for the short term option from the user.

36. The system of claim 35, wherein the processing component is configured to receive the short term option request from a trading process.

37. The system of claim 35, wherein the term of the short term option is about one second or less measured from when the short term option is granted.

38. The system of claim 35, wherein the request includes the term of the short term option.

39. The system of claim 35, wherein the processing component is further configured to request a platform process to instantiate and set a timer to indicate when the short term option has expired and to terminate the instance of the timer when the short term option has expired.

40. The system of claim 35, wherein the short term option request indicates a desired resource, the processing component being further configured to reserve the desired resource until the expiration time of the short term option.

41. The system of claim 40, wherein the processing component is further configured to release the reserved resource at the expiration of the short term option when the short term option has not been exercised.

42. The system of claim 40, wherein the short term option request indicates a price for the desired resource, the processing component being further configured to receive an instruction to exercise the short term option, and pair the reserved resource at the price in the request in response to the exercise instruction.

43. The system of claim 42, wherein the exercise instruction is received from a trading process.

44. The system of claim 42, wherein the exercise instruction is received from a platform process.

45. The system of claim 35, wherein computer program instructions stored in the computer form a market process that, when executed, configures the processing component to receive and grant the short term option request.

46. The method of claim 1, wherein the request for the short term option is automatically received as a result of processing a linked order received from the user, wherein the linked order is comprised of a plurality of orders for different items, each order including an item and an indicated price for the item, for joint execution of the orders at the indicated prices, wherein the short term option maintains a price for an item to ensure that the order for the item can be executed at the respective indicated price when the linked order is executed.

47. The method of claim 24, wherein the linked order is comprised of a plurality of orders for different items, each order including an item and an indicated price for the item, for joint execution of the orders at the indicated prices, wherein the short term option maintains a price for an item to ensure that the order for the item can be executed at the respective indicated price when the linked order is executed.

48. The method of claim 26, wherein the linked order is comprised of a plurality of orders for different items, each order including an item and an indicated price for the item, for joint execution of the orders at the indicated prices, wherein the short term option maintains a price for an item to ensure that the order for the item can be executed at the respective indicated price when the linked order is executed.

49. The computer-accessible medium of claim 34, wherein the linked order is comprised of a plurality of orders for different items, each order including an item and an indicated price for the item, for joint execution of the orders at the indicated prices, wherein the short term option maintains a price for an item to ensure that the order for the item can be executed at the respective indicated price when the linked order is executed.

50. The system of claim 35, wherein the short term option request is automatically received as a result of processing a linked order received from the user, wherein the linked order is comprised of a plurality of orders for different items, each order including an item and an indicated price for the item, for joint execution of the orders at the indicated prices, wherein the short term option maintains a price for an item to ensure that the order for the item can be executed at the respective indicated price when the linked order is executed.

* * * * *

UNITED STATES PATENT AND TRADEMARK OFFICE
CERTIFICATE OF CORRECTION

PATENT NO.          : 7,383,220 B1                                             Page 1 of 1
APPLICATION NO. : 09/802088
DATED                  : June 3, 2008
INVENTOR(S)        : C. Keith It is certified that error appears in the above-identified patent and that said Letters Patent is hereby corrected as shown below:

On the title page item

| | | |
|---|---|---|
| (56) Pg. 1-2, cols. 1-2 | Refs. Cited (U.S. Patent Documents) | Insert in appropriate numerical order:<br><br>--5297031  A  3/1994  Gutterman<br>  5787402  A  7/1998  Potter<br>  6359633  B1 3/2002  Balasubramaniam-- |
| (56) Pg. 2, col. 2 | Refs. Cited (Other References, Item 12) | "Exchang," should read --Exchange,"-- |

Signed and Sealed this

Thirteenth Day of October, 2009

David J. Kappos
*Director of the United States Patent and Trademark Office*